United States Patent [19] [11] 4,237,532
Borgerson et al. [45] Dec. 2, 1980

[54] TABLE DRIVEN DECISION AND CONTROL LOGIC FOR DIGITAL COMPUTERS

[75] Inventors: Barry R. Borgerson, Gwynedd Valley; Garold S. Tjaden, Doylestown, both of Pa.; Merlin L. Hanson, Arden Hills, Minn.

[73] Assignee: Sperry Corporation, New York, N.Y.

[21] Appl. No.: 830,302

[22] Filed: Sep. 2, 1977

[51] Int. Cl.[3] ........................ G06F 9/22; G06F 13/00; G06F 9/42

[52] U.S. Cl. ........................................ 364/200

[58] Field of Search ... 364/200 MS File, 900 MS File

[56] References Cited

U.S. PATENT DOCUMENTS

| | | | |
|---|---|---|---|
| 3,950,730 | 4/1976 | Bienvenu et al. | 364/200 |
| 4,044,334 | 8/1977 | Bachman et al. | 364/200 |
| 4,056,844 | 11/1977 | Izumi | 364/200 |
| 4,057,848 | 11/1977 | Hayashi | 364/200 |

*Primary Examiner*—Melvin B. Chapnick
*Attorney, Agent, or Firm*—Howard P. Terry; Albert B. Cooper

[57] ABSTRACT

Decision and control logic for use in digital computers that operate in cycles provides binary valued decision signals for effecting decisional control within the computer such as that utilized in conditional branching. The decision signals are provided in accordance with binary valued control functions of binary valued static and dynamic control variables utilized in the computer. The dynamic control variables are available in a computer cycle subsequent to the availability of the static variables and represent conditions of various components of the computer. Truth tables of the control functions are stored in logic function memories addressed by logic function selection control fields of computer control words, the control fields selectively addressing the truth tables in accordance with the desired functions. The static variables are utilized for addressing the logic function memories for providing the truth table entries corresponding to the selected function of the static control variables and the dynamic variables select among the addressed truth table entries to provide the binary valued decision control signals. Preferably the logic function memories are implemented by LSI integrated circuits.

10 Claims, 99 Drawing Figures

GLOBAL CONTROL

| | | | | | | | | | | | |
|---|---|---|---|---|---|---|---|---|---|---|---|
| 2 | 10 | 2 | 2 | 2 | 10 | 1 | 2 | 2 | 2 | 2 | 5 |
| JDS | NAT | XF | VDSO | VDS1 | NAF | BR | BIS | SFT | GRA | DADS | DACT |
| 5 | 4 | 4 | 4 | 4 | 4 | 4 | 4 | 4 | 4 | 4 | 4 |
| DACF | SVO | SV1 | SV2 | SV3 | SV4 | SV5 | DVO | DV1 | DV2 | DV3 | DV4 |
| 4 | 2 | 4 | 4 | 4 | 4 | 4 | 4 | | | | |
| DV5 | SWA | LFCO | LFC1 | LFC2 | LFC3 | LFC4 | LFC5 | | | | |

LOCAL CONTROL

| | | | | | | | | | | |
|---|---|---|---|---|---|---|---|---|---|---|
| | 2 | 14 | 14 | 2 | 6 | 2 | 2 | 2 | 2 | 3 |
| P1, P2, P3 | PDS | LPFT | LPFF | LMAS | LMA | CC | DDS | OUT | WLM | SCS |
| | 2 | 15 | 15 | 1 | 4 | 1 | 2 | 2 | 4 | 3 |
| P4 | PDS | LPFT | LPFF | LMAS | LMA | BBS | DDS | WLM | WLMA | SCS |

11

DEFERRED ACTION CONTROL (DAC) TABLE

106

| BIT | ACTION \ WORD | 0 (NOP) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|---|
| 0 | P → IAR | | 1 | | | | | | | | | | | | | | | 1 | | | | 1 | | 1 | | | | | |
| 1 | D → IAR | | | | | | | | | | | | 1 | | | | 1 | | | 1 | 1 | | 1 | | | | | | |
| 2 | D → OAR | | | | 1 | | | | | | | | | | 1 | | | | | | 1 | | | | | | | | |
| 3 | D → MDR | | | | | | | | | | | | | | | 1 | | | 1 | | | | | | | | | | |
| 4 | $D_4$ → RAR 1 | | 1 | | | | | | 1 | | | | | | | | | | | | | | | | | | | | |
| 5 | $D_4$ → RAR 2 | | | 1 | 1 | | | | | 1 | | | 1 | 1 | 1 | | | | | | | | | | | | | | |
| 6 | D → RAR 3 | | | 1 | | | | | | | | | | 1 | | | | | | 1 | | | | | | | | | |
| 7 | D → SCR | | | | | | | | | | | | | | | | | | | | | | | | | | 1 | | |
| 8 | D → LMAR | | | | | | | | | | | | | | | | | | | | | | | | | | | 1 | |
| 9 | $D_4$ → P | | | | | | | | | | | | | | | | | | 1 | | | 1 | | | 1 | | | | |
| 10 | LOAD BRG | | | 1 | 1 | | | | | | 1 | | | | | | | | | | | | | | | | | | |
| 11 | BRG BIT 0 | | | 1 | | | | | | | | | | | | | | | | | | | | | | | | | |
| 12 | BRG BIT 1 | | | 1 | | | | | | | 1 | | | | | | | | | | | | | | | | | | |
| 13 | FETCH NI | | | 1 | 1 | | | | | | | | 1 | | | 1 | | | | | | | | | | | | | |
| 14 | FETCH OP | | | | 1 | | | | | | | | | | | | | | | | | | | | | | | | |
| 15 | STORE OP | | | | | | | | | | | | | | | 1 | | | | | | | | | | | | | |
| 16 | STATICIZE | | | | | | 1 | | | | | 1 | | | 1 | | | 1 | 1 | | | | | | 1 | | | | |
| 17 | D → GRS (R) | | | | | 1 | | | | | | 1 | | | | | | | | | | | | | 1 | 1 | | | |
| 18 | CARRY → D0 | | | | | | | 1 | | | | | | | | | | | | | | | | | | | | | |
| 19 | OVFL → D1 | | | | | | | 1 | | | | | | | | | | | | | | | | | | | | | |
| 20 | NH → SCR | | | | | | | | | | | | | | | | | | | | | | | | | | | | 1 |
| 21 | D → GRS (L) | | | | | | | | | | | | | | | | | | | | | | | | 1 | 1 | | | |

FIG. 7.

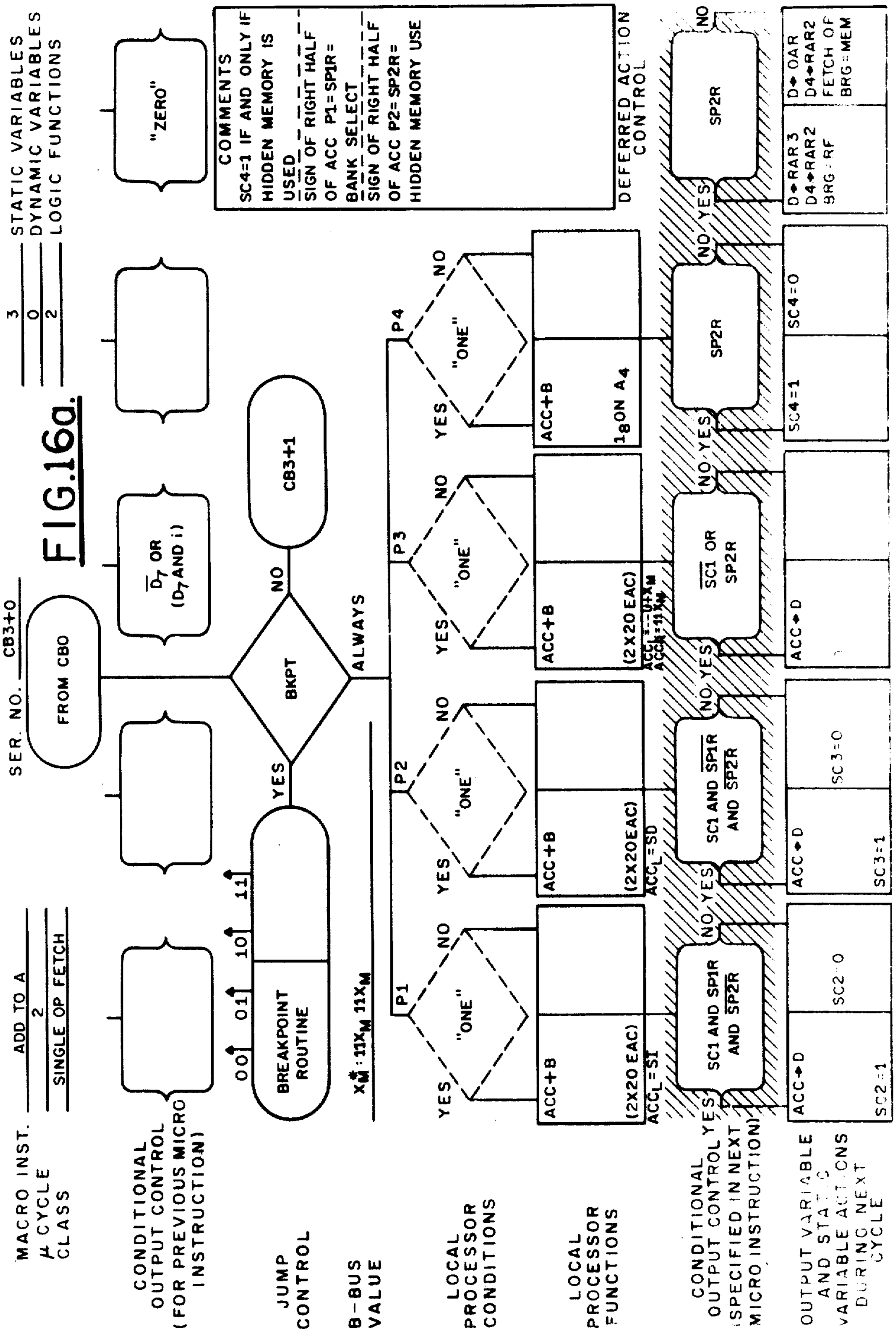
FIG. 16a.
MACRO INST. ADD TO A
μ CYCLE 2
CLASS SINGLE OP FETCH
SER. NO. CB3+0
3 STATIC VARIABLES
0 DYNAMIC VARIABLES
2 LOGIC FUNCTIONS
CONDITIONAL OUTPUT CONTROL (FOR PREVIOUS MICRO INSTRUCTION)
"ZERO"
JUMP CONTROL
FROM CBO
BKPT
YES
NO
ALWAYS
BREAKPOINT ROUTINE
CB3+1
B-BUS VALUE
LOCAL PROCESSOR CONDITIONS
P1
P2
P3
P4
"ONE"
LOCAL PROCESSOR FUNCTIONS
ACC+B
(2X20 EAC)
1₈ON A₄
CONDITIONAL OUTPUT CONTROL (SPECIFIED IN NEXT MICRO INSTRUCTION)
SC1 AND SP1R AND SP2R
SC1 OR SP2R
SP2R
OUTPUT VARIABLE AND STATIC VARIABLE ACTIONS DURING NEXT CYCLE
ACC→D
SC2:1
SC2:0
SC3:1
SC3:0
SC4=1
SC4=0
D→RAR3
D4→RAR2
BRG:RF
D→OAR
D4→RAR2
FETCH OF
BRG=MEM
COMMENTS
SC4=1 IF AND ONLY IF HIDDEN MEMORY IS USED
SIGN OF RIGHT HALF OF ACC P1=SP1R=BANK SELECT
SIGN OF RIGHT HALF OF ACC P2=SP2R=HIDDEN MEMORY USE
DEFERRED ACTION CONTROL

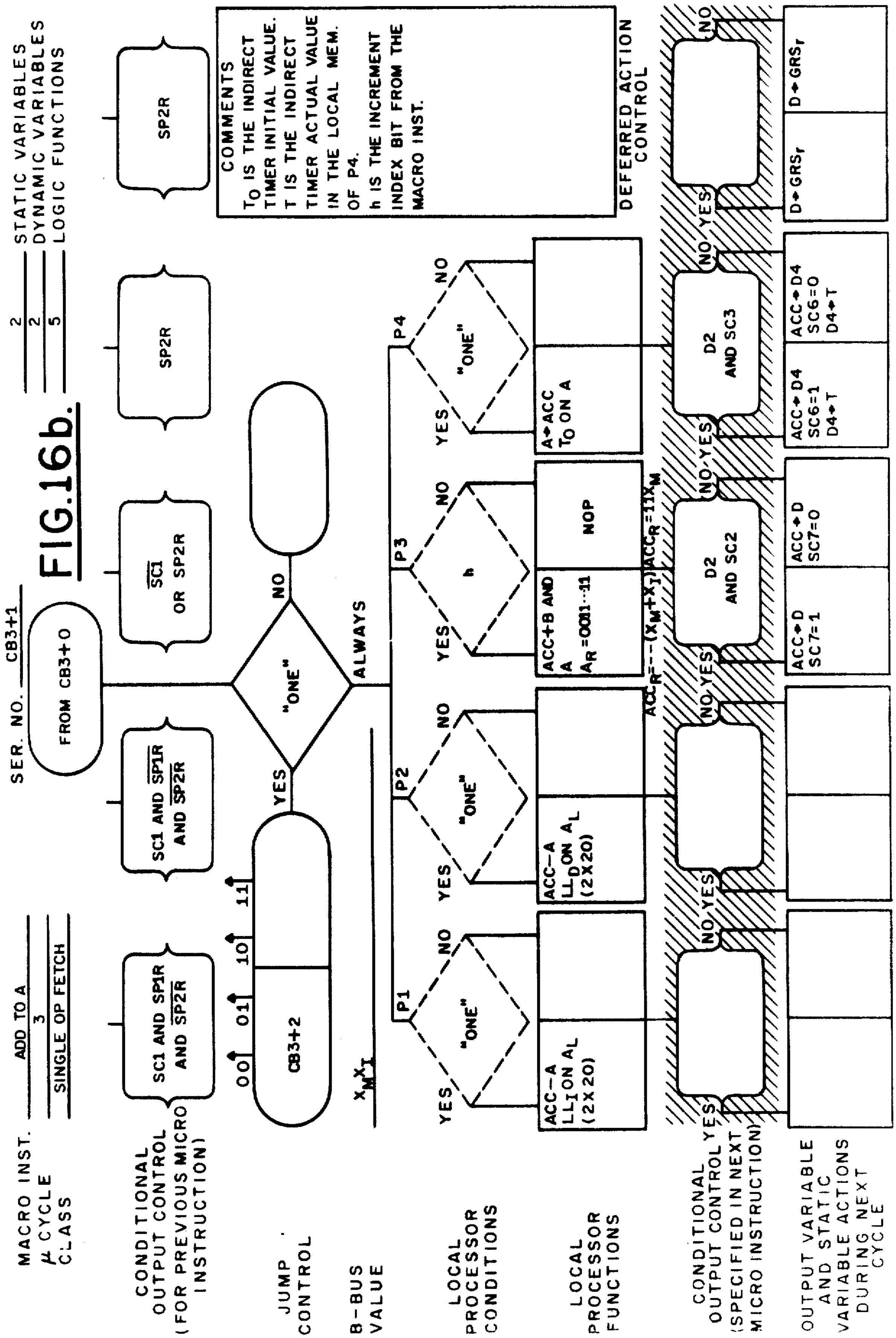
FIG.16b.
MACRO INST. ADD TO A
μ CYCLE 3
CLASS SINGLE OP FETCH
SER. NO. CB3+1
STATIC VARIABLES 2
DYNAMIC VARIABLES 2
LOGIC FUNCTIONS 5
CONDITIONAL OUTPUT CONTROL (FOR PREVIOUS MICRO INSTRUCTION)
SC1 AND SP1R AND SP2R
SC1 AND SP1R AND SP2R
SC1 OR SP2R
SP2R
SP2R
FROM CB3+0
JUMP CONTROL
"ONE"
YES
NO
ALWAYS
CB3+2
00
01
10
11
B-BUS VALUE
LOCAL PROCESSOR CONDITIONS
P1
P2
P3
P4
"ONE"
h
YES
NO
LOCAL PROCESSOR FUNCTIONS
ACC-A LLI ON AL (2X20)
ACC-A LLD ON AL (2X20)
ACC+B AND A AR=0011··11
NOP
A+ACC TO ON A
ACCR=-(XM+XI) ACCR=11XM
CONDITIONAL OUTPUT CONTROL (SPECIFIED IN NEXT MICRO INSTRUCTION)
D2 AND SC2
D2 AND SC3
DEFERRED ACTION CONTROL
OUTPUT VARIABLE AND STATIC VARIABLE ACTIONS DURING NEXT CYCLE
ACC→D SC7=1
ACC→D SC7=0
ACC→D4 SC6=1 D4→T
ACC→D4 SC6=0 D4→T
D→GRSr
D→GRSr
COMMENTS
TO IS THE INDIRECT TIMER INITIAL VALUE.
T IS THE INDIRECT TIMER ACTUAL VALUE IN THE LOCAL MEM. OF P4.
h IS THE INCREMENT INDEX BIT FROM THE MACRO INST.

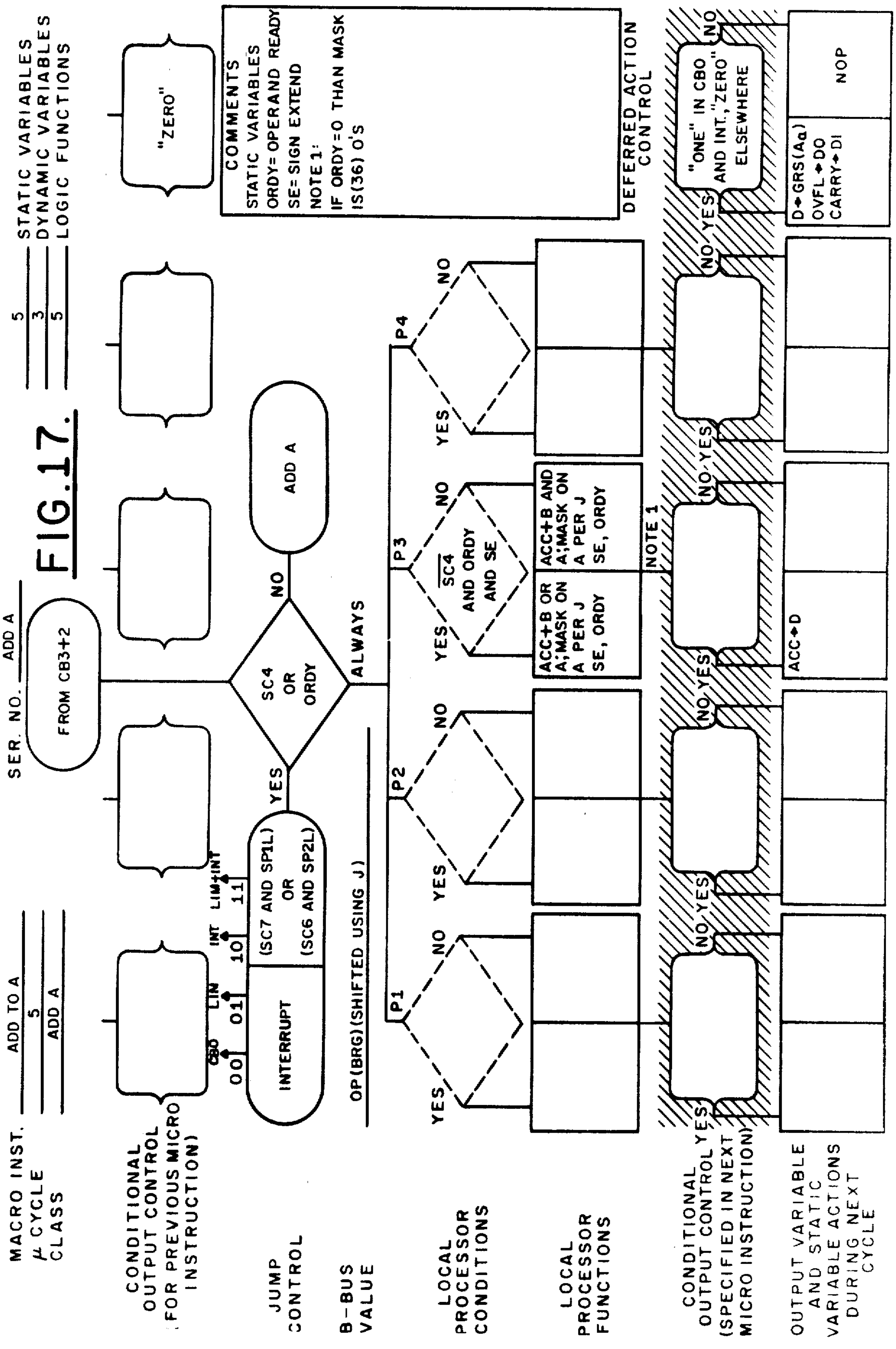
FIG. 17.
MACRO INST. ADD TO A
μ CYCLE 5
CLASS ADD A
SER. NO. ADD A
5 STATIC VARIABLES
3 DYNAMIC VARIABLES
5 LOGIC FUNCTIONS
CONDITIONAL OUTPUT CONTROL (FOR PREVIOUS MICRO INSTRUCTION)
"ZERO"
JUMP CONTROL
FROM CB3+2
SC4 OR ORDY
YES
NO
ALWAYS
ADD A
INTERRUPT
(SC7 AND SP1L) OR (SC6 AND SP2L)
00 CBO
01 LIN
10 INT
11 LIM+INT
B-BUS VALUE
OP(BRG)(SHIFTED USING J)
LOCAL PROCESSOR CONDITIONS
P1
P2
P3
P4
$\overline{SC4}$ AND ORDY AND SE
LOCAL PROCESSOR FUNCTIONS
ACC+B OR A;MASK ON A PER J SE, ORDY
ACC+B AND A;MASK ON A PER J SE, ORDY
COMMENTS
STATIC VARIABLES
ORDY= OPERAND READY
SE= SIGN EXTEND
NOTE 1:
IF ORDY=0 THAN MASK IS(36) 0'S
DEFERRED ACTION CONTROL
NOTE 1
CONDITIONAL OUTPUT CONTROL (SPECIFIED IN NEXT MICRO INSTRUCTION)
"ONE" IN CBO AND INT,"ZERO" ELSEWHERE
OUTPUT VARIABLE AND STATIC VARIABLE ACTIONS DURING NEXT CYCLE
ACC→D
D→GRS($A_d$)
OVFL→DO
CARRY→DI
NOP

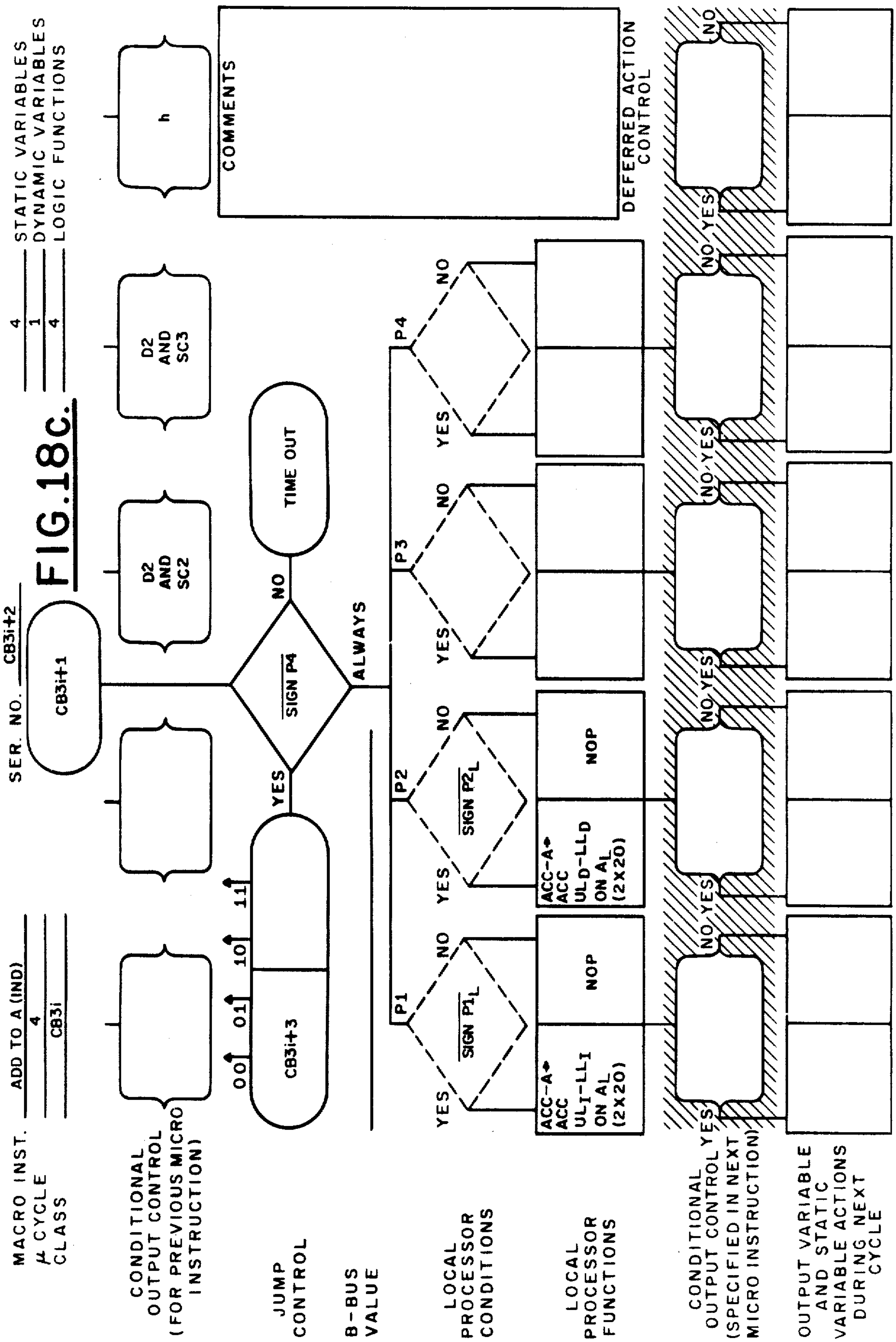
FIG. 18C.
MACRO INST. ADD TO A (IND)
μ CYCLE 4
CLASS CB3i
SER. NO. CB3i+2
STATIC VARIABLES 4
DYNAMIC VARIABLES 1
LOGIC FUNCTIONS 4
CONDITIONAL OUTPUT CONTROL (FOR PREVIOUS MICRO INSTRUCTION)
D2 AND SC2
D2 AND SC3
h
COMMENTS
JUMP CONTROL
CB3i+3
00
01
10
11
YES
SIGN P4
NO
CB3i+1
TIME OUT
ALWAYS
B-BUS VALUE
LOCAL PROCESSOR CONDITIONS
P1
SIGN P1L
P2
SIGN P2L
P3
P4
YES
NO
LOCAL PROCESSOR FUNCTIONS
ACC-A→ACC ULI-LLI ON AL (2X20)
NOP
ACC-A→ACC ULD-LLD ON AL (2X20)
NOP
DEFERRED ACTION CONTROL
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE

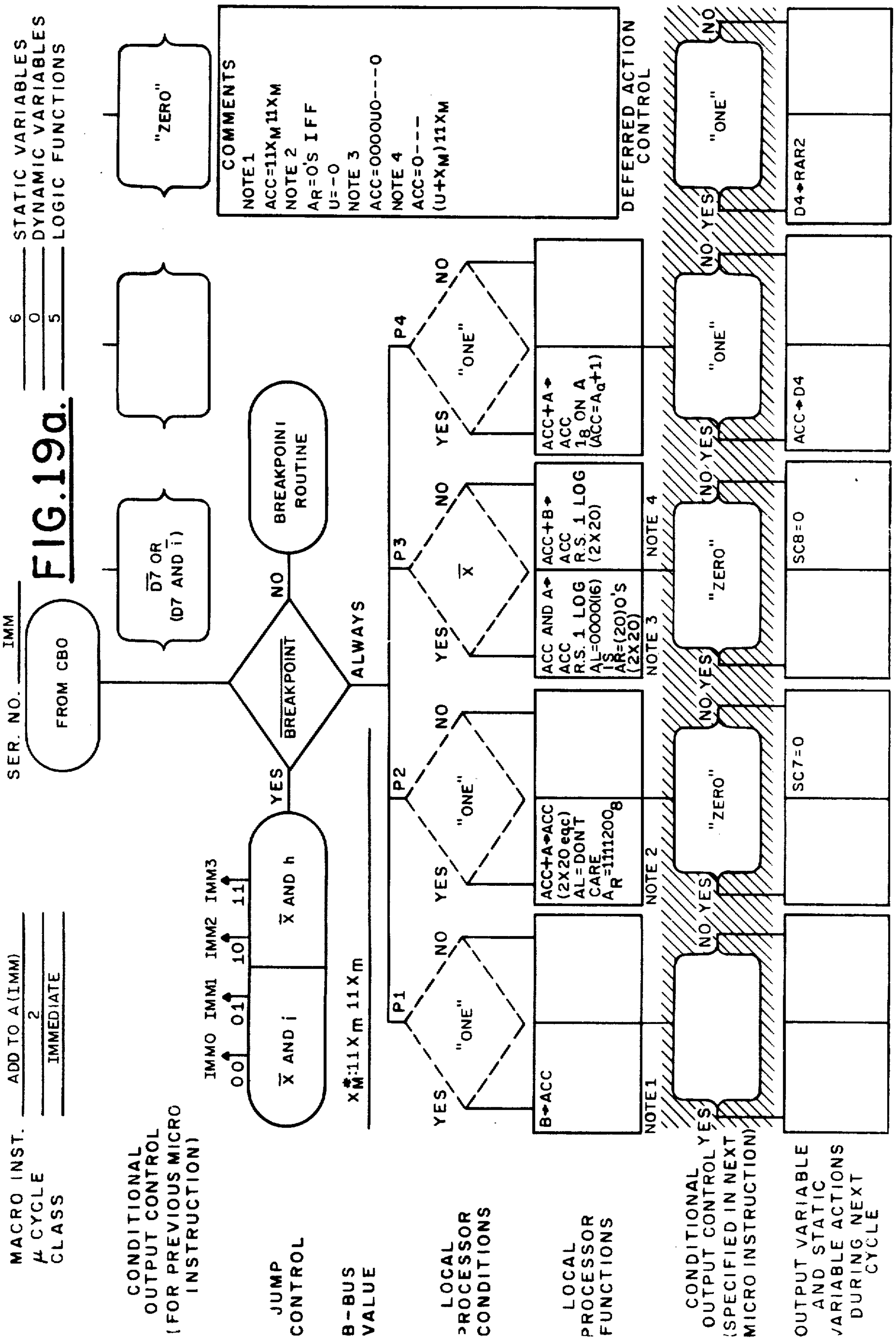
FIG. 19a.
MACRO INST.
μ CYCLE
CLASS
ADD TO A (IMM)
2
IMMEDIATE
SER. NO.
IMM
6 STATIC VARIABLES
0 DYNAMIC VARIABLES
5 LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
FROM CBO
BREAKPOINT
BREAKPOINT ROUTINE
ALWAYS
COMMENTS
DEFERRED ACTION CONTROL

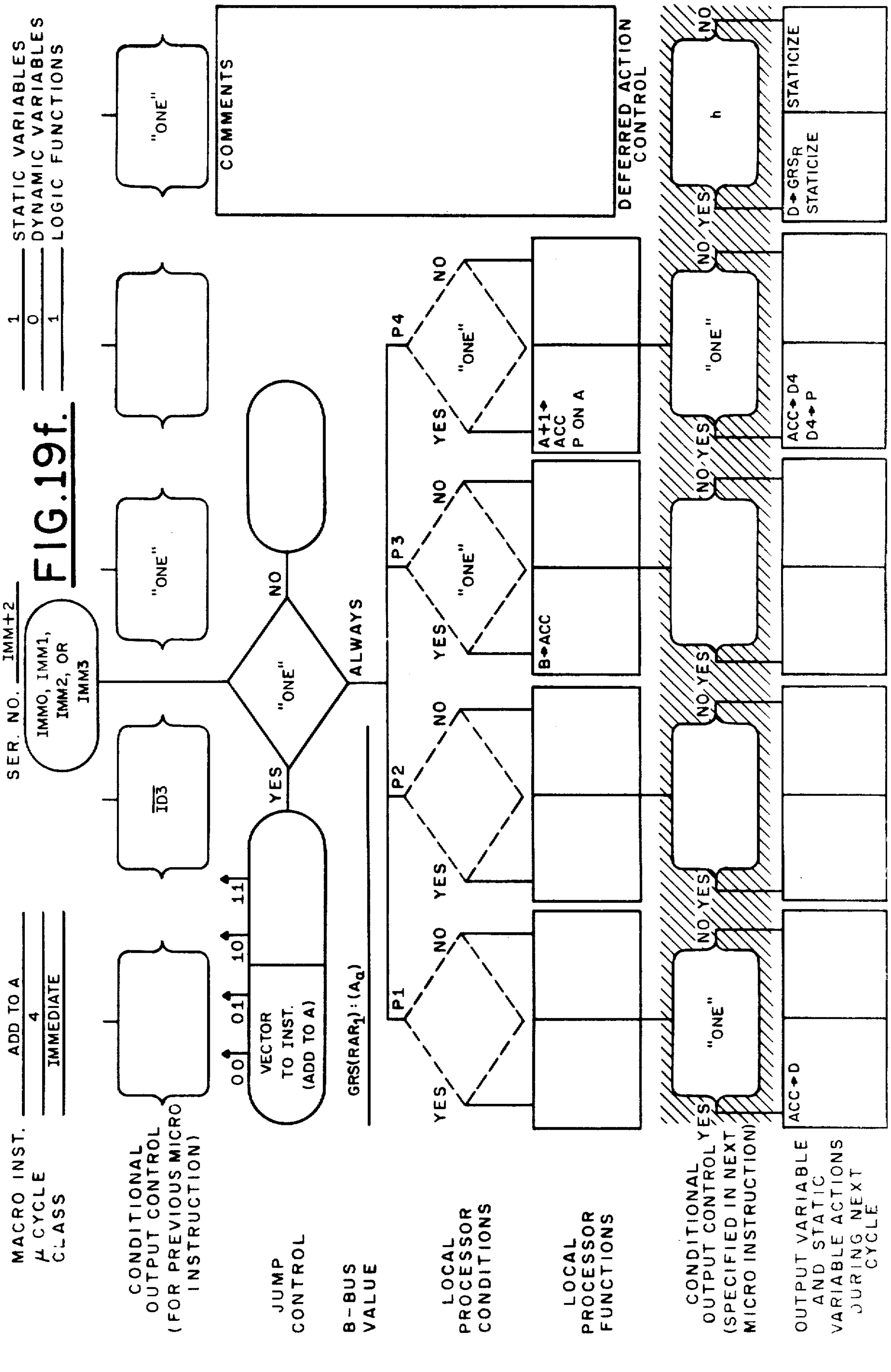
FIG.19f.
MACRO INST. ADD TO A
μ CYCLE 4
CLASS IMMEDIATE
SER. NO. IMM+2
STATIC VARIABLES 1
DYNAMIC VARIABLES 0
LOGIC FUNCTIONS 1
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
IMMO, IMM1, IMM2, OR IMM3
"ONE"
ID3
YES
NO
ALWAYS
VECTOR TO INST. (ADD TO A)
00
01
10
11
GRS(RAR1):(Aα)
P1
P2
P3
P4
B→ACC
A+1→ACC P ON A
COMMENTS
DEFERRED ACTION CONTROL
h
ACC→D
ACC→D4 D4→P
D→GRSR STATICIZE
STATICIZE

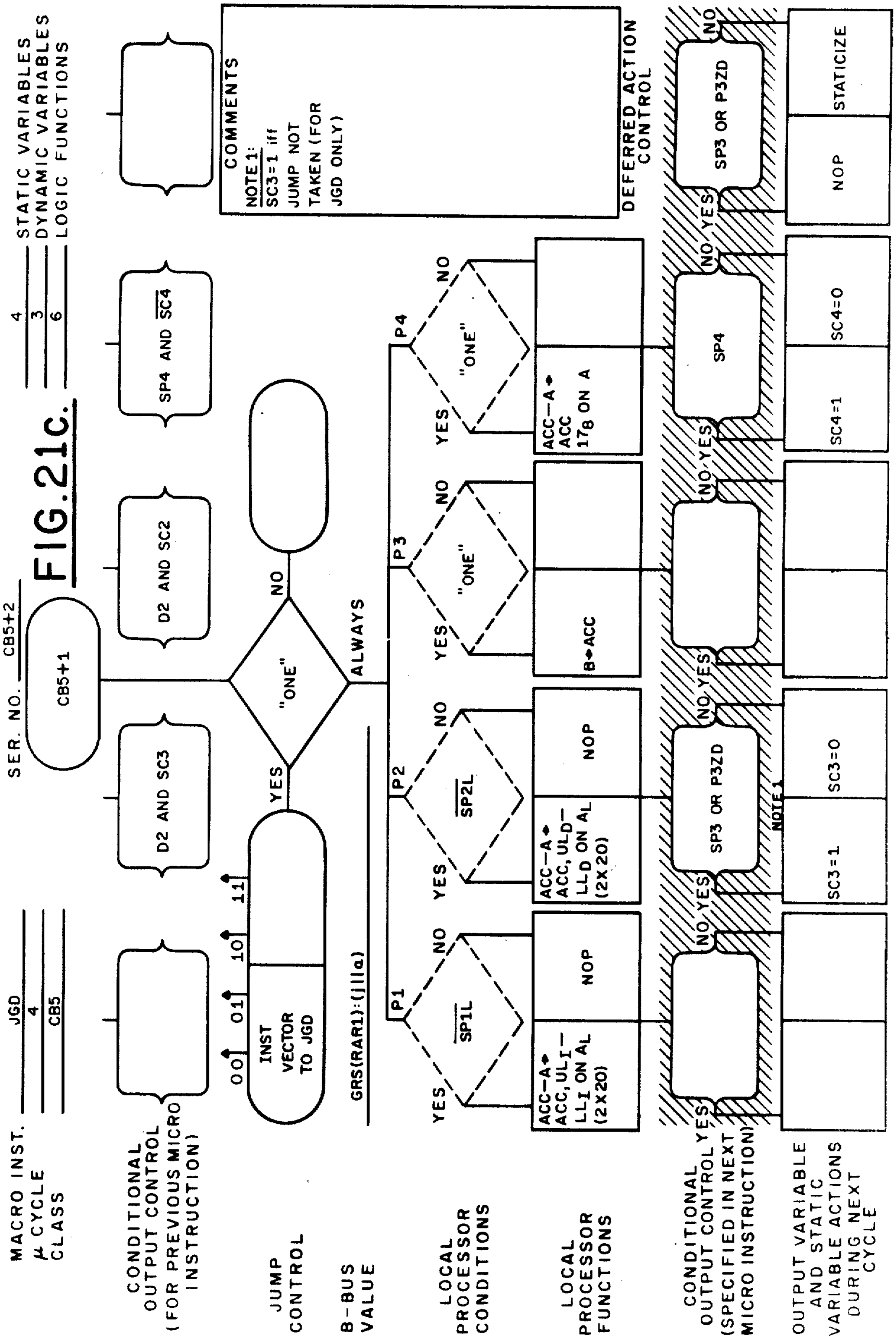
FIG. 21c.
SER. NO. CB5+2
MACRO INST. JGD
μ CYCLE 4
CLASS CB5
STATIC VARIABLES 4
DYNAMIC VARIABLES 3
LOGIC FUNCTIONS 6
CONDITIONAL OUTPUT CONTROL (FOR PREVIOUS MICRO INSTRUCTION)
D2 AND SC3
D2 AND SC2
SP4 AND SC4
JUMP CONTROL
CB5+1
"ONE"
YES
NO
INST VECTOR TO JGD
00
01
10
11
B-BUS VALUE
GRS(RAR1):(j||a)
ALWAYS
LOCAL PROCESSOR CONDITIONS
P1
P2
P3
P4
SP1L
SP2L
LOCAL PROCESSOR FUNCTIONS
NOP
B→ACC
COMMENTS
NOTE 1:
SC3=1 iff
JUMP NOT
TAKEN (FOR
JGD ONLY)
CONDITIONAL OUTPUT CONTROL (SPECIFIED IN NEXT MICRO INSTRUCTION)
SP3 OR P3ZD
SP4
DEFERRED ACTION CONTROL
NOTE 1
OUTPUT VARIABLE AND STATIC VARIABLE ACTIONS DURING NEXT CYCLE
SC3=1
SC3=0
SC4=1
SC4=0
STATICIZE

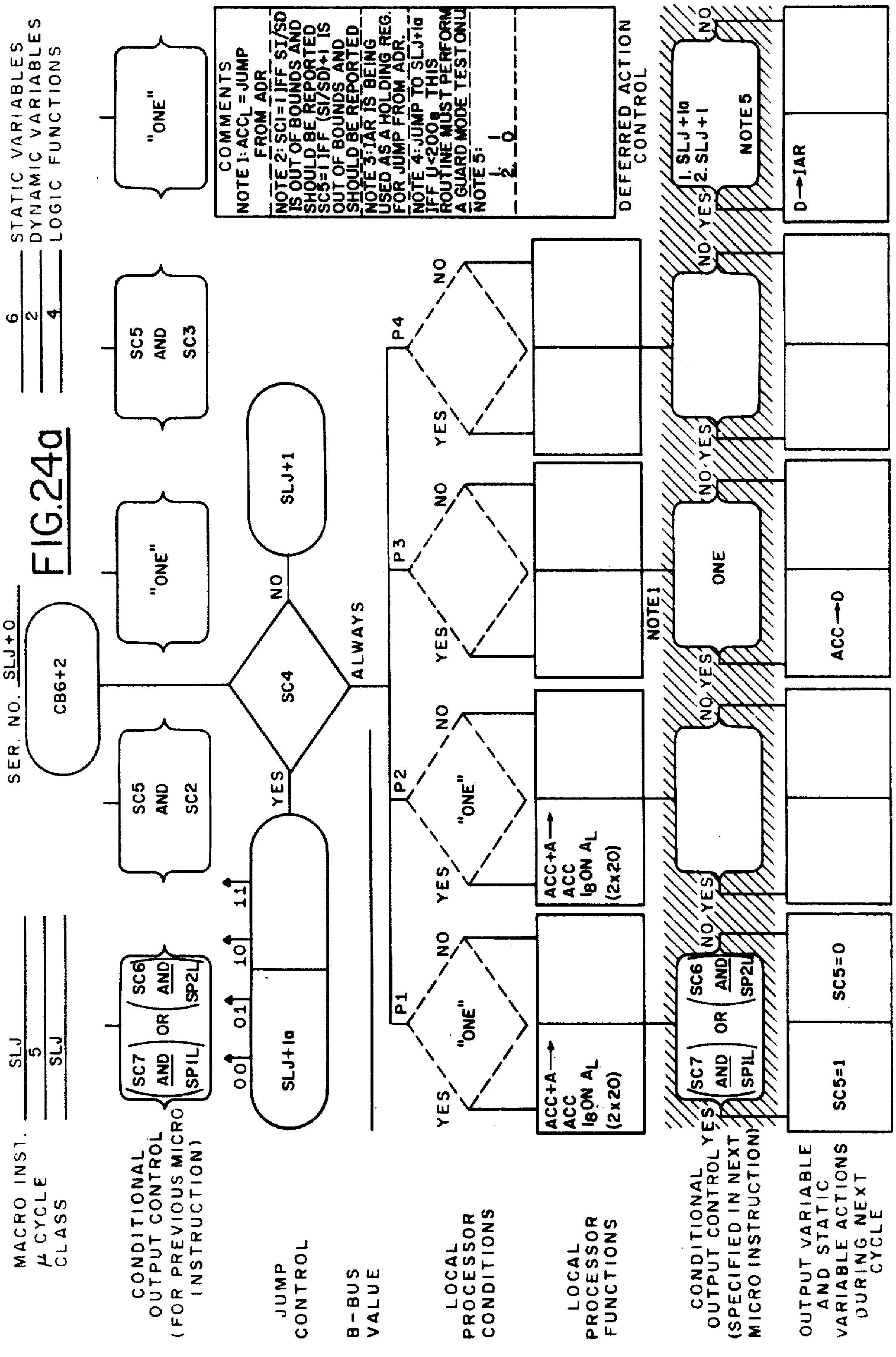
FIG. 24a
SER. NO. SLJ+0
MACRO INST. SLJ
μ CYCLE 5
CLASS SLJ
6 STATIC VARIABLES
2 DYNAMIC VARIABLES
4 LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
CB6+2
SC4
YES
NO
ALWAYS
SLJ+Ia
SLJ+1
SC7 AND SPIL OR SC6 AND SP2L
SC5 AND SC2
"ONE"
SC5 AND SC3
P1
P2
P3
P4
ACC+A → ACC $I_B$ ON $A_L$ (2x20)
NOTE 1
ONE
SC5=1
SC5=0
ACC → D
D → IAR
1. SLJ+Ia
2. SLJ+1
NOTE 5
COMMENTS
NOTE 1: $ACC_L$ = JUMP FROM ADR
NOTE 2: SCI=1 IFF SI/SD IS OUT OF BOUNDS AND SHOULD BE REPORTED SC5=1 IFF (SI/SD)+1 IS OUT OF BOUNDS AND SHOULD BE REPORTED
NOTE 3: IAR IS BEING USED AS A HOLDING REG. FOR JUMP FROM ADR.
NOTE 4: JUMP TO SLJ+Ia IFF U<200₈ THIS ROUTINE MUST PERFORM A GUARD MODE TEST ONLY
NOTE 5:
DEFERRED ACTION CONTROL

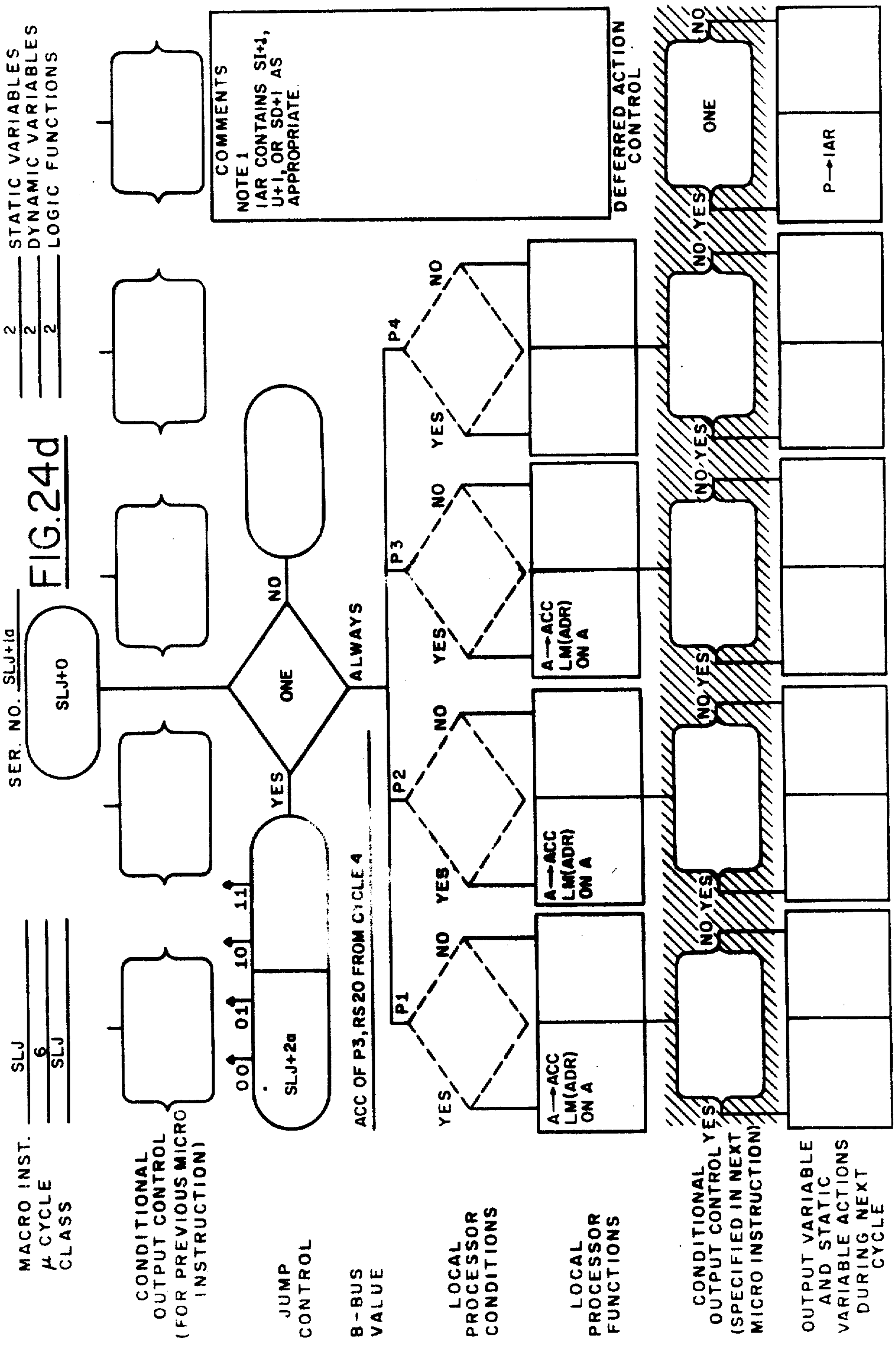
FIG.24d
MACRO INST. SLJ
μ CYCLE 6
CLASS SLJ
SER. NO. SLJ+1a
2 STATIC VARIABLES
2 DYNAMIC VARIABLES
2 LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
SLJ+0
ONE
YES
NO
SLJ+2a
00
01
10
11
ACC OF P3, RS20 FROM CYCLE 4
ALWAYS
P1
P2
P3
P4
A→ACC LM(ADR) ON A
COMMENTS
NOTE 1
IAR CONTAINS SI+1, U+1, OR SD+1 AS APPROPRIATE
DEFERRED ACTION CONTROL
P→IAR

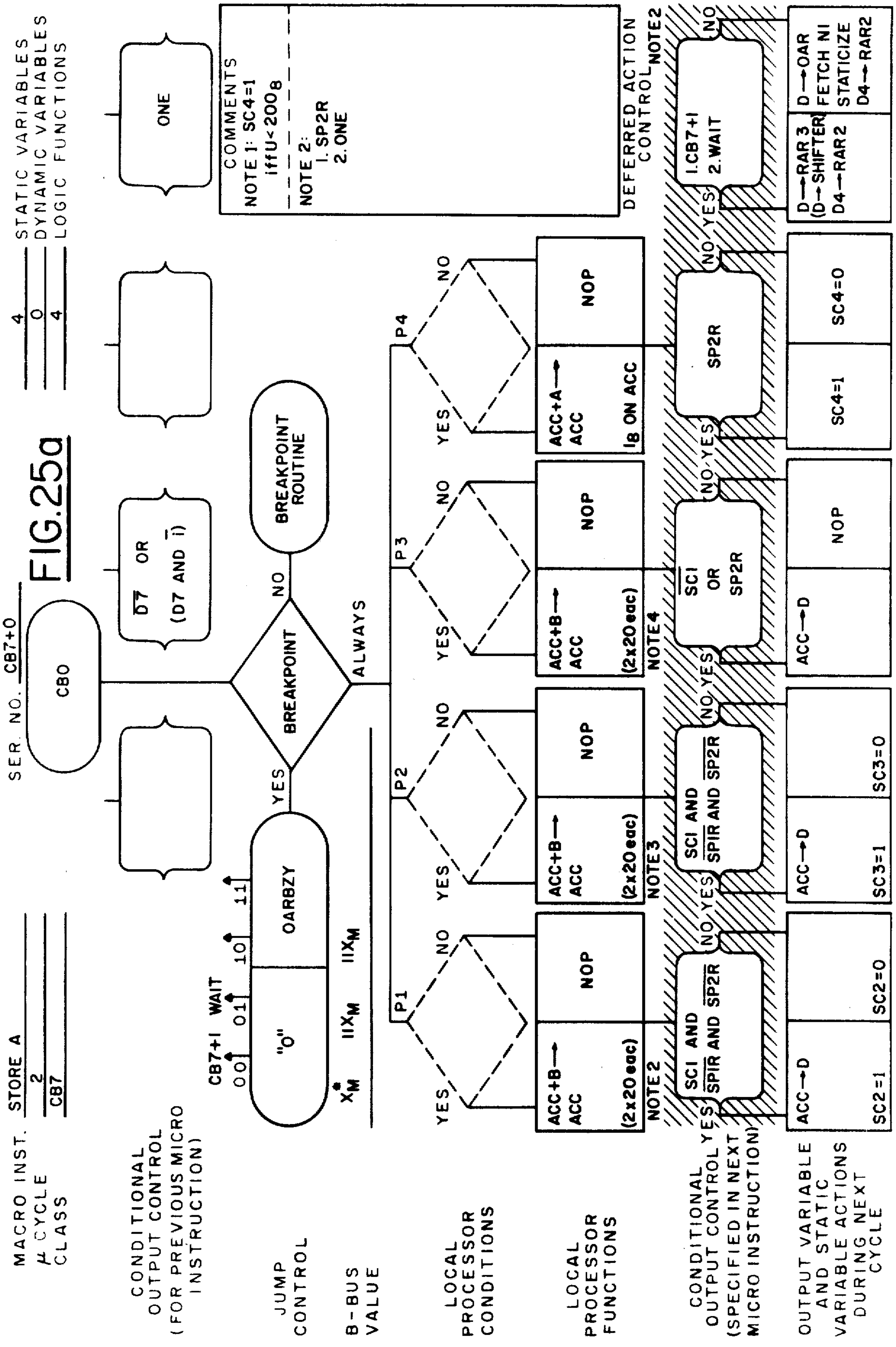

FIG.25a
MACRO INST. STORE A
μ CYCLE 2
CLASS CB7
SER. NO. CB7+0
STATIC VARIABLES 4
DYNAMIC VARIABLES 0
LOGIC FUNCTIONS 4
CONDITIONAL OUTPUT CONTROL (FOR PREVIOUS MICRO INSTRUCTION)
D7 OR (D7 AND i)
ONE
CBO
JUMP CONTROL
BREAKPOINT
YES
NO
ALWAYS
BREAKPOINT ROUTINE
CB7+1 WAIT
00 01 10 11
"0"
OARBZY
B-BUS VALUE
X*M
11XM
11XM
LOCAL PROCESSOR CONDITIONS
P1
P2
P3
P4
LOCAL PROCESSOR FUNCTIONS
ACC+B→ ACC (2x20eac)
ACC+B→ ACC (2x20eac)
ACC+B→ ACC (2x20eac)
ACC+A→ ACC IB ON ACC
NOP
NOTE 2
NOTE 3
NOTE 4
CONDITIONAL OUTPUT CONTROL (SPECIFIED IN NEXT MICRO INSTRUCTION)
SCI AND SPIR AND SP2R
SCI AND SPIR AND SP2R
SCI OR SP2R
SP2R
1.CB7+1 2.WAIT
OUTPUT VARIABLE AND STATIC VARIABLE ACTIONS DURING NEXT CYCLE
ACC→D
SC2=1
SC2=0
SC3=1
SC3=0
SC4=1
SC4=0
D→RAR 3 (D→SHIFTER) D4→RAR2
D→OAR FETCH NI STATICIZE D4→RAR2
COMMENTS
NOTE 1: SC4=1 iff U<200₈
NOTE 2: 1. SP2R 2. ONE
DEFERRED ACTION CONTROL NOTE 2

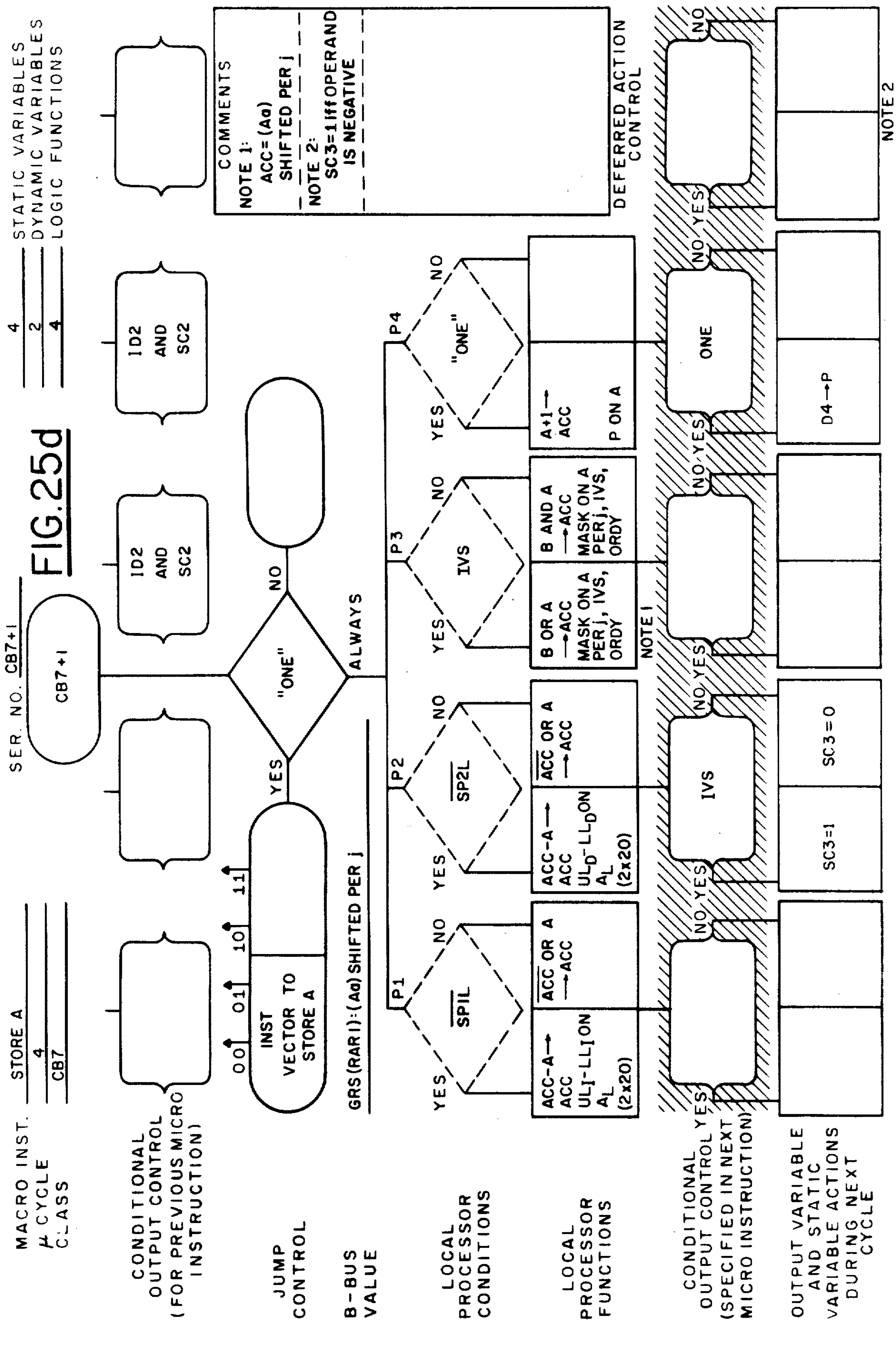
FIG.25d
MACRO INST. STORE A
μ CYCLE 4
CLASS CB7
SER. NO. CB7+1
STATIC VARIABLES 4
DYNAMIC VARIABLES 2
LOGIC FUNCTIONS 4
CONDITIONAL OUTPUT CONTROL (FOR PREVIOUS MICRO INSTRUCTION)
ID2 AND SC2
ID2 AND SC2
JUMP CONTROL
CB7+1
"ONE"
YES
NO
ALWAYS
00 01 10 11
INST VECTOR TO STORE A
B-BUS VALUE
GRS (RAR1):(Aa) SHIFTED PER j
LOCAL PROCESSOR CONDITIONS
P1 P2 P3 P4
SPIL
SP2L
IVS
"ONE"
LOCAL PROCESSOR FUNCTIONS
ACC-A→ ACC ULI-LLI ON AL (2x20)
ACC OR A →ACC
ACC-A→ ACC ULD-LLD ON AL (2x20)
ACC OR A →ACC
B OR A →ACC MASK ON A PER j, IVS, ORDY
B AND A →ACC MASK ON A PER j, IVS, ORDY
NOTE 1
A+1→ ACC P ON A
COMMENTS
NOTE 1: ACC=(Aa) SHIFTED PER j
NOTE 2: SC3=1 Iff OPERAND IS NEGATIVE
DEFERRED ACTION CONTROL
CONDITIONAL OUTPUT CONTROL (SPECIFIED IN NEXT MICRO INSTRUCTION)
IVS
ONE
OUTPUT VARIABLE AND STATIC VARIABLE ACTIONS DURING NEXT CYCLE
SC3=1
SC3=0
D4→P
NOTE 2

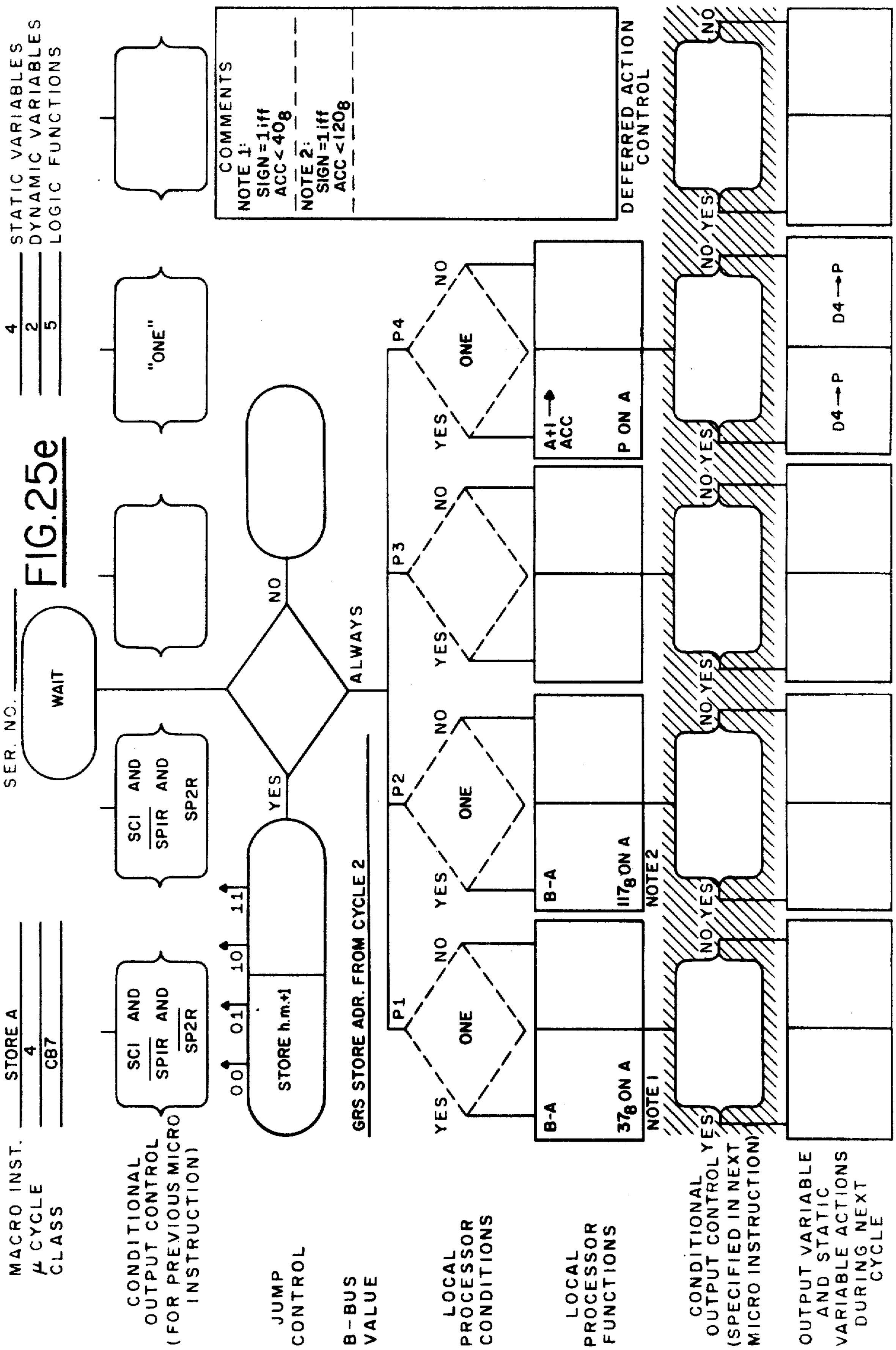
FIG.25e
MACRO INST. STORE A
μ CYCLE 4
CLASS CB7
SER. NO.
4 STATIC VARIABLES
2 DYNAMIC VARIABLES
5 LOGIC FUNCTIONS
CONDITIONAL OUTPUT CONTROL (FOR PREVIOUS MICRO INSTRUCTION)
SCI AND SPIR AND SP2R
SCI AND SPIR AND SP2R
"ONE"
COMMENTS
NOTE 1: SIGN=1 iff ACC < 40₈
NOTE 2: SIGN=1 iff ACC < 120₈
JUMP CONTROL
WAIT
YES
NO
00
01
10
11
STORE h.m+1
B-BUS VALUE
GRS STORE ADR. FROM CYCLE 2
ALWAYS
LOCAL PROCESSOR CONDITIONS
P1
P2
P3
P4
ONE
LOCAL PROCESSOR FUNCTIONS
B-A
37₈ ON A
NOTE 1
117₈ ON A
NOTE 2
A+1→ACC
P ON A
DEFERRED ACTION CONTROL
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
D4→P
D4→P

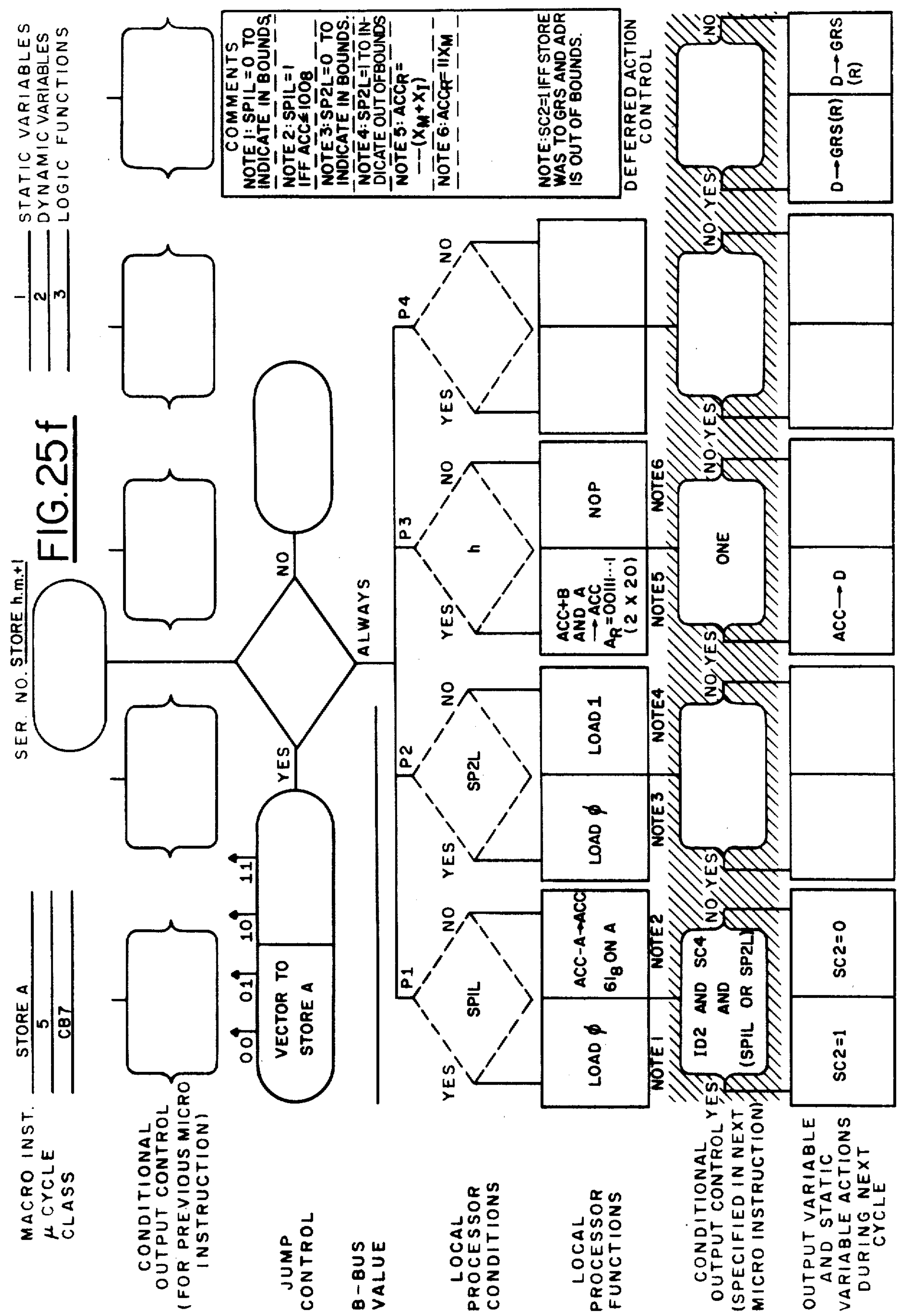
FIG.25f
SER. NO. STORE h.m.+1
MACRO INST. STORE A
μ CYCLE 5
CLASS CB7
1 STATIC VARIABLES
2 DYNAMIC VARIABLES
3 LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
VECTOR TO STORE A
00
01
10
11
YES
NO
ALWAYS
P1
P2
P3
P4
SPIL
SP2L
h
LOAD ϕ
ACC-A→ACC 6I8 ON A
LOAD 1
ACC+B AND A →ACC AR=OOIII···I (2 X 20)
NOP
NOTE 1
NOTE 2
NOTE 3
NOTE 4
NOTE 5
NOTE 6
ID2 AND SC4 AND (SPIL OR SP2L)
ONE
SC2=1
SC2=0
ACC→D
D→GRS(R)
D→GRS (R)
COMMENTS
NOTE 1: SPIL=0 TO INDICATE IN BOUNDS
NOTE 2: SPIL=1 IFF ACC≠1008
NOTE 3: SP2L=0 TO INDICATE IN BOUNDS.
NOTE 4: SP2L=1 TO INDICATE OUT OF BOUNDS
NOTE 5: ACCR= —(XM+XI)
NOTE 6: ACCR=IIXM
NOTE: SC2=1 IFF STORE WAS TO GRS AND ADR IS OUT OF BOUNDS.
DEFERRED ACTION CONTROL

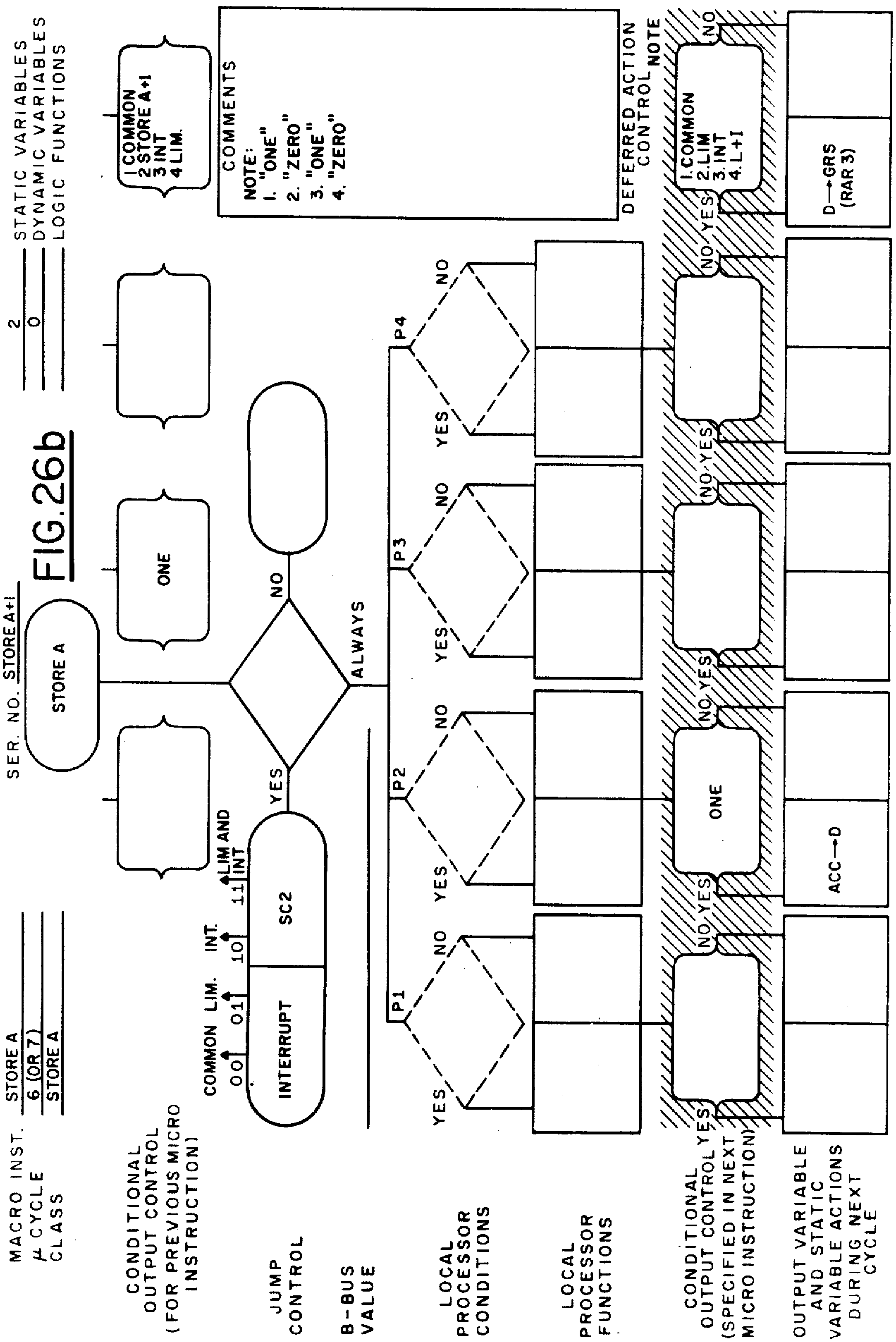
FIG.26b
MACRO INST. STORE A
μ CYCLE 6 (OR 7)
CLASS STORE A
SER. NO. STORE A+1
2 STATIC VARIABLES
0 DYNAMIC VARIABLES
LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
STORE A
ONE
1 COMMON
2 STORE A+1
3 INT
4 LIM.
COMMENTS
NOTE:
1. "ONE"
2. "ZERO"
3. "ONE"
4. "ZERO"
DEFERRED ACTION CONTROL NOTE
INTERRUPT
SC2
COMMON
LIM.
INT.
LIM AND INT
00
01
10
11
YES
NO
ALWAYS
P1
P2
P3
P4
ONE
1.COMMON
2.LIM
3.INT
4.L+I
ACC→D
D→GRS (RAR 3)

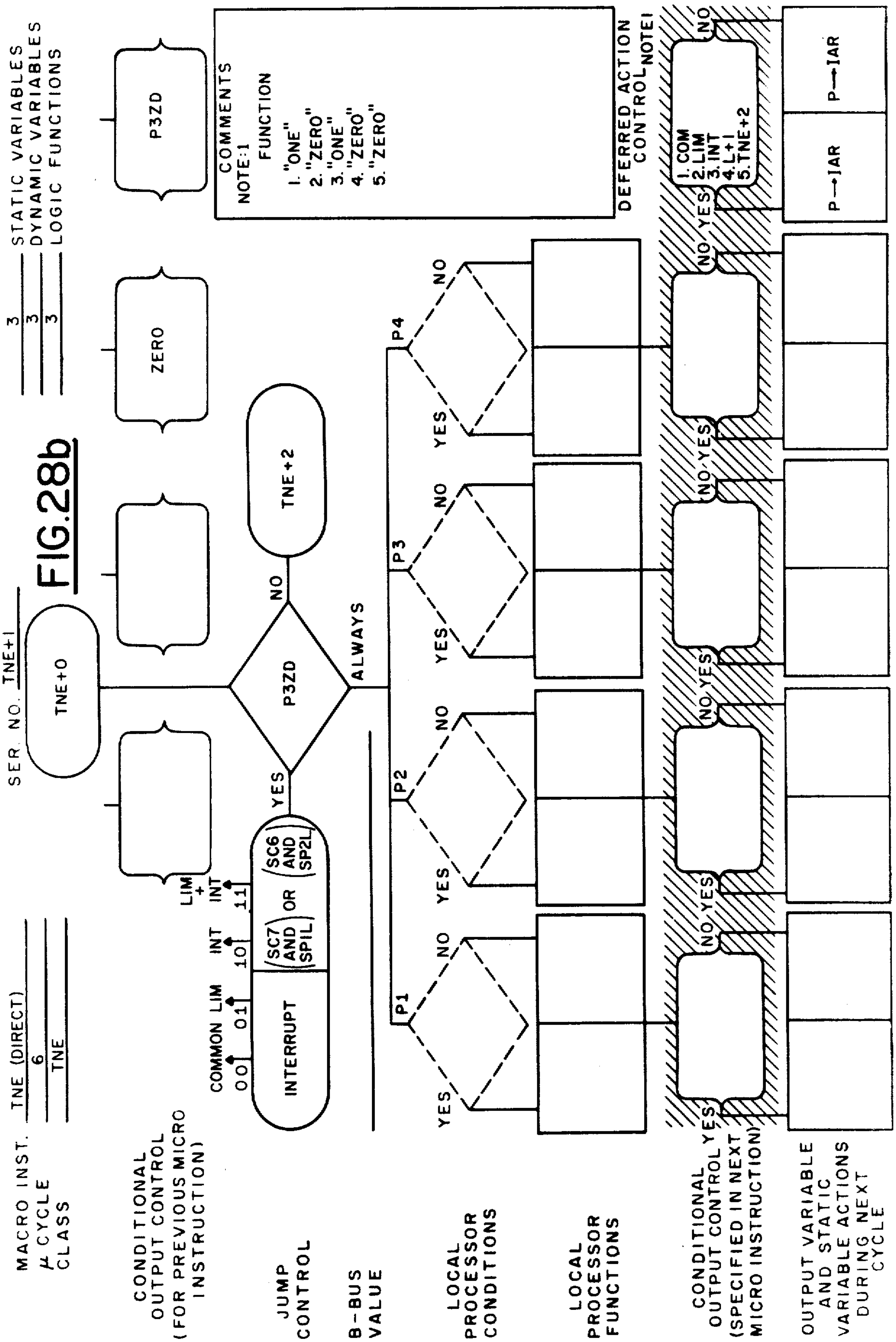
FIG.28b
MACRO INST. TNE (DIRECT)
μ CYCLE 6
CLASS TNE
SER. NO. TNE+1
3 STATIC VARIABLES
3 DYNAMIC VARIABLES
3 LOGIC FUNCTIONS
CONDITIONAL OUTPUT CONTROL (FOR PREVIOUS MICRO INSTRUCTION)
JUMP CONTROL
B-BUS VALUE
LOCAL PROCESSOR CONDITIONS
LOCAL PROCESSOR FUNCTIONS
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
ZERO
P3ZD
TNE+0
TNE+2
COMMON LIM INT LIM + INT
00 01 10 11
INTERRUPT
(SC7 AND SP1L) OR (SC6 AND SP2L)
YES
NO
ALWAYS
P1 P2 P3 P4
COMMENTS
NOTE:1
FUNCTION
1. "ONE"
2. "ZERO"
3. "ONE"
4. "ZERO"
5. "ZERO"
DEFERRED ACTION CONTROL NOTE1
1. COM
2. LIM
3. INT
4. L+1
5. TNE+2
P→IAR
P→IAR

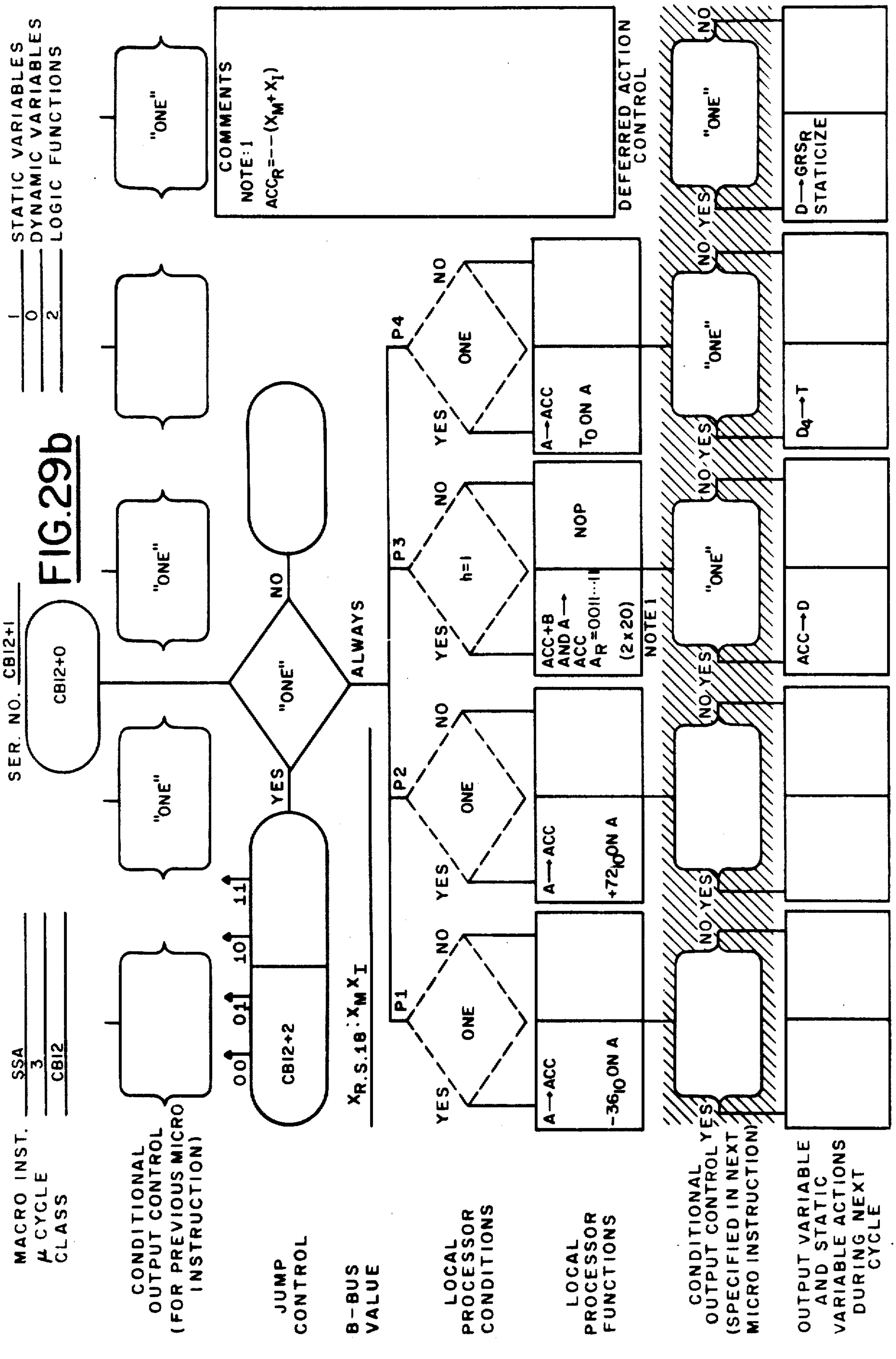
FIG.29b
MACRO INST. SSA
μ CYCLE 3
CLASS CBI2
SER. NO. CBI2+1
STATIC VARIABLES
DYNAMIC VARIABLES
LOGIC FUNCTIONS
CONDITIONAL OUTPUT CONTROL (FOR PREVIOUS MICRO INSTRUCTION)
"ONE"
JUMP CONTROL
CBI2+2
CBI2+0
00
01
10
11
YES
NO
ALWAYS
B-BUS VALUE
XR.S.18 : XMXI
LOCAL PROCESSOR CONDITIONS
P1
P2
P3
P4
ONE
h=I
LOCAL PROCESSOR FUNCTIONS
A→ACC
-36₁₀ ON A
+72₁₀ ON A
ACC+B AND A→ACC
AR=0011···I
(2x20)
NOTE 1
NOP
T0 ON A
COMMENTS
NOTE:1
ACCR=--(XM+XI)
DEFERRED ACTION CONTROL
CONDITIONAL OUTPUT CONTROL (SPECIFIED IN NEXT MICRO INSTRUCTION)
OUTPUT VARIABLE AND STATIC VARIABLE ACTIONS DURING NEXT CYCLE
ACC→D
D4→T
D→GRSR
STATICIZE

TABLE DRIVEN DECISION AND CONTROL LOGIC FOR DIGITAL COMPUTERS

BACKGROUND OF THE INVENTION

1. Field of the Invention

The invention relates to digital computers, particularly with respect to the decision and control logic therefor.

2. Description of the Prior Art

The decision and control logic portion of prior art digital computers is generally constructed utilizing random logic design. The specific logic required for the desired functions of the specific variables utilized in the computer is constructed for providing the specifically required decision signals. If it is necessary to provide the same function of different variables, the function logic is generally repeated with the different sets of specific variables hardwired thereto. The random logic approach to control circuitry design generally results in significant amounts of hardware and suffers from the disadvantage of lacking flexibility. Such random logic is generally unsuited to LSI implementation because of the irregularity of the design.

Although in the prior art, micro programming has been utilized in computers permitting much of the control to reside in LSI circuitry, known micro programmed computers still contain significant amounts of random logic to make decisions based on logic functions of Boolean variables.

It is an object of the present invention to provide computer decision and control logic suitable for implementation with LSI components.

It is a further object of the invention to provide high speed computer decision and control logic responsive to static and dynamic variables where the dynamic variables become available toward the end of the computer cycle.

It is a further object of the invention to provide computer decision and control logic that is flexible and effects hardware economy.

SUMMARY OF THE INVENTION

The above objects of the invention, as well as other objects, are accomplished by decision and control logic wherein the truth tables for the decision control functions of the computer variables are stored in memories addressed by the variables to provide the decision signals in accordance with the truth table entry addressed by the variables. When the computer provides static and dynamic variables, the static variables are utilized to address the truth table entries corresponding thereto and the dynamic variables are utilized to select amongst the addressed truth table entries to provide the desired decision signal.

BRIEF DESCRIPTION OF THE DRAWINGS

FIG. 7 is a memory map diagram illustrating the Deferred Action Control words stored in the DAC table memory.

FIGS. 16*a–c* are flow diagrams depicting the micro routine for the FETCH SINGLE OPERAND DIRECT macro repertoire class base.

FIG. 17 is a flow diagram depicting the micro routine for the ADD TO A DIRECT macro instruction.

FIGS. 18*a–d* are flow diagrams depicting the micro routine for the FETCH SINGLE OPERAND INDIRECT macro repertoire class base.

FIGS. 19*a–f* are flow diagrams depicting the micro routine for FETCH SINGLE OPERAND IMMEDIATE macro repertoire class base.

FIGS. 21*a–c* are flow diagrams depicting the micro routine for the JUMP GREATER AND DECREMENT macro repertoire class base.

FIGS. 24a–g are flow diagrams depicting the micro routine for the STORE LOCATION AND JUMP macro instruction.

FIGS. 25a–f are flow diagrams depicting the micro routine for the STORE macro repertoire class base.

FIGS. 26a–b are flow diagrams depicting the micro routine for the STORE A macro instruction.

FIGS. 28a–c are flow diagrams depicting the micro routine for the TEST NOT EQUAL macro instruction.

FIGS. 29a–c are flow diagrams depicting the micro routine for the SHIFT macro repertoire class base.

DESCRIPTION OF THE PREFERRED EMBODIMENT

The present invention is utilized in its preferred embodiment in the computer disclosed in copending application Ser. No. 830,303, filed Sept. 2, 1977, in the names of the present inventors, entitled "Microprogrammable Computer Utilizing Concurrently Operating Processors", and assigned to the assignee of the present invention. The situs of the present invention as described in said Ser. No. 830,303 is a microprogrammable emulator of the SPERRY UNIVAC 1108 computer. The details of the situs computer, in which the present invention is embodied, are repeated herein for completeness.

The structure, characteristics and operation of the SPERRY UNIVAC 1108 computer are well known and well documented and will not be expressly set forth herein for brevity. Reference may be had to the numerous manuals available from the SPERRY UNIVAC Division of the Sperry Rand Corporation which describe the computer in detail.

Figure 1:
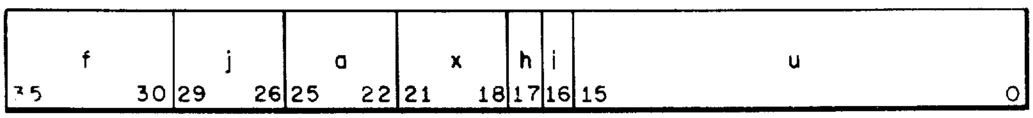
FIG. 1 is a diagram illustrating the format and fields of the macro instruction word for the SPERRY UNIVAC® 1108 computer. (SPERRY UNIVAC is a registered trademark of the Sperry Rand Corporation).

The SPERRY UNIVAC 1108 utilizes 36-bit instruction and data or operand words. The instruction word format is illustrated in FIG. 1 where:

- f=Function or Operation Code
- j=Operand Qualifier, Partial Control Register Address, or Minor Function Code
- a=A, X, or R register; Channel, Jump Key, Stop Keys, or Module Number Minor Function Code; partial Control Register Address
- x=Index Register
- h=Index Register Incrementation
- i=Indirect Addressing
- u=Operand Address or Operand Base The nomenclature and terms utilized have the same meanings herein as in the SPERRY UNIVAC 1108.

Figure 2:
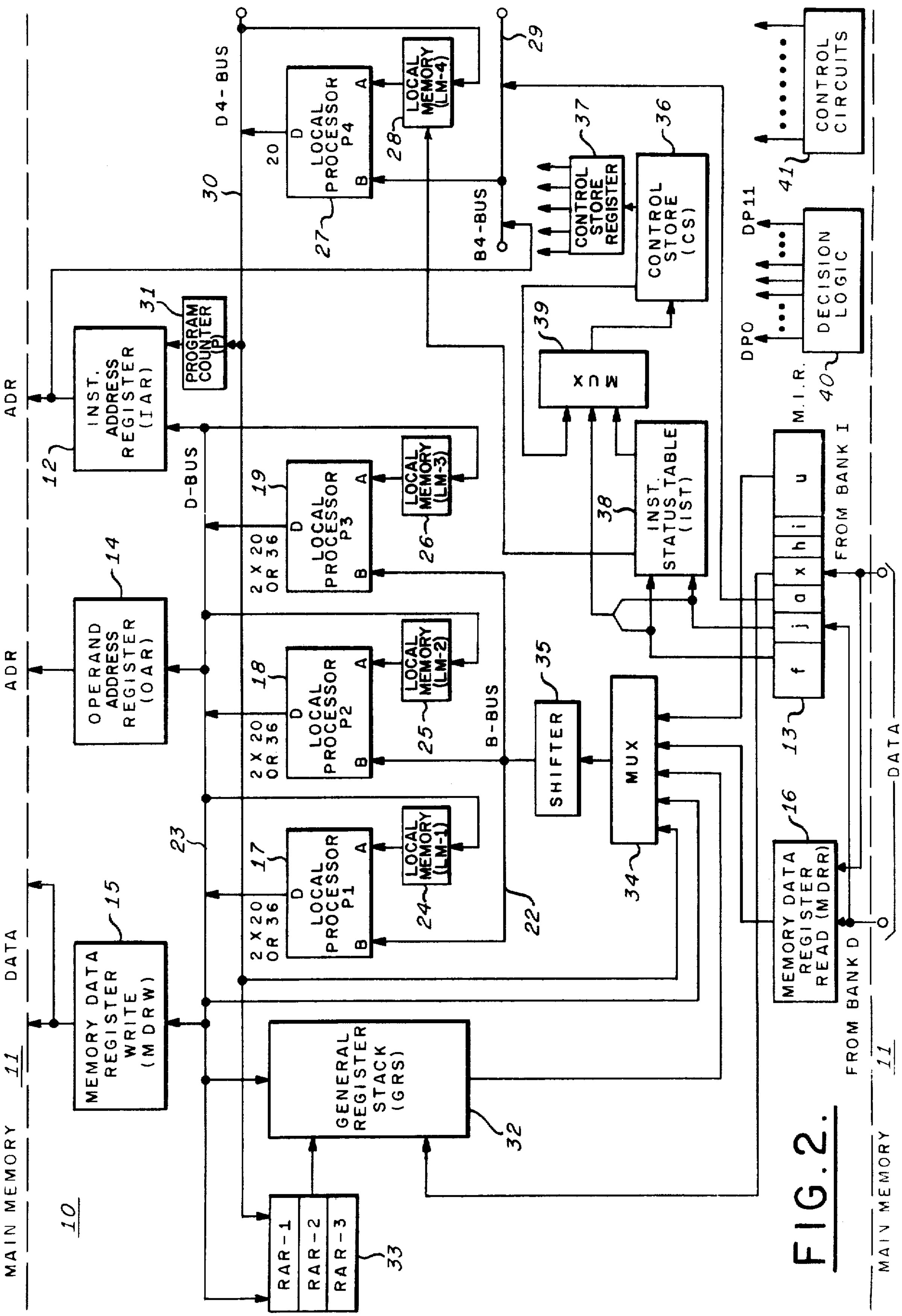
FIG. 2 is a simplified schematic block diagram of the computer incorporating the present invention.

Referring to FIG. 2, a schematic block diagram of the computer in which the present invention is embodied is illustrated. FIG. 2 is a simplified block diagram in that only the major components comprising the computer are depicted. The computer comprises a central processor unit (CPU) 10 and a main memory depicted at 11. Identically to the 1108, the main memory 11 is comprised of two memory banks, the I-bank and the D-bank (not specifically depicted in the drawing). Generally the I-bank stores and provides macro instruction words and the D-bank provides operand words. Generically, both the instruction and operand words are considered as data for the purposes of data flow description. As described above, the instruction words have the format depicted in FIG. 1.

The CPU 10 includes an instruction address register (IAR) 12 for addressing the main memory 11 for the purpose of fetching macro instructions therefrom. The CPU 10 further includes a macro instruction register (MIR) 13 for receiving the macro instructions fetched in accordance with the addresses inserted into the instruction address register 12. As explained above, the macro instruction words inserted into the register 13 have the format described above with respect to FIG. 1. The macro instructions are fetched primarily from the I-memory-bank but can also be provided from the D-bank as indicated by the data flow lines and arrows entering the register 13.

The CPU 10 also includes an operand address register (OAR) 14 for holding and providing addresses in the main memory 11 at which operands are to be stored and from which operands are to be fetched. The CPU 10 further includes a memory data register-write (MDRW) 15 for holding and providing operands for storage in the main memory 11 at the addresses provided by the operand address register 14. As indicated by the data flow lines and arrows from the register 15 to the main memory 11, the operand may be stored in either the memory bank D or the memory bank I in accordance with the associated memory address. The CPU 10 further includes a memory data register-read (MDRR) 16 which is utilized for storing operands read from the main memory 11 from the addresses specified in the operand address register 14.

The CPU further includes local processors 17, 18 and 19, each of which includes A and B input ports as well as a D output port. Each of the processors 17, 18 and 19 includes an internal accumulator (to be described hereinafter) and performs a repertoire of diadic binary arithmetic and logical functions of values on the A and B input ports and the value stored in the accumulator. Results of computations are selectively provided at the D output port in a manner to be explained. Each of the processors 17, 18, and 19 can be selectively configured to operate as two 20-bit processors or as one 36-bit processor as indicated by the legends "2×20 or 36". When the processor is in the 2×20 mode, address computations are conveniently performed with respect to the 18-bit addresses utilized in the SPERRY UNIVAC 1108. When the processors are configured in the 36-bit mode they are primarily utilized for computations on the 36-bit operands uilized in the 1108 computer.

The B input ports to each of the local processors 17, 18 and 19 receive data from a B bus 22 and the D output ports of the processors provide their values to a D bus 23. The B and D buses 22 and 23 are each 40-bits wide, the B bus providing 40-bits in parallel to the B input ports of the processors 17, 18 and 19 and the D output port thereof provide 40-bits in parallel to the D bus. The 40 respective bits of each of the processors 17, 18 and 19 are connected to the 40 respective bits of the D bus in conventional wired-OR fashion. Thus the D output port values from the processors 17, 18 and 19 are individually placed on the D bus 23 for communication to the various portions of the CPU 10 to which the D bus is connected. Although not utilized in the herein disclosed embodiment, simultaneously provided values from the local processor D ports could be combined on the D bus to provide further computational, logic and control capabilities.

The local processors 17, 18 and 19 have associated therewith local memories 24, 25 and 26 respectively, which are utilized for storing and providing values of interest to the associated local processors. The local memories 24, 25 and 26 can be utilized as temporary storage for values from the associated processors and can also be used to store constants required by the processors. For example, in a memory address computation local memory 24 contains the 1108 addressing constants $B_I$, $LL_I$, and $UL_I$ while local memory 25 contains the constants $B_D$, $LL_D$, and $UL_D$ which constants are utilized for main memory addressing and address limits checking in a manner to be explained. Each of the local memories 24, 25 and 26 contains a plurality of 40-bit words (for example 64 words in the present embodiment). Data is received by the local memories 24, 25 and 26 from the D bus 23 for writing therein and each of the local memories provides 40-bit data read therefrom to the 40-bit A input port of the associated local processor. Reading and writing control of the local memories 24, 25 and 26 will be explained in detail herein below.

The CPU 10 also includes a fourth local processor 27 and an associated local memory 28. Whereas the local processors 17, 18, and 19 are controllably utilized in either the 2×20 bit mode or the 36-bit mode, the processor 27 has a fixed 20-bit wide configuration. Correspondingly, the local memory 28 is 20-bits wide and in the present embodiment contains 16 words. The processor 27 includes A and B input ports as well as a D output port, the 20-bit output of the local memory 28 being connected to provide data to the A port of the processor 27. The local processor 27 has a private input bus 29 designated as B4 as well as a private output bus 30 designated as D4. The buses 29 and 30 are each 20-bits wide, the bus 29 providing a parallel 20-bit input to the B port of the processor 27 and the bus 30 receiving a parallel 20-bit output from the D port thereof. The D4 bus 30 provides an input to the local memory 28 for writing data therein to be utilized by the processor 27. The B4 bus 29 receives as an input the output from the instruction address register 12 and is additionally coupled to receive the a field information discussed above with respect to FIG. 1 from the macro instruction register 13. The D4 bus 30 provides an input to a program counter 31 whose output is applied as an input to the instruction address register 12. The local processor 27 with its local memory 28 in association with the program counter 31, the instruction address register 12 and the macro instruction register 13 is primarily utilized in the CPU 10 for performing the address computations required in controlling the fetching of the macro instructions from the main memory 11 that comprise the program being executed by the CPU 10. The local processor 27 performs this and other functions in a manner to be described in detail hereinafter.

In accordance with computations performed in the local processors 17, 18 and 19, instruction and operand addresses are provided via the D bus 23 to the instruction address register 12 and the operand address register 14 respectively. Operands are also provided via the D bus 23 to the memory data register write 15 for storage in the main memory 11.

The CPU 10 includes a general register stack (GRS) 32 which comprises a set of index and operand registers in a manner similar to that utilized in the 1108. The general register stack 32 receives data from the D bus 23 for storage therein. The registers comprising the general register stack 23 are utilized, inter alia, for indexed addressing. A particular register from the stack 32 is addressed by means of register address registers (RAR) 33. Address information is inserted into the register address registers 33 from the D bus 23 and from the D4 bus 30. The general register stack 32 is also addressed by the X field from the macro instruction register 13.

Data is applied to the B bus 22 via an input multiplexer 34 and a high speed data shifter 35. Inputs to the multiplexer 34 are provided from the D bus 23, the D4 bus 30, the general register read stack 32, the memory data register 16 and the U field from the macro instruction register 13. The multiplexer 34 selects the input to be applied to the shifter 35 which selectively shifts the data in the transfer thereof to the B bus in a manner to be hereinafter described.

The CPU 10 further includes a control store 36 for storing the micro code routines utilized in emulating the 1108 macro instructions. The micro instruction words, to be described hereinbelow, are addressed and transferred to a control store register 37 from which the various fields of the micro instruction words are routed to the components of the CPU 10 for controlling the operations thereof. Each of the local processors 17, 18, 19 and 27 is controlled by unique fields in the control store 36. These fields control not only the arithmetic and logic functions to be performed thereby, e.g., (add, logical OR etc.) but also whether or not the operands will be the value currently on the B bus 22, a word from the associated local memory 24, 25, or 26, the internal accumulator in the local processor, or a combination of two of these operand sources. The control store fields also control whether or not the contents of the local processor accumulator will be gated out onto the D bus 23 and whether the value on the D bus 23 will be written into a selected local memory. One of the address sources for reading and writing the local memory is provided by fields in the control store 36.

The control store 36 also provides fields for use by each of the local processors 17, 18, 19 and 27 to control the conditional usage of other fields and to conditionally set "flag bits" indicating the value of computed logical functions of selected logical variables such as sign bits, zero detect bits, other flag bits and the like. The details of conditional control of the CPU 10 will be discussed hereinbelow. For convenience, the fields from the control store 36 that are provided uniquely to each of the local processors 17, 18, 19 and 27 will be designated as local control fields. Each of the local processors 17, 18, 19 and 27 requires approximately fifty bits in the control store 36 to provide its local control fields.

In addition to the local control fields, the micro instruction words stored in the control store 36 provide fields that are utilized in the overall control of the CPU 10. For convenience these fields are designated as global control fields. The global control fields control such functions as providing the addresses of the next micro instruction to be fetched as well as providing fields for controlling the conditional selection of the next address, providing addresses for reading and writing the general register stack 32, controlling the source of the value on the B bus 22, controlling the shifter 35, conditionally controlling the destination of computed values and controlling decision logic to be later discussed. The control store 36 requires over 100 bits for the global control fields.

Thus a word of the control store 36 comprises the fields required to control each of the local processors 17, 18, 19 and 27 and, in addition, provides the global control fields. Since each of the local processors 17, 18, 19 and 27 is controlled with unique control information from the control store 36 to which it has access concurrently with the local processors and the global control fields are simultaneously provided to the CPU 10, each of the local processors 17, 18, 19 and 27 executes a micro operation concurrently with the other local processors and with the global functions of the CPU 10. Thus the CPU 10 executes multiple micro instruction streams concurrently and simultaneously with each other.

It will be appreciated that although the control store 36 provides the local control fields for each of the local processors 17, 18, 19 and 27, each local processor could be controlled by information provided by its own private control store with its own private addressing mechanism. With this arrangement, however, coordinated functioning of the CPU 10 may be more difficult to achieve than in the present arrangement utilizing the control store 36. The control store 36 is preferably implemented as a random access memory (RAM) but may alternatively be implemented as a programmable read only memory (PROM).

The control store 36 contains the micro instruction routines for emulating the 1108 macro instructions fetched into the macro instruction register 13. For purposes of efficient micro programming the 1108 instruction repertoire is considered comprised of instructions grouped into class bases. The various class bases utilized are Fetch Single Operand Direct, Fetch Single Operand Indirect, Fetch Single Operand Immediate, Jump Greater and Decrement, Unconditional Branch, Store, Skip And Conditional Branch and Shift.

Figure 3:
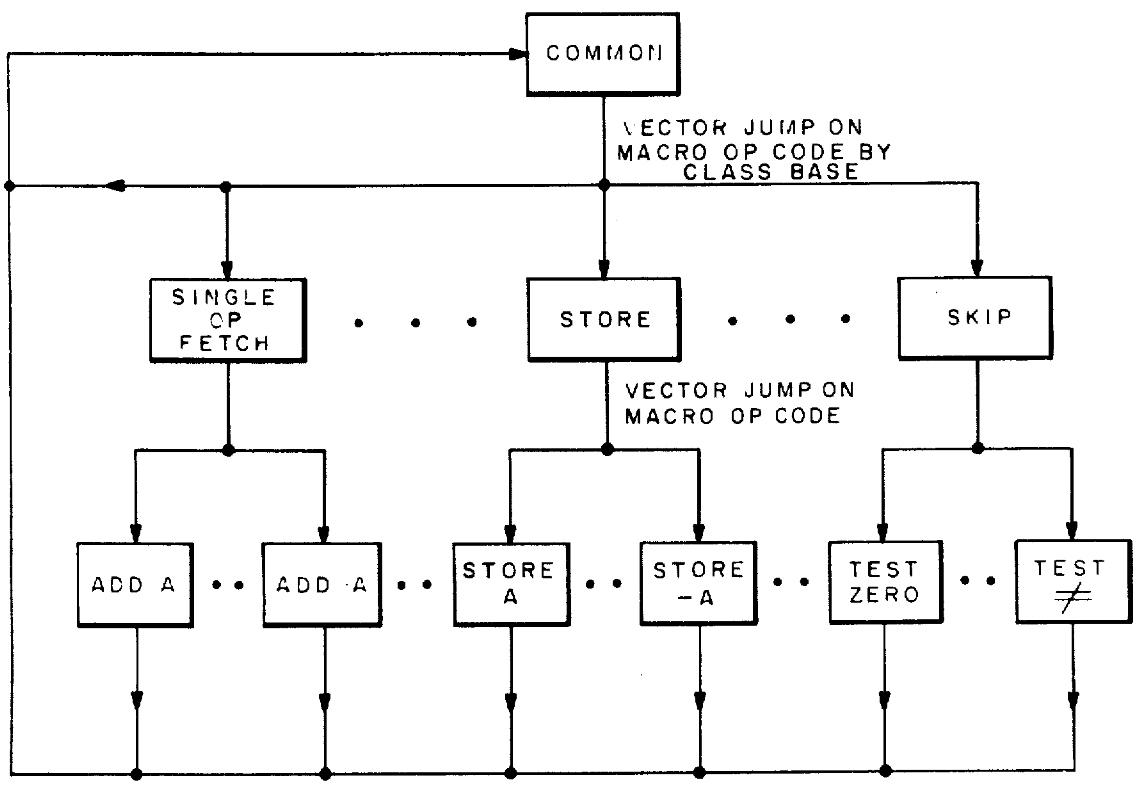
FIG. 3 is a flow diagram illustrating the structure of the micro code utilized in the computer of FIG. 2.

Referring for the moment to FIG. 3, the structure of the micro software utilized in the emulation is illustrated. Irrespective of the macro instruction to be performed, control fetches a micro instruction word that is common to all routines. This is illustrated on the first level of the structure chart of FIG. 3. In accordance with the macro op code (fields f and j of the macro instruction word stored in the register 13) a jump is taken to an appropriate one of the class base micro routines as indicated by the second level of the structure chart of FIG. 3. After execution of the class base routine a jump is taken to the specific micro routine for the particular macro instruction again as controlled by the macro op code fields f and j of the macro instruction register 13. The specific instruction routines are illustrated in the third level of the micro software structure chart of FIG. 3. As illustrated in FIG. 3, after the execution of the particular instruction routine, control returns to the location of the common micro instruction. Similarly, after execution of the common micro instruction, if the next macro instruction has not as yet been fetched, the routine loops back to common, as illustrated, until the macro instruction word is ready.

Referring again to FIG. 2, the CPU 10 includes an instruction status table 38 which is implemented by a programmable read only memory for providing instruction status words via a multiplexer 39 to address the control store 36 in accordance with the macro op code of the macro instruction to be executed. Accordingly, the instruction status table 38 is addressed from the f and j op code fields of the macro instruction register 13 which macro op code information is also applied directly via the multiplexer 39 for addressing the control store 36. The instruction status table 38 is 256 words long and 10 bits wide and provides address information to the control store 36 via the multiplexer 39 with regard to the class base of the macro instruction. The instruction status table 38 also provides signals to the local memory 28 of the local processor 27 for providing the proper base address for reading and writing the general register stack 32. The control store 36 provides an input to the multiplexer 39 for providing the address of the next micro instruction to be fetched in accordance with address data provided by the current micro instruction. Further details of the addressing for the control store 36 will be described hereinafter.

The CPU 10 also includes decision logic 40 implemented in accordance with the invention that provides 12 decision points designated as DPO through DP11. In a manner to be later described, the decision logic 40 provides the decision point signals in accordance with selected logic functions of selected variables. The decision point signals DP0-DP11 provide the decisional control required throughout the CPU 10. Additionally the CPU 10 includes control circuits 41 that provide the required control signals to the various components of the computer. In a manner to be described, the control circuits 41 include a deferred action control table as well as various flags and parameter latches to be later described.

Figures 4, 6:
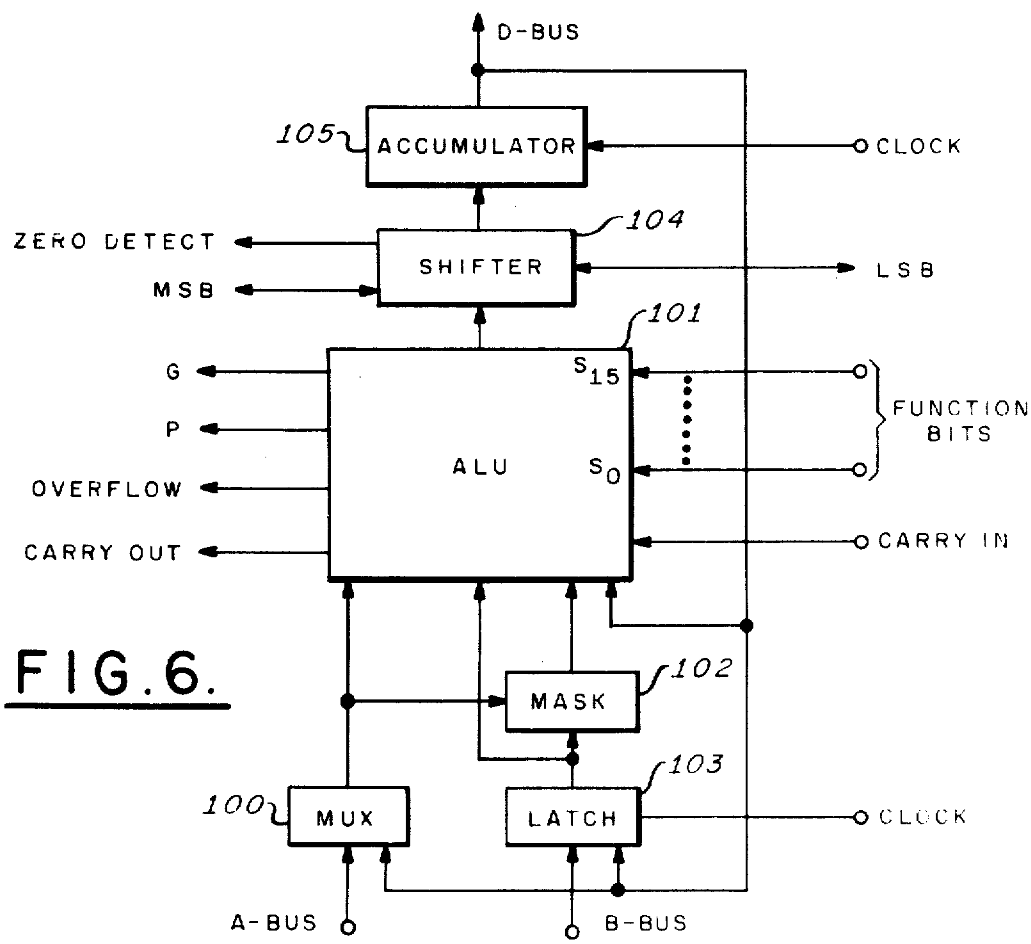
FIG. 4 is a diagram illustrating the format and fields of the micro instruction control words utilized in the computer of FIG. 2 which provide inputs to the table driven control logic of the present invention.
FIG. 6 is a schematic block diagram of a micro processor slice utilized in implementing the local processors of the computer of FIG. 5.

Referring now to FIG. 4, the format of the micro instruction words stored in the control store 36 is illustrated. Each micro instruction word contains global control fields as illustrated for the overall control of the CPU 10. The number of bits in each field is enumerated above the acronym for the field. Additionally, the micro instruction word also includes three groups of local control fields for the three local processors 17, 18, and 19 designated as P1, P2 and P3 respectively. The micro instruction word also includes a group of local control fields for controlling the local processor 27 designated as P4. The control store 36 provides the micro instruction words to the control register 37 from which the bits of the various fields are connected to the components of the CPU 10 in a manner to be described in detail hereinafter.

Generally the control store fields control the components of the CPU 10 as follows:

CONTROL STORE FIELDS—GLOBAL CONTROL

JDS—JUMP DECISION SELECTOR—The JDS field associates a logic function computer (LFC) in the decision logic 40 with decision point 0 (DPO) which determines the next micro instruction address.

NAT, NAF—NEXT ADDRESS (TRUE, FALSE)—These fields contain possible addresses for the next micro instruction. The NAT address may be modified by vectors in a manner to be explained or by the global control fields VDSO and VDSl. Address NAT is selected if decision point 0 is true and NAF is selected if decision point 0 is false.

XF—INDEX FUNCTION—The XF field controls vector jumps when the address NAT is selected by decision point 0. The relationship between the field XF and the output of decision point 0 is illustrated in the following table 1.

VDSO—VECTOR DECISION SELECTOR 0—The VDSO field associates a logic function computer in the decision logic 40 with decision point 1. Decision point 1 is or'ed with the least significant bit ($2^0$) of the NAT address. VDSl—VECTOR DECISION SELECTOR 1—The VDSl field associates an LFC of the decision logic 40 with decision point 2. The decision point 2 is or'ed with the second least significant bit ($2^1$) of the NAT address.

TABLE 1

| | MICRO INSTRUCTION FETCHING | |
|---|---|---|
| XF | DPO | NEXT CONTROL STORE ADDRESS |
| XX | 0 | NAF |
| 00 | 1 | NAT |
| 01 | 1 | NAT or'ed with class base vector |
| 10 | 1 | NAT or'ed with instruction vector |
| 11 | 1 | NAT or'ed with interrupt vector |

As described above with respect to FIG. 2, the class base vector is determined by the macro instruction to be executed and is provided by the instruction status table 38 in response to the op code fields f and j in the macro instruction register 13. Its value depends on the class of the marco instruction. The instruction vector is provided directly by the op code fields f and j from the macro instruction register 13. The instruction vector indicates the precise action to be performed. The interrupt vector is provided in a conventional manner by circuitry not shown which detects interrupt requests, the value of the vector depending on the type of interrupt. It will be appreciated that decision points 1 and 2 control a four way conditional vector branch capability on any real jump in addition to the vector branch capability controlled by the XF field. The OR functions delineated in Table 1 above are performed in the multiplexer 39 in a manner to be described.

BR—B-BUS INPUT SELECTION—The BR field selects which of two sources provides the selection data for the B-BUS input multiplexer 34. The two possible sources are a hardware 2-bit register called BRG, or the microinstruction field BIS.

BIS—B-INPUT SELECT—The BIS field selects a data input for the B-BUS input multiplexer 34.

SFT—SHIFT CONTROL SOURCE—The SFT field determines the source of data for controlling the shifter 35. The relationship between the fields BR, BIS and SFT with respect to the source of data applied to the B-BUS 32 is in accordance with the following table 2.

TABLE 2

| SHIFTER CONTROL AND INPUT SELECTION | | |
|---|---|---|
| SFT | BRG OR BIS | ACTION |
| 0 0 | 0 0 | MDRR → B-bus, no shift |
| 0 0 | 0 1 | D-bus → B-bus, no shift |
| 0 0 | 1 0 | $D_4$ → B-bus, no shift |
| 0 0 | 1 1 | GRS → B-bus, no shift |
| 0 1 | 0 0 | MDRR → B-bus, shift per SCR |
| 0 1 | 0 1 | D-bus → B-bus, shift per SCR |
| 0 1 | 1 0 | $D_4$ → B-bus, shift per SCR |
| 0 1 | 1 1 | GRS → B-bus, shift per SCR |
| 1 0 | 0 0 | MDRR → B-bus, shift per j-field |
| 1 0 | 1 1 | GRS → B-bus, shift per j-field |
| 1 1 | 0 0 | u* → B-bus |
| 1 1 | 0 1 | GRS* → B-bus |

where the MDRR designates the register 16 and GRS designates the general register stack 32 of FIG. 2. SCR (Shift Control Register) is a hardware register containing a value used to control the shifter. In a manner to be described, the BR field selects between BRG and BIS to control the B-bus input selection. BRG is a signal to be later described with respect to deferred action control. The quantities u* and GRS* are special inputs to the shifter 35 which align the u-field data from the macro instruction register 13 and the data from the GRS 32 for address computation arithmetic in the 2×20 mode of the local processors 17, 18 and 19.

GRA—GRS READ ADDRESS SOURCE—The GRA field determines the address source for the general register stack 32 when reading.

GWA—GRS WRITE ADDRESS SOURCE—The GWA field determines the address source of the general register stack 32 when writing. The following Table 3 indicates the control field coding for these address sources.

TABLE 3

| GRS ADDRESS SOURCE CONTROL | | |
|---|---|---|
| GRA OR GWA | SOURCE OF GRS ADDRESS | |
| 00 | x-field of MIR (13) | |
| 01 | RAR1 | 33 |
| 10 | RAR2 | 33 |
| 11 | RAR3 | 33 |

DADS—DEFERRED ACTION DECISION SELECTION—The DADS field associates a logic function computer of the decision logic 40 with decision point 11 which is utilized in selecting either the DACT or the DACF address of the deferred action control table included within the control circuits 41. If decision point 11 is true, then the DACT field is selected as the deferred action control table address and if false, DACF is selected.

DACT, DACF—DEFERRED ACTION CONTROL (TRUE, FALSE)—These global control store fields provide addresses into the deferred action control table, the addressed output of which controls the deferred routing of data and other deferred actions. One or the other of these addresses is selected in accordance with the value of the logical function (true or false) selected by the DADS field. Details of deferred action control of the CPU 10 will be provided hereinbelow.

SV0-SV5—STATIC VARIABLE SELECTION FIELDS (0-5)—Each of the SV0-SV5 fields selects one of 16 static control variables selected from a possible 24 static control variables as one of the inputs to two different logic function computers in a manner to be further described with respect to the decision control logic 40. Thus six static control variables can be selected by each micro instruction.

DV0-DV5—DYNAMIC VARIABLE SELECTION FIELDS (0-5)—Each of the DV0-DV5 fields selects one of a possible 16 dynamic control variables as one of the inputs to two different logic function computers to be later described. Thus six dynamic control variables can be selected by each micro instruction. The static and dynamic control variables utilized in the CPU 10 are delineated in the following Table 4 where the variables designated therein will be further described below.

TABLE 4

| DECISION CONTROL VARIABLES | | | |
|---|---|---|---|
| STATIC | | DYNAMIC (MUST BE SET BY '67) | |
| MNEMONIC | EXPLANATION | MNEMONIC | EXPLANATION |
| SCO - SC7 | "Settable Control" variables. | SP2R | Sign P1 Right half, 2 × 20 |
| | Selected by the SCS field in local | SP1L | Sign P1 Left half, 2 × 20 |
| | control and conditioned on the DDS | SP2R | Sign P2 Right half, 2 × 20 |
| | fields in local control. | SP2L | Sign P2 Left half, 2 × 20 |
| | | SP3R | Sign P3 Right half, 2 × 20 |
| DO | PSR CARRY DESIGNATOR | SP3L | Sign P3 Left half, 2 × 20 |
| D1 | OVERFLOW DESIG. | SP1 | Sign P1, 36 bit |
| D2 | Guard mode & storage protection | SP2 | Sign P2, 36 bit |
| D3 | Write only storage protection | SP3 | Sign P3, 36 bit |
| D5 | Double Prec. Underflow | SP4 | Sign P4 |
| D7 | Base Reg. Suppression | P1ZD | P1 ZERO DETECT, 36 bit |
| D8 | Floating Point Compatibility | P2ZD | P2 ZERO DETECT, 36 bit |
| i | indirect bit from macro inst. | P3ZD | P3 ZERO DETECT, 36 bit |
| h | increment index bit from macro. | P4ZD | P4 ZERO DETECT, 36 bit |
| x | 1 if x-field = 000, 0 otherwise | | |
| BRKPT | BREAKPOINT | ORDY | Operand Ready |
| INT | Interrupt | IRDY | Instruction Ready |

TABLE 4-continued

| DECISION CONTROL VARIABLES | | | |
|---|---|---|---|
| STATIC | | DYNAMIC (MUST BE SET BY '67) | |
| MNEMONIC | EXPLANATION | MNEMONIC | EXPLANATION |
| SE | Sign Extent | | |
| ID1 | D7 . i | | NOTE: |
| ID2 | D2 + ($\overline{D2}$ . D3) = D2 + D3 | | SE = (XH1vXH2vT1vT2vT3) IVS |
| ID3 | jo (low order bit of j-field) | | Program Mnemonics: |
| OARBZY | OAR BUSY (loaded but not fetched) | | XH1 Extend Left Half |
| | | | XH2 Extend Right Half |
| | | | T1 Left, Third |
| | | | T2 Middle Third |
| | | | T3 Right Third |
| | | | IVS Invert Sign |

LFC0-LFC5—LOGICAL FUNCTION COMPUTER CONTROL FIELDS (0-5)—The decision logic 40 comprises six logic function computers each of which can compute 16 different logical functions of four variables (2 dynamic and 2 static). Each of the LFC fields selects one of the 16 functions to be computed by the associated logic function computer.

CONTROL STORE FIELDS—LOCAL CONTROL

PDS—PHANTOM BRANCH DECISION SELECTOR—The PDS local control field for each of the local processors P1, P2, P3 and P4 associates a logic function computer in the decision logic 40 with the phantom branch decision points DP3-DP6 respectively. If the value of the decision point is true, then the associated LPFT field is utilized, otherwise the LPFF field is used.

LPFT, LPFF—LOCAL PROCESSOR FUNCTION SPECIFICATION FIELDS (TRUE OR FALSE)—The LPFT and LPFF fields provide the function control signals for the local processor 17, 18, 19 and 27. Only one of the two fields is utilized for each processor during the execution of a micro instruction as determined by the value of the logical function specified by the PDS field.

The PDS, LPFT, and LPFF fields provide the CPU 10 with a phantom branching capability wherein each of the local processors 17, 18, 19 and 27 can perform either of the functions specified by the LPFT and LPFF fields selected by the associated decision point which provides the result of a logical function computation selected by the PDS field. This conditional phantom branching capability is in addition to the real branching capability provided by the JDS, NAT and NAF fields discussed above. The real and phantom branching capabilities of the CPU 10 will be discussed in greater detail hereinbelow.

LMAS—LOCAL MEMORY ADDRESS SOURCE—The LMAS field associated with the respective local processors, P1, P2, P3 and P4, selects the address for reading or writing the memory 24, 25, 26 or 28 associated with the local processor. The following Table 5 delineates the specific LMAS field coding associated with the address sources for the local processors 17, 18 and 19.

TABLE 5

| LOCAL MEMORY ADDRESS SOURCE FOR P1, P2, P3 | |
|---|---|
| LMAS | ADDRESS SOURCE |
| 00 | LMA field from control store |
| 01 | LMAR (Local Memory Address Register) |
| 10 | Shift/Mask Memory |

where the LMAR and the shift/mask memory will be discussed hereinafter. The following Table 6 provides the LMAS coding for the local processor 27.

TABLE 6

| LOCAL MEMORY ADDRESS SOURCE FOR P4 | |
|---|---|
| LMAS | ADDRESS SOURCE |
| 0 | LMA field from control store |
| 1 | D6 Concatenated with GR field from IST |

where D6 is the 1108 control register selection indicator (bit 33) of the Processor State Register and is utilized to specify which of the X, A or R registers is to be used. The GB field from the instruction status table (IST) 38 provides the GRS base address which indicates the proper base address for reading and writing the general register stack 32 (GRS) in a manner to be described.

LMA—LOCAL MEMORY ADDRESS—The LMA field for each of the local processors P1, P2, P3 and P4 contains one of the possible addresses which may be selected by the LMAS field for reading or writing the local processor memory.

CC—CONFIGURATION CONTROL—The CC field for the local processors P1, P2 and P3 selects the arithmetic configuration of the processors in accordance with whether the processor will operate in the 2×20 or in the 36-bit (tsb) mode with or without an end around carry (eac). The arithmetic configuration control coding for the CC field is delineated in Table 7 as follows:

TABLE 7

| CONFIGURATION CONTROL | |
|---|---|
| CC | CONFIGURATION |
| 00 | 2 × 20 $\overline{eac}$ |
| 01 | 2 × 20 eae |
| 10 | 36 |
| 11 | 36 end in shift ($C_{IN}$ = msb of P on right) |

where the details of the various arithmetic configurations will be discussed hereinbelow.

DDS—D-BUS DECISION SELECTOR—Each of the local processors P1, P2, P3 and P4 has an associated DDS field that associates a logic function computer in the decision logic 40 with the D-bus decision points DP7-DP10 respectively. The value of the logical function selected is used in conjunction with the OUT field to conditionally place the contents of the accumulator within the associated processor for processors 17, 18 and 19 onto the associated D-bus (the D-bus 23 for the processors 17, 18 and 19). The value of the logical function selected is also used for processors 17, 18, 19 and 27 in conjunction with the WLM and WLMA fields for conditionally writing into the associated local memory and with the SCS field to conditionally set the settable static control variables SC0–SC7.

OUT—ACCUMULATOR OUTPUT CONTROL—The OUT field for the processors P1, P2 and P3 outputs the processor accumulator to the D-bus 23 conditioned on the value of the associated decision point (DP) as determined by the DDS selection as depicted in the following Table 8.

TABLE 8

| ACCUMULATOR OUTPUT CONTROL | | |
|---|---|---|
| DP | OUT | ACTION |
| x | 00 | no output to D-bus |
| 0 | 01 | no output |
| 1 | 01 | ACC → D-bus |
| 0 | 10 | ACC → D-bus |
| 1 | 10 | no output |
| X | 11 | ACC → D-bus |

BBS—B4 BUS INPUT SELECTION—The BBS field associated with the local processor P4 selects the source of the value placed on the B4 bus 29 in accordance with the following Table 9.

TABLE 9

| | GRS BASE ADDRESS |
|---|---|
| GB | BASE TO BE USED |
| 00 | A Registers |
| 01 | X Registers |
| 10 | R Registers |
| 11 | j ‖ a, $j_3j_2j_1$ concatenated with a-field if BBS = o put j ‖ a onto $B_4$ and read base of 18 φ's from local memory of $P_4$, if BBS = 1 put IAR on $B_4$. |

The entries in Table 9 will be further described hereinbelow with respect to the detailed discussion of the P4 local processor 27.

WLM—WRITE LOCAL MEMORY—The WLM field associated with each of the local processors P1, P2, P3 and P4 controls the writing of the associated local memory 24, 25, 26 and 28 conditioned on the value of the associated decision point DP7–DP10 respectively as determined by the associated DDS field in accordance with the following Table 10.

TABLE 10

| WRITE LOCAL MEMORY CONTROL | | |
|---|---|---|
| DP | WLM | ACTION |
| X | 00 | no write of local memory |
| 0 | 01 | no write |
| 1 | 01 | D-bus → LM |
| 0 | 10 | D-bus → LM |
| 1 | 10 | no write |
| X | 11 | D-bus → LM |

For processors P1, P2 and P3 the data is taken from the D-bus 23 and the address for the write is selected by the associated LMAS field. For the processor P4 the data is taken from the D4 bus 30 and the address for the write is selected by the associated LMAS field.

WLMA—WRITE LOCAL MEMORY ADDRESS—The WLMA field associated exclusively with the P4 processor 27 provides an address for writing into the memory 28 associated with this processor. The utilization and connection of the WLMA local control field will be discussed hereinbelow with respect to the local processor 27 and the associated local memory 28.

SCS—STATIC CONTROL VARIABLE SELECTOR—The SCS field for each local processor P1, P2, P3 and P4 selects one of the seven settable static control variables (SC–SC7) for setting as conditioned by the value of the associated decision point DP7–DP10 determined by the DDS selection. If the value of the decision point is true, then the static variable is set to a logic ONE, otherwise it is reset to a logic ZERO. SCO is selected (SCS=000) if no static control variable is to be altered. The values for the static control variables SC1–SC7 are stored in seven static control variable latches in the control circuits 41 to be described hereinafter.

Figure 5A:
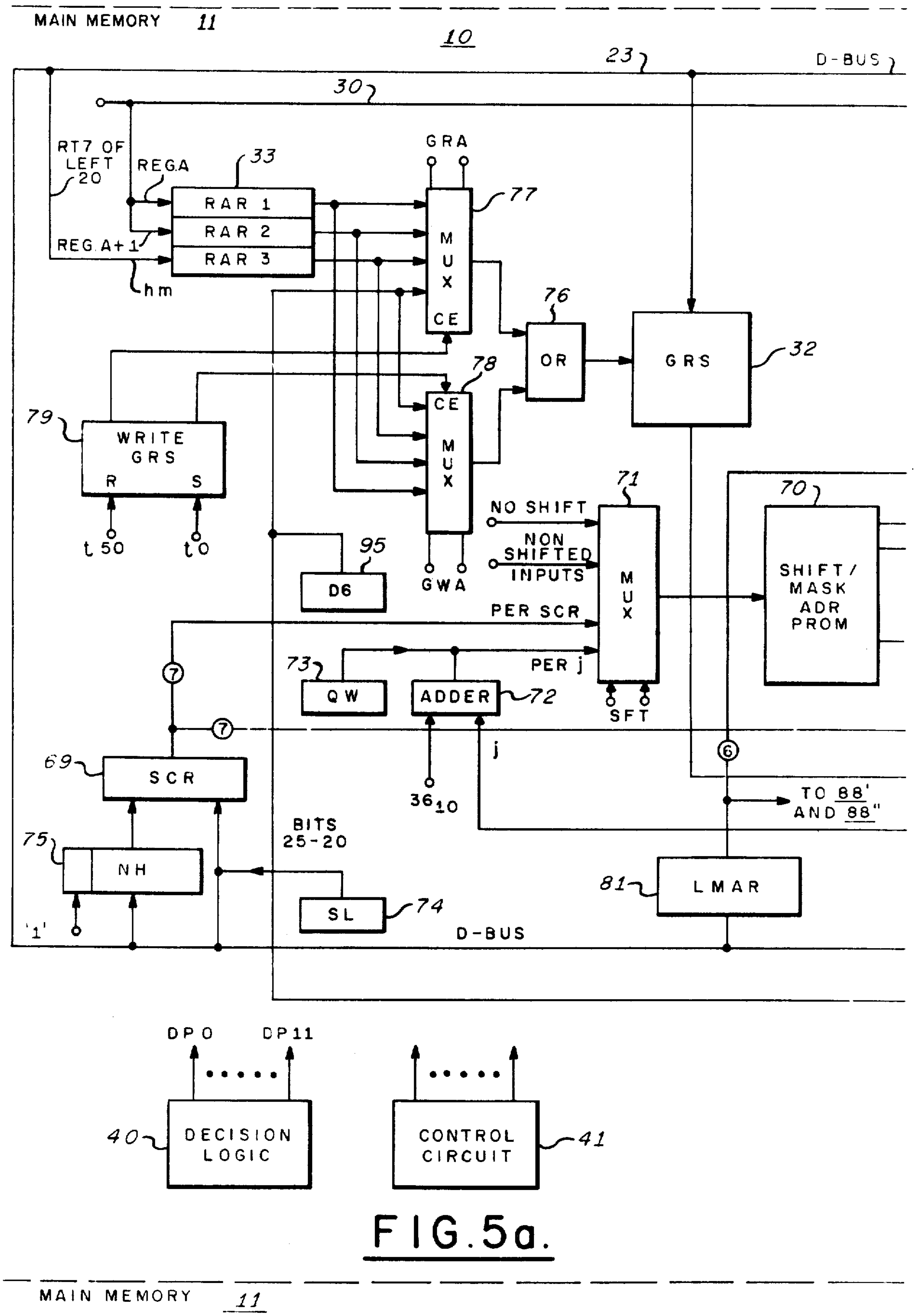
FIGS. 5*a*, 5*b* and 5*c*, hereinafter referred to as FIG. 5 in portions of the specification for convenience and brevity, comprise a detailed schematic block diagram of the computer of FIG. 2 illustrating decision points computed by the table driven control logic of the present invention.

Referring now to FIG. 5, comprised of FIGS. **5*a*, 5*b* and 5*c*, in which like reference numerals indicate like components with respect to FIG. 2, a schematic block diagram of the CPU 10 is illustrated showing further details thereof. As discussed above with respect to FIG. 2, the 1108 memory comprises two memory modules or banks which had been referred to as the I bank and the D bank. These memory modules may also be referred to as M0 and M1 with data or instructions designated as $D_0$ and $D_1$ provided by these modules in response to request signal $R_0$ and $R_1$ respectively. The instruction address register 12 receives an 18-bit memory address from either the program register 31 or from the bits 21–38 of the 40-bit wide D bus 23. The address from the instruction address register 12 is provided to the memory module M1 through a multiplexer 50 or to the memory module M0 through a multiplexer 51**.

The operand address register 14 receives 18-bit operand addresses from the bits 21–38 of the D-bus 23 and provides the operand address to the memory module M0 through the multiplexer 51 or to the memory module M1 through the multiplexer 50. The most significant bits from the registers 12 and 14 respectively are applied to a logic circuit 52 that provides request signals $R_0$ and $R_1$ to the respectively modules $M_0$ and $M_1$, the request signals being utilized to control the multiplexers 50 and 51 such that the request is directed to the appropriate module and the address is provided thereto in accordance with the numerical value of the requesting address. The logic 52 also provides signals designated as $D_0$→MDR and $D_0$→MIR which are applied respectively to an MDR multiplexer 53 and an MIR multiplexer 54. The main memory addressing circuitry for the CPU 10 also includes a partial word register (PW) 55 which receives the quarter word bit QW from a designator flip-flop (not shown) in the control circuits 41 as well as the j field bits from a staticizer register 56. The quarter word and j field information is applied along with the operand address from the OAR register 14 to the multiplexers 50 and 51 so as to address the memory 11 in the partial word mode. The main memory addressing utilized herein (including the partial word mode) is substantially identical to that utilized in the 1108 and will not be described in detail herein for brevity. Details of the logic circuit 52 will, however, be described hereinbelow.

Briefly, when an operand is to be stored in main memory 11, the D bus 23 transfers the operand address to the register 14. In accordance with the numerical value of the address, the logic 52 determines the memory module into which the operand is to be written and provides an appropriate request signal on either the line $R_0$ or the line $R_1$. The addressed location in the appropriate module then receives the operand from the register 15 for storage therein. When an operand is to be fetched from main memory the operand address is transferred to the operand address register 14 and the logic 52 again directs the address to the appropriate memory module via the multiplexers 50 and 51 and simultaneously provides a request to that module via the line $R_0$ or $R_1$. In accordance with the module from which the operand is requested the logic circuit 52 sets the $D_0 \rightarrow$MDR signal to either its true or false state which signal controls the multiplexer 53 to accept the operand from the appropriate module.

When fetching a macro instruction from main memory the instruction address is transferred to the instruction address register 12 and is directed to the appropriate memory module via the multiplexers 50 and 51 under control of the logic circuit 52. In accordance with the memory module from which the macro instruction is fetched the logic circuit 52 sets the $D_0 \rightarrow$MIR signal to either its true or false state to control the multiplexer 54 to accept the instruction from the appropriate module.

Each of the multiplexers 53 and 54 comprises a two input multiplexer responsive to operand and instruction words from the two memory modules respectively. The logic 52 provides an appropriate control signal to each of the multiplexers 53 and 54 in accordance with the module from which the word was requested and in accordance with whether the word was an operand or an instruction, the operands being routed to the MDRR register 16 and the macro instructions to the MIR register 13. Interposed between the multiplexer 53 and the register 16 are transfer gates 57 and similarly transfer gates 58 are interposed between the multiplexer 54 and the register 13. The transfer gates 57 and 58 are enabled by the acknowledge signal (ACK) from the 1108 main memory electronics.

In response to a STAT (staticize) signal from a STAT MEM flip-flop to be discussed with respect to control circuits 41, the f, j and a fields from the macro instruction stored in the register 13 are transferred to the corresponding fields of the staticizer register 56. The f and j fields from the staticizer register 56 determine an 8-bit instruction vector that is combined in the multiplexer 39 with the NAT field from the micro instruction to address the control store 36 to provide a vector jump to the control store micro routine for providing the micro instructions for emulating the particular macro instruction that was fetched.

The f and j fields from the staticizer register 56 are also utilized to provide addresses into the instruction status table 38. In a manner to be described in greater detail hereinafter, the 8-bit instruction status table address $A_7$–$A_0$ is provided as follows. If the f field bits $F_5F_4F_3 \neq 7_8$, then

| $A_7$ | $A_6$ | $A_5$ | $A_4$ | $A_3$ | $A_2$ | $A_1$ | $A_0$ |
|---|---|---|---|---|---|---|---|
| O | $J^*$ | $F_5$ | $F_4$ | $F_3$ | $F_2$ | $F_1$ | $F_0$ |

where $J^* = J_3 \wedge J_2 \wedge J_1$

If, however, the f field bits $F_5F_4F_3 = 7_8$, then

| $A_7$ | $A_6$ | $A_5$ | $A_4$ | $A_3$ | $A_2$ | $A_1$ | $A_0$ |
|---|---|---|---|---|---|---|---|
| 1 | $J_3$ | $J_2$ | $J_1$ | $J_0$ | $F_2$ | $F_1$ | $F_0$ |

It is appreciated that the address field $A_7$–$A_0$ for the IST 38 also forms the vector utilized to provide the instruction vector jump. The instruction status Table 38 is a programmable read only memory 256 words long and 10-bits wide, having the following output field format.

| IST OUTPUT FIELDS | | | | |
|---|---|---|---|---|
| 2 | 4 | 1 | 1 | 2 |
| GB | CB | FOS | SL | MC |

where the fields are defined as follows:

GB—GRS BASE ADDRESS—The GB field provides, to the local processor 27, the proper base address for reading and writing the GRS 32 in accordance with Table 9 above where the A, X and R registers are located in the general register stack 32.

CB—CLASS BASE—The CLASS BASE vector is utilized when XF=01 in accordance with the following Table 11

TABLE 11

| CLASS BASE VECTORS | |
|---|---|
| CB | CLASS BASE |
| 0000(CBC) | Common (vectored to if $\overline{IRDY}$) |
| 0011(CB3) | Fetch Single Operand Direct |
| 0100(CB4) | Fetch Single Operand Immediate |
| 0101(CB5) | Jump Greater and Decrement |
| 0110(CB6) | Unconditional Branch |
| 0111(CB7) | Store |
| 1011(CB11) | Skip and Cond. Branch |
| 1100(CB12) | Shift |

FOS—FETCH NEXT INSTRUCTION ON STATICIZE—The FOS field initiates the fetch of the next macro instruction when the staticize bit from the deferred action control table is set.

SL—SHIFT LEFT—The SL field from the IST table controls the high speed shifter 35 and causes data to be shifted left if SL=1 and right if SL=0.

MC—MASK CONTROL—The MC field provides information for masking a shifted operand in accordance with the following Table 12.

TABLE 12

| SHIFTED OPERAND MASK CONTROL | |
|---|---|
| MC | MASK |
| 01 | Read mask from local memory based on shift prom. |
| 10 | Read complement of mask from local memory based on shift prom. |
| 11 | Read mask from local memory based on shift prom, complement per sign of operand. |

where the elements and operations delineated will be further discussed hereinbelow.

The class base field from the IST 38 is applied to the multiplexer 39 along with the instruction vector from the staticizer register 56, the interrupt vector, the NAT and NAF fields from control store and the decision points DP1-DP2. Additionally control inputs DPO and XF are applied to the multiplexer 39. The class base field from the IST 38 is combined with the static variable ID1 at 59. The static variable ID1 is the logical combination shown in Table 4 of the processor state register designator D7 and the i field from the macro instruction register 13. The logic for forming the static variable ID1 is included in the control circuits 41, the result being provided at 59 for combination with the class base vector from the IST 38. The 1-bit IDI variable is combined with the 4-bit class base vector to form a unique address for indirect addressing. The DPO signal selects which of the two addresses NAT and NAF will be utilized in fetching the next micro instruction and XF controls vector jumps when NAT is selected. Table 1 above delineates the various address combinations effected in the circuitry 39 for providing the address of the next micro instruction in the control store 36. Decision point 1 and decision point 2 are additionally or'ed with the two least significant bits, respectively, of NAT to form a four way vector jump. The address to the control store 36 is provided via an address latch 60.

The inputs to the B4 bus 29 are provided from the instruction address register 12 and from two 2 input multiplexers 61 and 62. The B4 bus bits 7-4 and 3-0 are provided by the multiplexers 61 and 62 respectively while the B4 bus bits 17-8 are provided from the correspondingly numbered bits from the register 12. Bits 7-4 from the register 12 are applied as an input to the multiplexer 61 which receives as its second input the 4-bit j field from the staticizer register 56. The bits 3-0 from the register 12 are applied as an input to the multiplexer 62 which receives the 4-bit a field from the staticizer register 56 as its second input. The BBS field from the P4 portion of the micro instruction word (FIG. 4) provides the selection signal for the multiplexers 61 and 62 determining whether the B4 bus receives the j and a field bits or the bits from the instruction address register 12 (Table 9).

The 4-bit address for the local memory 28 associated with the local processor 27 is provided from multiplexers 63 and 64 and from bit 3 of the 4-bit LMA field from the P4 portion of the micro instructions (FIG. 4). Bits 0–1 of the address are provided by the multiplexer 63, bit 2 by the multiplexer 64 and bit 3 from the LMA field. One of the 2-bit inputs to the multiplexer 63 is provided by bits 0 and 1 from the LMA field and the other input thereto is provided by the 2-bit GB field from the IST 38. The two inputs to the multiplexer 64 are provided by the D6 bit from the processor state register and bit 2 from the LMA field. The selection for the multiplexer 63 and 64 is made in accordance with the LMAS field from the P4 portion of the micro instruction word. Thus, LMAS selects whether the address into the memory 28 will be provided by the LMA field from control store or by the D6 bit concatenated with the GB field as discussed above with respect to Table 6.

The WLMA field is also utilized to provide the address to the local memory 28 as follows. The LMA bit 3, the output of the multiplexer 64, and the output of the multiplexer 63 are applied as inputs to respective AND gates 44, 45 and 46, the outputs of which are concatenated to form a four bit input to OR gates 47. The output of the OR gates 47 provides the 4-bit address to the local memory 28. The 4-bit WLMA address field discussed above is applied through AND gates 48 as the second input to the OR gates 47. Thus, the OR gates 47 provide the address input to the local memory 28 either from the AND gates 44–46 as discussed above or from the WLMA address field through the AND gates 48. A write local memory 4 flip-flop 49 selectively enables either the AND gates 44–46 or the AND gates 48 in order to provide the appropriate address for writing into the local memory 28. The flip-flop 49 is set and reset, respectively, by the timing pulses $t_0$ and $t_{60}$.

As discussed above with respect to FIG. 2, the CPU 10 includes the input multiplexer 34 for selectively directing operands and addresses through the shifter 35 to the B bus 22 for processing in the local processors 17, 18 and 19. The multiplexer 34 accepts inputs from the general register stack 32, from the D bus 23, from the memory data register 16 and from the D4 bus 30. Selection of these inputs for transmission to the output of the multiplexer 34 is effected by a 2-bit control input from a multiplexer 65. The multiplexer 65 receives inputs from the BIS field of the micro instruction and from a BRG register 66 that is loaded from the deferred action control memory in a manner to be discussed. The inputs to the multiplexer 65 are selectively applied to its output under control of the BR field from the micro instructions. Thus selection of the source for application to the B bus 22 may be effected either under direct micro program control or as a deferred action.

The output of the multiplexer 34 is applied as the primary input to the high speed shifter 35 which is schematically represented by multiplexers 67 and 68. It is appreciated that the multiplexer 34 provides 36 parallel bits to the shifter 35. Each of the multiplexer 67 and 68 comprise 36, 8-input to 1 output multiplexer segments wherein the outputs from the multiplexer segments at the level 67 are connected to the inputs of the multiplexers at the level 68 so as to instantaneously effect a controlled shift of from 0 to 36 positions (circular) as the data flows in parallel through the shifter 35. The magnitude of the shift is controlled by the 3-bit selection inputs to the multiplexer levels 67 and 68 which provide simultaneous input selection control for each of the multiplexer segments in each of the levels. The details of the interconnections and control for effecting the shifts will be described hereinafter. The multiplexer level 68 receives the GRS* input from the general register stack 32 as well as the U* input from the U field of the macro instruction register 13. These inputs are applied and aligned in the multiplexer 68 for address computations in the local processors 17, 18 and 19. The multiplexer 67 additionally receives an input from a shift count register 69 to permit the shift count value to be updated by the local processors. The inputs to the shifter 35 from the shift control register 69 as well as the inputs designated as GRS* and U* need not undergo a general 1 to 36 bit shift, but are aligned on the shifter output to the B-bus in a fixed position. Thus, they can be (and are) brought into multiplexer 67 and 68 rather than multiplexer 34 to reduce hardware.

The control signals for the multiplexer levels 67 and 68 are provided by a shift/mask address PROM 70. The memory 70 contains 128 12-bit words for controlling the magnitude of the shifts effected by the shifter 35 as well as to provide address information for the control of masking operations performed by the local processors 17, 18 and 19. The memory map for performing the required operations will be illustrated hereinafter. The memory 70 accepts a 7-bit address from a 4 input multiplexer 71 where the inputs are selectively connected to the output under control of the SFT field from the micro control store 36. One of the inputs to the multiplexer indicated by the legend NO SHIFT provides the 0 address to the memory 70 at which address is stored a word, the bits of which effect the no shifting connections in the multiplexers 67 and 68. Another input to the multiplexer 71 designated as NON SHIFTED INPUTS is for a small set of selected constant addresses which are utilized for non-shift inputs such as U* and GRS* mentioned above. This provision is utilized for inputing additional data without the necessity of utilizing a larger input multiplexer 34. Instead spare inputs provided in the multiplexers 67 and 68 are utilized. To this effect control words may be stored in the memory 70 to control the multiplexers 67 and 68 to direct the proper bits to the B bus 22 as required.

Another input to the multiplexer 71 is provided by the shift count register 69 which is utilized for the SHIFT macro instruction or for normalizing. The fourth input to the multiplexer 71, which is designated by the legend PER j, provides the quarter word bit (QW) generally concatenated to the j field of the macro instruction for j field defined shifting. Specifically this input to the multiplexer 71 is effected by an adder 72 that adds the decimal constant 36 to the j field from the staticizer register 56 and at 73 where the quarter word bit by concatenation, has the effect of adding an additional decimal constant of 64 to the result. The combination effected by the elements 72 and 73 is provided in a manner and for reasons well understood with respect to the 1108 computer.

The shift count register 69 is a 7-bit register, the most significant bit controlling the direction of shift and the remaining bits controlling the number of places shifted via the addressed words stored in the memory 70. When performing the SHIFT macro instruction, the register 69 receives its 6 least significant bits from bits $25 \geqq 20$ from the D bus 23 and its most significant bit from the SL field from the instruction status Table 38, which SL field is provided at 74. The SL field provided by the instruction status table 38, as discussed above, comprises a single bit designating a left shift when in the 1 state and a right shift when in the 0 state.

The shift count register 69 is also utilized when normalizing in conjunction with a normalizer helper (NH) circuit 75. The normalizer helper circuit is responsive to the 36 data bits from the D bus 23 and provides a 7 digit shift count to the register 69. The most significant bit of the 7 output bits from the normalizer helper 75 is permanently set to 1 to effect exclusively left shifts as required in normalizing. Further details of the elements 69, 74 and 75 will be described hereinbelow.

As discussed above with respect to FIG. 2, the CPU 10 includes the general register stack 32 which comprises 128 36-bit registers. The A, X and R registers of the 1108 are included in the register stack 32. The registers of the stack 32 are addressed by a 7-bit address provided by an OR gate configuration 76. As discussed above, data is written into the addressed register from the D bus 23 and read therefrom into the B bus input multiplexer 34 and into the shifter multiplexer 68. There are four address sources for the GRS 32, three of them being provided by the register address registers 33 which are comprised of the three 7-bit registers RAR1, RAR2 and RAR3. The fourth address is provided by the X field from the macro instruction register 13 with the D6 bit concatenated thereto at 95 in a manner to be described below. The D6 bit is one of the 1108 designator bits from the PSR register as described above and, in the CPU 10, is provided by a separate flip-flop in the control circuits 41. The four addresses are applied as inputs to a GRS READ address multiplexer 77 and to a GRS WRITE address multiplexer 78. The GRA and GWA fields from the control store 36 are applied as the selection inputs to the multiplexer 77 and 78 respectively. Additionally, a write enable flip-flop 79 responsive to timing signals $t_0$ and $t_{50}$, which timing signals will be later described, applies control signals to the chip enable inputs of the multiplexers 77 and 78 to provide the timing for the GRS writing and reading operations.

In a manner to be further described hereinbelow, the CPU 10 operates with a 100 nanosecond micro cycle, timing strobes being provided every ten nanoseconds, the strobes being designated as $t_0$–$t_{90}$. Thus, it is appreciated that at $t_0$ the write enable flip-flop 79 is set and at $t_{50}$ it is reset. Thus, during the first half of the micro cycle the multiplexer 78 is enabled for writing and during the second half of the micro cycle the multiplexer 77 is enabled for reading. Thus, in accordance with the GRA and GWA fields from the micro instruction words, one of the four input addresses is selected by the GWA field during the first half of the micro cycle and is transmitted through the OR gate 76 to address the GRS 32 for writing. During the second half of the micro cycle one of the four input addresses is selected by the GRA field and transmitted through the OR gate configuration 76 to address the GRS 32 for reading. RAR1 usually contains the absolute address of the register pointed at by the a field of the macro instruction, which value is generally computed toward the beginning of the macro instruction emulation by the local processor 27. The RAR1 register receives this address from the 7 least significant bits from the D4 bus 30. The RAR2 register is usually utilized to contain the address of $A_a+1$ for the 1108 double precision instructions and receives this address information from the 7 least significant bits of the D4 bus 30. The register RAR3 usually contains the GRS address provided by the u field of the macro instruction which, in accordance with 1108 addressing, is the 'hidden' memory. Any of the local processors 17, 18 and 19 may provide the computations to provide this address information to RAR3 which is taken from the right 7 of the left 20 bits of the 40-bit wide D bus 23. The fourth address source is provided directly from the macro instruction register 13 by the x field concatenated with the D6 bit. D6 determines whether the x register is in the user state or in the executive state in a manner identical to that utilized in the 1108. Because of the boundaries chosen by the 1108, the D6 bit can merely be concatenated in a manner to be described hereinbelow.

The addressing for the GRS was generally discussed above with respect to Tables 3 and 9 from which it is appreciated that the base address computations are performed by the local processor 27 in response to the GB field from the IST memory 38, the results being provided to the register address registers 33 as directed by the GRA and GWA fields in the micro instructions in the control store 36.

As previously discussed, the CPU 10 includes local processors 17, 18 and 19 designated as P1, P2 and P3 which have local memories 24, 25 and 26 associated therewith respectively. Each of the local memories 24, 25 and 26 are 64 words long by 40 bits wide. The local memory 24 is adressed by a 6-bit, 3 input multiplexer 80 where the inputs are selected by the LMAS field from the local control field associated with the processor P1 provided from the control store 36 as discussed above with respect to Table 5. One of the inputs to the multiplexer 80 is provided by the LMA field from the local control field associated with the processor P1 whereby the local memory 24 may be addressed directly under micro program control. A second input to the multiplexer 80 is provided from a local memory address register (LMAR) 81 which is loaded from the 6 least significant bits of the D bus 23 under control of the deferred action control table in the control circuits 41. Thus, in a manner to be described hereinafter, the local memory 24 may be addressed in accordance with a deferred action. The third input to the multiplexer 80 is provided from the shift/mask address PROM 70 which addresses thirty-six locations in the local memory 24 which are utilized for storing masks used in the local processor computations.

The addressed words from the local memory 24 are applied through a complementer 82 to an A latch register 83 which, in turn, provides its 40-bit input to the A port of the local processor 17. The complementer 82 will transmit the addressed word from the local memory 24 to the A register 83 in either an uncomplemented form in accordance with inputs LMAS, MC and SE thereto. It is appreciated that the control field LMAS is provided from the control store 36, the field MC from the instruction status table 38 and the field SE from the associated static variable flip-flop in the control circuits 41 as indicated above with respect to Table 4. The detailed control of the complementer 82 will be later discussed. The latches provided by the A register 43 are required since the A port of the local processor 17 is not provided with an internal latch. The B port to the local processor 17 is so provided. The selective complementation control of the complementer 82 is primarily utilized in mask extraction from the local memory 24 under control of the shift/mask address PROM 70 so that 36 masks as well as their complements may be selectively provided from the local memory 24 as indicated above with respect to Tables 5 and 12.

The input, output, arithmetic and logic function control for the local processor 17 is provided by 16 function bits $S_0$–$S_{15}$. In a manner to be later described in greater detail, the local processor 17 has a useful repertoire of approximately 67 functions, the 16-bit function code selecting the functions by utilizing a semi-master bitted approach. Fourteen of the 16 function bits, namely $S_{0\text{-}3, 5\text{-}7, 9\text{-}15}$ are provided from a 2 input multiplexer 84 via a function latch 85. The 2 inputs to the multiplexer 84 are provided from the control store 36 by the LPFT and LPFF fields of the portion of the micro control word associated with the local processor P1. The selection of these function control fields is provided by the selection input to the multiplexer 84 from decision point 3 from the decision logic 40. Thus, in accordance with the state of DP3, either the function called for by LPFT or that called for by LPFF will be performed by the local processor 17 in accordance with the control arrangement for the CPU 10 to be later described.

The $S_8$ function bit of the local processor 17 controls the output of the local processor accumulator to the D port. The $S_8$ function bit is provided from an accumulator output control multiplexer 86 via an $S_8$ function latch 87. The 2 bits of the OUT field of the portion of the micro control word associated with the P1 processor are applied respectively to the 2 inputs to the multiplexer 86, selection therebetween being effectd by the decision point 7 signal from the decision logic 40. The specific output control effected was delineated above with respect to Table 8. For reasons to be clarified, the local processor function controlled by the $S_4$ function bit is not utilized in the operation of the CPU 10 and the function is disabled by applying a permanent "1" signal to the $S_4$ input. The components 80, 82–87 may for convenience be designated as a block 88.

Associated with the local processor 18 and local memory 25 is a block 88' and associated with the local processor 19 and the local memory 26 is a block 88". The blocks 88' and 88" are identical to the block 88 with the exception that appropriately associated local control fields from the control store 36 are applied thereto. The local memory address register 81 and the shift-/mask address PROM 70 provide inputs to the blocks 88' and 88" for reasons similar to those discussed with respect to the block 88.

The local processor 27 with its associated local memory 28 is configured somewhat differently from the processor 17, 18 and 19. The addressing of the local memory 28 has previously been discussed with respect to the blocks 63 and 64. The local processor 27 utilizes 16 function bits $S_0$–$S_{15}$ in a manner similar to that described above with respect to the processor 17. The function bits $S_{0\text{-}3, 5\text{-}7, 9\text{-}15}$ are provided in parallel from a function select multiplexer 89 via a function latch 90. The 2 inputs to the multiplexer 89 are provided from the control store 36 by the local processor function fields LPFT and LPFF from the portion of the micro control word associated with the P4 processor as discussed above with respect to FIG. 4. The selection between LPFT and LPFF is effected by decision point 6 from the decision logic 40. The carry in ($C_{IN}$) input to the processor 27 is treated as a function bit and is provided from one of the function bit outputs of the multiplexer 89. The $S_8$ input is permanently enabled by a 1 input since the processor 27 utilizes the private $D_4$ bus 30 to which it exclusively provides inputs. The $S_4$ input to the processor 27 is permanently disabled in the manner and for the reasons discussed above with respect to the processor 17.

Each of the local processors 17, 18, 19 and 27 are preferably constructed from LSI chips of the micro processor variety. Particularly, the Motorola 10,800 4-bit slice ALU was selected for the implementation. The detailed specifications for this ALU slice may be found in the publication entitled "M10800-HIGH PERFORMANCE MECL LSI PROCESSOR FAMILY", 1976, available from Motorola Semiconductor Products, Inc. It should be noted that the terminology utilized herein, namely, A bus, B bus and D bus, corresponds to the Motorola terminology A bus, O bus and I bus respectively.

Referring now to FIG. 6, a schematic block diagram of the ALU slice utilized to implement the local processor 17, 18, 19, and 27 is illustrated depicting the components and paths that are utilized in the CPU 10. The input from the A register 83 (FIG. 5) to the A port is applied as an input to a multiplexer 100 whose output is applied to the ALU 101 of the chip as well as to a mask network 102. Another input to the mask network 102 is provided from a B bus latch 103 utilized to latch values from the B bus 22 (FIG. 5) at the beginning of each micro cycle. The output of the mask network 102 as well as the output from the latch 103 provide inputs to the ALU block 101. The ALU 101 receives the 16 function select bits $S_0$–$S_{15}$ as discussed above as well as a carry in signal. The ALU 101 also provides carry generate (G), carry propagate (P), as well as overflow and carry out signals.

The output from the ALU 101 is applied to a 1-bit shifter 104 whose output is applied to a micro accumulator 105 (designated as $\alpha$) whose output, in turn, provides the value to the output D port of the processor. The output of the accumulator 105 is also applied as an input to the A bus multiplexer 100, the B bus latch 103 and the ALU 101. The shifter 104 includes a bi-directional port for the least significant bit (LSB) as well as a bi-directional port for the most significant bit (MSB) and also provides a ZERO detect output utilized as a dynamic variable in the CPU 10 which provides an indication when all of the bits transmitted through the shifter are 0.

The chip illustrated in FIG. 6 provides Boolean logic functions, binary arithmetic and a set of data routing functions, the chip having a repertoire of approximately 67 functions. As discussed above, the functions are selected by the semi-master-bitted inputs $S_0$–$S_{15}$. As previously described, the D port output can be disabled by the function bit $S_8$ permitting the wired OR output to the D bus 23. The basic arithmetic repertoire is add, subtract, complement, shift 1 bit and the basic logic repertoire is AND, OR, EXCLUSIVE OR and NOT. Additionally, the chip can perform a Boolean logic function followed by an arithmetic function in the same micro cycle utilizing the mask network 102. Since the shifter 104 is constrained to a 1-bit shift per cycle, the external high speed shifter 35 is utilized as described with respect to FIGS. 2 and 5. Data from the B bus 22 is latched in the B bus latch 103 at the beginning of each micro cycle and the result of the last operation is latched in the accumulator 105 at the end of a cycle. Since there is no internal latch for the A port of the chip, the external A register 83 is utilized to provide this capability. The complete repertoire for the chip as well as the details of its structure and operation are documented in said Motorola specification referenced above.

Each of the chips utilized is 4-bits wide and is sliced parallel to the data flow. The chip is expanded to the 40 bits required by the processors 17, 18 and 19 and to the 20-bits required by the processor 27 by connecting the circuits in parallel. Specifically, in implementing the local processors 17, 18 and 19, 10 4-bit wide chips such as illustrated in FIG. 6 are utilized with the resulting 40-bit wide A, B, and D ports connected in parallel to the 40-bit wide A bus register 83, B bus 22 and D bus 23 respectively. The local processor 27 is comprised of 5 such chips with the resulting 20-bit wide A, B, and D ports being connected in parallel to the 20-bit wide memory 28, $B_4$, bus 29 and $D_4$ bus 30, respectively. For each of the local processors 17, 18, 19 and 27, the function control bits $S_0$–$S_{15}$ are applied in parallel to all of the chips comprising a processor. The shifter circuits 104 for all of the chips in a processor are serially connected with respect to each other with the MSB shifter output of a chip connected to the LSB of the next higher order chip. The ZERO detect output from the chips comprising a processor are ANDed together to provide the ZERO detect dynamic variable for the processor as delineated above with respect to Table 4. The overflow outputs from the most significant chips of the respective processors 17, 18, 19 and 27 provide inputs to the decision logic 40 as variables into decision logic circuits to be described hereinbelow.

As previously described, the 10 4-bit chips comprising each of the local processor 17, 18 and 19 may be utilized interconnected in a 36-bit mode or as 2, 20-bit processors in the 2×20 bit mode. The connections of the generate (G), propagate (P), carry in and carry out leads to carry look ahead circuitry will be described hereinbelow with respect to the configuration control of the local processors. An indication of the sign of either the 18-bit or 36-bit value computed is provided in a conventional manner by connections to the appropriate sign digits from the accumulator.

As previously discussed, the DACT and DACF fields of the micro control word in the control store 36 selectively provide, in accordance with decision point 11, addresses into a deferred action control table in the control circuits 41 for controlling the performance of global deferred actions. Referring now to FIG. 7, deferred action control table 106 is illustrated. The deferred action control table 106 comprises a memory for storing a plurality of words addressed in accordance with DACT and DACF, the bits thereof providing a master bitted list of the actions to be performed. For example, the memory 106 includes 28 words of 22 bits each where each bit controls a particular action. The bit outputs from the memory 106 are connected to the appropriate control circuitry for effecting the designated actions in accordance with the states of the bits. For example, bit 0 which controls the action P→IAR controls the transfer of the contents of the program counter 31 to the instruction address register 12 by connecting the bit 0 output from the memory 106 to the strobe input of the register 12. Thus, when a word is addressed in the memory 106 at either the address DACT or DACF selectively under control of DP 11; if bit 0 of that word is set to 1, the P→IAR transfer will take place, otherwise it will not. In a similar manner, the other bits of the memory 106 are connected to the components designated by the particular action listed to control the deferred action associated therewith. Details of the control connections will be later described. Thus, the two control store fields DACT and DACF specify the particular deferred action choices for a micro instruction. The table 106 includes a word for each combination of deferred actions desired. Several deferred actions will occur simultaneously if several bits are set in the words read from the memory.

The choice as to whether the word in the memory 106 addressed by the DACT field or that addressed by the DACF field is utilized is controlled by the state of DP 11. This selection is implemented by utilizing two identical memories, one addressed by DACT and the other addressed by DACF where the corresponding bits from the memory are gated at the device to be controlled in accordance with DP 11. For example, the BRG BIT 0 bits from both the DACT and DACF memories are connected to the least significant stage of the BRG register 66 and the bit from one memory or the other is loaded into that stage under control of DP 11. The details for the selective control of the deferred actions will be described hereinbelow.

Most of the mnemonics specifying the deferred actions to be performed refer to registers and latches discussed hereinabove with respect to FIG. 5. For example D→IAR controls placing the value on the D bus 23 into the instruction address register 12. The STORE OP action controls storing the operand in the MDRW register 15 into the main memory at the address in the operand addres register (OAR) 14. The FETCH NI action causes fetching of the next macro instruction at the address in the IAR register 12 into the MIR register 13. The LOAD BRG, BRG BIT 0 and BRG BIT 1 actions control the loading of the BRG register 66 with the bits provided by bits 11 and 12 of the memory 106. The STATICIZE actions sets a latch in the control circuits 41 called STAT MEM. The output of the STAT MEM latch provides the STAT signal for the staticizer register 56. It should be noted that the D0 and D1 designations refer to the static variables discussed above with respect to Table 4 and that the D→GRS (R)

and the D→GRS (L) actions are utilized in loading the right hand or left hand side of the selected register of the general register stack 32 from the D bus 23 respectively, the left hand side (L) referring to the left most 20 bits of the D bus 23 and the right most half (R) referring to the 20 right most bits thereof.

TABLE DRIVEN DECISION LOGIC

As discussed above with respect to FIG. 4, the CPU 10 requires a plurality of decisions to be made to provide for conditional control of the computer. Decision logic 40 (FIGS., 2 and 5) provides 12 decision points DP0–DP11 for effecting the required control in a manner to be described below with respect to FIGS. 8 and 9. The relationships between the decision points and the micro control fields illustrated in FIG. 4 were set forth above where the binary states of the decision points determine the selection. Briefly, (referring to FIG. 9)

- DP0 controls the real branching by selecting either address NAT or NAF in accordance with a function selected by JDS where address NAT may be modified to perform a vector jump with respect to the class base, the instruction and the interrupt vectors under control of the XF field.
- DP1 and DP2 are or'ed with the two least significant bits of address NAT respectively to effect a 4-way conditional vector branch. The logic functions that provide DP1 and DP2 are selected by fields VDS0 and VDS1 respectively.
- DP3–DP6 select between the LPFT and LPFF function control fields for the respective processors P1–P4 in accordance with logic functions selected by the PDS fields respectively. These decision points control the phantom branching of the CPU 10 in a manner to be described.
- DP7–DP10 provide deferred action conditional control for the respective local processors P1, P2, P3 and P4 in accordance with logic functions selected by the respective DDS fields. These decision points are utilized in conjunction with the OUT, WLM, WLMA and SCS field to conditionally place the accumulator contents of the local processors, P1, P2 and P3 onto the D bus 23, write into the local memories 24, 25, 26 and 28 and set the static control variables SC1–SC7 as discussed above with respect to Table 4.
- DP11 controls the global deferred action by selecting between the DACT and DACF addresses into the deferred action control table of FIG. 7 in accordance with a logic function selected by the DADS field.

Thus, the decisions delineated above are effected by the binary states of the decision points in accordance with the selected logic function. The CPU 10 utilizes 24 static variables and 16 dynamic variables which are selectively applied as the inputs to the logic functions which variables are delineated in Table 4 above. The static variables have values which exist before the start of a micro cycle and may exist over several micro cycles. The dynamic variables are computed during a micro cycle at about $t_{67}$ of the 100 nanosecond cycle with the resultant decision point requiring a value by about $t_{95}$.

In order to achieve flexibility as well as hardware economy, the logical functions of the decision logic 40 are computed by storing the truth tables of the functions in memories designated as logic function computers and by looking up the proper truth table entry by applying the values of the variables as inputs to the address leads of the memory. The memory output is then routed to the associated decision point. For example, if it is desired to compute the EXCLUSIVE OR of a static variable SV1 and a dynamic variable DV1 where $F=SV1\cdot\overline{DV1}\oplus\overline{SV1}\cdot DV1$, the truth table for this logic function is

| SV1 | DV1 | F |
|---|---|---|
| 0 | 0 | 0 |
| 0 | 1 | 1 |
| 1 | 0 | 1 |
| 1 | 1 | 0 |

Thus, the table can be stored in a 4 word by 1 bit memory such that the contents of the memory are

| ADDRESS | CONTENTS |
|---|---|
| 0 0 | 0 |
| 0 1 | 1 |
| 1 0 | 1 |
| 1 1 | 0 |

Thus, when the variables SV1 and DV1 are applied to the address leads of the memory, the value of the output lead is the value of the function F. Many such truth tables are stored in a single memory with the low order address leads connected to the control variables and the upper order address lead connected to the control store fields which are utilized to select the function to be computed.

Since the static variables are available at the beginning of the micro cycle and the dynamic variables are only available toward the end of the micro cycle, the speed of the decision logic 40 may be incrçased by folding the truth table for the logic function in memory so that it is wider than the 1 bit previously described. The memory word can then be read dependig only on the static variables with the selection between the read-out bits of the word addressed by the static variables being made by the dynamic variables. Thus, in the example given above the memory contents would be as follows:

| ADDRESS | CONTENTS | |
|---|---|---|
| 0 | 0 | 1 |
| 1 | 1 | 0 |

DV1 = "1"
DV1 = "0"

Therefore, it is appreciated that reading the memory in accordance with the static variables produces 2 bits of information and the dynamic variable is utilized to select which of the 2 bits is the correct one. This permits the memory to be read before the dynamic variable is available thus overlapping the memory read with the computation of the dynamic variable thereby increasing the speed of the decision network.

Figure 8D:
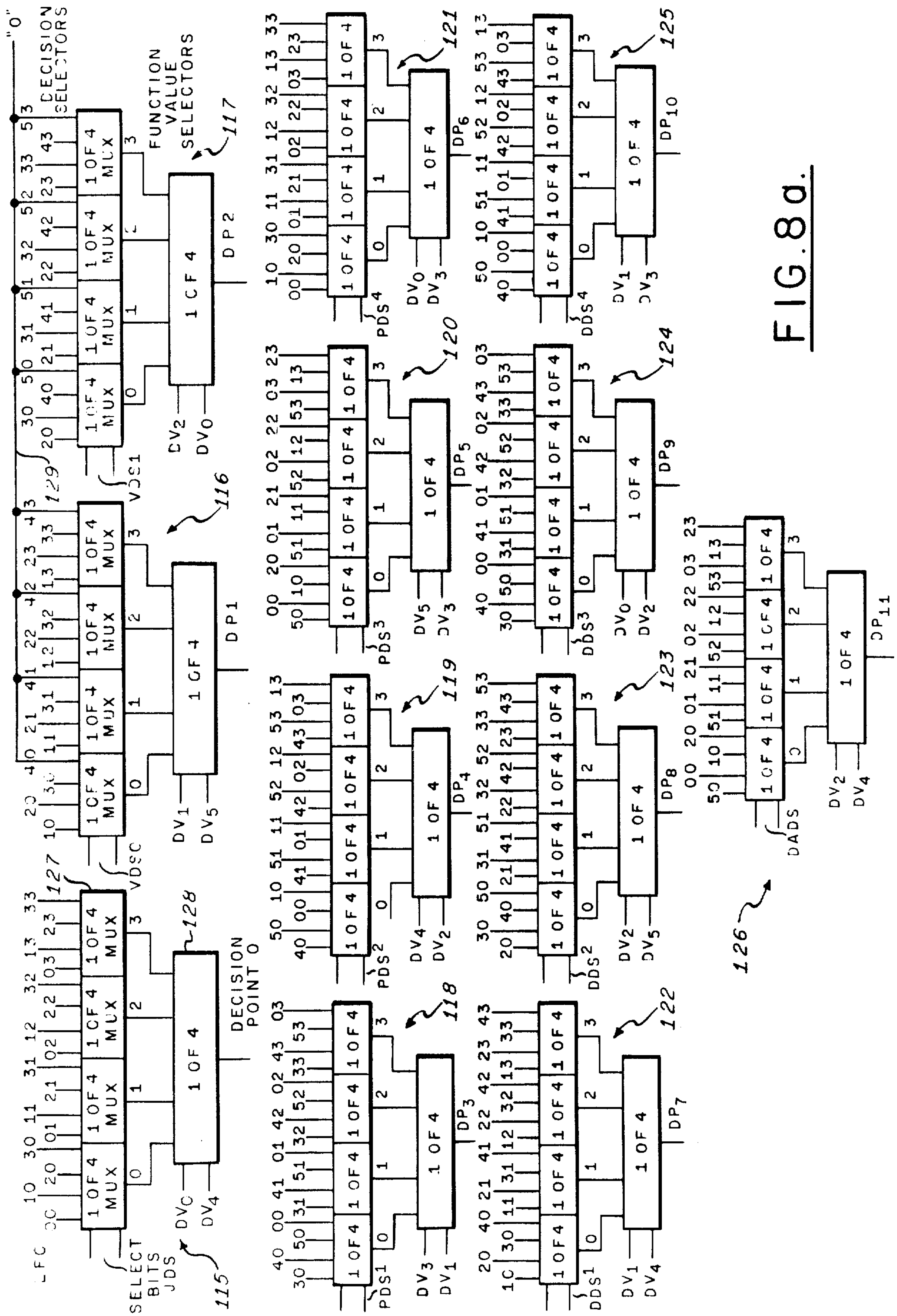
FIGS. 8*a* and 8*b*, hereinafter referred to as FIG. 8 in portions of the specification for convenience and brevity, comprise a block schematic diagram of the table driven control logic of the present invention utilized in the computer of FIG. 5.
Figure 8B:
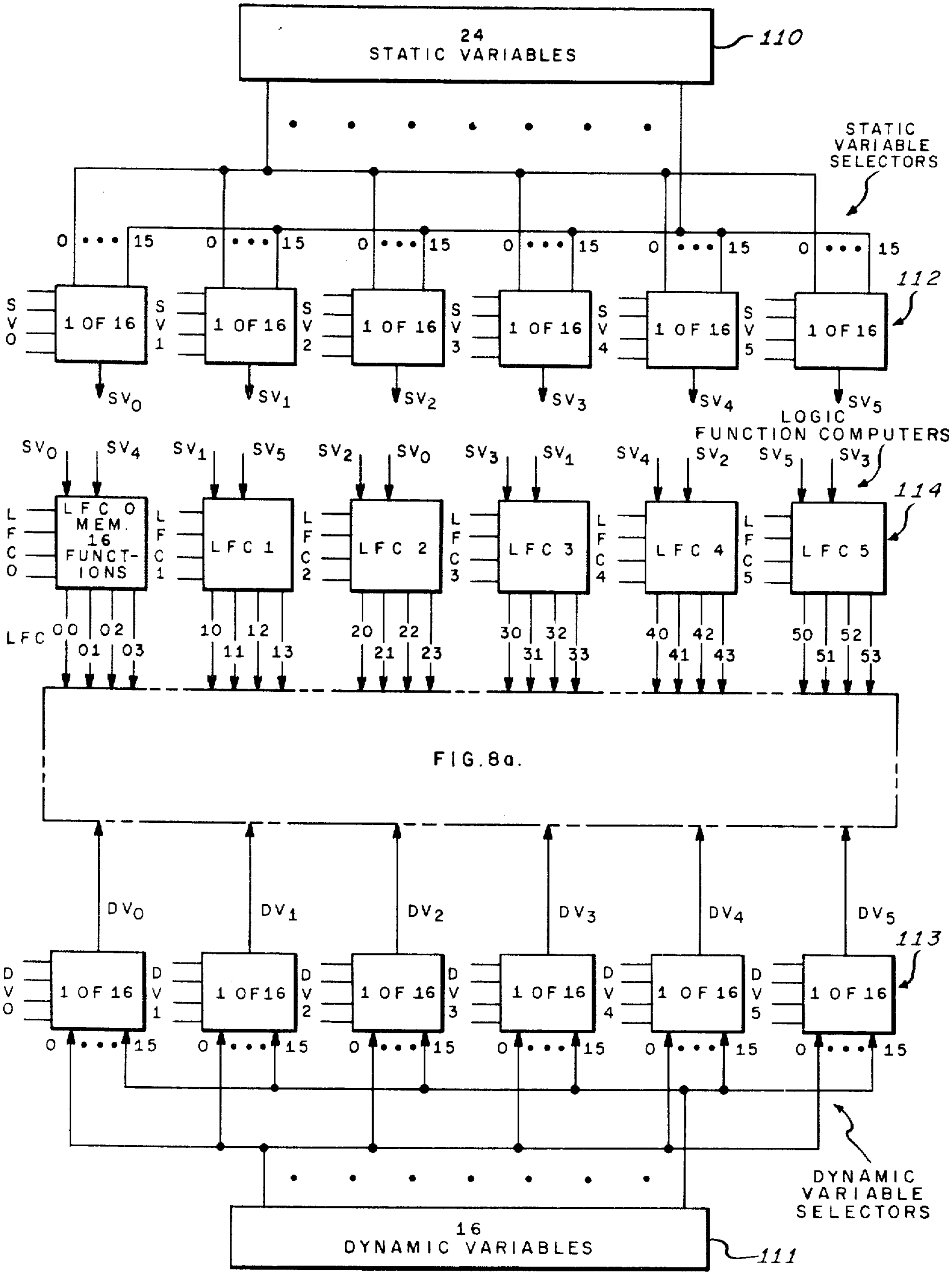

Referring now to FIG. 8 comprised of FIGS. 8_a–b_, the decision logic 40 utilized in the CPU 10 and implemented in accordance with the present invention is illustrated. The 24 static variables developed throughout the machine are represented as being collected into a 24 bit buffer 110 wherein each bit provides the current state of the static variables associated therewith. In a similar manner the 16 dynamic variables utilized in the CPU 10 are represented as collected into a 16 bit buffer 111. The 24 outputs from the buffer 110 are arranged in 6 groups of 16 outputs each and are applied as the input to six 1-of-16 multiplexers 112 which are utilized as the static variable selectors. The groups of the 16 static variable inputs into each of the multiplexers 112 are arranged whereby each static variable is applied as an input to at least one of the multiplexers with some of the variables being applied to more than one multiplexer for convenience in accordance with the usage of the variables. The select bit inputs to the respective multiplexers 112 are provided by the static variable selection fields SV0–SV5 of the microinstruction. Thus, the 4-bit selection fields SV0–SV5 provide 6 static variables $SV_0$–$SV_5$ during each micro cycle selected from the 24 static variables provided from the buffer 110.

Similarly, the 16 dynamic variables from the buffer 111 are provided as inputs to six 1-of-16 multiplexers 113 which are utilized as dynamic variable selectors. The 4-bit selection inputs to the multiplexers 113 are coupled respectively to receive the dynamic variable selection fields DV0–DV5 from the micro instruction. Thus, during each micro cycle the dynamic variable selection fields select 6 dynamic variables $DV_0$–$DV_5$ from the 16 dynamic variables provided by the buffer 111 for application as inputs to the logic functions utilized in the machine.

The decision logic 40 includes 6 logic function computers 114 designated as LFC0–LFC5. Each of the logic function computers 114 comprises a 64 word by 4-bits/word memory for storing 16 logical functions of 4 variables comprising 2 static variables and 2 dynamic variables. Thus, addressing each of the logic function computers 14 requires a 6-bit address input. The 4 most significant address inputs are utilized to select the required one of 16 stored logic functions and these 4 address inputs to the 6 logic function computers LFC0–LFC5 are provided from the logic function computer control fields LFC0–LFC5 respectively of the micro instruction. The static variables $SV_0$–$SV_5$ provided from the static variable selectors 112 are coupled as illustrated to the two least significant address input bits of the logic function computers 114 with the output of each of the static variable selectors 112 being connected to 2 different addresss inputs of the logic function computers 114 for flexibility. Thus, each of the logic function computers LFC0–LFC5 provides a 4-bit output representative of the result of applying the 2 selected static variables SV to the logic function selected by the logic function selection field LFC. Each of the output bits from the logic function computers is identified by a 2 digit legend, the first digit representing the particular logic function computer and the second digit representing the bit number of the output.

Referring to FIG. 8*a*, the outputs from the logic function computers 114 are applied to 12 decision and function value selectors 115–126 which, in response to select bits from the micro control word and the selected dynamic variables, provide the decision points DP0–DP11 respectively. The decision and function value selector 115 is comprised of a decision selector 127 which comprises four 1-of-4 multiplexers receiving inputs from 4 of the logic function computers 114. The inputs of the multiplexers 127 are commonly selected by the 2-bit JDS field of the micro control word. As indicated by the legends, the corresponding input to each of the multiplexers 127 is provided by the 4 output bits of one of the logic function computers 114. The decision selector 127 thus receives the outputs from the logic function computers LFC0–LFC3, making the selection therebetween on the basis of the value of the JDS field.

The 4-bits from the selected logic function computer are applied as the inputs to a function value selector 128 which is comprised of a 1-of-4 multiplexer, the output thereof providing decision point 0. The selection of the 4 inputs to the multiplexer 128 is provided by dynamic variables $DV_0$ and $DV_4$ from the dynamic variable selectors 113. Thus the output of one of the logic function computers LFC0–LFC3 is selected by the JDS field which logic function computer output is provided in accordance with the selected static variables and the final value of the decision point 0 is then determined by the selected dynamic variables. Thus, the decision and function value selector 115 in response to the JDS field provides the value of decision point 0 that controls the real branching of the CPU 10.

In a similar manner, the values of the remaining decision points DP1–DP11 are determined under control of the micro control word fields indicated by the legends for providing the decisional control capability discussed above with respect to these fields and decision points. Further details of the utilization of these fields and decision points will be provided hereinbelow.

As an example of the operation of the decision logic 40, consider a situation with 2 static variables S and T and 2 dynamic variables D and E. If the desired function is $F=(S \veebar T) \wedge (D \vee E)$ and this function is stored as the third function computed by LFC3, the LFC3 prom would have the following contents:

| Word Address | | | Contents | | | |
|---|---|---|---|---|---|---|
| | | | Bit | Bit | Bit | Bit |
| LFC3 | S | T | 3 | 2 | 1 | 0 |
| 0011, | 0 | 0 | 0 | 0 | 0 | 0 |
| 0011, | 0 | 1 | 0 | 1 | 1 | 1 |
| 0011, | 1 | 0 | 0 | 1 | 1 | 1 |
| 0011, | 1 | 1 | 0 | 0 | 0 | 0 |
| 3rd function | | | $\begin{Bmatrix} D=0 \\ E=0 \end{Bmatrix}$ | $\begin{Bmatrix} D=0 \\ E=1 \end{Bmatrix}$ | $\begin{Bmatrix} D=1 \\ E=0 \end{Bmatrix}$ | $\begin{Bmatrix} D=1 \\ E=1 \end{Bmatrix}$ |

The S and T bits are the low order address bits to the memory. Thus, if S=1 and T=0, the memory output will be 0 1 1 1. The D and E bits then control what value (1 or 0) will be obtained at the decision point. If either D or E is 1, a 1 will be gated to the decision point. If both D and E are 0, then a 0 will be gated to the decision point. There are 16 cells in the table corresponding to the 16 rows in a conventional truth table presentation of 4 inputs variables and the given function. Thus, it is appreciated that while the memory is addressed in accordance with the function and the static variables, the dynamic variables can be computed for the final gating process when the word from the logic function computer prom is available.

It will be appreciated that neither a binary 1 nor a binary 0 is provided as a variable in the CPU 10. However, the logic function computers 114 can be coded to permit "don't care" situations if less than 4 variables are utilized in the computation of a logic function. For example, if it is desired to compute the function $F=S \wedge D$, the prom utilized for providing this function may be configured as follows:

| Word Address | | | Contents | | | |
|---|---|---|---|---|---|---|
| | | | Bit | Bit | Bit | Bit |
| LFC | S | T | 3 | 2 | 1 | 0 |
| 0101, | 0 | 0 | 0 | 0 | 0 | 0 |
| 0101, | 0 | 1 | 0 | 0 | 0 | 0 |
| 0101, | 1 | 0 | 0 | 0 | 1 | 1 |
| 0101, | 1 | 1 | 0 | 0 | 1 | 1 |
| 5th function | | | (D=0, E=0) | (D=0, E=1) | (D=1, E=0) | (D=1, E=1) |

Thus, the function is the 2 input AND with variables T and E being ignored. It will be appreciated that the decision selectors for DP1 and DP2 (the computed vector jump bits) have logic 0 available as an input to avoid utilizing a logic function computer to provide this primitive but commonly used function. The logic 0 is provided on a line 129 (FIG. 8*a*) to the 4th input to each of the decision and function value selectors 116 and 117 which provide DP1 and DP2 respectively.

Although the decision logic 40 was described in terms of first selecting the logic function in accordance with the static variables and then gating the logic function output values by means of the dynamic variables, the decision logic 40 may alternatively be implemented by utilizing both the static and dynamic variables to perform the logic function computer addressing utilizing 1 bit wide proms. The arrangement previously described is, however, preferred because of the speed advantage provided.

MULTI-DIMENSIONAL DECISION AND CONTROL

The CPU 10 under control of the micro instruction format illustrated and described with respect to FIG. 4 has the capability of making three different types of decisions during each micro cycle. The CPU 10 has the capability of performing real branches, phantom branches and conditional deferred action.

In a real branch DPO determined by JDS chooses either NAT or NAF as the address of the next micro instruction to be fetched and executed. If NAF is chosen, that address is utilized without modification as the address to the control store 36 for the next cycle. If NAT is chosen, it may have its two low order bits modified by DP1 and DP2 as selected by VDS0 and VDS1, respectively, for performing vector jumps. Additionally, NAT may be modified with a vector depending upon the contents of the XF field as discussed above with respect to Table 1.

The CPU 10 also has the capability of performing phantom branches where, for the local processors 17, 18, 19 and 27, DP3–DP6 select either the LPFT or the LPFF field associated with the local processor to provide the function bits for controlling the operation thereof. The DP3–DP6 decisions are made under control of the associated PDS fields. The phantom branching capability eliminates the necessity for taking many real branches that would otherwise be required. It is desirable to avoid real branches because of the 3-way micro instruction overlap to be described. The 3-way micro instruction overlap can result in wasted micro cycles when performing real branching because the micro instruction fetch is overlapped with the micro instruction execution. Thus, the executed instruction may compute a condition indicating that a branch should be taken but the next micro instruction has already been fetched and must be executed. The phantom branch capability permits two different paths to be coded into one instruction, thus obviating the need to waste a cycle were a real branch taken. Thus, the phantom branch provides the capability of executing one of two possible functions for each local processor during micro cycle n based on the arithmetic results obtained as late as cycle n−1. Thus, the CPU 10 is provided with the capability of effectively conditionally executing a one micro instruction subroutine without the necessity for real branching with its attendant time loss. It is appreciated that the phantom branch capability contributes significantly to the speed of the CPU 10 since the emulation effected thereby involves a significant amount of decision making.

The CPU 10 also has the capability of performing conditional deferred actions by conditionally controlling the routing of data, computed variables and conditions within the machine as well as to and from the main memory 11. This routine is designated as deferred action since it occurs in the micro cycle following the cycle in which the micro instruction in which it was specified was executed. As previously described, there are local deferred actions associated with the local processors 17, 18, 19 and 27 controlled by the DDS fields. Specifically, local deferred action control includes placing the contents of the accumulator of a selected local processor onto the D bus 23 under control of the OUT field. An additional local deferred action comprises writing the value of the D bus 23 into the local memory of a specific local processor under control of the WLM field. A further local deferred action comprises loading the condition value computed to make the deferred action decision for the specific local processor into one of the seven static variable flip-flops in the control circuits 41. The SCS field specifies the particular static variable to be set as discussed above with respect to FIG. 4.

Certain deferred actions are of a global nature. These actions were discussed above with respect to FIG. 7 and are under control of the DADS field. Thus, the DADS field (deferred action decision selector) selects the action to be taken with arithmetic results. DDS, which is local, selects one of the three processors P1, P2 and P3 to be a source to the D bus 23 and DADS, which is global, selects a destination which may, for example, comprise the various registers illustrated in FIG. 5 and discussed above with respect thereto.

Figure 9:
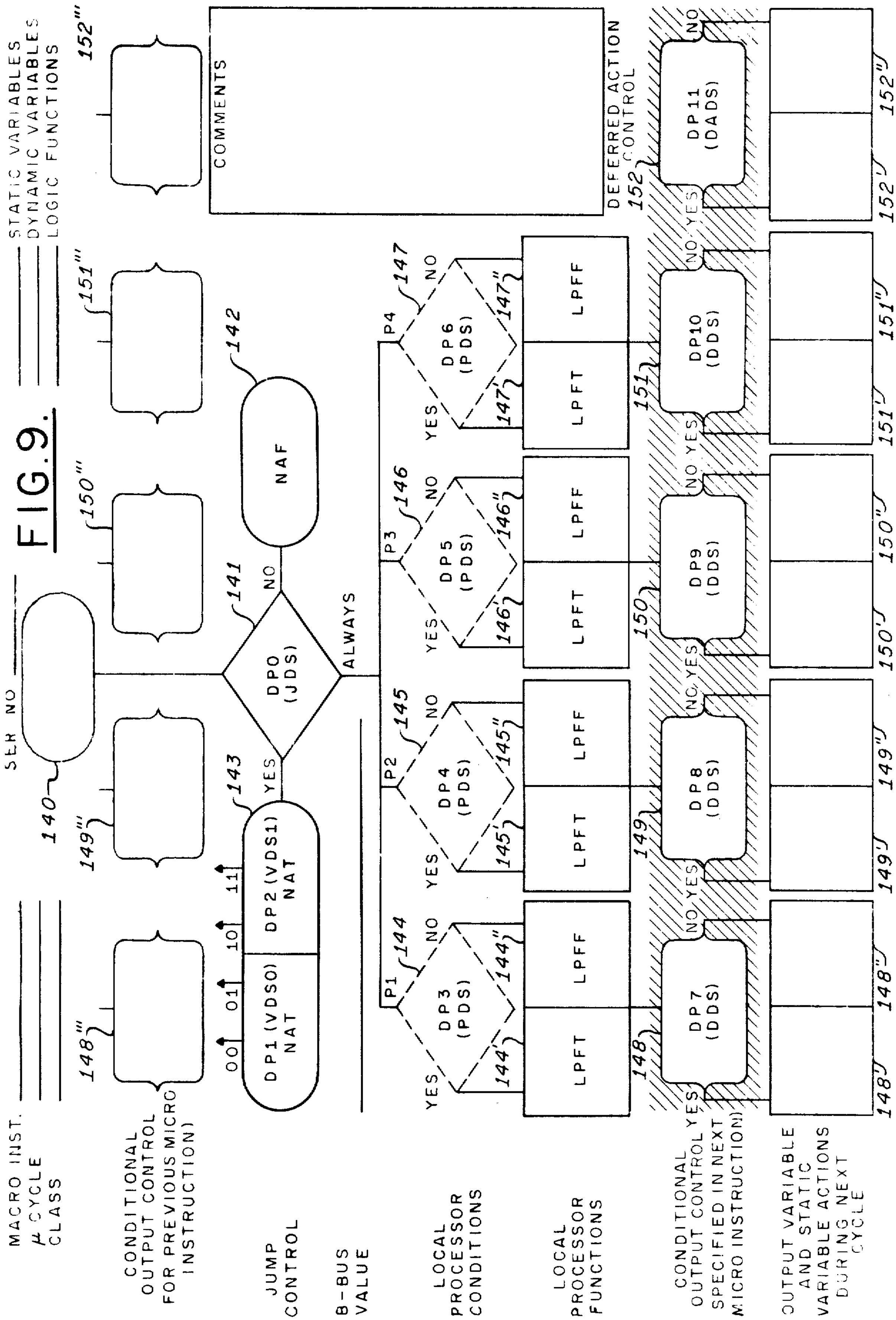
FIG. 9 is a flow chart illustrating the control flow of a micro instruction of the computer of FIG. 5 illustrating the decision points computed by the table driven control logic of the present invention.

Referring now to FIG. 9, a flow chart showing the performance of one micro instruction depicting the various decisions controlled thereby, is illustrated. The flow chart of FIG. 9 represents the micro instruction to be executed during micro cycle n. The micro instruction entry point is illustrated by an oval 140 which leads to a decision diamond 141. The decision diamond 141 represents the binary decision effected by DPO in accordance with the logic function computer selected by the JDS field of the micro instruction. Decision diamond 141 selects the address of the micro instruction to be fetched during cycle n+1. One branch of the DPO decision leads to the NAF address oval 142 whereas the other branch leads to the NAT address oval 143. When the "no" branch from the decision diamond 141 is taken, the address field NAF of the micro instruction is unconditionally selected as the address of the next micro instruction. If the "yes" branch from the diamond 141 is taken, the NAT address field of the micro instruction is selected as the address for the next micro instruction which NAT field may be modified by DP1 and DP2 in accordance with logic functions selected by the VDS0 and VDS1 fields to perform a controllable 4-way branch from the oval 143 as discussed above. The address NAT may also be modified in accordance with the XF field (not shown on FIG. 9) as discussed above with respect to Table 1.

A path from the decision diamond 141 which is "always" taken leads to the phantom branch decision selection diamonds 144–147. These diamonds depict the phantom branch decisions rendered for the local processors P1, P2, P3 and P4 in accordance with the binary decision points DP3-DP6 respectively under control of the logic function computers selected by the respective PDS fields of the micro instruction. The "yes" and "no" branches from each of the diamonds 144–147 lead to two action boxes designated by primed and double primed reference numerals with respect to the reference numeral for the associated decision diamond. The action box led to from the "yes" branch of the phantom branch decision selector designates the LPFT function field of the micro instruction and the action box associated with the "no" branch designates the LPFF function field thereof. Thus, in accordance with the binary decision rendered in the diamonds 144–147, the associated local processor P1-P4 respectively will be controlled to perform the function specified by the selected one of the LPFT or LPFF fields.

The micro instruction flow chart of FIG. 9 also contains a line for displaying the value on the B-bus 22, as indicated by the legend, which value is applied to the B port of the local processors P1, P2 and P3.

The function blocks for each of the local processors P1-P4 lead to conditional deferred action output control braces 148–151 respectively. The decision braces 148–151 control the output and routing of data from the local processors in accordance with binary decisions at decision point DP7-DP10, respectively, under control of the logic function computers selected by the associated DDS fields. The "yes" and "no" branches from each of the decision braces 148–151 lead to two deferred action boxes designated by primed and double primed reference numerals with respect to the reference numeral associated with the decision brace. The decision braces 148–151 and the associated action boxes selectively control the output and routing of data from the local processors and can be utilized to enable the output of the associated local processors P1, P2 or P3 to the D-bus 23 or can cause the local memory associated with the controlled local processor to be written in accordance with the value on the D-bus 23. The decision braces 148–151 and the associated action boxes may also be utilized to set or clear one of the seven hardware flags within the control circuits 41 which flags can be later interrogated to permit decisions to be based on the outcome of the particular DDS decision.

The micro instruction flow chart also includes a decision brace 152 which depicts the binary decision of DP11 in accordance with the logic function computer selected by the DADS field. The decision 152 which provides the global deferred action decision, selects the action to be taken with arithmetic results in accordance with the action boxes 152' and 152'' representing the selection of the addresses DACT and DACF into the deferred action control table discussed above with respect to FIG. 7. Thus, it is appreciated that DDS, which is local, can select one of the three processors P1, P2 and P3 in accordance with the decision braces 148–150 to be a source to the D bus 23 and the DADS field, which is global, selects a destination in accordance with the decision brace 152. The destinations are the various registers illustrated in FIG. 5 and discussed above.

Although the deferred action decision braces 148–152, are shown on the flow chart for the micro instruction executed during micro cycle n, the DDS ad DADS fields are actually controlling the action taken with the results obtained during cycle n−1. For this reason these decision braces are illustrated on a shaded portion of the flow chart. For convenience, decision braces 148'''-152''' are included to repeat the conditional output control decisions from the braces 148–152 from the previous micro cycle.

As described above, the flow chart of FIG. 9 represents the micro instruction to be executed during cycle n. It will be appreciated that at the end of cycle n−1, all of the twelve decision points DPO-DP11 have values established such that the decisions associated therewith may be effected. The decisions associated with DPO-DP6 are effected during micro cycle n and the decisions associated with DP7-DP11 are effected during micro cycle n+1. Thus in the aggregate decisions are being made involving three cycles; n−1, n and n+1. This may be considered as a three dimensional decision capability.

Figure 10:
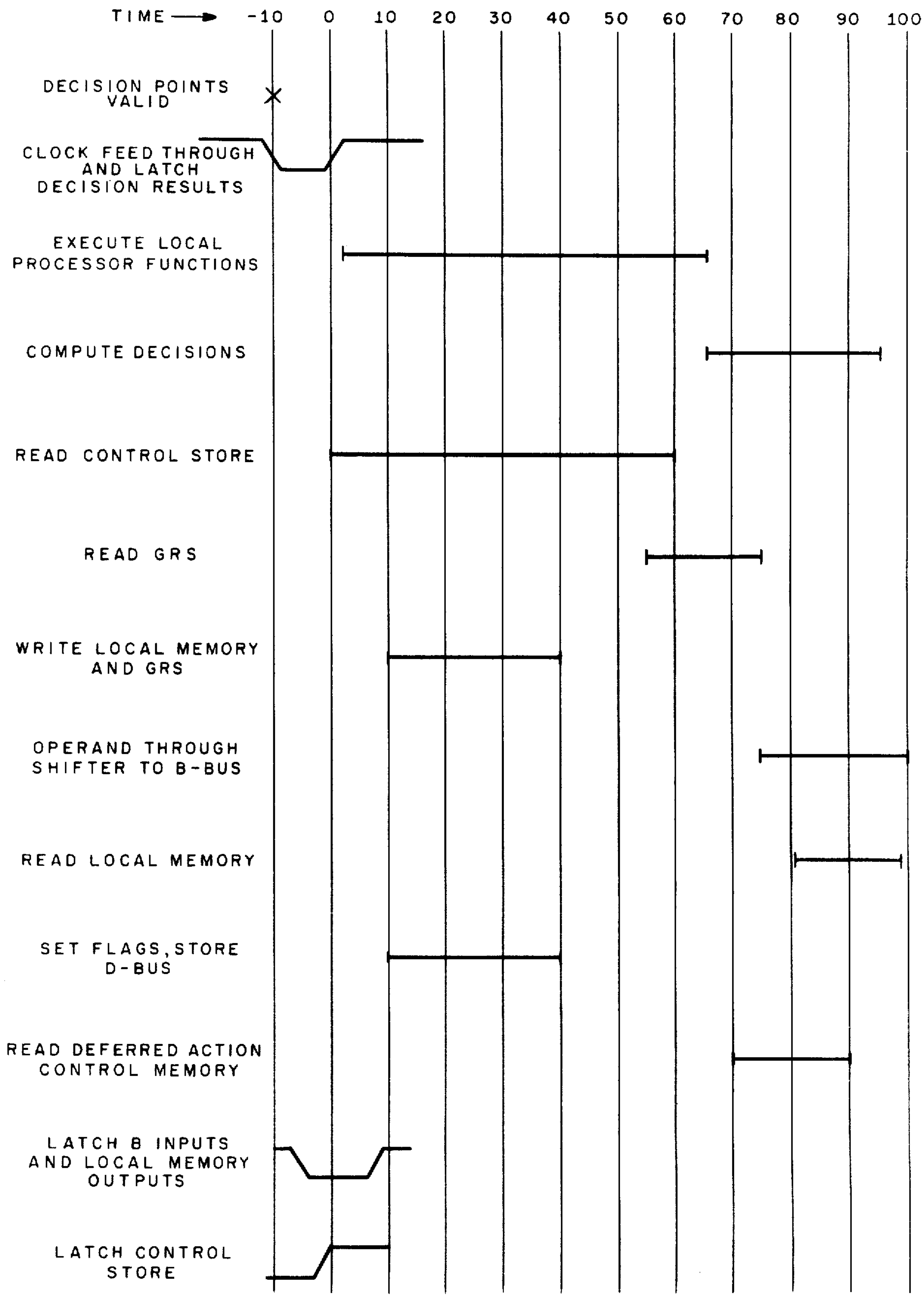
FIG. 10 is a timing diagram illustrating the timing of various activities that occur during a micro cycle of the computer of FIG. 5.

Referring now to FIG. 10, a timing diagram of the concurrent and sequential operations occurring in the CPU 10 during a micro cycle is illustrated. The time intervals indicated by the legends are in nanoseconds and thus it is appreciated that the CPU 10 operates on a 100 nanosecond micro cycle. As indicated by the legends, the decision points DPO-DP11 are valid at the end of the previous micro cycle and are fed through and latched for use in the current micro cycle.

THREE WAY MICRO OVERLAP

In order to significantly increase processor speed the structure of the CPU 10 and the micro repertoire stored in the control store 36 are designed whereby the execution of the micro instructions is overlapped to a depth of three. Primarily, the following three activities occur in a single micro cycle but with respect to three different micro instructions.

1. Perform deferred actions for micro instruction n−1.
2. Execute local processor functions for micro instruction n.
3. Read micro instruction n+1 from the control store 36. Additionally, make decisions for deferred action for micro instruction n.

Figure 11:
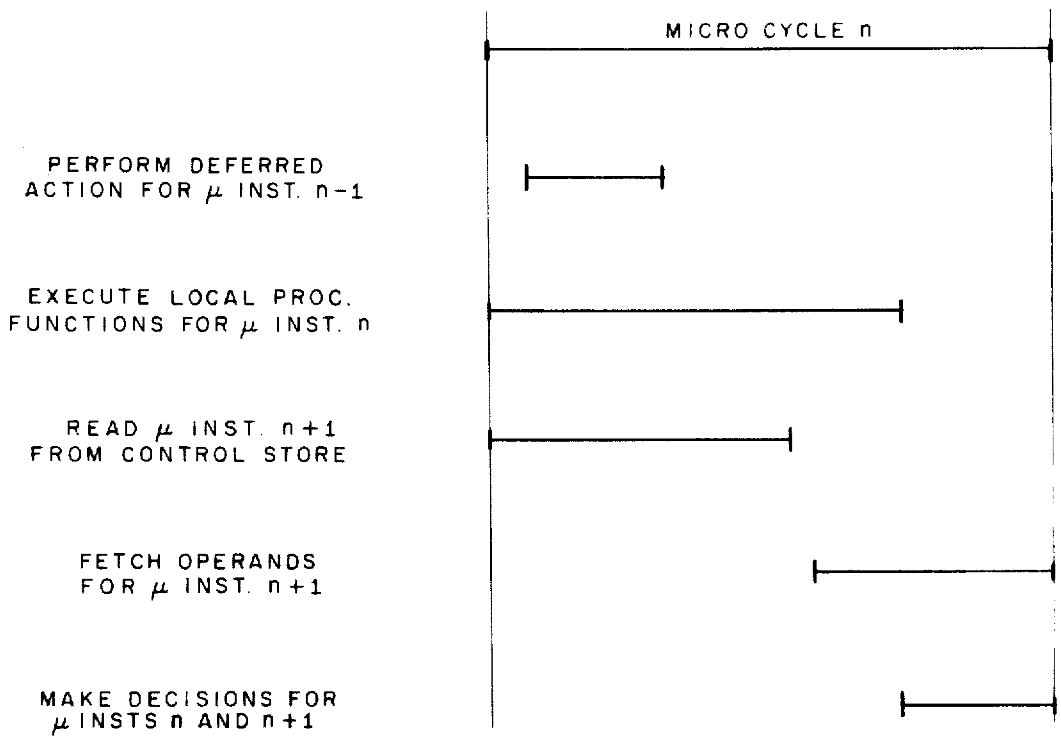
FIG. 11 is a timing diagram illustrating events occurring during a micro cycle of the computer of FIG. 5 in accordance with the three-way micro instruction overlap utilized therein.

The relative timing for these actions during a micro cycle is illustrated in FIG. 11.

Figure 12:
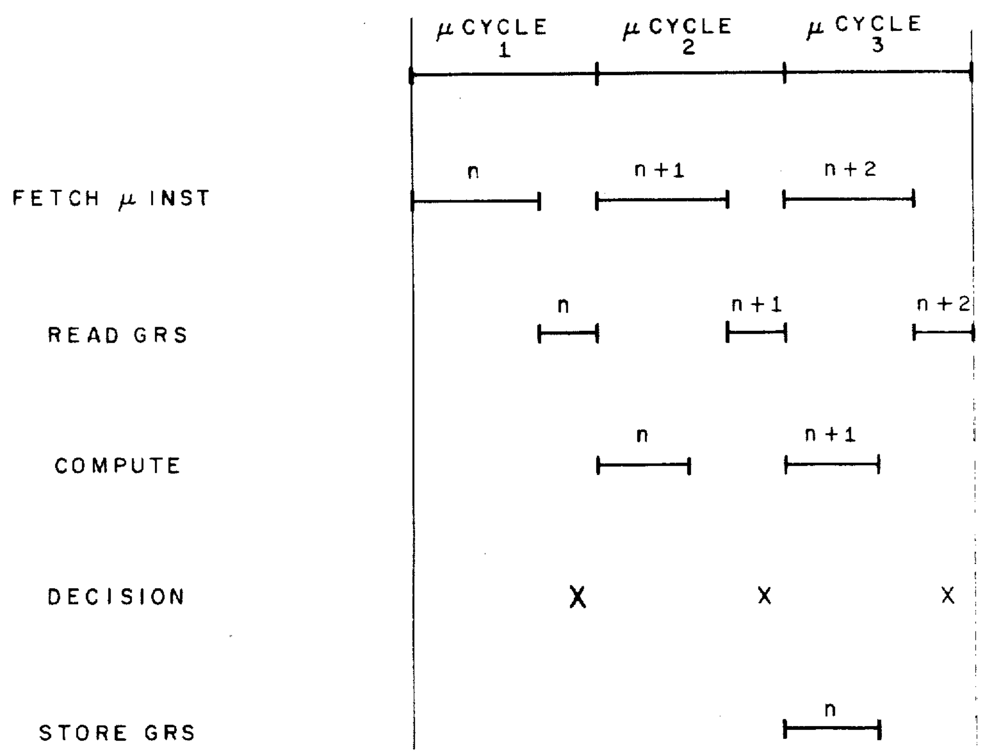
FIG. 12 is a timing diagram illustrating three consecutive micro cycles of the computer of FIG. 5 depicting the three-way micro instruction overlap with respect to the three cycles.

Referring to FIG. 12, three consecutive micro cycles are illustrated depicting the functional overlap of the CPU 10. It will be appreciated that during cycle 3, micro instruction n+2 is being fetched, computation is occurring for micro instruction n+1 and results obtained from the micro instruction n are being stored. Although the macro instructions are not overlapped, there is a pre-fetch of the next macro instruction as described above with respect to the deferred action control table of FIG. 7 where the timing of the FETCH NI bit controls the pre-fetch.

It will be appreciated that the overlapped performance of the CPU 10 is not degraded by wasting cycles when performing conditional jumps of microinstructions because of the real branch conditional fetching of the next micro instruction under control of DP0, DP1, and DP2; the phantom branch conditional selection of the proper function to be performed by the local processors under control of DP3–DP6 and the deferred action conditional storage of values computed during the previous micro cycle under control of DP7–DP11. Thus, the overlapped execution is effected with a minimal time penalty due to conditional jumps and branches. Each micro instruction contains the real branch address information NAF and NAT, the phantom branch function choices LPFT and LPFF as well as the deferred action fields previously discussed and therefore, the CPU 10 continuously performs real, phantom and deferred action conditional branches in the unbroken rhythm illustrated in FIG. 12, thus alleviating the possibility of wasted cycles.

Therefore, it is appreciated that the phantom branch may be utilized to obviate the necessity for real jumps to perform the associated functions and additionally preserves cycles. The conditional deferred action also prevents wasted cycles when performing real jumps since it permits a jump to be taken to any micro instruction without requiring a wasted cycle waiting for computed variables to be stored away. All decisions leading to action in micro cycle n are made at the end of micro cycle n−1, based on information in the micro instruction read from the control store 36 during micro cycle n−2. The deferred action to be performed during micro cycle n is specified in the micro instruction read from control store 36 during micro cycle n−2 and evaluated during micro cycle n−1. The relevant control store fields DACT, DACF, OUT, WLM and SCS are saved during cycle n−1 for use during cycle n in a manner to be described.

Figure 13:
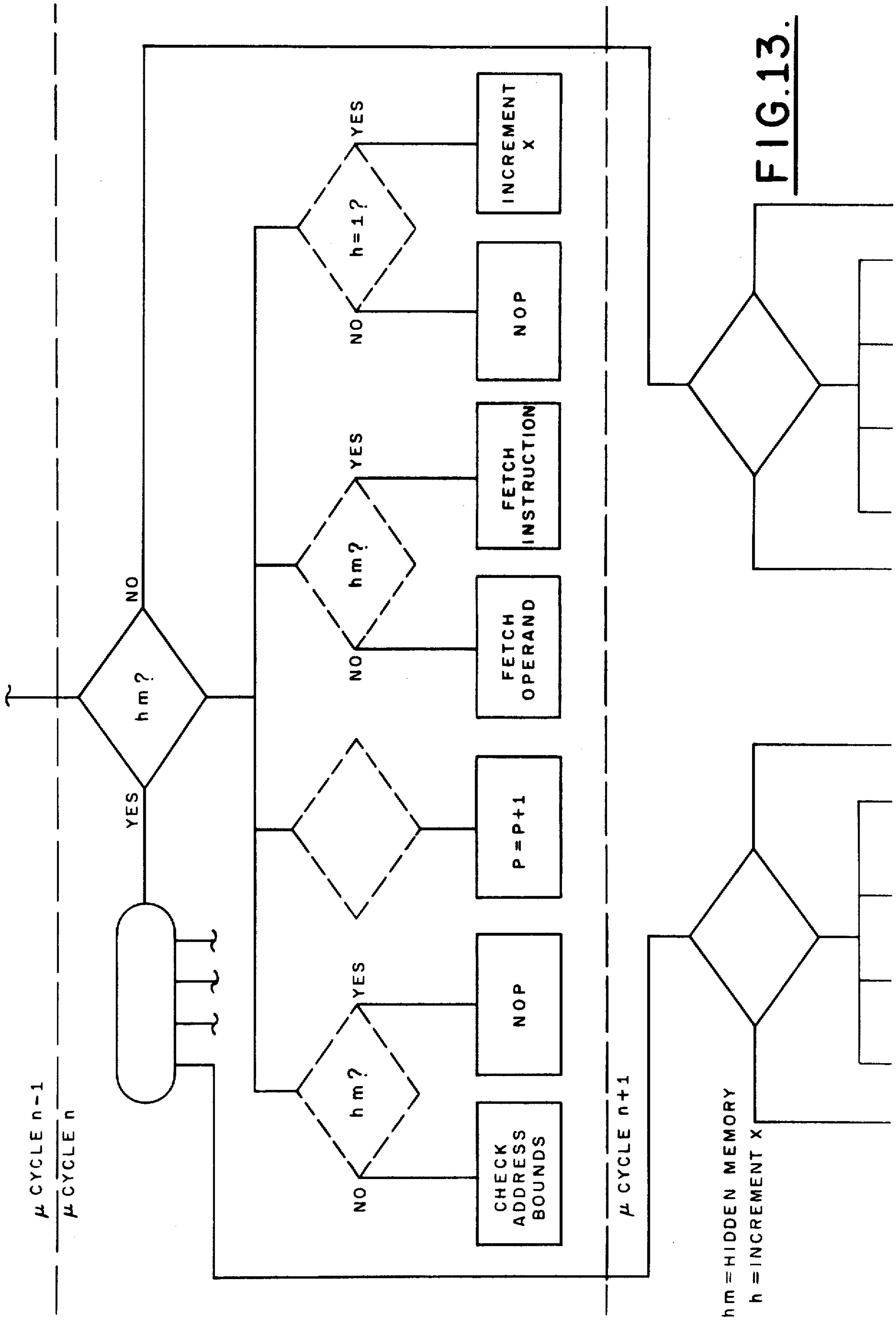
FIG. 13 is an exemplary flow diagram illustrating three consecutive micro cycles of the computer of FIG. 5 particularly with respect to real and phantom branching.

Referring now to FIG. 13, an example of the real and phantom branching capability of the CPU 10 is illustrated. The real branch is depicted as a solid diamond with four phantom branches as dashed diamonds. The phantom branch is implemented by providing the LPFT and LPFF pair of ALU function bit sets in the control store 36 for each local processor and selecting the proper function bits at the end of cycle n−1.

Figure 14:
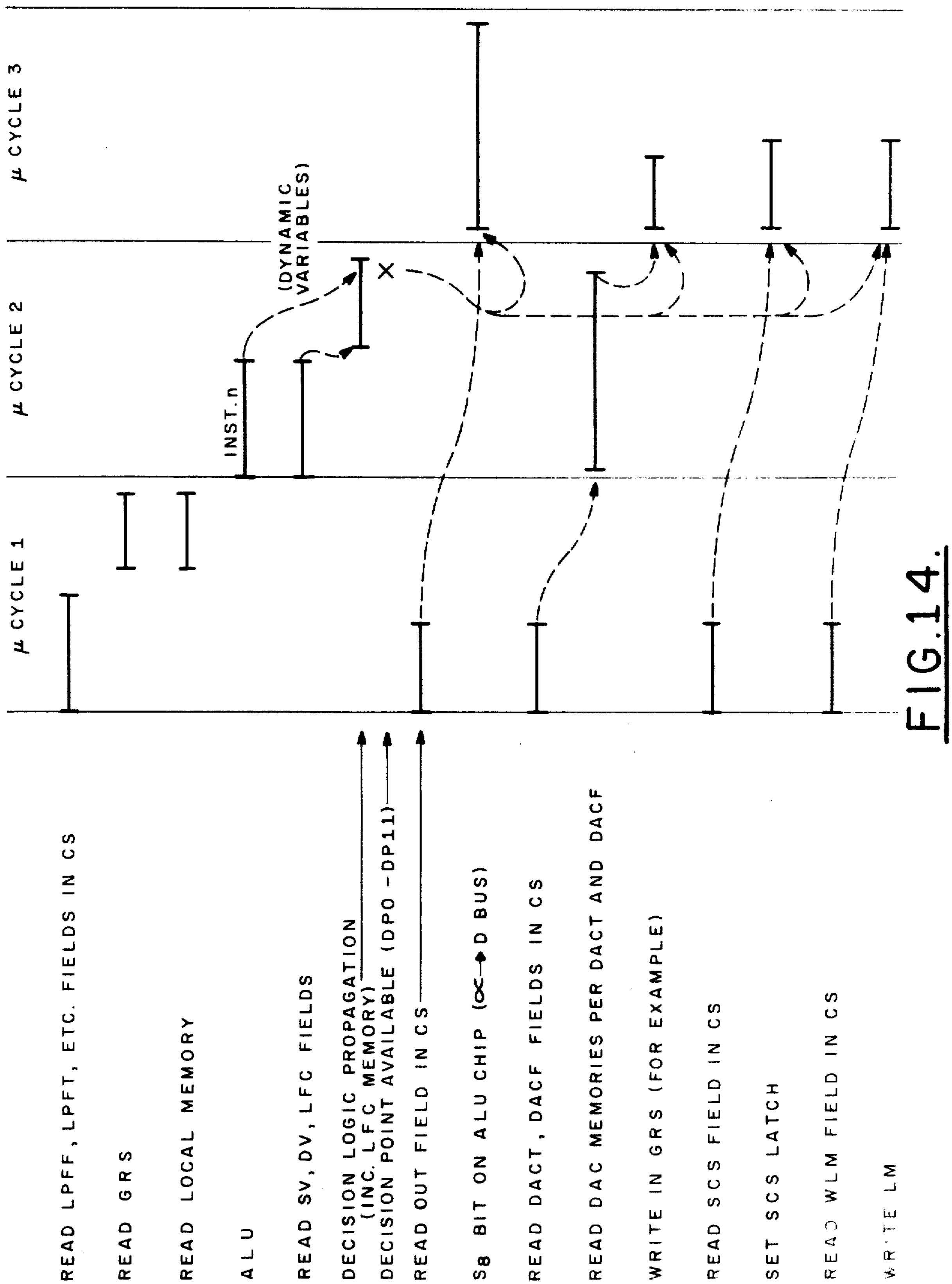
FIG. 14 is a timing diagram illustrating detailed activities occurring during three consecutive micro cycles of the computer of FIG. 5, particularly with respect to the three-way micro instruction overlap.

Referring now to FIG. 14, further timing details of the effect of the three way overlap are illustrated. The major actions preformed by the CPU 10 in executing a micro instruction n are traced over the three micro cycles of the figure. It is appreciated that during the first half of micro cycle 3, three micro operations are being concurrently executed: micro instruction n+1 is being fetched from control store 36, computations are being performed on behalf of micro instruction n and deferred action such as storage into GRS and LM are being performed on behalf of micro instruction n−1. This concurrent execution basically depicts the three way micro overlap.

It will be appreciated that SV, DV and LFC micro instruction fields are displaced by one micro instruction. Although these fields control the result store for micro instruction n, the bits themselves are contained in the micro instruction control store word associated with micro instruction n+1. As previously discussed, this is the reason the DDS and DADS fields are shaded on the micro instruction flow chart of FIG. 9. The SV, DV and LFC fields select the static variables, the dynamic variables and the logic function computers respectively that are utilized to determine the binary values of each of the decision points DP0–DP11. The static variables are selected and the logic function computer memories are read before the dynamic variables are available. As discussed above, this different handling of the static and dynamic variables minimizes the effect of decision logic propagation time on cycle time. At approximately $t_{95}$ all of the decision points DP0–DP11 have attained their correct value and the following selections occur. The particular decision point shown at the end of micro cycle 2 in FIG. 14 determines:

| Decision Point Logic Signal | μINST. Field | μINST. | SELECT |
|---|---|---|---|
| DP0 | JDS | n + 2 | CS address |
| DP1 | VDSO | n + 2 | CS address, bit $2^0$ |
| DP2 | VDS1 | n + 2 | CS address, bit $2^1$ |
| DP3–DP6 | PDS | n + 1 | Function bits to ALU slice (LPFT vs. LPFF) |
| DP7–DP10 | DDS | n | { α→D-BUS<br>Write LM<br>SCS latch bit |
| DP11 | DADS | n | DACT vs. DACF as appropriate DAC memory address |

It will be appreciated from the foregoing that FIG. 5 depicts a specifically structured machine having a micro instruction control word specifically formatted as discussed above with respect to FIG. 4. The specific fields of the micro instruction control word are connected from the control register 37 to the various components of the CPU 10 as described herein. The CPU 10 comprises an emulator that operates in response to the control register 37 whereby the local processors 17, 18, 19 and 27 operate concurrently in response to the specific fields with the three way overlapped operation as discussed above. The detailed operations discussed, such as real branching, phantom branching, deferred conditional control, macro instruction fetching and the like are also controlled by the control fields emanating from the control register 37.

The specific micro code loaded into the control store 36 will cause specific actions to occur such as those discussed, thereby emulating the specifically desired macro instructions in accordance with the micro routines loaded into the control store 36.

As discussed above with respect to FIG. 3, the micro software is structured whereby, from a common micro instruction a jump may be effected to a selected one of the class base micro routines and from the selected class base micro routine a jump is taken to the micro routine for the specific macro instruction. Thus, this structure provides a high degree of sharing of the micro code amongst the classes. As discussed above with respect to Table 11, the specific class bases implemented are common, fetch single operand direct, fetch single operand immediate, jump greater and decrement, unconditional branch, store, skip and conditional branch, and shift. These class bases are designated respectively as CB0, CB3, CB4, CB5, CB6, CB7, CB11, and CB12 with the associated binary designations as delineated in Table 11.

The class base "common" (CB0) is not properly a macro instruction class base but is controlled along with the other class bases by the IST 38. Specific micro routines are provided for performing the following macro instructions which micro routines are entered from the class base micro routines as follows:

TABLE 13

| MACRO INSTRUCTION | CLASS BASE |
|---|---|
| ADD TO A DIRECT (AA) | FETCH SINGLE OPERAND DIRECT (CB3) |
| ADD TO A INDIRECT (AA) | FETCH SINGLE OPERAND INDIRECT (CB3i) |
| ADD TO A IMMEDIATE (AA) | FETCH SINGLE OPERAND IMMEDIATE (CB4) |
| JUMP GREATER AND DECREMENT (JGD) | JUMP GREATER AND DRCREMENT (CB5) |
| STORE LOCATION AND JUMP (SLJ) | UNCONDITIONAL BRANCH (CB6) |
| STORE (SA) | STORE (CB7) |
| TEST NOT EQUAL (TNE) | SKIP AND CONDITIONAL BRANCH (CB11) |
| SINGLE SHIFT ALGEBRAIC (SSA) | SHIFT (CB12) |

Figure 15:
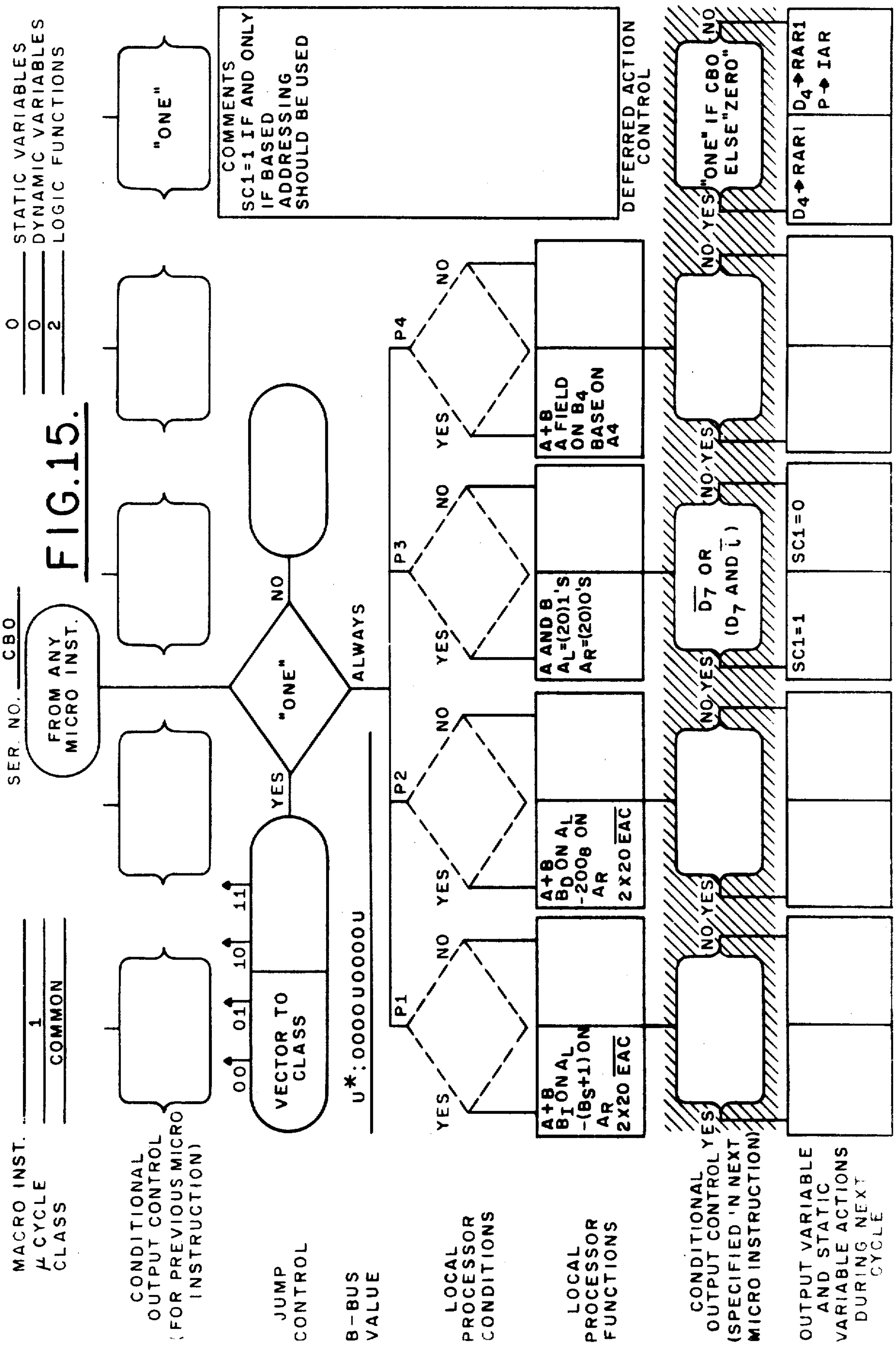
FIG. 15 is a flow diagram depicting the "COMMON" micro instruction.

Referring now to FIG. 15, the micro instruction flow chart for the "common" micro instruction is illustrated. This micro instruction is jumped to and performed as the first micro instruction in the micro routine for every macro instruction emulated by the CPU 10. As indicated by the legend the common micro instruction is associated with micro cycle 1 of the emulation routine for the particular macro instruction involved. Because of the micro instruction overlap, however, all of the operations depicted in FIG. 15 are not actually performed in the first micro cycle. The timing for the performance of the various operations were discussed above with respect to the micro instruction overlap depicted and explained with respect to FIGS. 9–14.

In particular, assume that the "common" microinstruction shown in FIG. 15 is read from the control store during micro-cycle 1 as defined in FIG. 12. The "common" microinstruction is uniquely identified with the name CB0 as shown in the space marked Serial Number (SER. NO.) of FIG. 15. Towards the end of cycle 1 in FIG. 12 the value to be placed on the B-bus as one of the inputs to P1, P2 and P3 is fetched. This fetching occurs during the time designated as READ GRS in FIG. 12, although in the case of microinstruction CB0 the B-bus values are not fetched from GRS, but from the macroinstruction register (MIR). The particular B-bus value to be supplied is called u*, and it consists of the value u from the u field of the macroinstruction, as indicated in FIG. 1, with four zero's concatenated on the left (creating a 20-bit value) placed onto both the left and right halves of the B-bus as shown in the entry called B-bus value of FIG. 15. Selection of the B-bus value as discussed above is controlled by the BR, SFT, and BIS fields of the microinstruction. To select u* the SFT value should be 11 and the BIS value should be 00, as indicated above in Table 2. The BR bit should be set to 0 indicating that the BIS field is to be used rather than the register BRG.

The value to be placed on the B4-bus during cycle 2 as the B input to P4 is also fetched during this "READ GRS" portion of cylce 1. In this case the A-field from the MIR is to be placed on the B4-bus as indicated in the left of the two local processor function boxes for P4. Selection of this B4-bus value is controlled by the BBS field of the local control fields for P4, along with the GB field from the IST table as shown in Table 9 and discussed previously.

The operands to be provided to each local processor on the A input ports are fetched from the local memories associated with these local processors (P1, P2, P3 and P4). The particular value to be fetched is indicated in one of the local processor function boxes for each local processor as shown in FIG. 15. Selection of this value is unconditionally determined by the values placed in the LMAS and LMA local control microinstruction fields associated with each local processor as discussed previously with reference to Table 5. Thus, the selection of the operands as inputs to each local processor is invariant once the microinstruction is encoded, but the function performed on those operands is conditionally selected on the basis of the dynamic state of certain variables when the instruction is executed, as previously discussed and designated as the "phantom branch" capability. The value read from the local memory of P1 on behalf of microinstruction CB0 is a 40 bit value composed of two constants whose meaning is defined by the Sperry Univac 1108 addressing definition. These constants are $B_I$, the main memory Instruction Bank Base Address, and $-(B_s+1)$, the negative of the main memory Bank Select constant plus one. These constants are preloaded into the local memory of P1 such that $B_I$ is appropriately positioned in the left 20 bits of a certain word, and $-(B_s+1)$ is appropriately positioned in the right 20 bits of that same word. Thus, reading this word from the local memory of P1 will place the value $B_I$ on the left half of the A input ($A_L$), and the value $-(B_s+1)$ on the right half ($A_R$), as indicated in the local processor function box for P1.

In a similar manner the input value for local processor P2 is provided from the local memory of P2 such that the main memory Data Bank Base Address is on the left half of the A input, and the constant $-200_8$ is on the right half. The A input for P3 will have the left half set to the all one's value ($A_L$=(20) 1's) and the right half set to all zeros. The A input value provided to P4 from its local memory is the GRS address base determined by the GB field of the IST table as controlled by the LMAS bit for P4 described in Table 6 above.

As shown in FIG. 12, decisions based on static and dynamic variables are made at the end of every microcycle. The decisions made at the end of cycle 1 of FIG. 12 on behalf of microinstruction CB0 of FIG. 15 will only (in this case) effect the next microinstruction to be fetched and executed. The "JUMP CONTROL" portion of FIG. 15 describes how the next microinstruction is to be determined. The real branch control diamond (denoted 141 in FIG. 9) is related to the JDS field of the global control portion of microinstruction CB0. The constant "ONE" is shown in this diamond in FIG. 15 to indicate that a YES should unconditionally be supplied at the output of decision point DP0 as controlled by the selection of the proper logic function computer to supply this value as determined by the JDS field. At least one of the logic function computers accessible to DP0 contains the truth table consisting of all ones to implement this unconditional forcing of DP0 to the logical "ONE" state.

A DP0 value of "ONE" causes selection of the NAT field of the microinstruction to be used to supply (at least part of) the address for the next microinstruction. The ovals on either side of the jump control diamond are used to indicate the possible next microinstructions, with the NAT address associated with the YES oval, and the NAF address associated with the NO oval. In the specific example of microinstruction CB0 of FIG. 15, the YES oval will always be selected, and the phrase "VECTOR TO CLASS" shown in the YES oval means that the XF field described earlier with respect to Table 1 has the value 01 causing the NAT field to be or'ed with the class base vector, thus implementing a vector jump to the class base as determined by the macroinstruction op-code (f—field of FIG. 1) located in the MIR. The values of DP1 and DP2 (controlled by microinstruction fields VDS0 and VDS1 respectively) are selected to be logical zeros so as not to interfere with the class base being or'ed with the NAT field. It should be understood that the low order four bits of the NAT field are logical zeros when a class base (or instruction) vector jump is to take place so that the vector effectively implements a 1 of 16 way jump.

Other decisions which would normally be made during cycle 1 of FIG. 12 on behalf of microinstruction CB0 are the selection of the functions to be performed by the local processors as controlled by selection of the LPFT or LPFF field for each of the local processors. In the case of microinstruction CB0, the lack of any information in the local processor condition diamonds of FIG. 15 indicates that the processor function to be executed is unconditionally that function specified in the local processor function box below the diamond. By convention this function is written in the box labeled YES, although it could also unambigiously be written in the box marked NO, or in both boxes.

There are two ways in which the microinstruction fields can be coded to implement this unconditional local processor function selection. The first, and most straightforward is to code both the LPFT and LPFF fields of the local processor with the same function code. Then the code in the phantom-decision selector (PDS) field associated with each local processor condition diamond is a don't care. The second approach is to select a logical-function computer, by properly coding the PDS fields, which will compute a logic function (selected by properly specifying the LFC field for the logic function computer) whose value is known (truth table is all ones or all zeros), placing the code of the function to be executed by the local processor in the function field (TRUE or FALSE) associated with the known logical function value (TRUE or FALSE), and allowing the other local processor function field to be a don't care. For example, if "ONES" are placed in the local processor condition diamonds, the functions specified in the local processor "YES" boxes are performed.

The major activity occurring during cycle 2 of FIG. 12 on behalf of CB0 is the computation of functions by the local processors. As shown in FIG. 15, local processor P1 computes the function A+B, where A refers to the value on the A input port, B refers to the value on the B input port (B-bus) and "+" is the binary addition operation. Each local processor P1,P2 and P3, as previously discussed with respect to Table 7, can be controlled to operate in four modes with respect to shifts and carries. Local processor P1, as indicated in FIG. 15, is to be operated in the two-by-twenty mode with no end-around carry ($2\times20$ $\overline{eac}$) as controlled by the CC field associated with P1 in microinstruction CB0. The two-by-twenty mode means that the carry-out from bit position 19 to bit position 20 is inhibited, allowing the local processor to perform arithmetic functions on its operands as though it were two processors, each twenty bits wide, rather than a single 36 bit processor. The no-end around carry option in the $2\times20$ mode means that carries from bit position 19 to bit position 0 (end-around carry of the right half of P1) and from bit position 39 to bit position 20 (end-around carry of left half of P1) are inhibited. The ability to inhibit these end-around carries is required to conform to certain operand address calculation anomolies which occur in the definition of Sperry Univac 1108 addressing algorithms.

Local processor P2 is also performing the binary addition of its A-input and B-input operands in the two-by-twenty mode with no end-around carries. Local processor P3 is performing the logical AND operation of its A and B operands. By convention, the processor is to operate in the 36 bit mode, since no configuration indication is given for it in FIG. 15. Note that for logical operations the 36 bit mode and the $2\times20$ bit mode will produce identical results. Local processor P4 is performing the binary addition operation. This local processor has no configuration control associated with it. Thus, end-around carries can never be inhibited, and computations cannot be split into two halves as in P1, P2 and P3.

Towards the end of the microcycle, values computed by the local processors are latched into accumulator 105 (FIG. 6) associated with each local processor. At the end of cycle 2 of FIG. 12 executed on behalf of microinstruction CB0 of FIG. 15 the various accumulators will contain the following values:

| | | |
|---|---|---|
| left half of | P1 | $u + B_I$ |
| right half of | P1 | $u - (B_s + 1)$ |
| left half of | P2 | $u + B_D$ |
| right half of | P2 | $u - 200_8$ |
| left half of | P3 | u |
| right half of | P3 | zeros |
| | P4 | $A_u$ (address of operand in general register stack) |

The decisions made at the end of cycle 2 on behalf of microinstruction CB0 are with respect to conditional output control and deferred action control. The specification of the decisions to be made (via microinstruction fields) is not contained in microinstruction CB0, but in the microinstruction fetched during cycle 2. The shading of these decision brackets in FIG. 15 is utilized to indicate this provision. Alternatively, the conditional output and deferred action decision information could have been provided in the same microinstruction as the other information (real branch, local processor functions, etc.) discussed above with equivalent results from the point of view of macroinstruction emulation.

The only conditional output decision to be made for microinstruction CB0, as shown in FIG. 15, is associated with local processor P3. The decision is to be based on the logical function $\overline{D7}$ OR (D7 AND $\overline{i}$), where D7 and i are static variables defined in Table 4. To cause this particular logic function to be computed, the logic function truth table for the function is selected in a particular logic function computer by one of the LFC fields in the global control portion of the microinstruction, the two static variables are selected with two SV fields in global control which are wired to drive the logic function computer containing the truth table (as can be determined from FIG. 8), and the output of this logic function computer is connected to Decision point 9 (associated with P3) by correctly setting the DDS field associated with P3 with the binary representation of the number of the logic function computer selected. For those local processors not requiring any conditional output decisions the specification of the DDS field is a don't care.

The deferred action control decision specified in FIG. 15 is really unconditional. To understand the notation it should be remembered that microinstruction CBO will loop on itself until the next macroinstruction to be executed has been fetched and staticized. Thus, the microinstruction being fetched during cycle 2 of FIG. 12 may be CBO itself. The specification of the deferred action control decision (DADS) of FIG. 15 may therefore come from either CBO, or the first microinstruction of any of the class bases. If CBO is indeed looping on itself the actions performed by CBO should not alter the contents of any macro state registers. The unshaded conditional output control brackets at the top of FIG. 15 indicate the decision function actually specified in microinstruction CBO. In the case of deferred action control the value supplied to Decision Point 11 should unconditionally be "ONE" (specified in the same manner as for jump control in CBO). If CBO is looping on itself, the deferred action associated with the YES selection of DP 11 (DACT) will be performed. Otherwise (CBO vector branches to some other class base) the deferred action associated with the NO selection of DP 11 (DACF) will be performed. Note that all of the microinstructions to which CBO can branch (except itself) must have the specification "ZERO" in the unshaded conditional output control bracket associated with DP 11. Also note that in the specific case of CBO the specifications of the unshaded conditional output control brackets associated with DP 7, DP 8, DP 9, and DP 10 are don't cares.

The actual deferred actions which may be performed by microinstruction CBO are shown in the bottom row of FIG. 15. These actions are controlled by fields specified in microinstruction CBO which are latched at the end of cycle 1 of FIG. 12 and carried over into cycle 3 where the particular actions selected at the end of cycle 2 are performed. No output control actions are to be performed for local processors P1, P2 and P4. Thus the OUT microinstruction fields associated with these local processors should have the value 00 (Table 8), the WLM fields should also have the value 00 (Table 10), and the SCS field should have the value 000 (can be considered a null static variable). The OUT and WLM fields associated with P3 will also have 00 values, while the SCS field should be specified as 001 to cause static variable SC1 to be altered in accordance with Decision Point 9.

The DACT field is specified to cause the action $D_4$→RAR1 so it must have the value 00111 (FIG. 7), while the DACF/field must have the value 00001 to specify the action P→IAR and $D_4$→RAR1. The action $D_4$→RAR1 causes the output of P4 (address of operand in GRS) to be loaded into the GRS address register called RAR1, while the action P→IAR causes the current value of the program counter register (P) to be loaded into the instruction address register in preparation for fetching the next instruction.

As shown in the "COMMENTS" portion of FIG. 15, setting static variable SC1 to the value 1 will occur if and only if "based addressing" should be used by the macroinstruction currently being emulated. Based addressing is defined for the Sperry Univac 1108 computer in published Sperry Univac literature.

The common micro instruction of FIG. 15 is stored at a predetermined location in control store 36 and, as explained above with respect to FIG. 3, when the last micro instruction of a routine has been executed, control returns to this common location. When control returns to common the next macro instruction will probably have been fetched and control signals are provided from the staticizer register 56 to the IST Table 38 and to the control store multiplexer 39 so that the XF field of the common micro instruction set to 01, and DPO set to 1, (Table 1) the class base vector from the IST 38 is or'ed with the NAT field of the common micro instruction to effect a vector jump to the first micro instruction of the associated class base micro routine.

Referring now to FIGS. **16*a–c*, the micro instructions comprising the fetch single operand direct (CB3) class base are depicted. The jump control of the common micro instruction (FIG. 15) causes a jump to the micro instruction of FIG. 16*a* whenever the macro instruction fetched into the macro instruction register 13 is of this class base. The jump control for the micro instruction of FIG. 16*a* effects a jump to the micro instruction of FIG. 16*b* which jump control, in turn, effects the jump to the micro instruction of FIG. 16*c* which is the last micro instruction of this class base micro routine. It will be appreciated that the real branch of the micro instruction of FIG. 16*a* controls a conditional jump to the breakpoint routine in response to console maintenance switches (not shown) in a conventional and well known manner. When break point is not called for, the next micro instruction (FIG. 16*b***) in the micro routine is fetched.

The major functions being computed by micro instruction CB3+0 shown in FIG. **16*a*** are related to calculating the address of the operand to be fetched from main memory on behalf of macro instructions of the single operand fetch class. The B-bus contains a value called $X_m$* (fetched from GRS using the X-field from the macro instructions as an address and the GRS* B-bus input selection) which consists of the 18-bit $X_m$ field in the index register placed on both halves of the B-bus with two 1's appended on the left of each $X_m$ value to facilitate end around carries in the 20-bit local processor halves. This value $X_m$* is added to the existing contents of the local processor accumulators (computed by micro instruction CBO discussed above with respect to FIG. 15) in P1, P2, and P3. This computation will produce three possible operand addresses in the left halves of P1, P2, and P3, and establish dynamic variable values SP1R (sign of P1 right half) and SP2R (sign of P2 right half) from which a decision can be made as to which of these three main memory addresses should be used. The left half of P1 contains the instruction bank address (called SI in Sperry Univac literature), the left half of P2 contains the data bank address (SD), and the left half of P3 contains the nonbased address ($u+X_m$) used if absolute (non-based) addressing is indicated by the macro instruction, or if hidden memory is to be used (indicated by SP2R). The conditional output control decisions for CB3+0 effectively select the proper operand address to be used by gating the accumulator of only the local processor whose accumulator contains this address onto the D-bus, where deferred action control gates this address to the proper address register depending upon whether the fetch is to be from main memory or hidden memory.

Microinstruction CB3+1 of FIG. 16*b* is, in P1 and P2, concerned with the first step of checking the operand address into main memory produced by CB3+0 (and still residing in the accumulators of P1 and P2) against the lower limits defined for it by the system ($LL_I$ or $LL_D$). Local processor P3 is incrementing the index value ($X_M$) with the increment ($X_I$) from the B-bus if incrementation is specified in the macro instruction (h bit set to "ONE"). Thus, the local processor decision for local processor P3 in CB3+1 is implementing a "phantom branch."

Micro instruction CB3+2 is finishing the memory operand address limits check procedure in P1 and P2, while P3 is loading the GRS operand (from address $A_a$) into its accumulator for later combination with the operand being fetched from main memory.

Figure 16C:
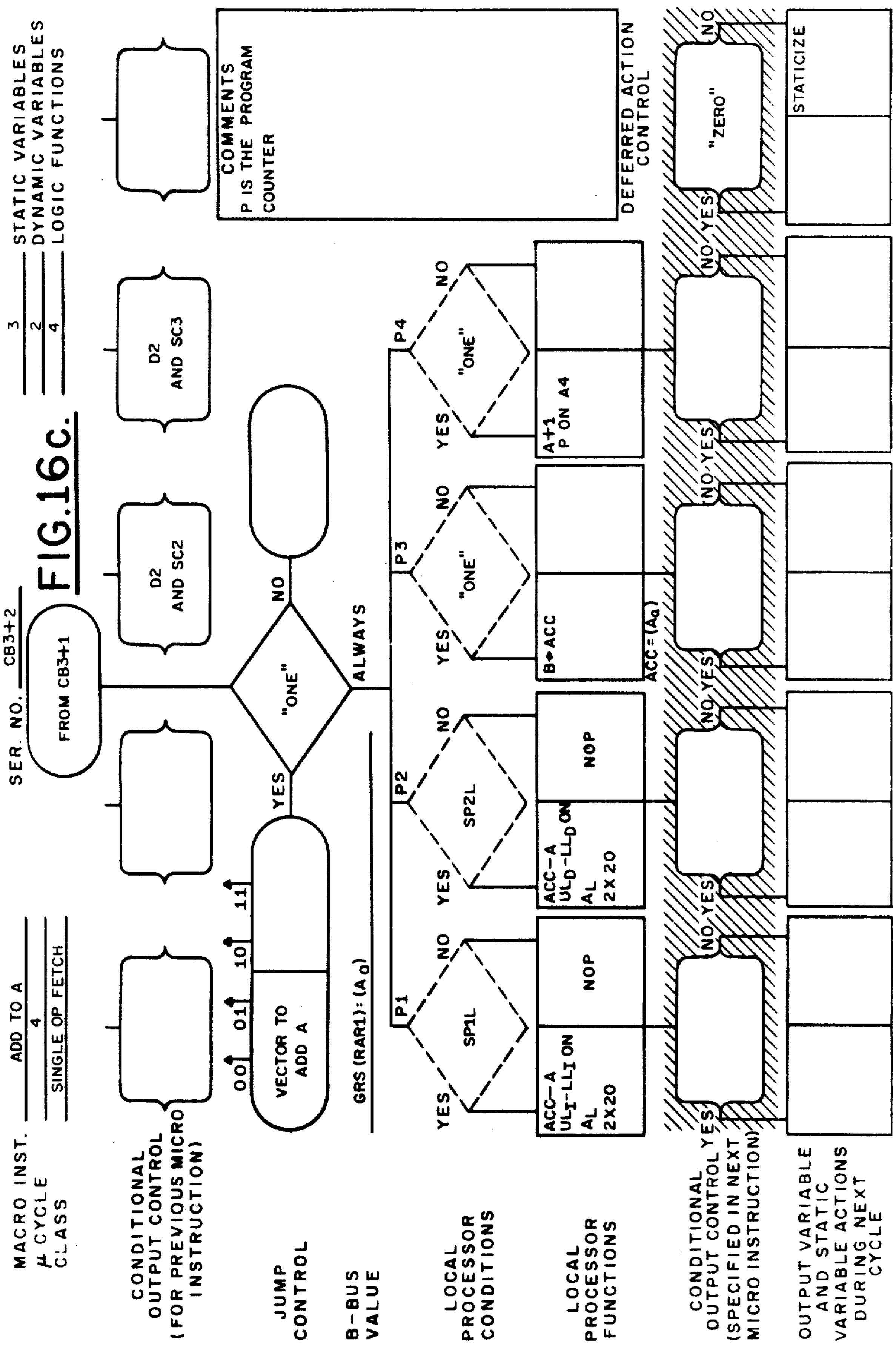
Figure 18A:
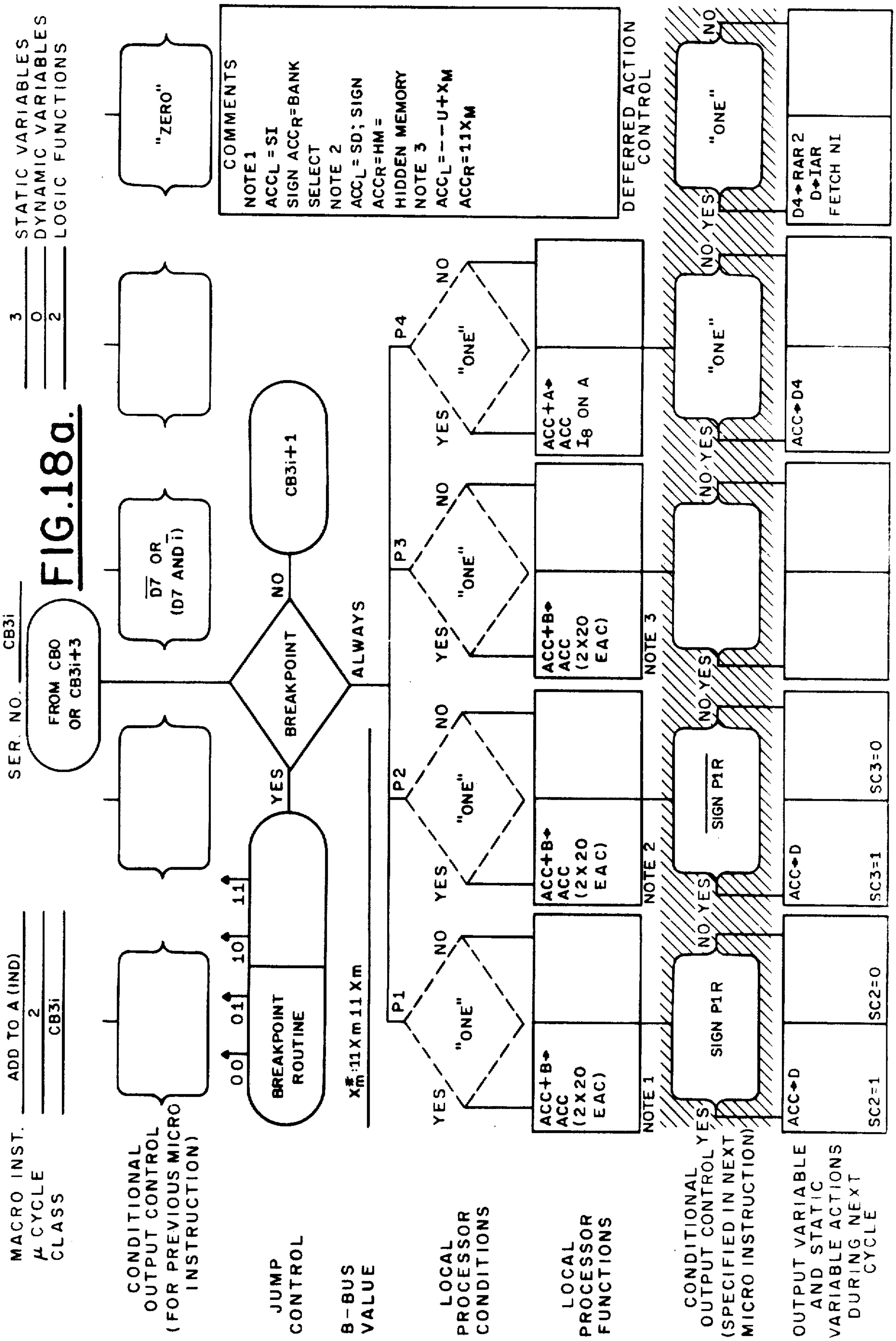
Figure 18B:
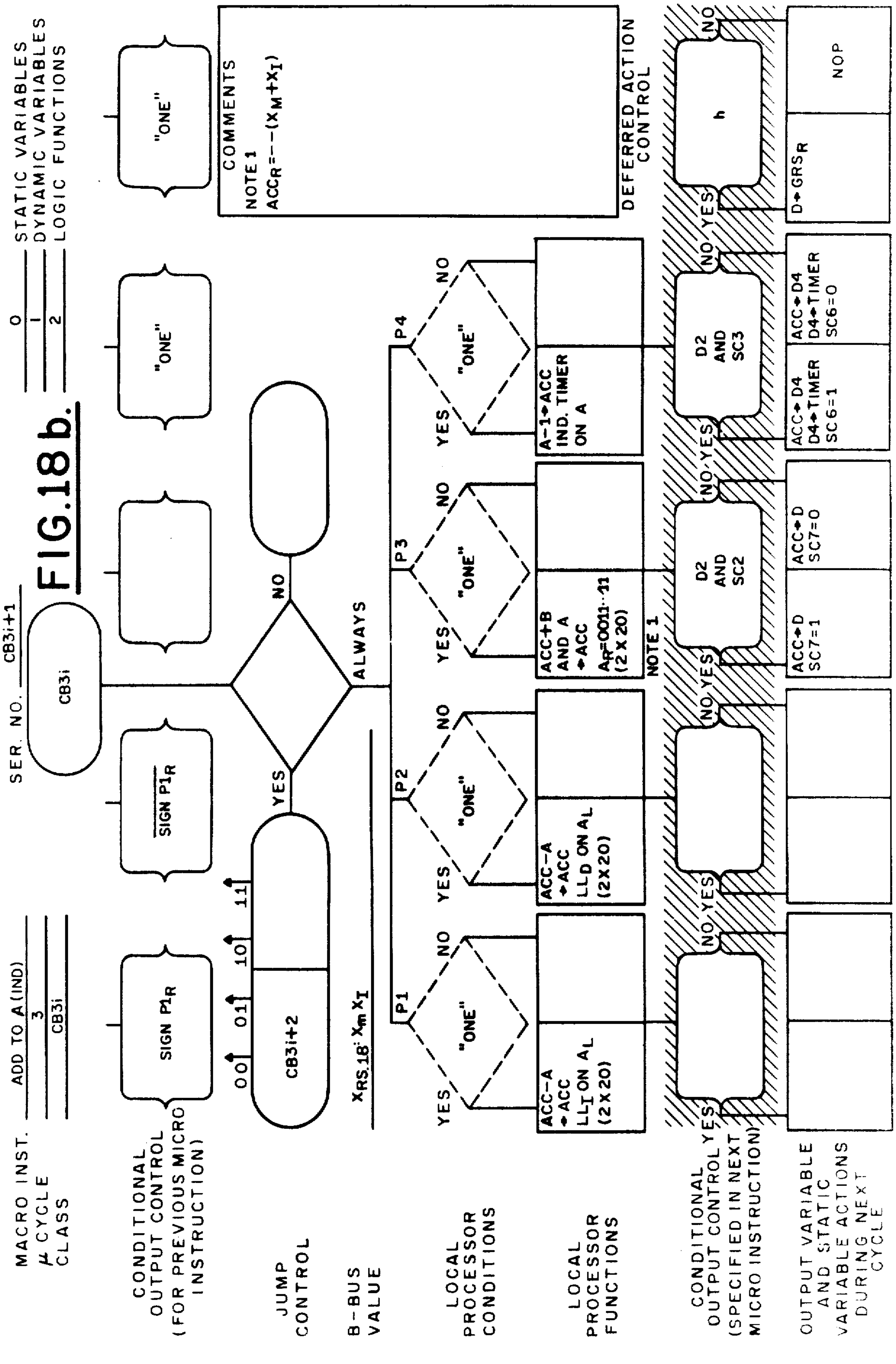
Figure 18D:
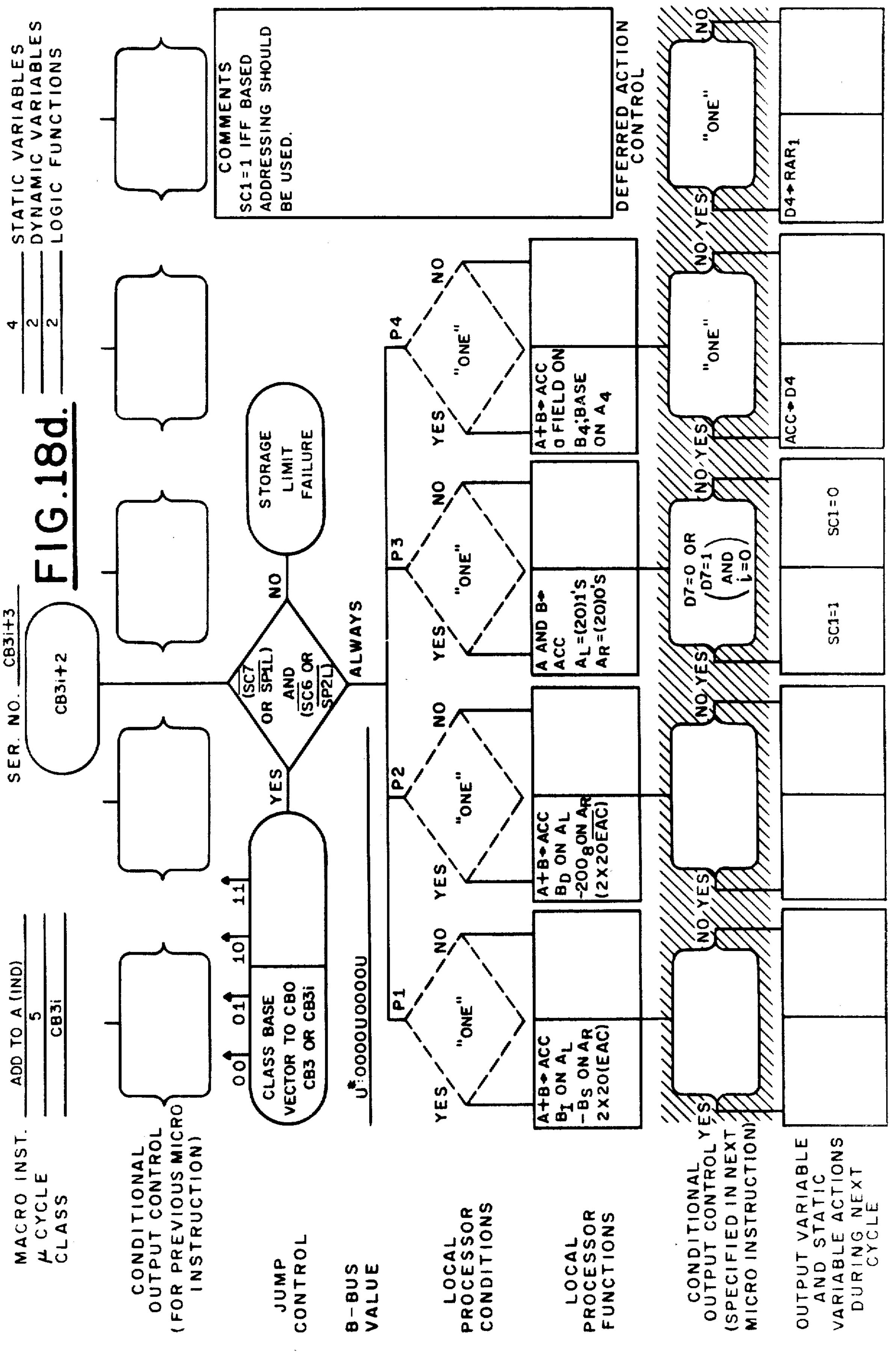
Figure 19B:
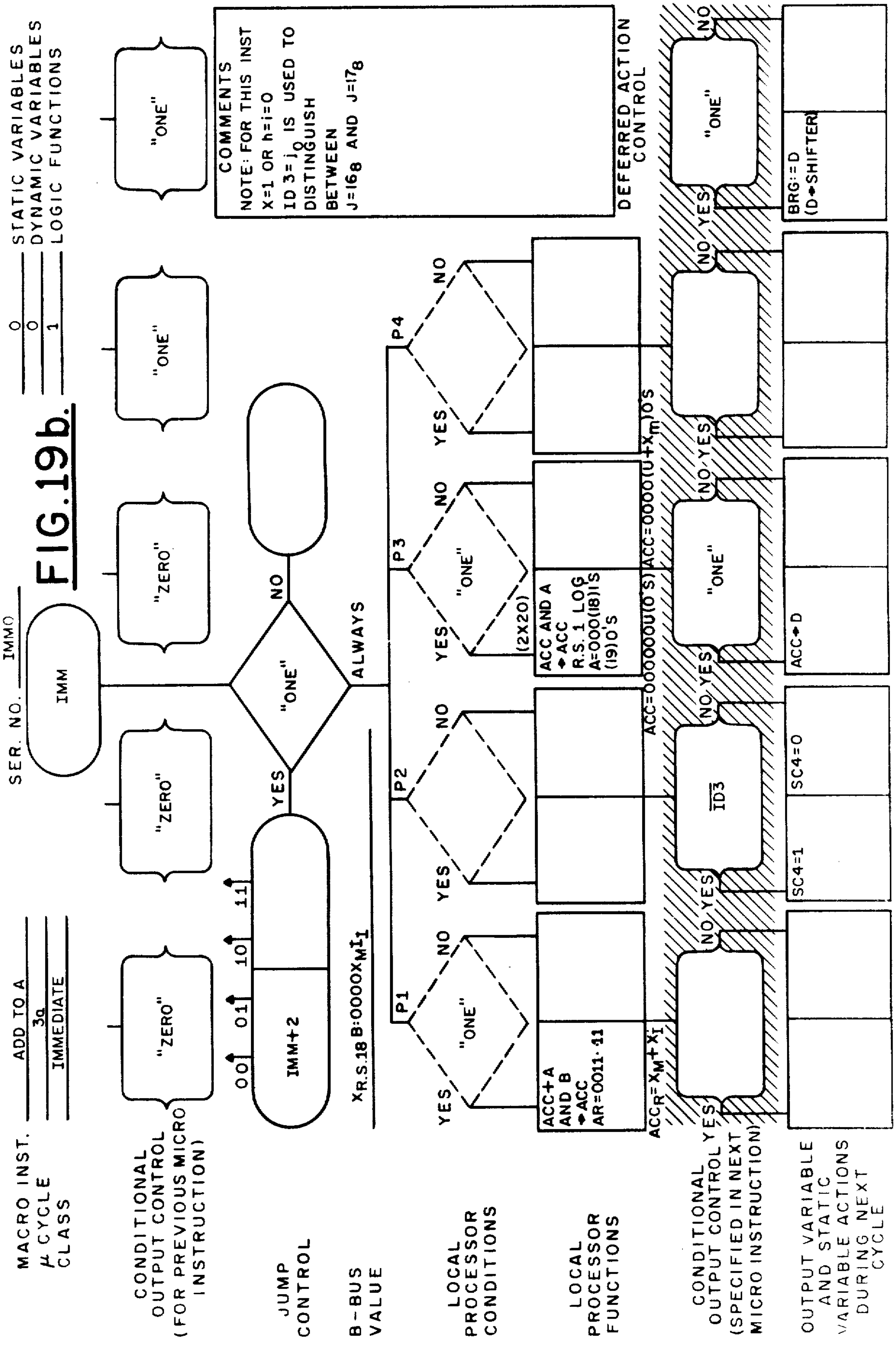
Figure 19C:
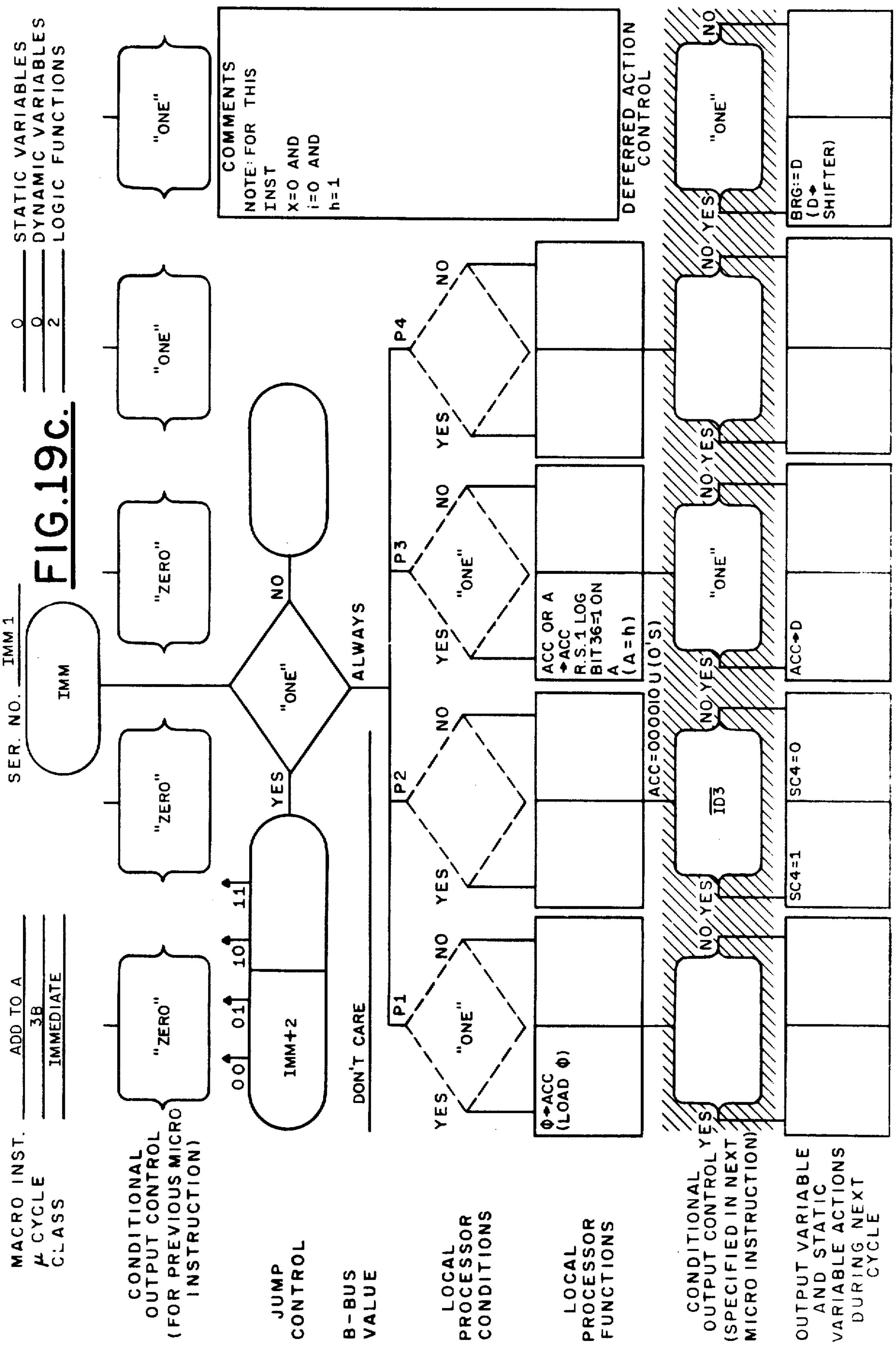
Figure 19D:
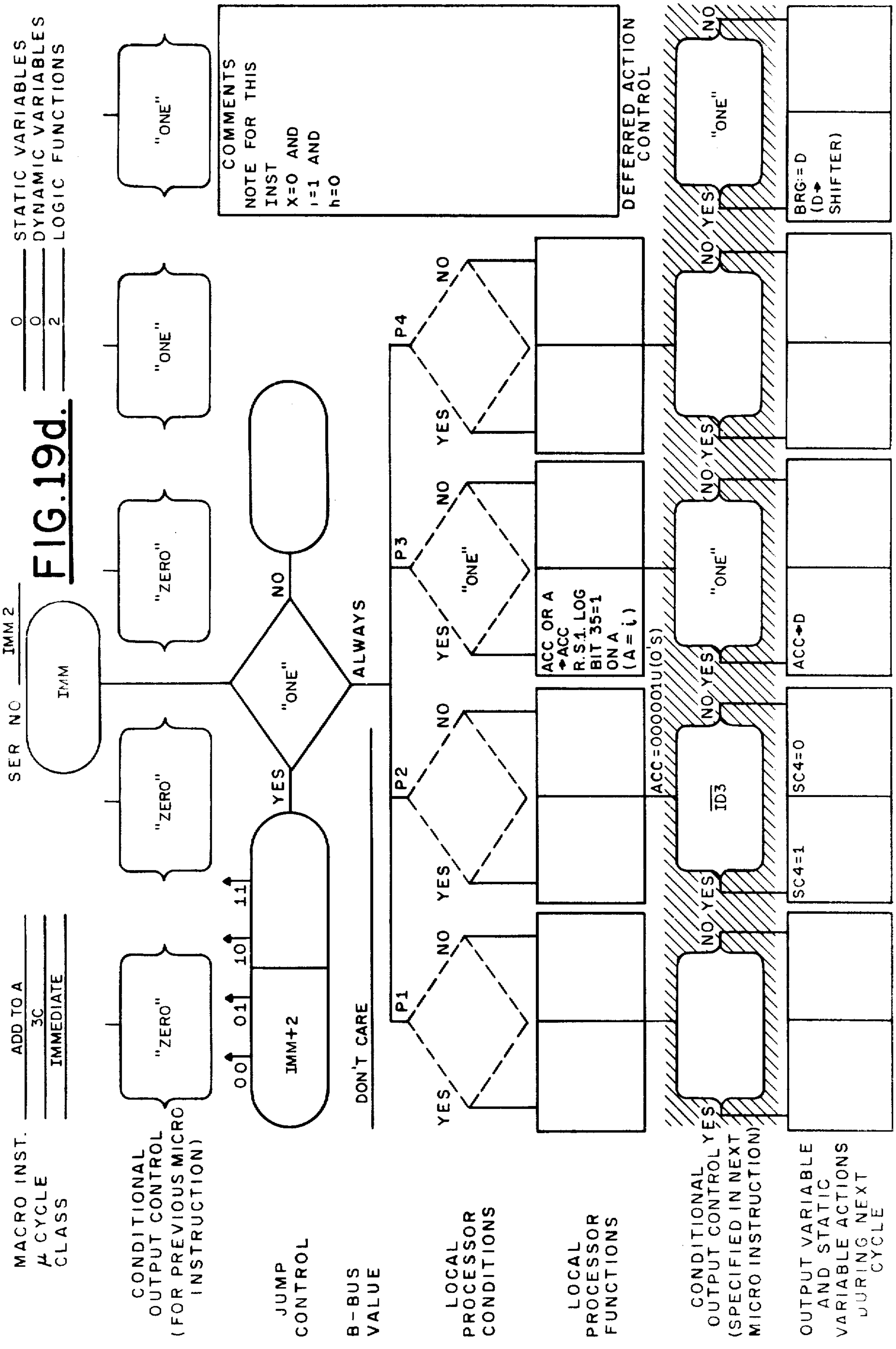
Figure 19E:
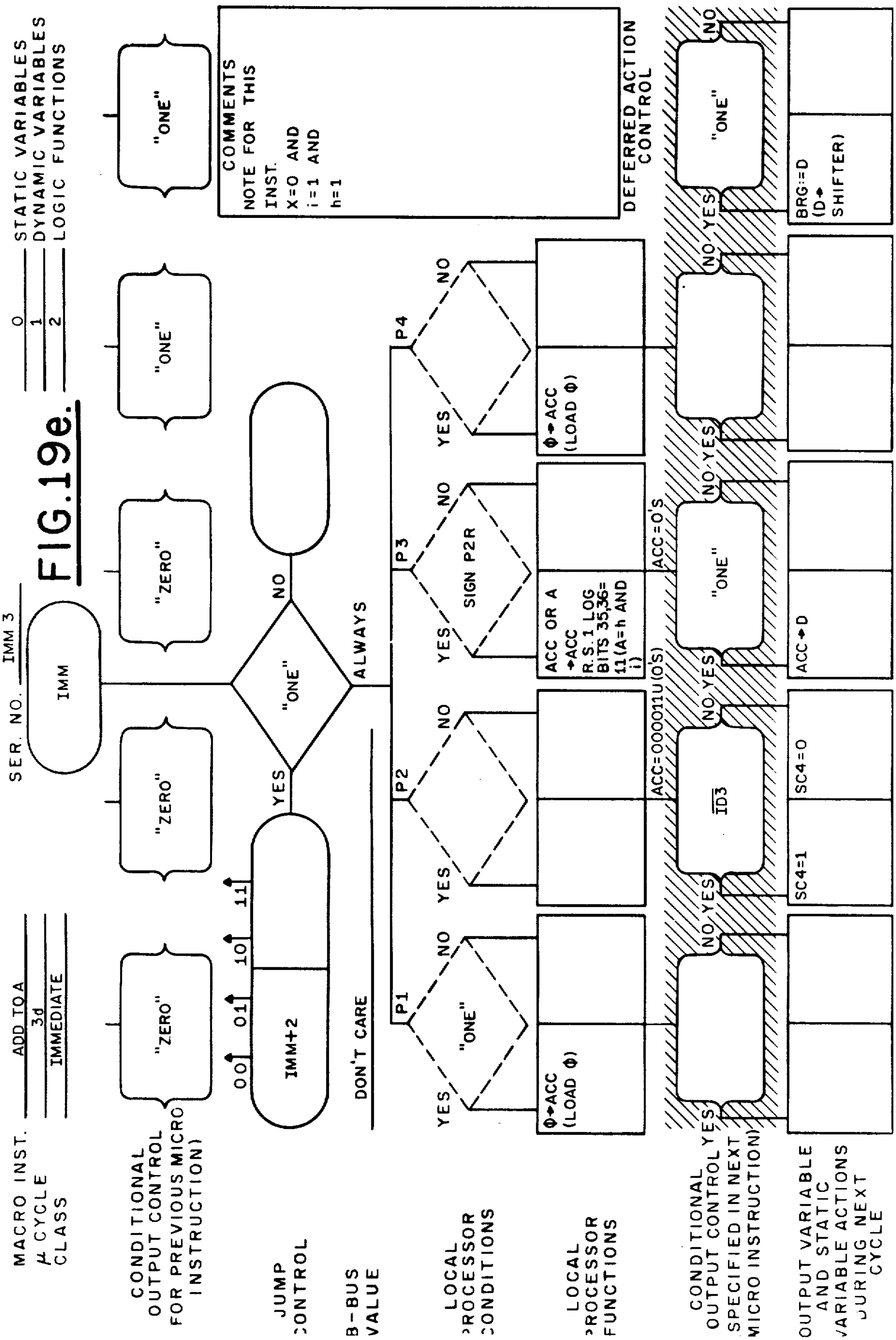

FIG. 16*c* depicts the last micro instruction in the fetch single operand direct class base micro routine. The XF field of this micro instruction is set to 10 with DPO unconditionally set to 1 whereby a vector jump is effected to the micro routine for the particular macro instruction being emulated by ORing the instruction vector from the staticizer register 56 with the NAT address of the FIG. 16*c* micro instruction as described above with respect to Table 1.

If the ADD TO A DIRECT macro instruction op code is residing in the staticizer register 56, (FIG. 5), the jump will be effected to the ADD A micro instruction of FIG. 17 to perform the specific operations necessary in effecting the ADD TO A DIRECT macro instruction.

The jump control of ADD A must determine if the operand being fetched from main memory has arrived by the time it is required. If the operand has not arrived the micro instruction will loop on itself until it does arrive using the "NO" jump path. If the operand has arrived or none was required from main memory because hidden memory was used, the addition of operands will be performed in P3 and a 4-way vector jump will be made depending on whether a macro interrupt has occurred (vector to INT), the operand address failed to pass the limits check (vector to LIM), both events occurred (vector to LIM & INT), or neither of the events occurred (vector to CBO to start another macro instruction). The addition operation performed by P3 is complicated by the fact that the j-field of the macro instruction may specify that the addition is to be performed only on a certain field of the operand fetched from memory and that this field (once it is right adjusted on the B-bus by the shifter) may or may not be extended on the left with sign bits (depending on the sign of the operand fetched from main memory). The phantom branch decision for P3 together with the local memory fetch circuitry which fetches the particular mask required as a function of j and SE properly performs the addition as defined by 1108 documentation.

With regard to the emulation for the ADD TO A macro instruction depicted by FIGS. 15-17, the following depicts the primary functional activities occuring in each micro cycle of the ADD TO A instruction. Because of the micro overlap discussed above, the actions delimited by dashed lines do not actually occur in the cycle indicated but are displaced by part of a cycle. There are five micro cycles of 100 nanoseconds each so that an 1108 ADD TO A can be completed in 500 nanoseconds.

| | | ADD TO A |
|---|---|---|
| Common | Cycle 1 | Fetch Next Instruction |
| | | - - - - - - - - - - - - - - - - - - - - |
| | | Add Bases to u |
| | | Generate ABS. GRS Address |
| | Cycle 2 | Add index to (u + base) |
| | | Select Address |
| | | Fetch Operand |
| Single Op Fetch | Cycle 3 | Increment index Reg. |
| | | Begin Limits Check |
| | Cycle 4 | GRS to Micro Accumulator |
| | | Update P Register |
| | | Finish Limits Check |
| | | Add if Op. Available |
| Add A | Cycle 5 | Check for Limits Error |
| | | Check for Interrupt |
| | | - - - - - - - - - - - - - - - - - - - - |
| | | Store Operand |
| | | Set Carry and Overflow |

Referring now to FIGS. 18*a-d*, the micro routine for the fetch single operand indirect (CB3i) class base is illustrated. A vector jump is taken from the common microinstruction of FIG. 15 to the indirect routine of FIGS. 18*a-d* by modifying the CB3 class base vector from the instruction status table 38 by means of the static variable ID1 provided at 59 on FIG. 5 as discussed above. The last microinstruction of the class base routine (FIG. 18*d*) provides a vector jump in response to the instruction vector from the staticizer register 56 to either the microinstruction depicted in FIG. 18*a*, the common microinstruction depicted in FIG. 15 (if the newly fetched instruction is not ready) or to the single operand fetch class base if no indirection is indicated in the newly fetched instruction.

Figure 20:
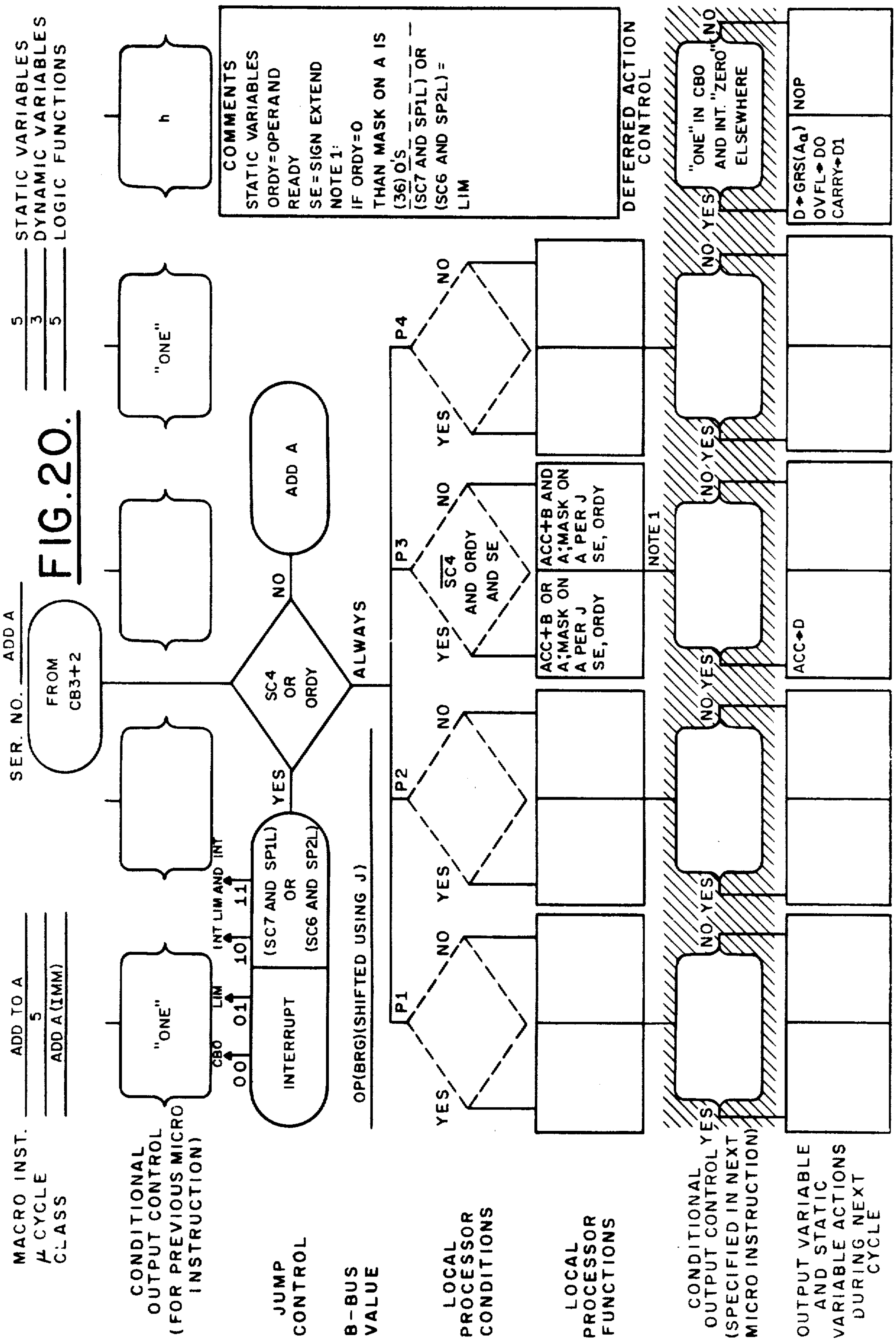
FIG. 20 is a flow diagram depicting the micro routine for the ADD TO A IMMEDIATE macro instruction.
Figure 21A:
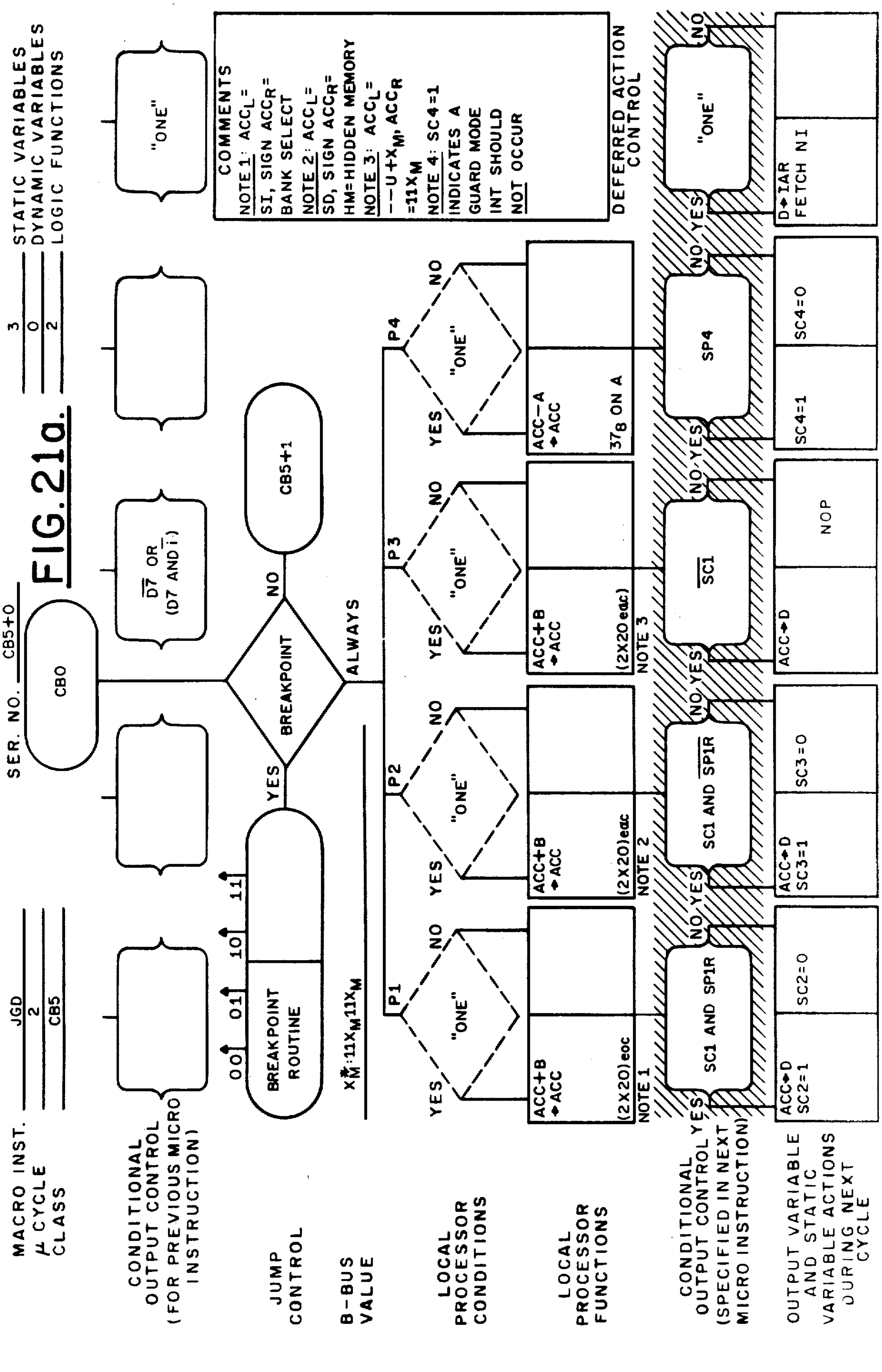
Figure 21B:
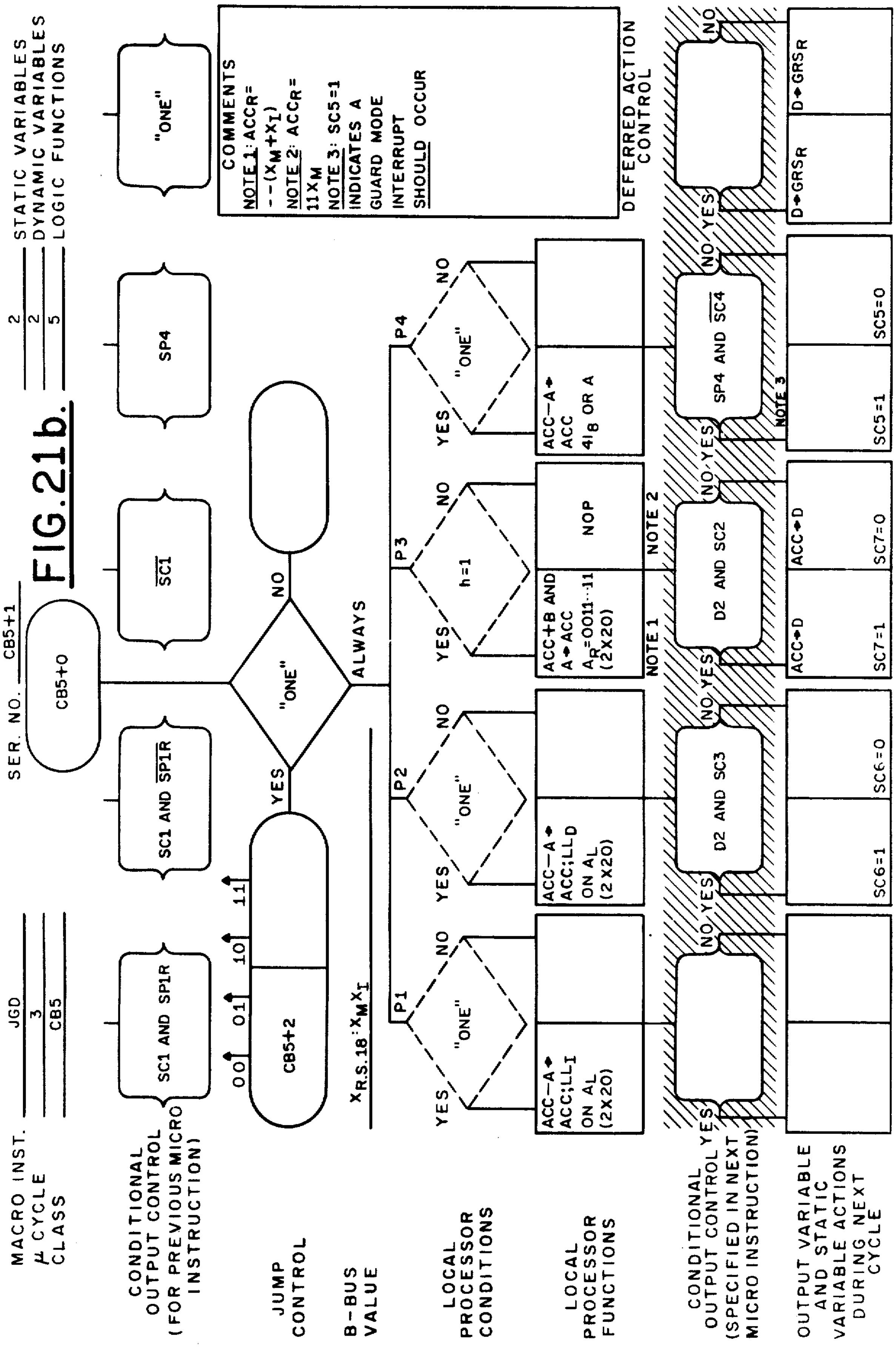

Referring now to FIGS. 19*a-f*, the micro routine for the fetch single operand immediate (CB4) class base is illustrated comprising six micro instructions. In a manner similar to that described above, the micro instruction depicted in FIG. 19*a* is vectored to from the common micro instruction of FIG. 15 and the micro instruction of FIG. 19*f* controls a vector jump to the specific micro routines for emulating the specific macro instructions in the class base. FIG. 20 illustrates the ADD A IMMEDIATE micro instruction to which the jump may be controlled.

Figure 22A:
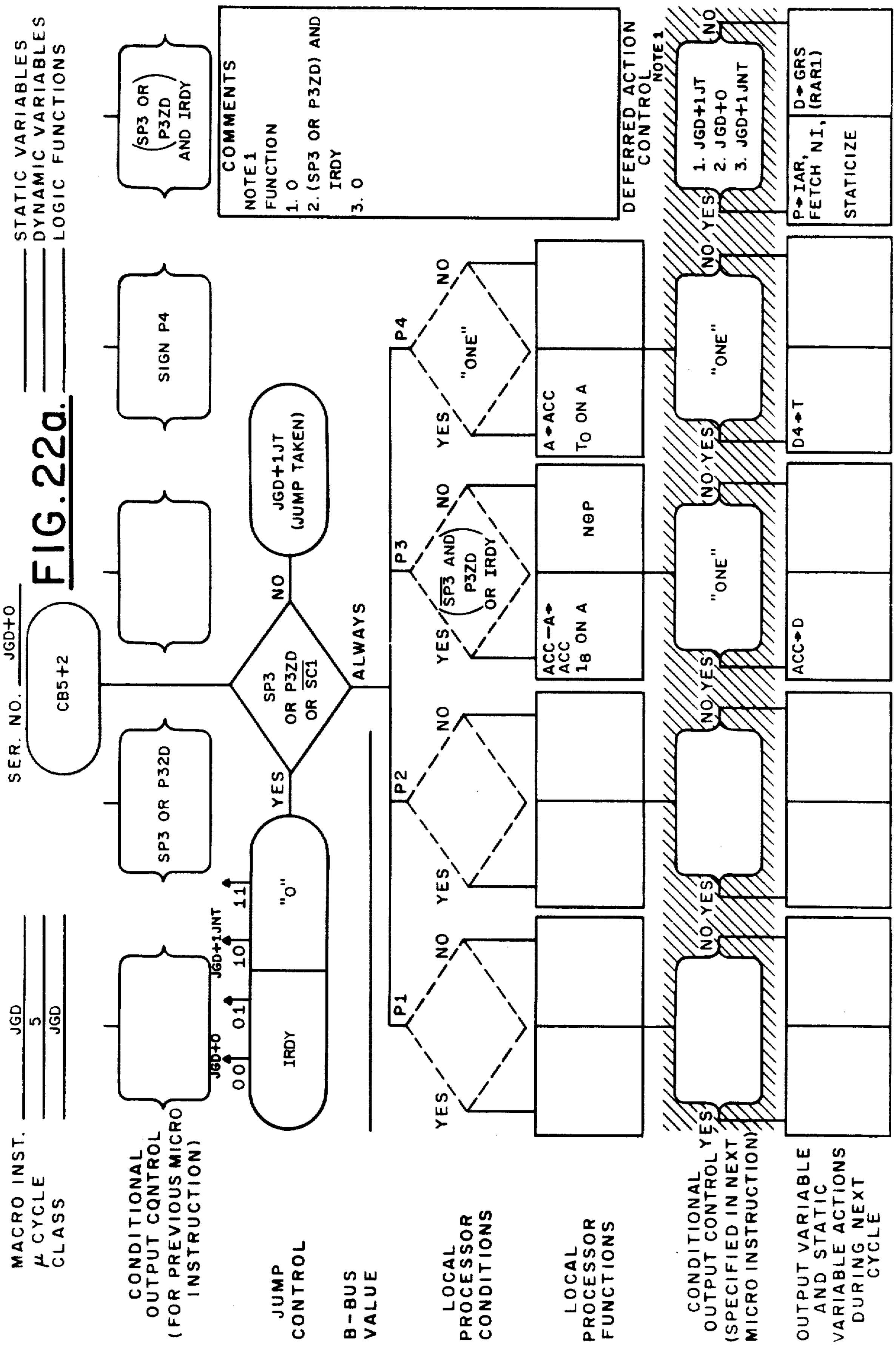
FIGS. 22*a–c* are flow diagrams depicting the micro routine for the JUMP GREATER AND DECREMENT macro instruction.
Figure 22B:
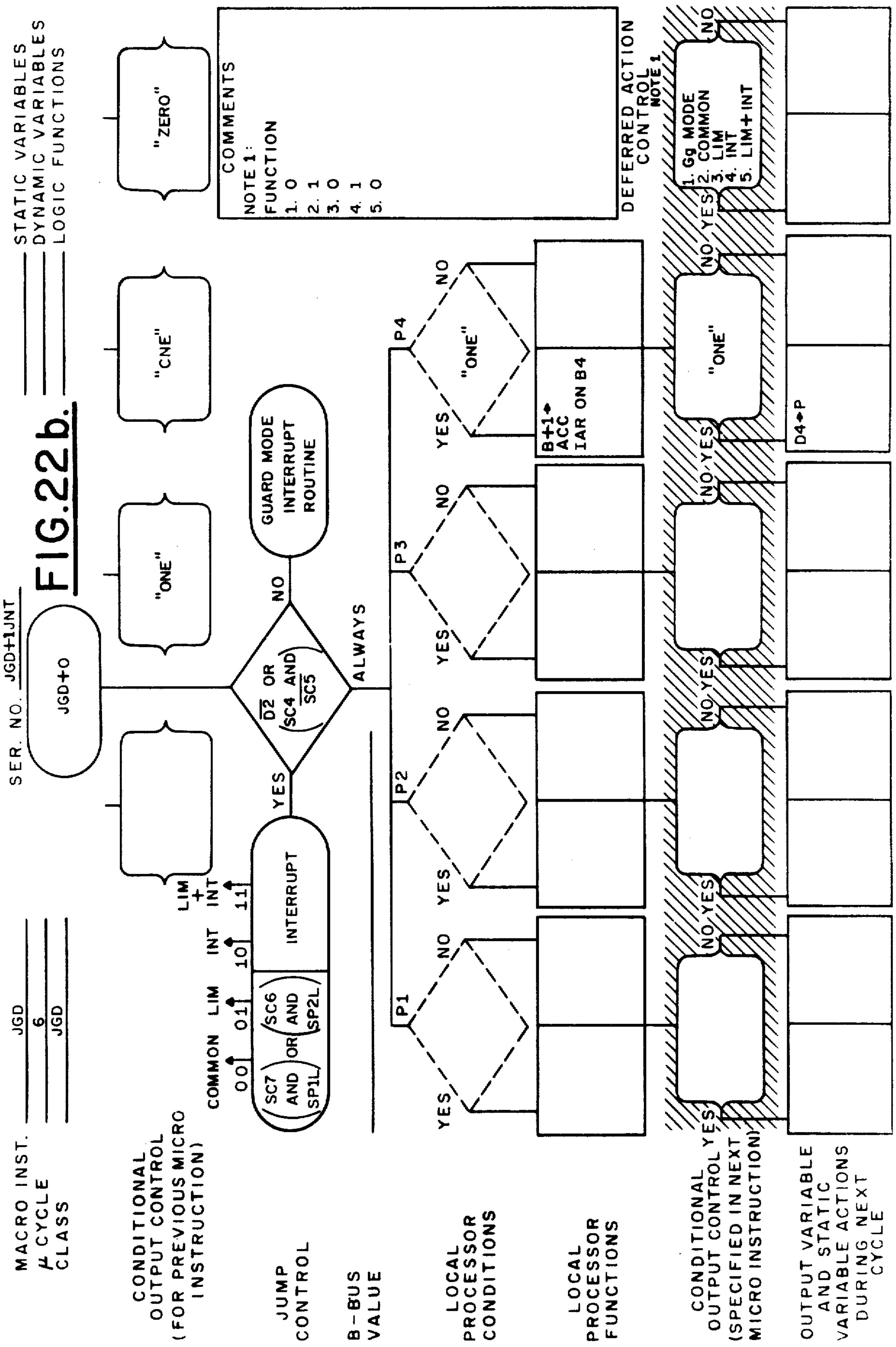
Figure 22C:
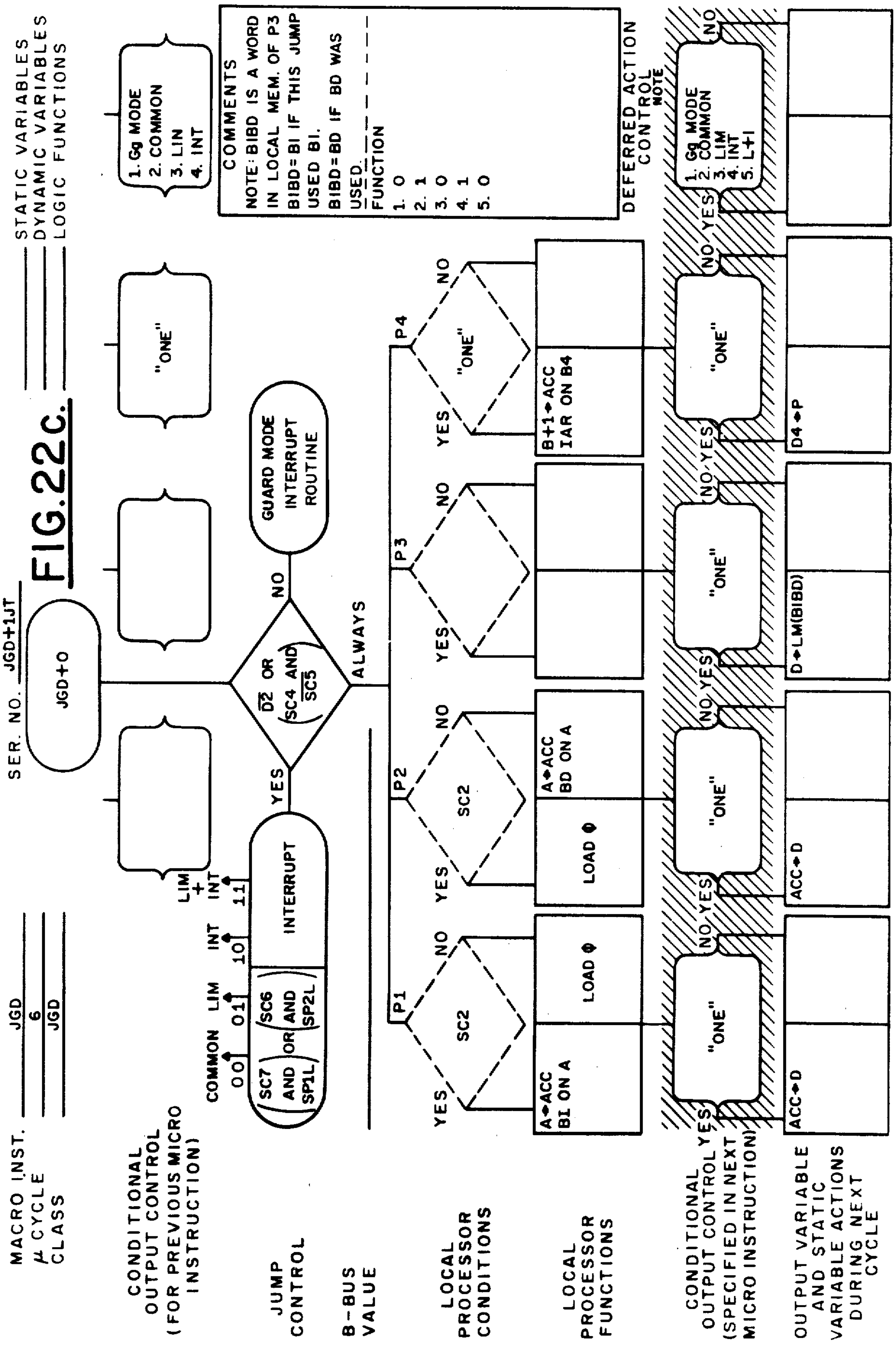

Referring now to FIGS. 21*a-c* and 22*a-c*, FIGS. 21*a-c* depict the three micro instructions that comprise the jump greater and decrement (CB5) class base and FIGS. 22*a-c* depict the micro routine for the emulation of the JUMP GREATER AND DECREMENT macro instruction.

Specifically, with regard to FIG. 21*c*, the function in the decision brace of the conditional output control associated with P2 will be different in general for each conditional jump macro instruction.

Also with regard to FIG. 22*a*, the entry in the deferred action control decision brace indicates the three possible next micro instructions while Note 1 in the comments section specifies the logical function which must be specified by the DADS fields of each of these instructions. This same notation is used throughout the microcode of FIGS. 22 through 30.

Figure 23A:
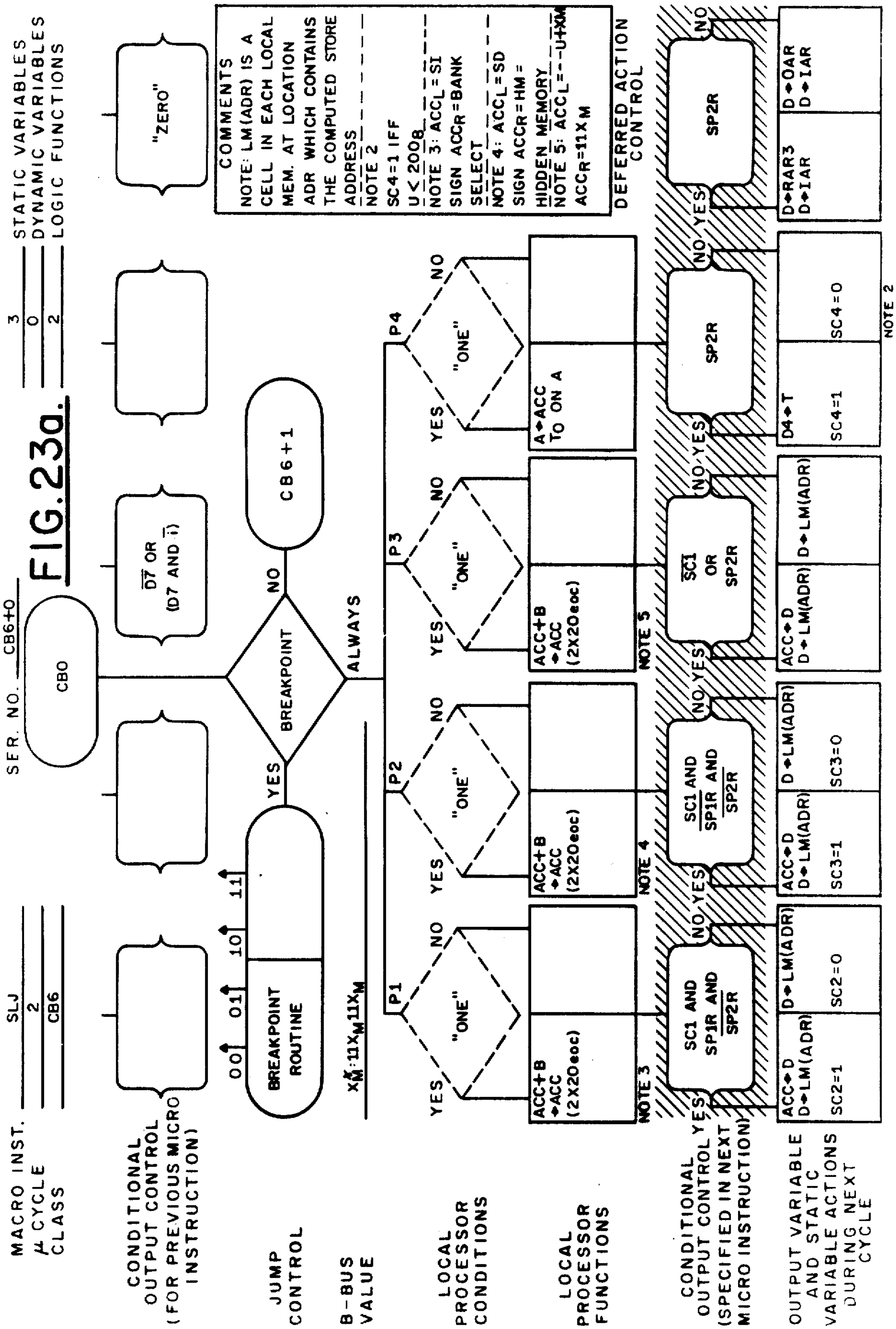
FIGS. 23*a–c* are flow diagrams depicting the micro routine for the UNCONDITIONAL BRANCH macro repertoire class base.
Figure 23B:
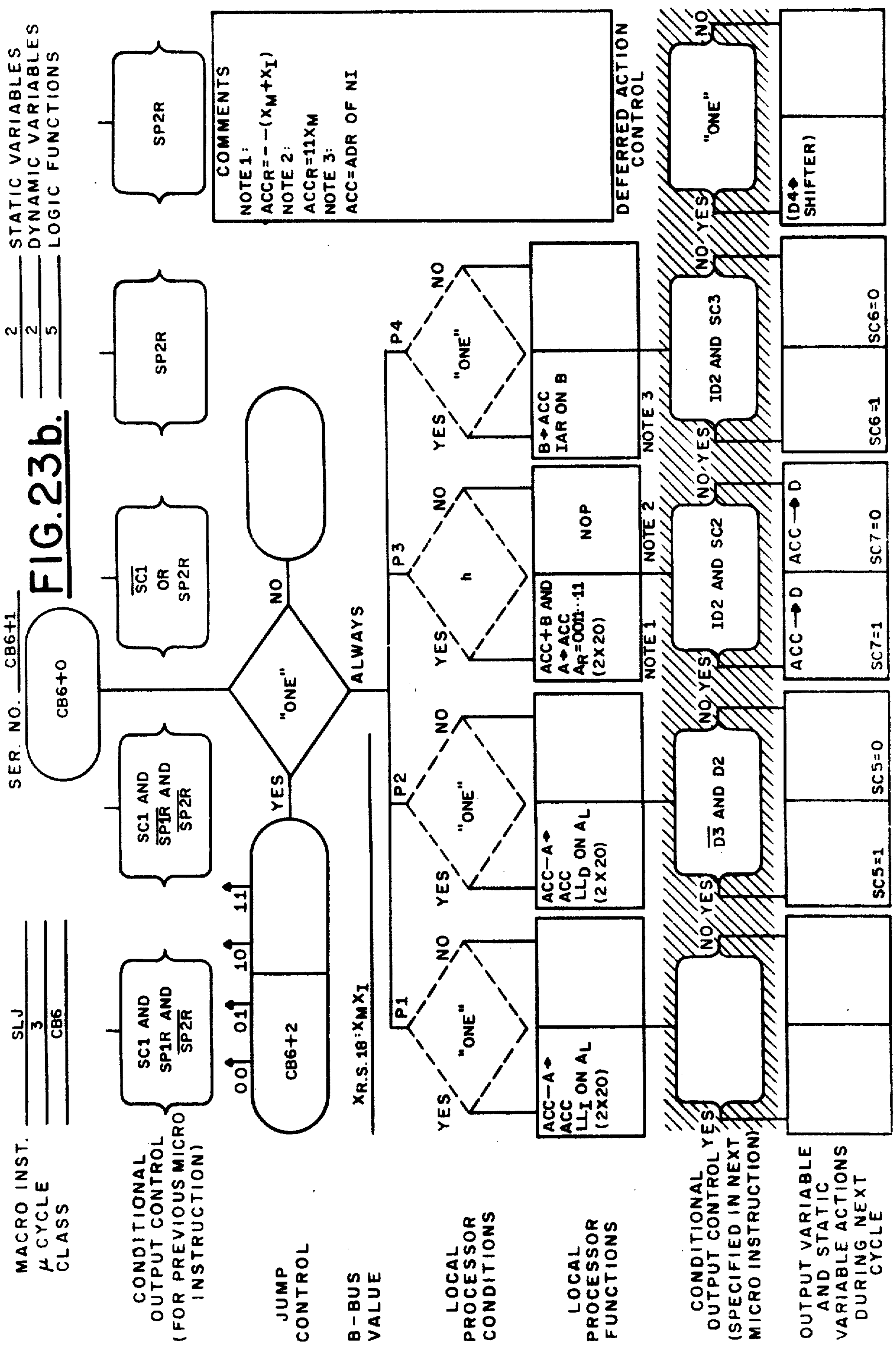
Figure 23C:
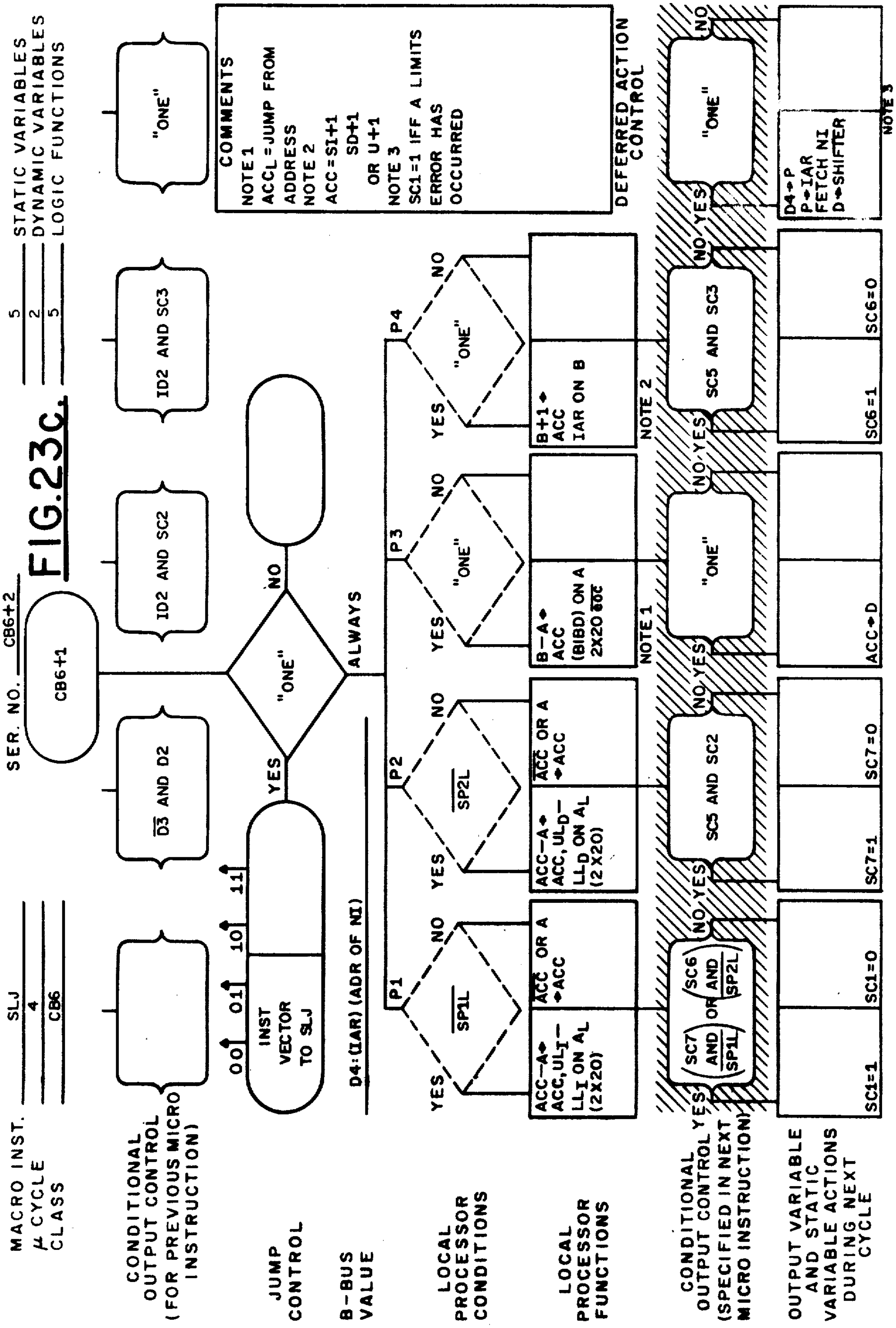
Figure 24B:
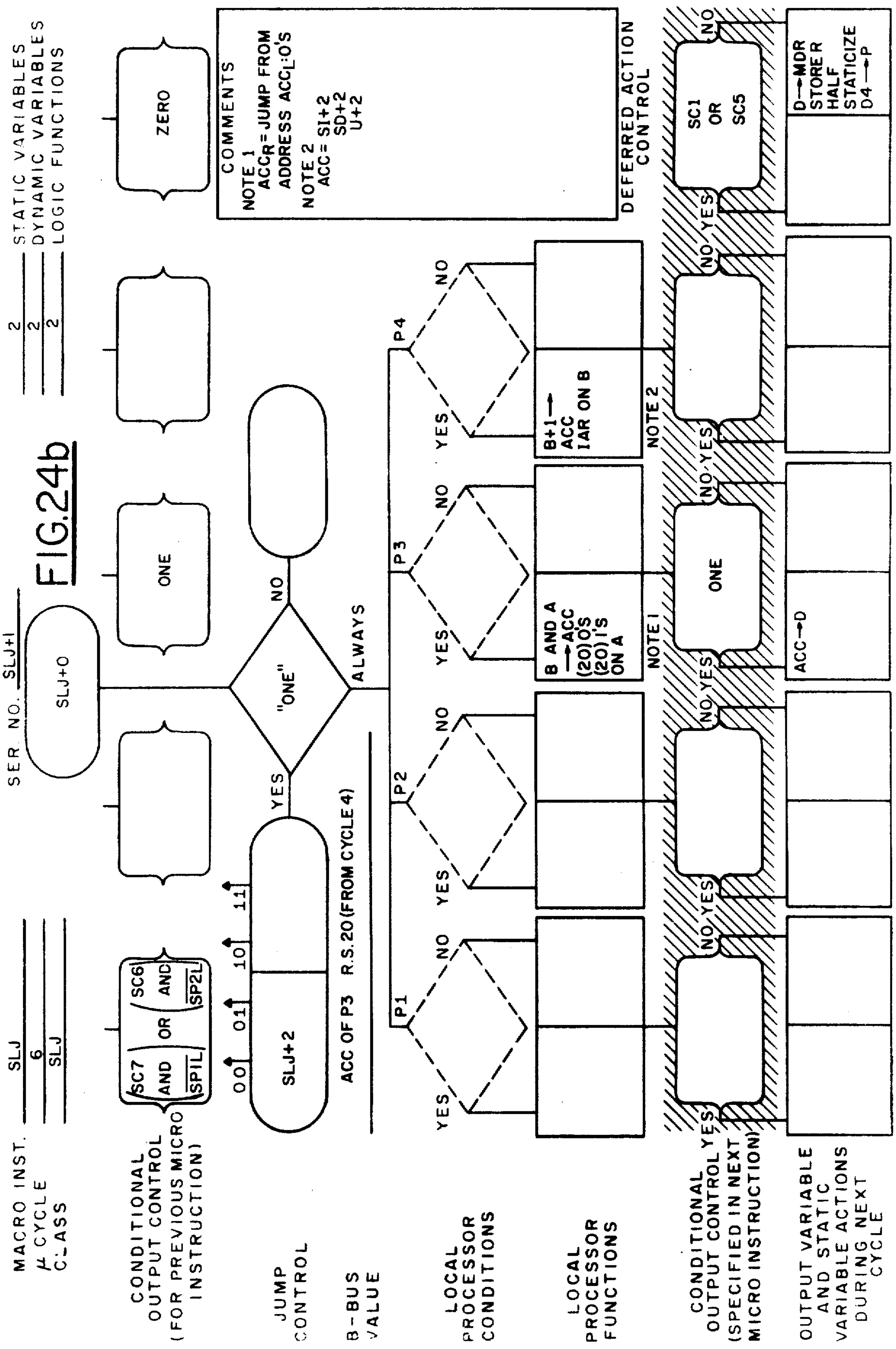
Figure 24C:
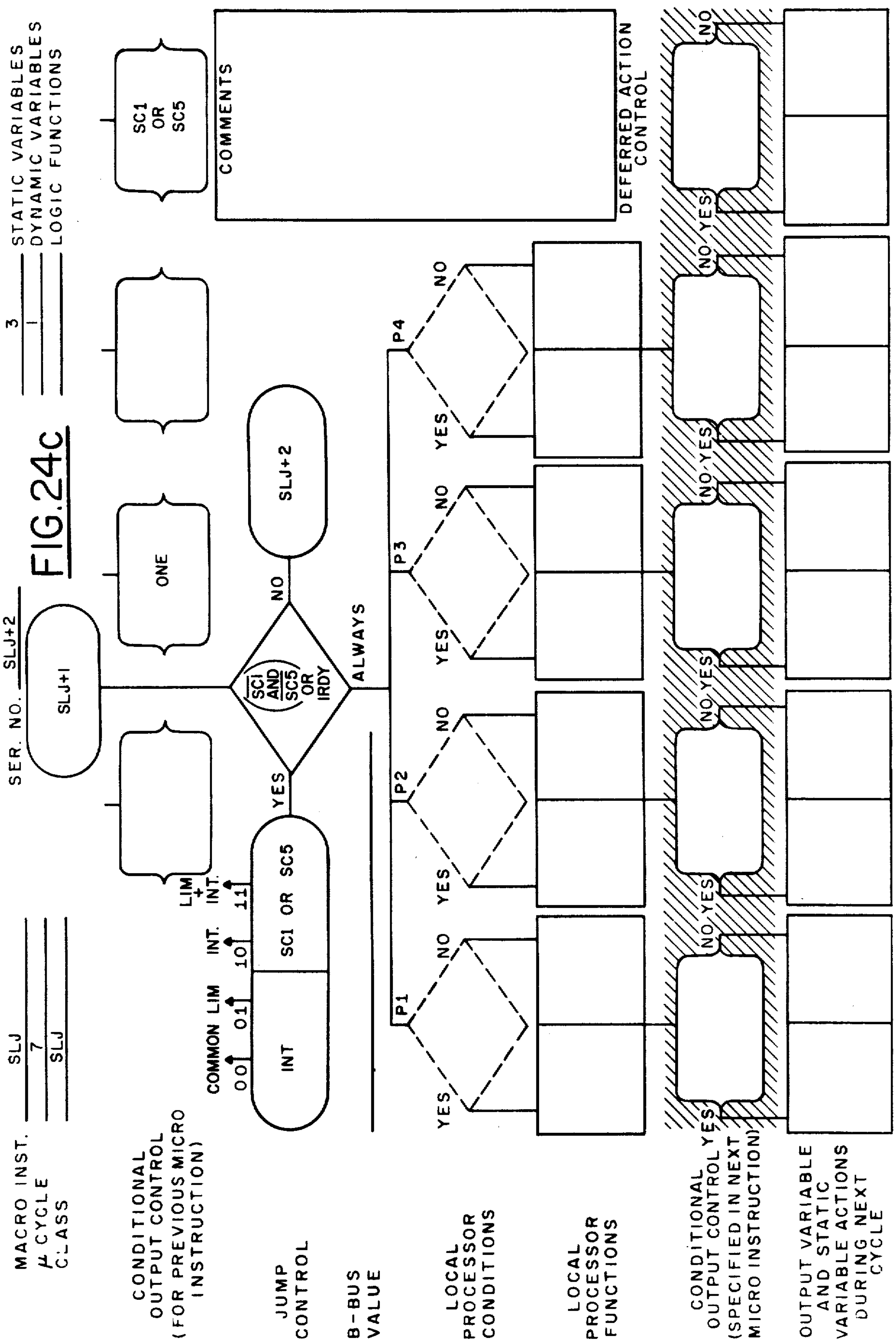
Figure 24E:
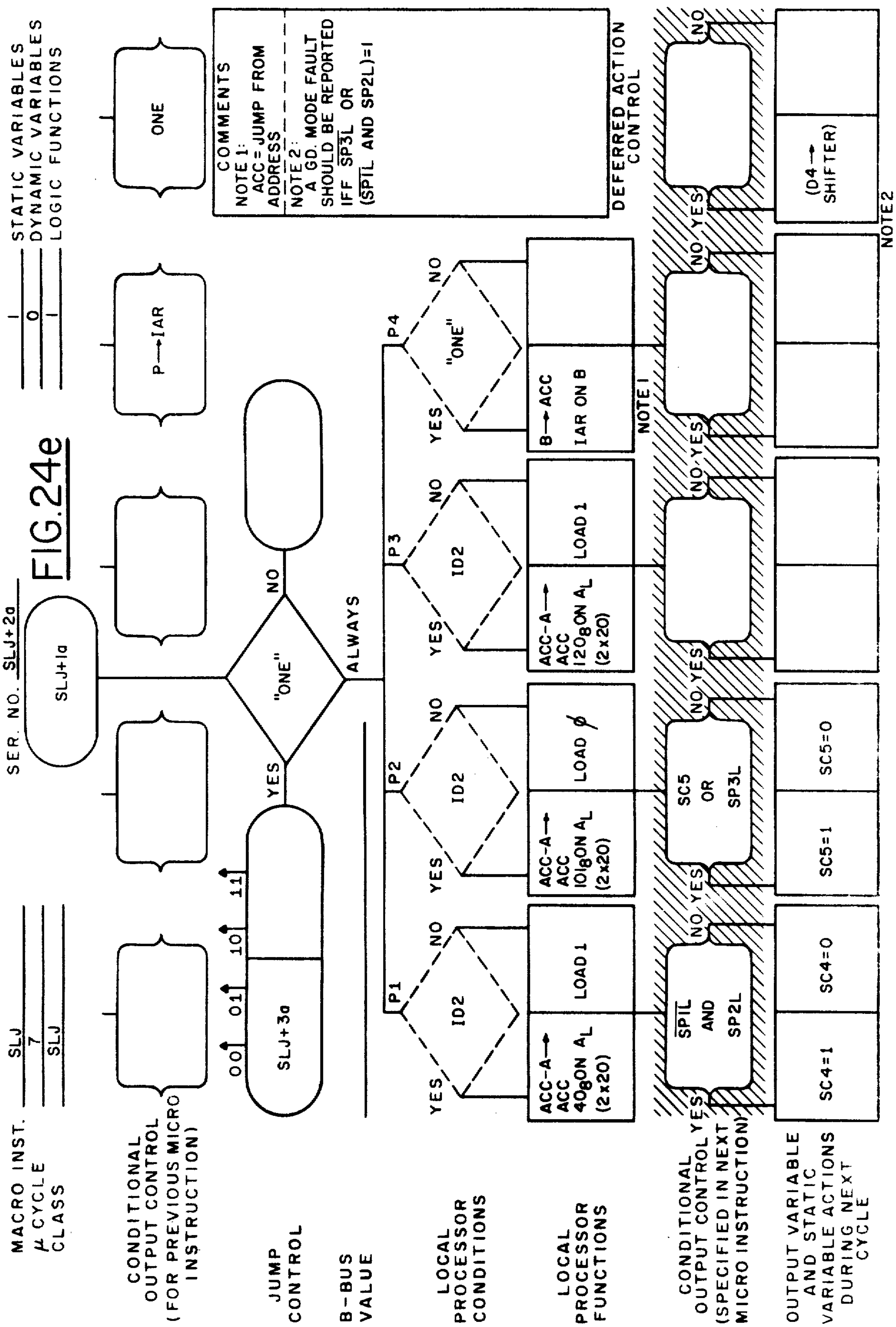
Figure 24F:
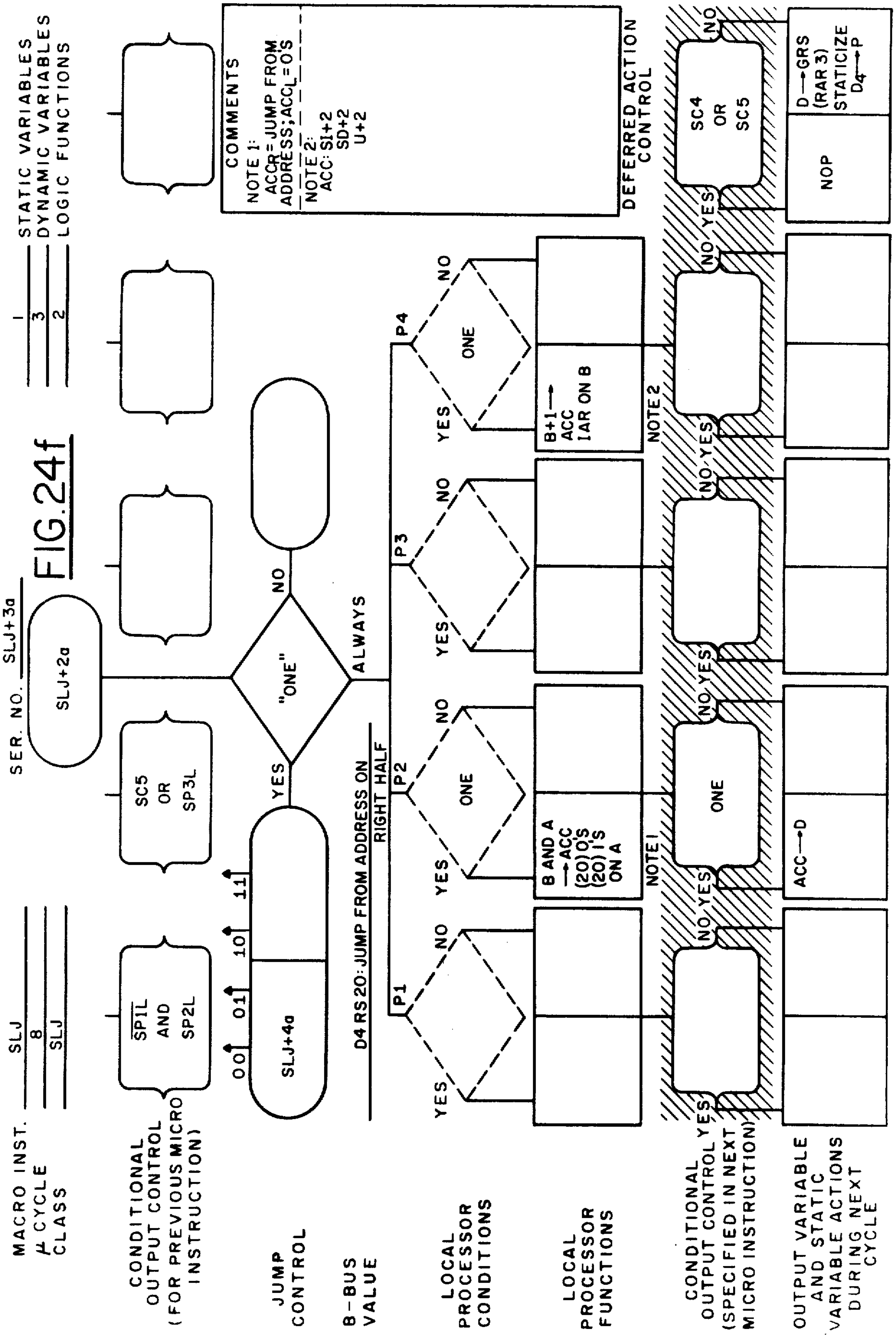
Figure 24G:
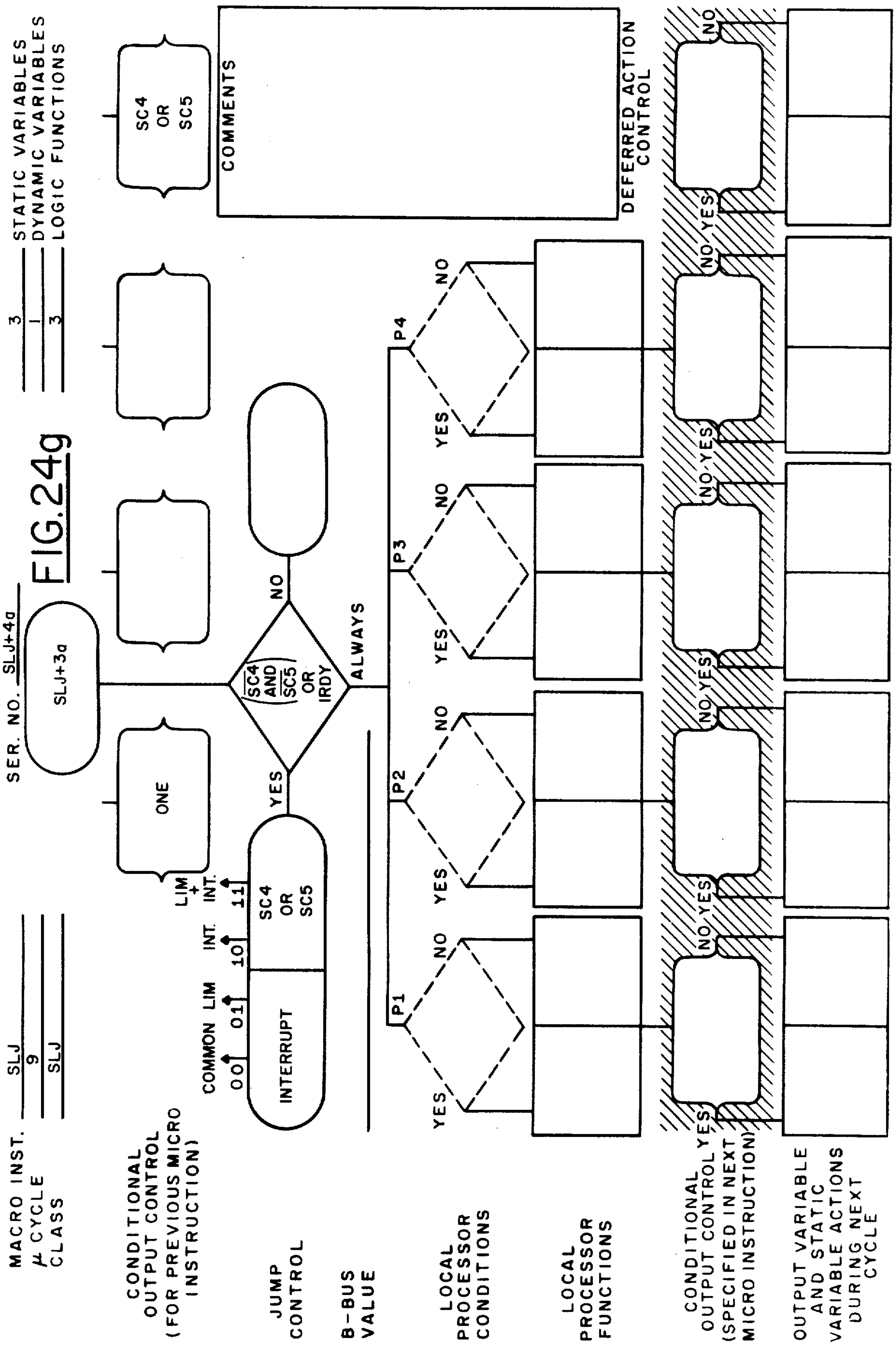
Figure 25B:
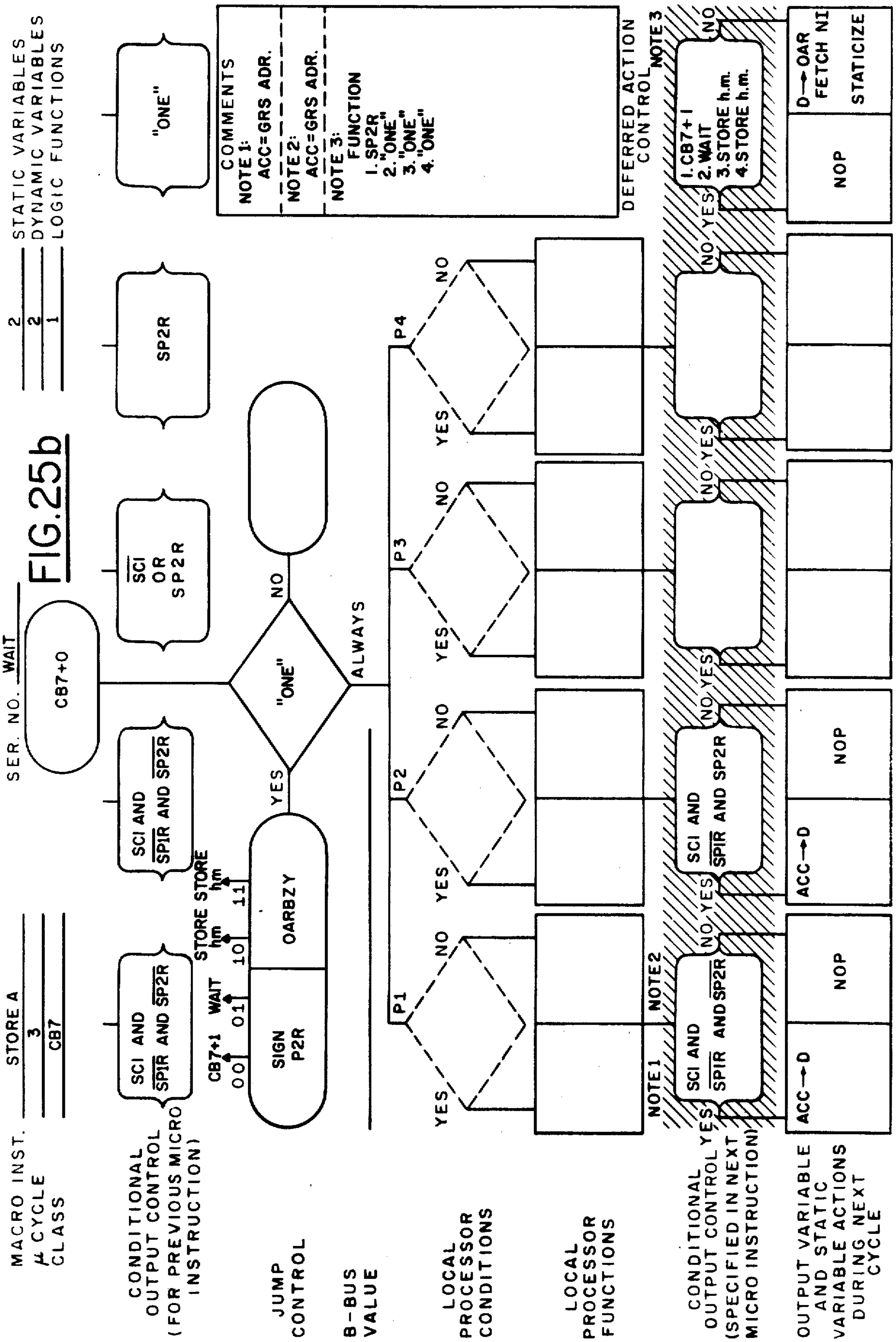
Figure 25C:
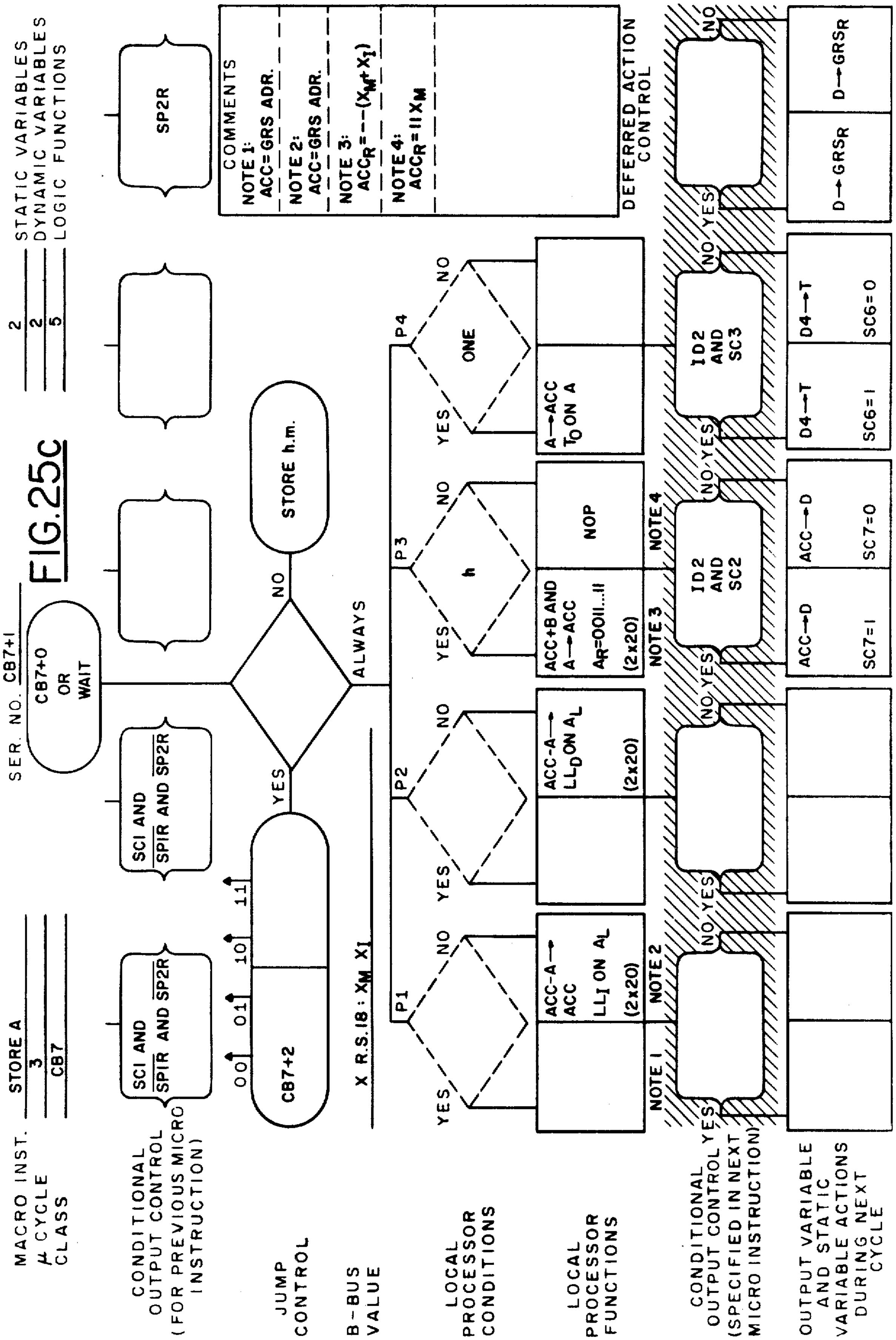
Figure 26A:
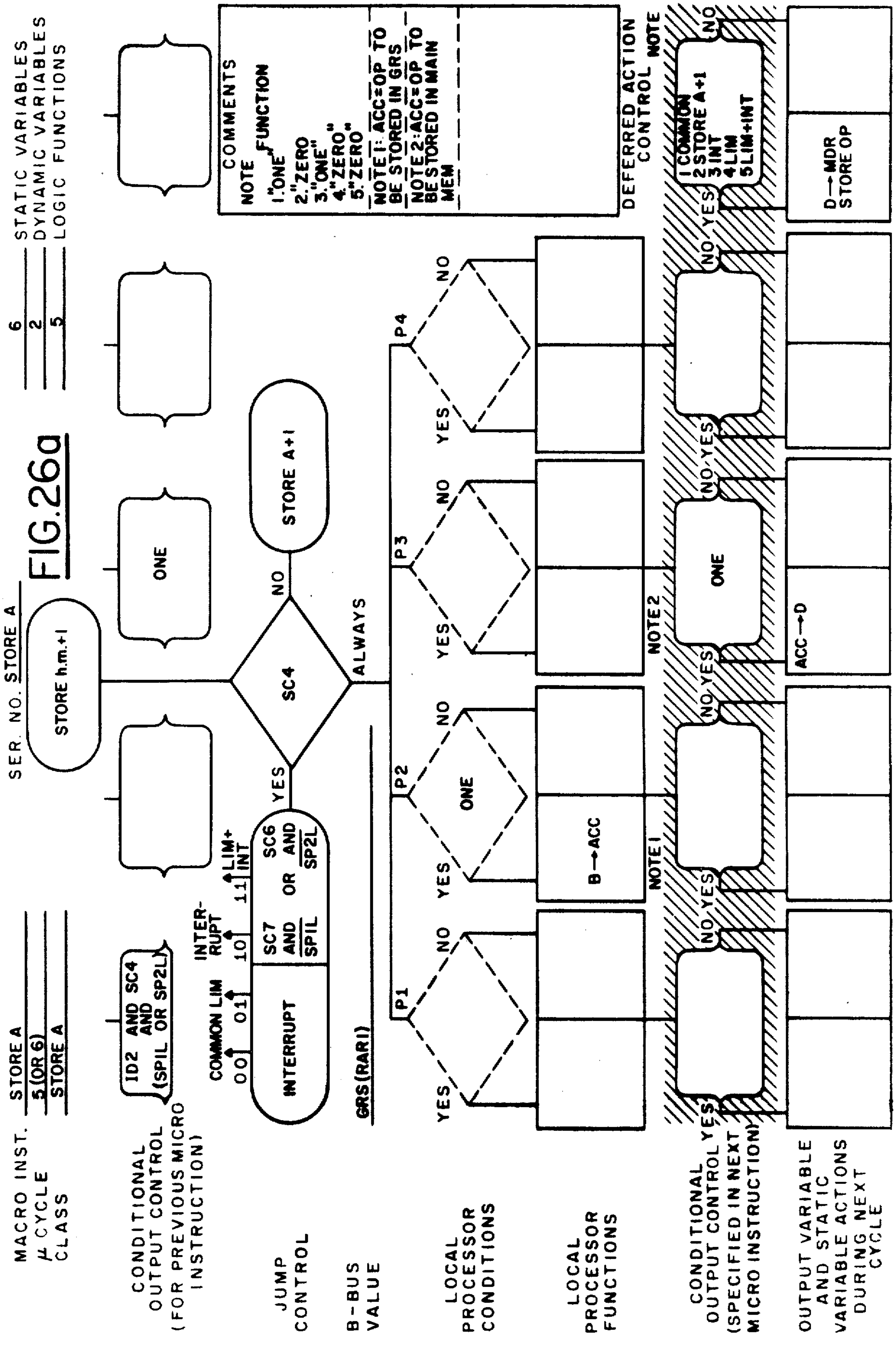

Referring to FIGS. 23*a-c* and 24*a-g*, the micro routine for the unconditional branch (CB6) class base is depicted by FIGS. 23*a-c* and the emulation for the STORE LOCATION AND JUMP (SLJ) macro instruction to which a vector jump can be taken from the unconditional branch class base is depicted by FIGS. 24*a–g*.

Referring now to FIGS. 25*a–f* and FIGS. 26*a–b*, the micro routine for the STORE (CB7) class base is depicted by FIGS. 25*a–f*, and FIGS. 26*a–b* depict the micro routine for the specific emulation of the STORE A (SA) macro instruction.

Figure 27A:
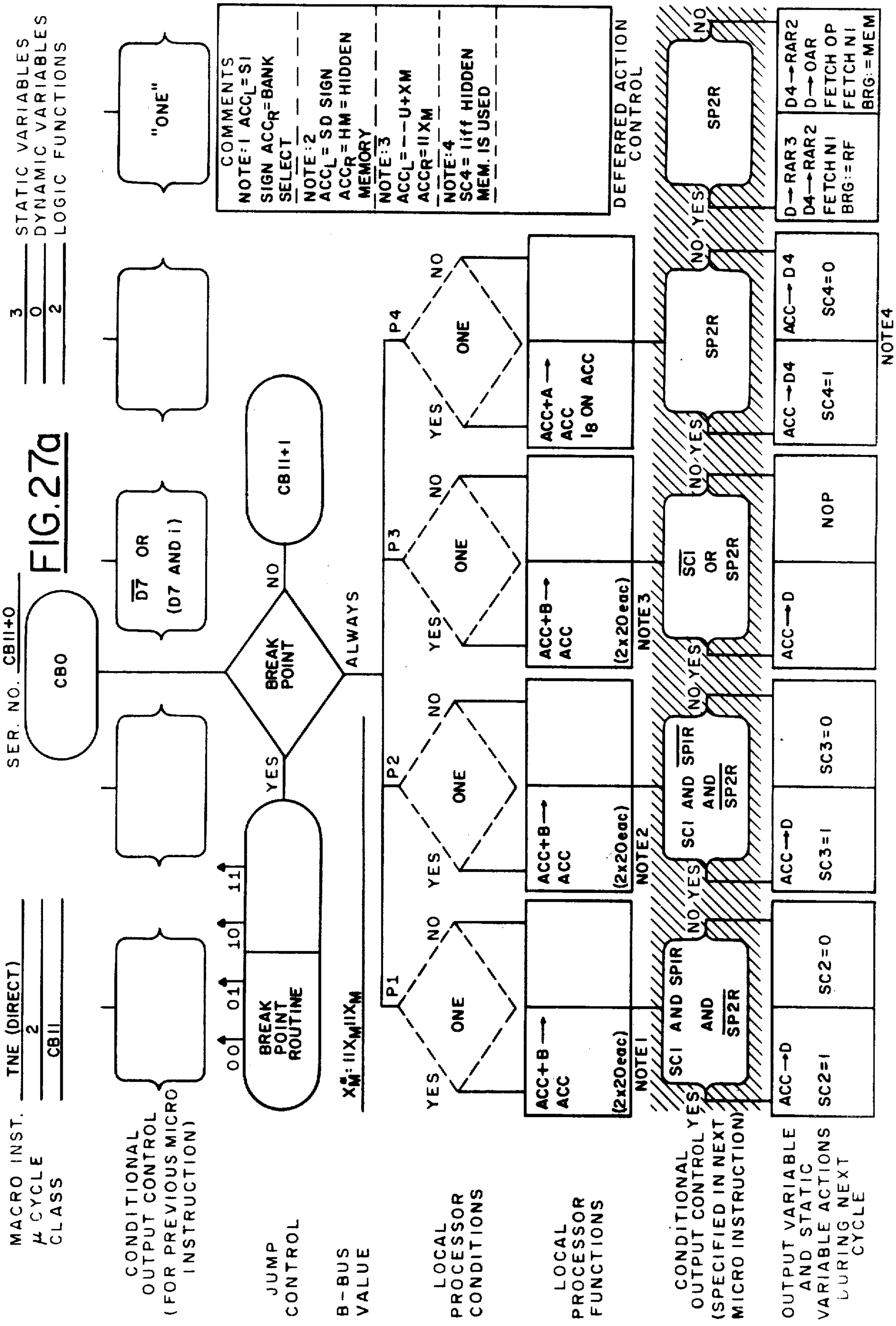
FIGS. 27a–c are flow diagrams depicting the micro routine for the SKIP AND CONDITIONAL BRANCH macro repertoire class base.
Figure 27B:
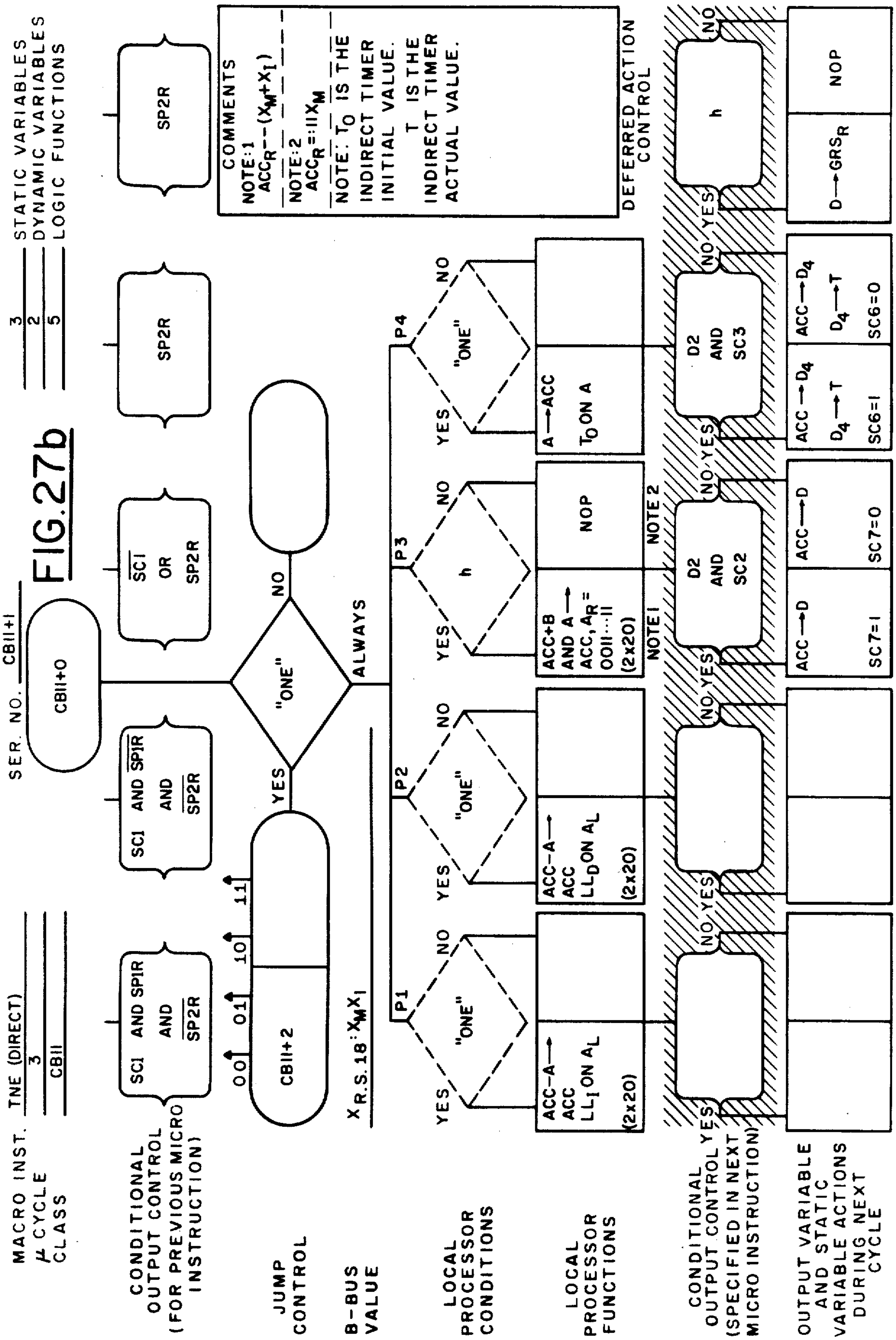
Figure 27C:
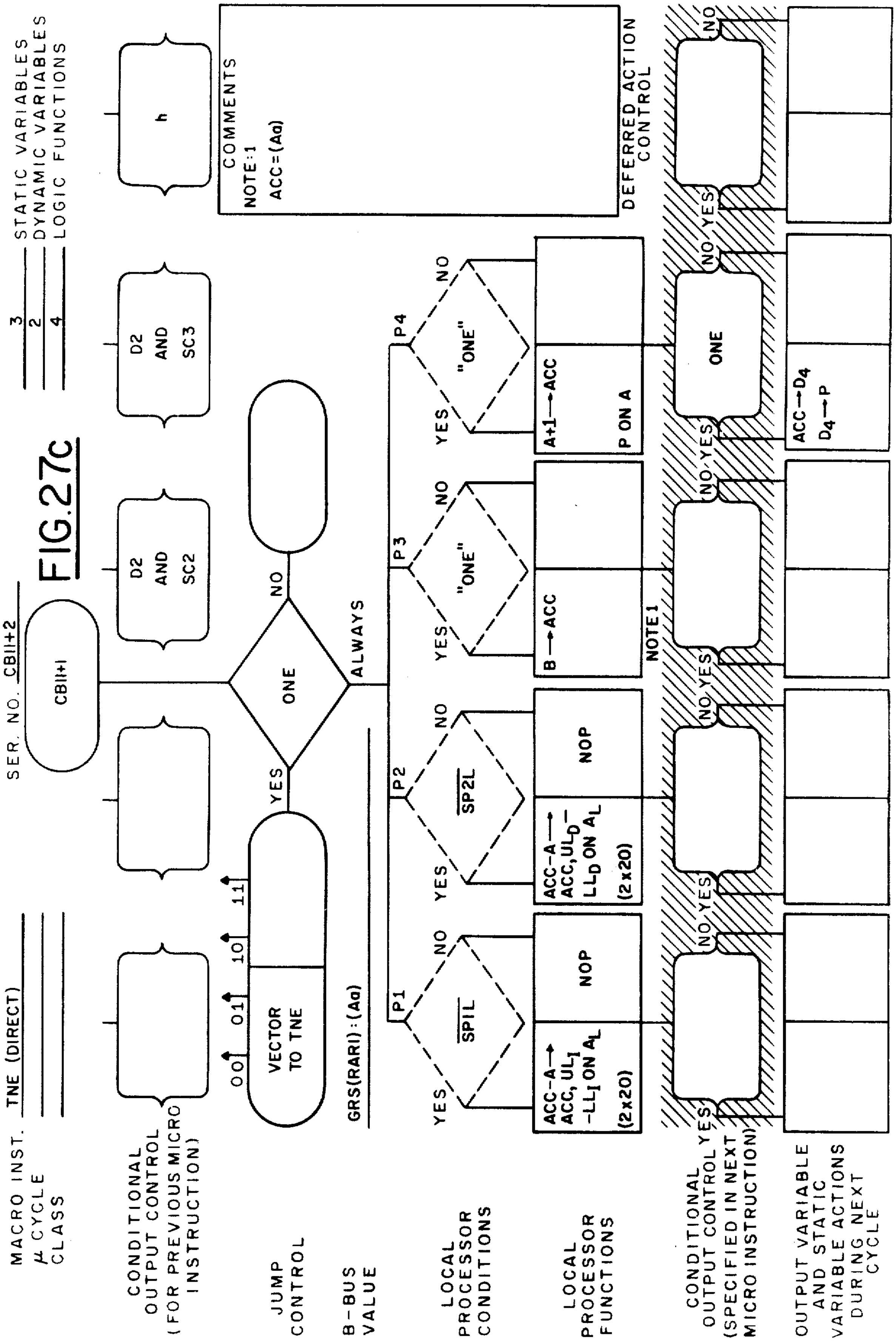
Figure 28A:
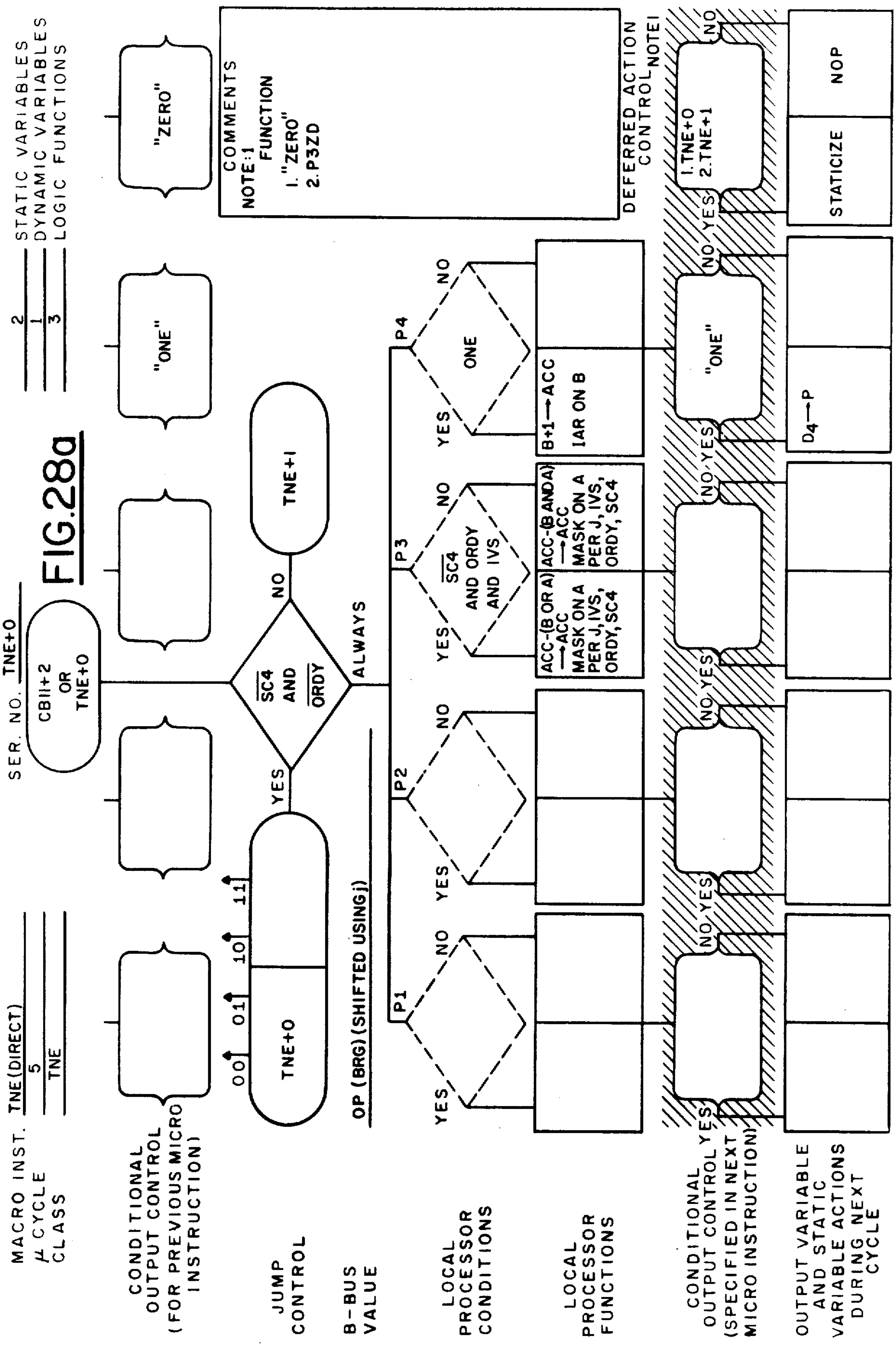
Figure 28C:
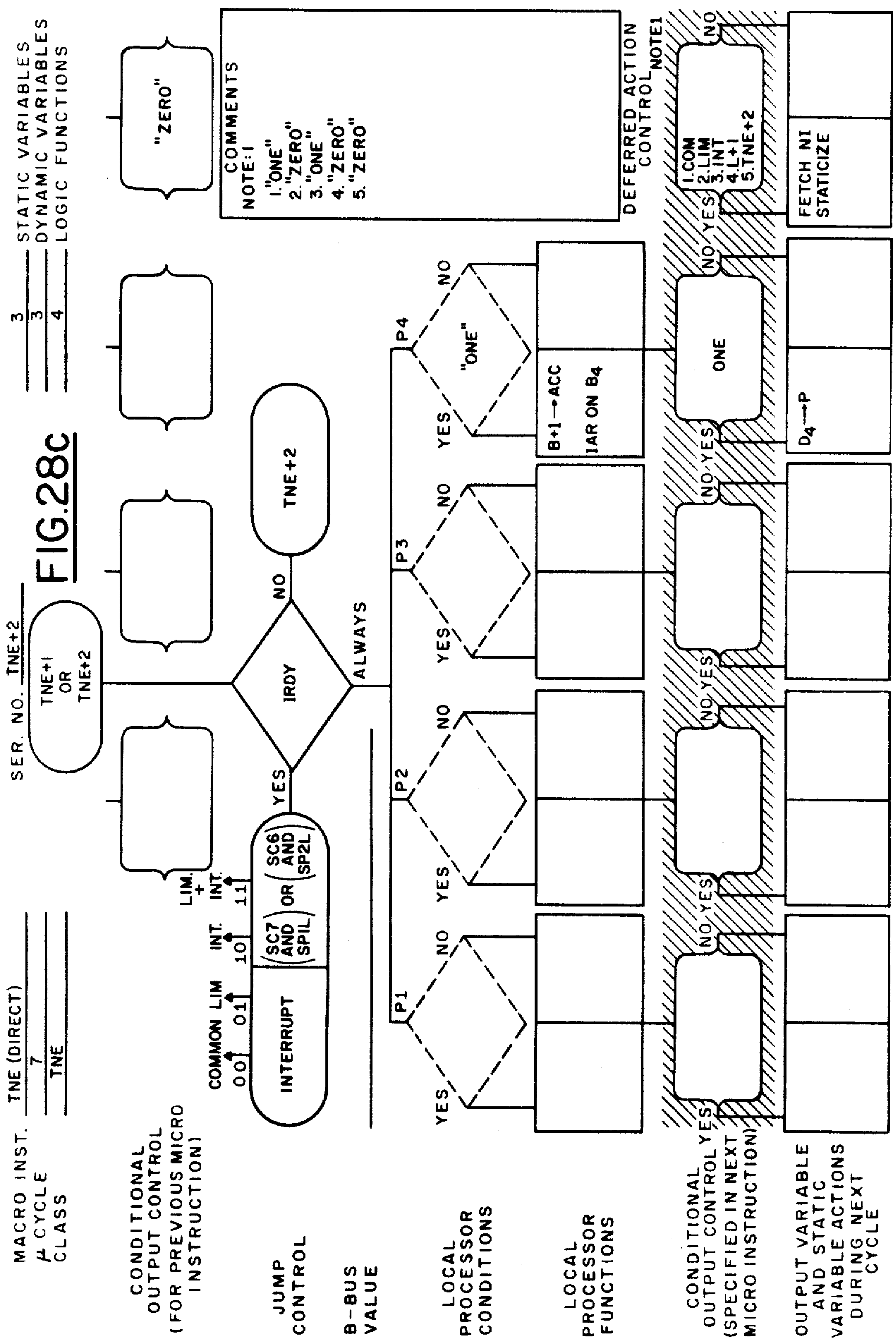

Referring now to FIGS. 27*a–c* and 28*a–c*, the micro routine for the skip and conditional branch (CB11) class base is depicted by the micro instructions of FIGS. 27*a–c* and the micro code for the specific macro instruction TEST NOT EQUAL (TNE) emulated with respect to this class base is depicted by the micro instructions of FIGS. 28*a–c*.

Figure 29A:
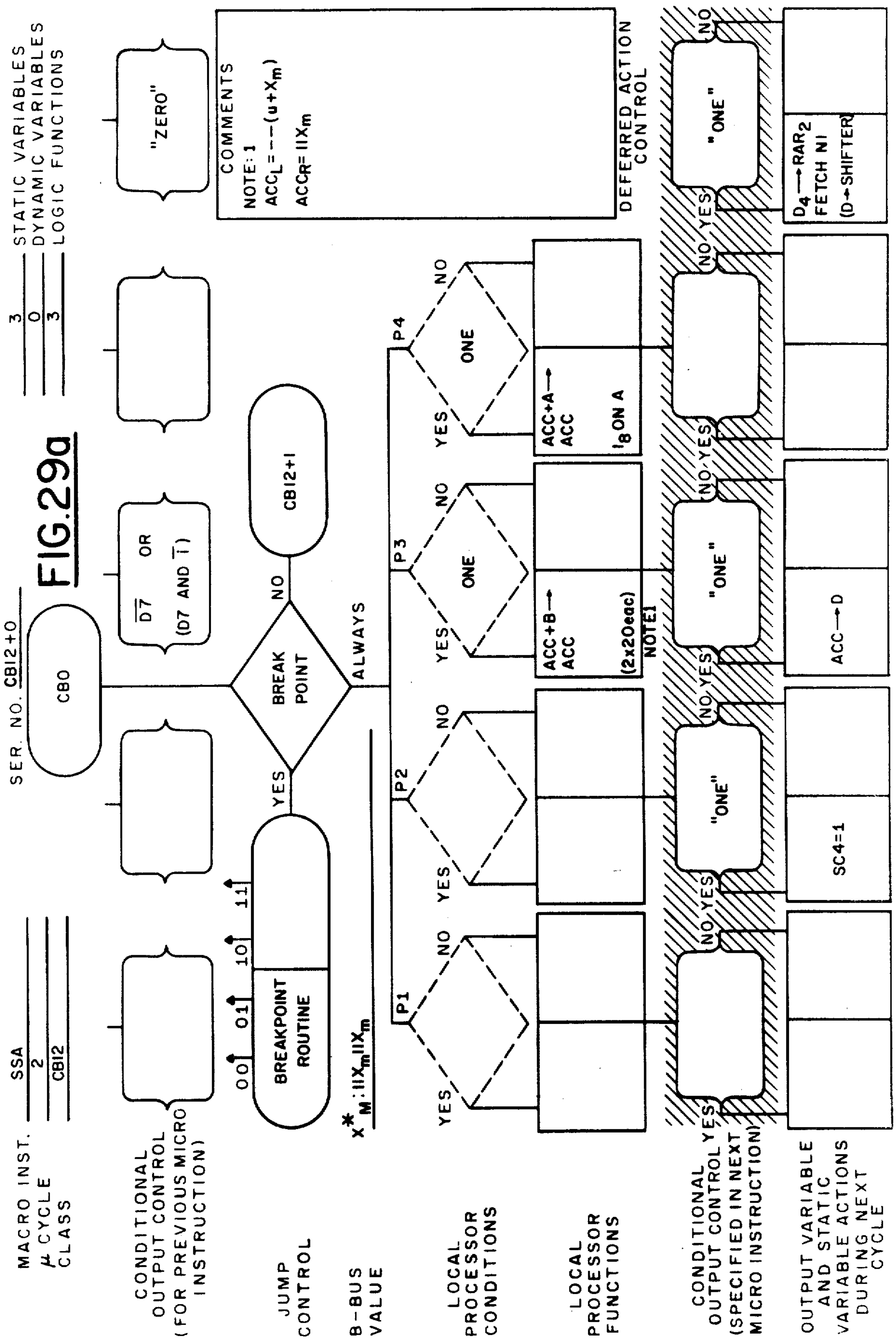
Figure 29C:
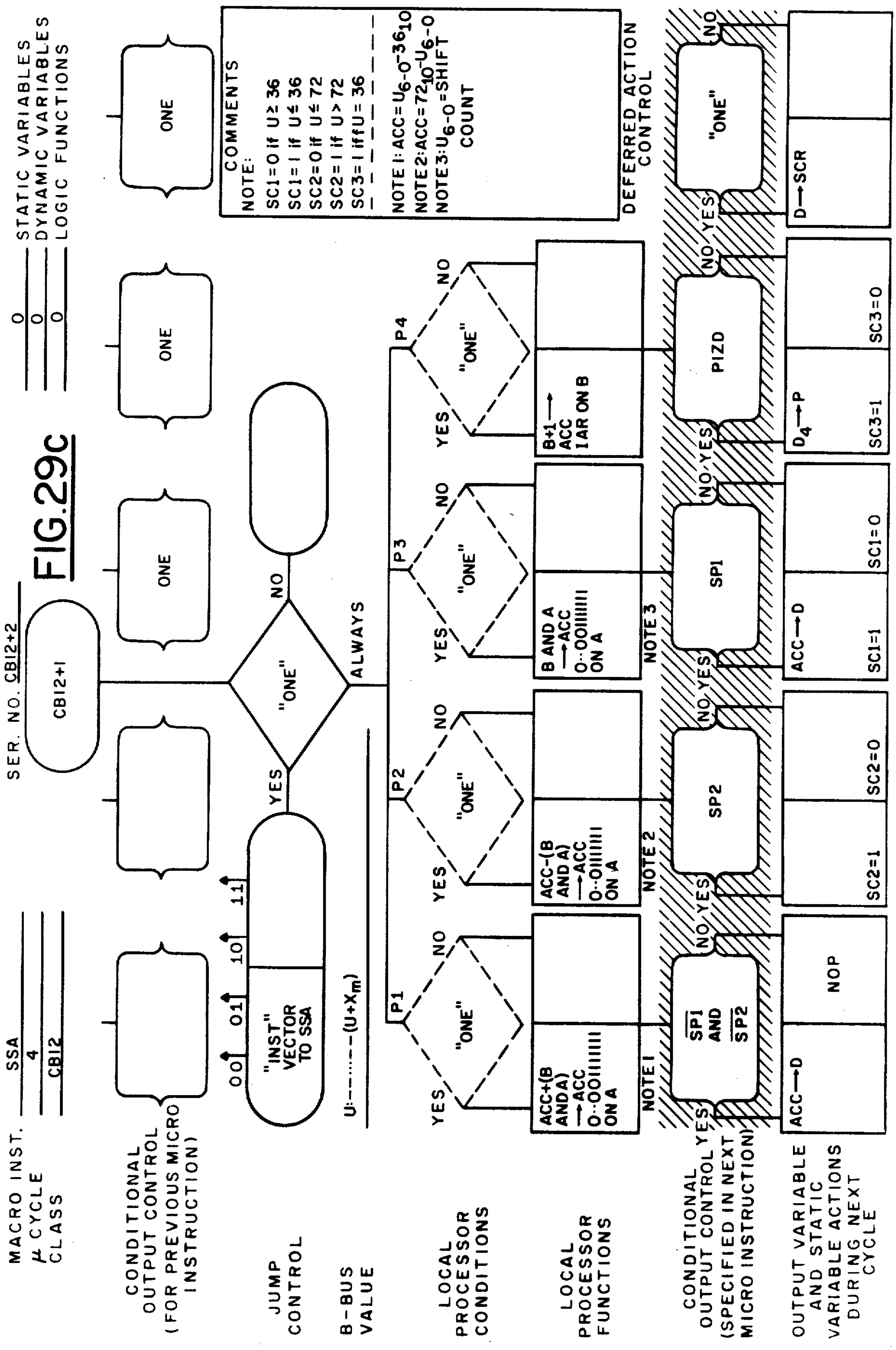
Figure 30A:
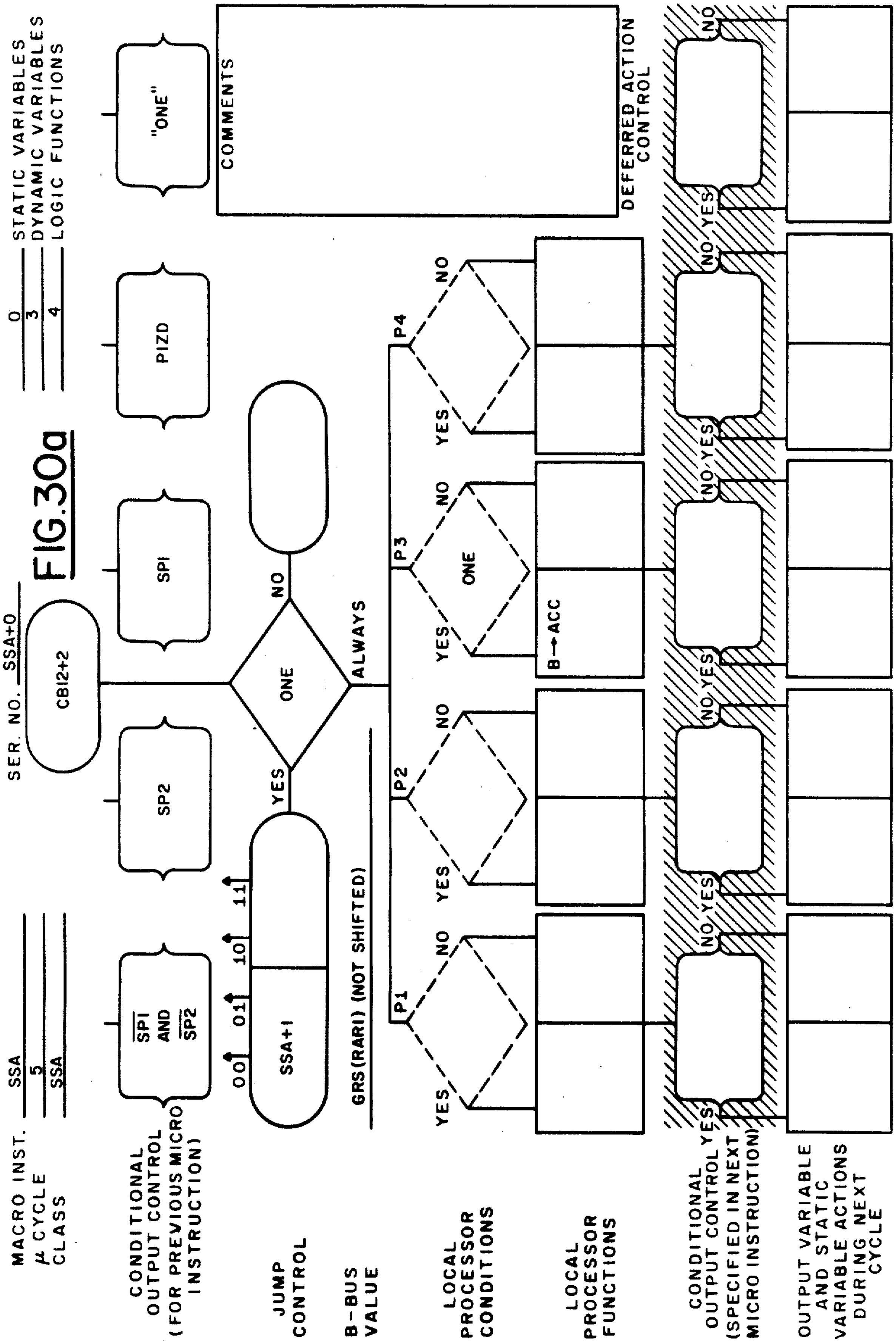
FIGS. 30a–b are flow diagrams depicting the micro routine for the SINGLE SHIFT ALGEBRAIC macro instruction.
Figure 30B:
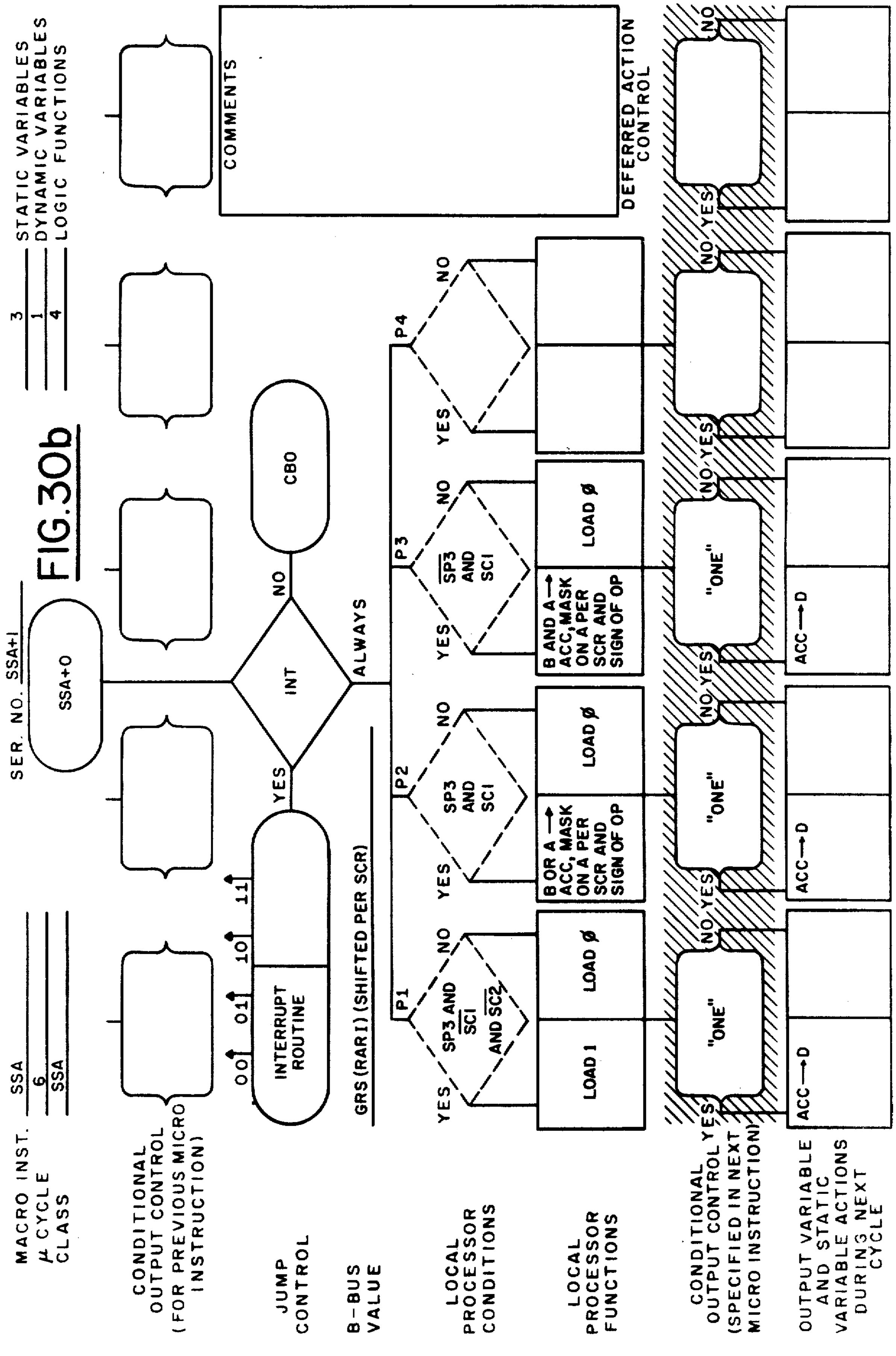

Referring to FIGS. 29*a–c* and FIGS. 30*a* and *b*, the micro routine for the SHIFT (CB12) class base is depicted by the micro instructions of FIGS. 29*a–c* and the SINGLE SHIFT ALGEBRAIC (SSA) emulation vectored to from the SHIFT class base is depicted in FIGS. 30*a* and *b*.

FIGS. 15–30 illustrate the micro instruction flow charts for the micro code to be stored in the control store 36 to provide the described particular 1108 macro instruction emulations. The specific code to be loaded into the control store 36 is readily derived using Tables 1–12, the Figures appended hereto and the descriptive material associated therewith.

As discussed above with respect to FIGS. 8 and 9, the logic function computers of FIG. 8 provide the decision point values for the solid diamonds, the jump control ovals, the dashed diamonds and the decision braces (FIG. 9) of the various micro instructions depicted in FIGS. 15–30. These decision blocks of the micro instruction flow charts, which have specific logic functions of specific variables, are implemented in the logic function computers of FIG. 8. For example, the logic function in the lower left hand decision brace of FIG. 16*a*, to wit: SC1 AND SP1R AND $\overline{\text{SP2R}}$, is stored as a folded truth table of the type discussed above with respect to FIG. 8 in a specific one of the logic function computers 114 (FIG. 8). The static variable SC1 is provided from the buffer 110 as selected by the SV fields of the micro instruction and is applied as the static variable input to the appropriate logic function computer selected by the LFC fields of the micro instruction. Similarly, the dynamic variables SP1R and SP2R are provided from the buffer 111 and selected by the DV fields of the micro instruction and applied to the associated function value selector of FIG. 8.

It will be appreciated from the foregoing description of the architecture of the CPU 10 and the structure of the components thereof that the CPU 10 is eminently suited to fabrication utilizing LSI micro processor type chips or slices. For example, the arithmetic and logic functionality required in the local processors 17, 18, 19 and 27 may be provided by a plurality of suitably interconnected commercially procurable micro processor chips or slices. Additionally, the orderly arrangement of the micro programmable control of the CPU 10 as compared to conventional random logic design lends itself to LSI construction.

Thus it is appreciated that because of the LSI micro processor implementation the CPU 10 is significantly smaller and less expensive than a conventionally configured computer with similar performance. Additionally, because of the architecture permitting execution of multiple micro instruction streams in emulating a single macro instruction stream; the three way micro instruction overlap with the real, phantom and deferred action conditional branching; as well as the novel table driven control logic, the CPU 10 not only provides the above described advantages of cost and size with respect to prior art computers, but additionally also exceeds the performance of such prior art computers with regard to mean time between failure, ease of repair and power dissipation.

CONFIGURATION CONTROL OF THE LOCAL PROCESSORS 17, 18 AND 19 (TWO TIMES 20 AND 36 BIT MODES)

As discussed above with respect to FIGS. 2 and 5, each of the local processors 17, 18 and 19 comprise ten 4 bit micro processor type slices such as that described above with respect to FIG. 6. Each of the local processors 17, 18 and 19, is configured to operate in either a 2×20 or 36 bit mode with or without end around carry in accordance with the configuration control CC field as described above with respect to FIG. 4. This arrangement is utilized since the 1108 main memory 11 provides 36 bit data and instruction words and the 1108 address range is 256 K words requiring 18 bit addresses. Thus, with the configuration control it is possible to utilize a local processor to perform 36 bit data computations and in a different microcycle to perform two 18 bit address computations. Thus, each of the local processors 17, 18 and 19, are 40 bit processors as described above, this size being required because the local processors are constructed from 4 bit slice chips, 5 such chips being required to compute one 18 bit address with proper access to sign, overflow and carry out indicators as discussed above with respect to FIG. 6. The configurations and connections for the 36 bit mode and the 2×20 bit mode will be separately described and thereafter the circuitry required for the combined configurations will be discussed.

Figure 31:
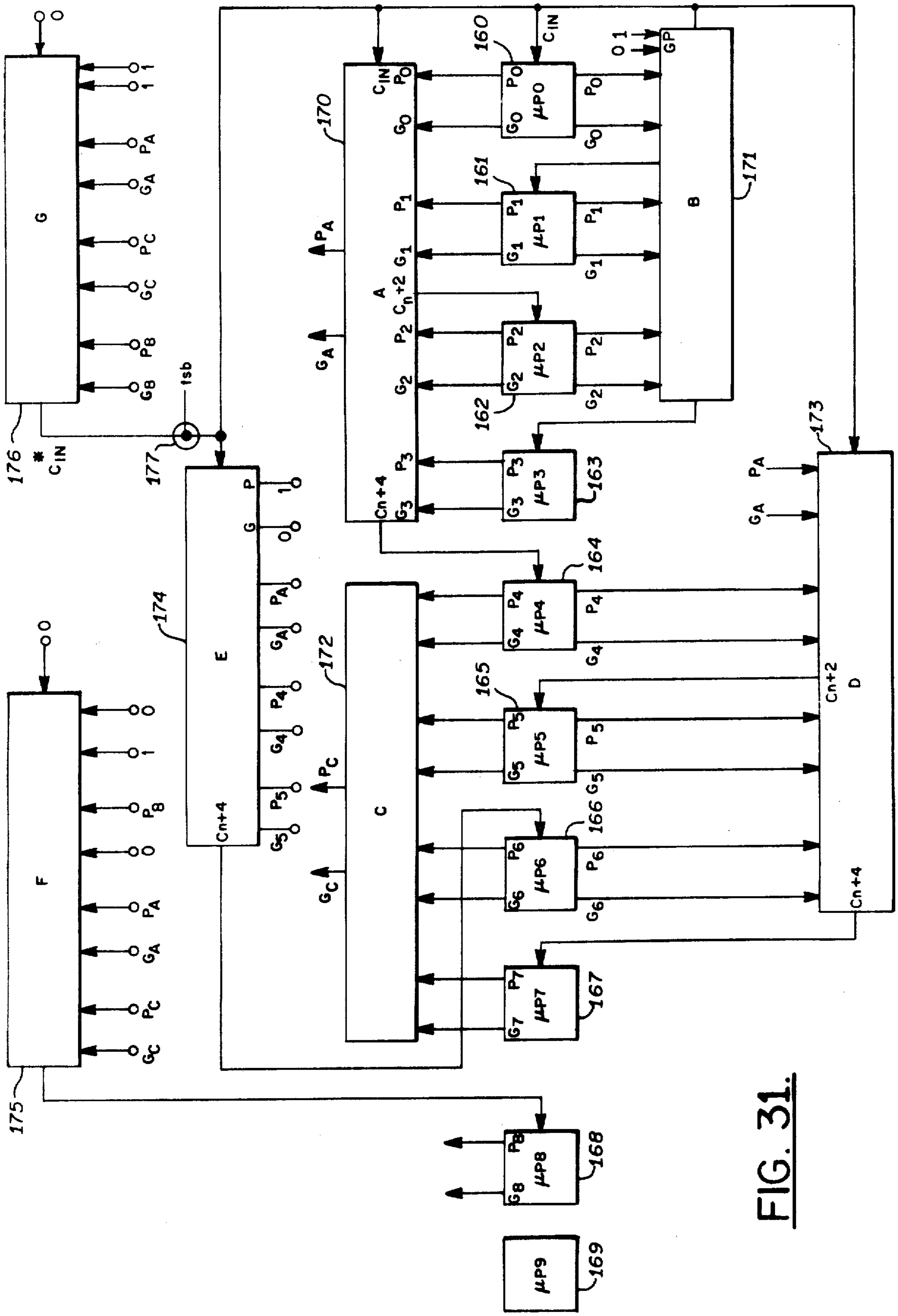
FIG. 31 is a schematic block diagram depicting details of the 36 bit mode of the local processors of the computer of FIG. 5.

Referring to FIG. 31, the configuration for the 36 bit mode is illustrated. As discussed above, each of the local processors 17, 18 and 19 are comprised of ten 4 bit microprocessor slices such as discussed above with respect to FIG. 6, the slices $\mu P_0$–$\mu P_9$ being designated by reference numerals 160–169, respectively. Each of the microprocessor slices 160–169 provides carry generate (G) and carry propagate (P) outputs as discussed above with respect to FIG. 6 and as designated by the subscripted legends associated with these outputs. In order to provide adequately fast computation speed, carry look ahead chips 170–176 are utilized in the local processors instead of ripple carry arrangements. Additionally, in a manner to be hereinafter described, an end around carry is utilized because 1108 data is represented in one's complement form and the microprocessor slices 160–169 utilized in the CPU 10 contain two's complement adders rather than the one's complement subtractive adders as utilized in the 1108 computer. When operating in the 36 bit mode, as illustrated in FIG. 31, the 36 bit data items entering the A and B ports of the local processor (FIGS. 2, 5 and 6) are right justified with respect to the 40 bit field so that only the slices 160–168 are utilized in this mode with the left most 4 bit slice 169 not being utilized.

With respect to each of the microprocessor slices 160–169, the G output is the group carry generate lead for the slice and the P output is the group carry propagate lead therefor with the right hand input to each slice being the carry in lead $C_{in}$ discussed above with respect to FIG. 6 and indicated by the legend with respect to the microprocessor slice 160. Considering any one of the slices $\mu P_i$, which contains bits $2^i$, $2^{i+1}$, $2^{i+2}$ and $2^{i+3}$, the four input bits of one operand may be designated as $X_0$, $X_1$, $X_2$ and $X_3$ and the four input bits of the other operand as $Y_0$, $Y_1$, $Y_2$ and $Y_3$. Thus for any bit w, $P_w$ is the propagate condition for that bit and $G_w$ is the generate condition. This may be expressed in Boolean equation form as: $P_w = X_w \oplus Y_w$ and $G_w = X_w \cdot Y_2$. Thus the propagate and generate signals for the chip may be expressed as:

$$P = P_0 \cdot P_1 \cdot P_2 \cdot P_3$$

$$G = G_3 + P_3G_2 + P_3P_2G_1 + P_3P_2P_1G_0$$

The carry look ahead circuits 170–176 are of conventional design and may conveniently be implemented by the Motorola look ahead carry chip MC10179 as fully described in "The Semiconductor Data Library", Series A. Volume 4, 1974, available from Motorola Semiconductor Products, Inc.

The carry look ahead chips 170–176 are connected with respect to the microprocessor slices 160–169 in the manner described in said Data Library. Each carry look ahead chip has inputs for the group carry generate and group carry propagate leads from four of the microprocessor slices as well as a carry input $C_{in}$. Each carry look ahead chip provides group propagate and group generate indicators for the input to the chip as well as two carry out indicators $C_{n+2}$ and $C_{n+4}$. For example, the carry look ahead chip 170 receives the group carry generate and group carry propagate signals from the microprocessors 160–163 designated as $G_0$, $P_0$, $G_1$, $P_1$, $G_2$ $P_2$ and $G_3$, $P_3$.

The chip 170 provides the group propagate and group generate indicators $G_a$ and $P_a$, respectively, for the inputs to the chip as follows:

$$G_a = G_3 + G_2P_3 + G_1P_2P_3 + G_0P_1P_2P_3$$

$$P_a = P_0 \cdot P_1 \cdot P_2 \cdot P_3$$

The $C_{n+2}$ carry out indicator generates a carry out signal based on the carry in $C_{in}$ and the propagate and generate signals from the two least significant microprocessors 160 and 161 as follows:

$$c_{n+2} = C_{in}P_0P_1 + G_0P_1 + G_0$$

The $C_{n+4}$ carry out indicator is based on $C_{in}$ and the generate and propagate leads from all of the input microprocessors 160–163 as follows:

$$C_{n+4} = C_{in}P_0P_1P_2P_3 + G_3 + G_2P_3 + G_1P_2P_3 + G_0P_1P_2P_3 = C_{in}P_a + G_a$$

The 36 bit mode configuration for the local processor as illustrated in FIG. 31 achieves maximum speed since the circuitry is designed whereby the $C_{in}$ signal for every microprocessor slice 160–169 is computed by the carry look ahead chips 170–176 rather than by utilizing a ripple carry from the preceding microprocessor slice, the carry look ahead signals being provided as illustrated. For example, the carry look ahead chip 175 provides the carry in signal to the microprocessor slice 168 as follows:

$$C_{in}(\mu P_8) = G_c + P_cG_a + P_8P_cP_a$$

The end around carry signal $C_{in}^*$ is provided by the carry look ahead chip 176 to the $C_{in}$ inputs to the microprocessor slice 160 and the carry look ahead chips 170, 171, 173 and 174. The end around carry signal, $C_{in}^*$, has two components, one component being contributed by a carry out from the microprocessor slice 168. However, rather than wait for the carry out to be generated by the slice, it is computed from $G_8$, $P_8$ and the other computed group generates and propagates illustrated as inputs to the chip 176. There will be a carry out of the microprocessor slice 168 if $G_8$ is a logical one or if $P_8$ is a logical one and there is a carry in to the slice 168 from the other slices. Thus, there will be a carry in to the slice 168 if the microprocessor slices 164–167 generate a carry, or if the microprocessor slices 160–163 generate a carry and the slices 164–167 propagate this carry. In other words, there will be a carry in to the slice 168 (not generated by the end around carry) in accordance with $G_c + P_cG_a$ and there will thus be a carry out of slice 168 in accordance with $G_8 + P_8(G_c + P_cG_a)$.

The other component of the end around carry results from a negative zero (all ones) being generated by the microprocessor slices 160–168. In this instance an end around carry signal is required to change the all ones to all zeroes for reasons to be discussed. Since $P_a = P_0 \cdot P_1 \cdot P_2 \cdot P_3 \cdot P_c = P_4 \cdot P_5 \cdot P_6 \cdot P_7$, and the propagate signal of a microprocessor slice is a logical one if, and only if, the result, without a carry in is all ones, the condition for this end around carry is $P_a \cdot P_c \cdot P_8$.

Thus, the $c_{in}^*$ signal is generated by the carry look ahead chip 176 as follows:

$$C_{in}^* = G_8 + P_8(G_c + P_cG_a) + P_aP_cP_8$$

The $C_{in}^*$ is combined with the tsb signal at a wired AND connection 177 for reasons to be hereinafter discussed.

Figure 32:
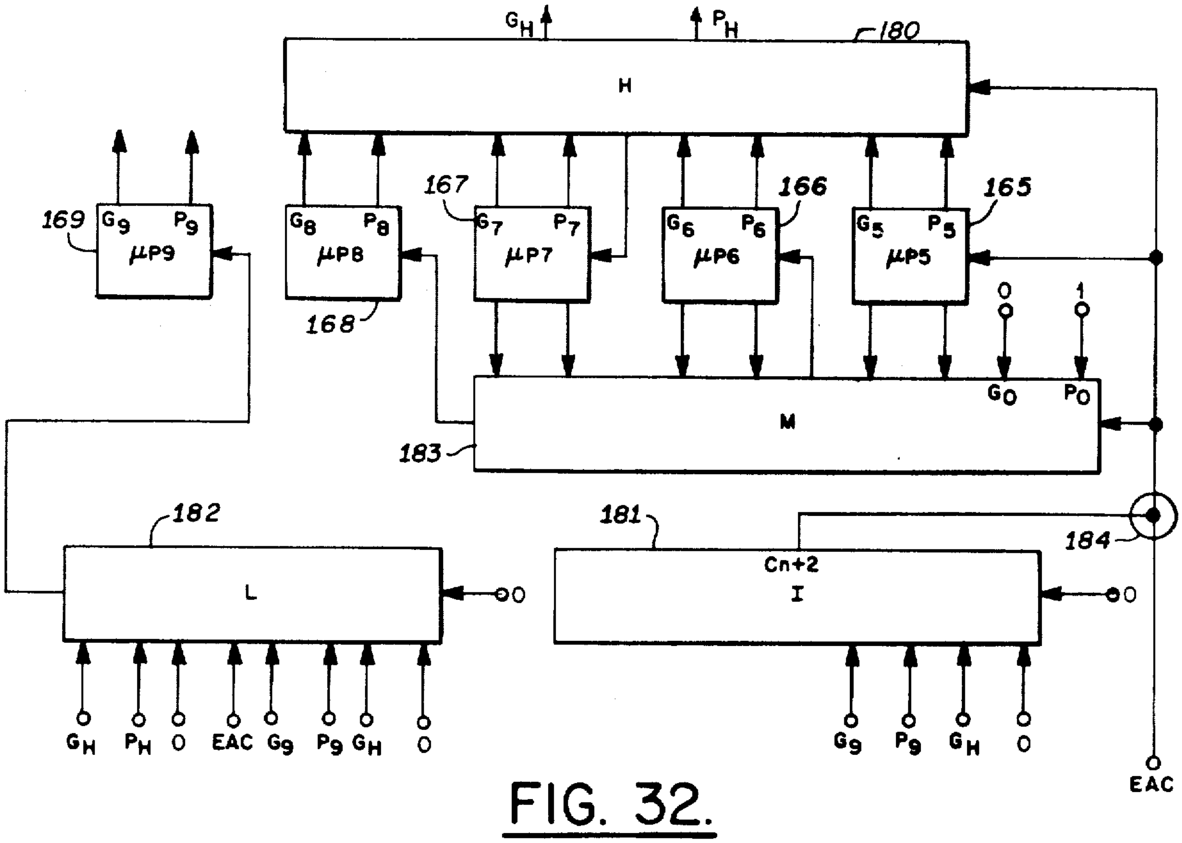
FIG. 32 is a schematic block diagram illustrating details of the 2×20 bit mode of the local processors of the computer of FIG. 5.

In the 2×20 mode, the 40 bit local processor is configured as two 20 bit processors that perform the same function in response to the LPFT or LPFF fields but on different data provided at the A and B ports. Referring to FIG. 32 in which like reference numerals indicate like components with respect to FIG. 31, the left hand 20 bit processor is illustrated comprised of the microprocessor slices 165–169. Carry look ahead chips 180–183 are utilized in a manner and for reasons similar to those discussed above with respect to FIG. 31 and are identical to the carry look ahead chips 170–176. For reasons similar to those discussed above with respect to the 36 bit mode, an end around carry signal is provided to the carry in inputs of the microprocessor slice 165 as well as to the carry look ahead chips 180 and 183. The end around carry for the left half 20 bit processor is provided by the carry look ahead chip 181 in accordance with $G_9 + P_9G_h$. This signal is applied through a wired AND gate 184 under control of the eac signal to be described. The output of the carry look ahead chip 182 to the carry in input of the microprocessor slice 169 is as follows:

$$C_{in}(\mu P_9) = G_h + (G_9P_h + G_hP_hP_9)\text{eac} = G_h + \text{eac}(G_9 + P_9G_h)P_h$$

It is appreciated that the expression $(G_9 + P_9G_h)$ is the $C_{end\text{-}around}$ signal provided by the $C_{n+2}$ carryout indicator from the chip 181.

When the local processor is operating in the 2×20 mode, the right hand 20 bit processor is provided by the microprocessor slices 160–164 and the carry look ahead chips 170 and 171 of FIG. 31. In the 2×20 mode, the signal tsb equals zero and therefore logical zero is provided as the carry in inputs to the microprocessor slice 160 as well as to the chips 170 and 171. Thus, the right hand half of each of the local processors 17, 18 and 19 (FIGS. 2 and 5) operate without an end around carry.

Figure 33:
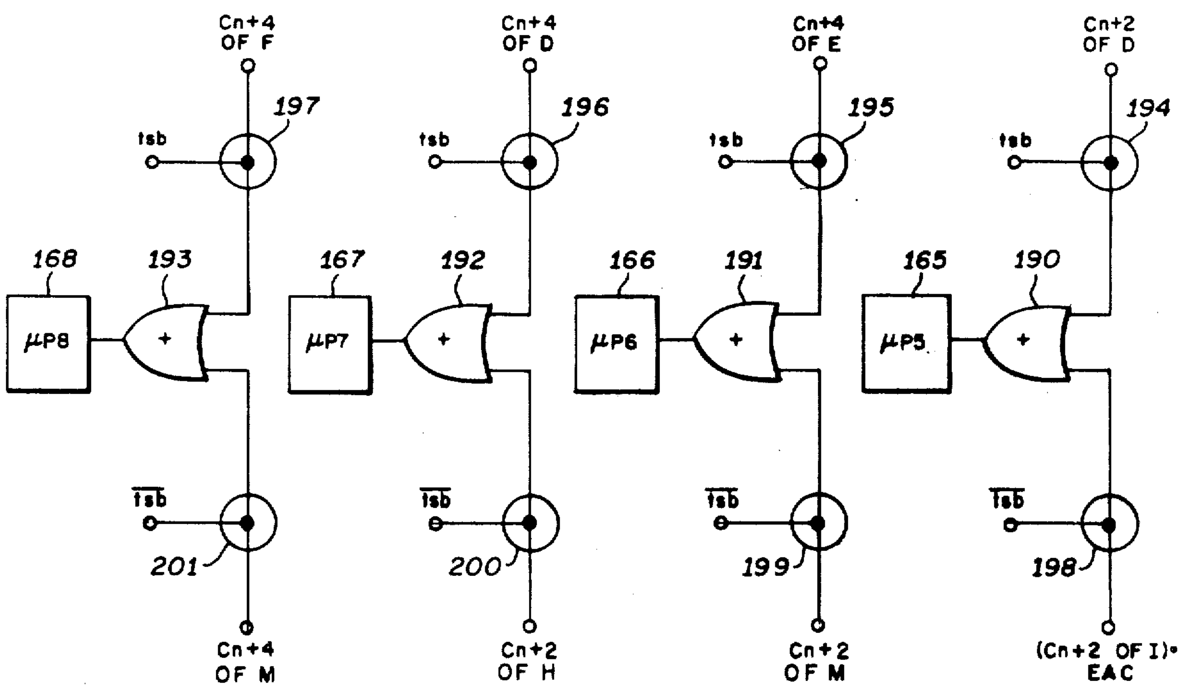
FIG. 33 is a schematic diagram illustrating the logic for combining the configurations of FIGS. 31 and 32.

The configuration for the 36 bit mode described with respect to FIG. 31 and the configuration of the 2×20 bit mode described with respect to FIG. 32 are combined by utilizing the arrangement of FIG. 33 where like reference numerals indicate like components with respect to FIGS. 31 and 32. As discussed above with respect to FIG. 4, the CC micro control field provides two bits which are designated tsb (36 bit mode) and eac (end around carry) which control the configuration of the local processor as follows:

| Bit | NMENONICS | Meaning |
|---|---|---|
| 1 | tsb | Use thirty six bit configuration if bit = 1, else use 2 × 20 bit conf. |
| 2 | eac | If in 2 × 20 mode perform end around carry on left half if eac = 1, else do not do end around carry |

as previously described with respect to Table 7.

The carry in inputs to the microprocessor slices 165–168 provided in the 36 bit mode by the arrangement of FIG. 31 and in the 2×20 bit mode by the arrangement of FIG. 32 are OR'ed together to provide the combined inputs via OR gates 190–193 respectively. The appropriate outputs, from the carry look ahead chips of FIG. 31, as indicated by the legends, are provided through wired AND gates 194—194, to provide one input to the respective OR gates 190–193. The carry look ahead signals from FIG. 32, as indicated by the legends, are applied through wired AND gates 198–201 to provide the second input to the respective OR gates 190–193. The tsb signal is applied as the second input to each of the AND gates 194–197 and the inverse thereof is applied as the second input to the AND gates 198–201. Thus, it is appreciated, that in the 36 bit mode the tsb signal enables the gates 194–197 while the $\overline{tsb}$ signal disables the gates 198–201. Conversely, in the two times 20 mode, the $\overline{tsb}$ signal enables the gates 198–201 while the tsb signal disables the gates 194–197. Additionally, as discussed above with respect to FIG. 31, the tsb signal enables $C_{in}^*$ into the circuit in the 36 bit mode and disables $C_{in}^*$ in the 2×20 mode. In FIG. 32, the eac signal enables the end around carry into the left half processor in the 2×20 mode for control of the arithmetic processes.

Each of the local processors 17, 18 and 19 include the configuration control and carry look ahead circuitry discussed with respect to FIGS. 31–33. The 20 bit local processor 27 is constructed in accordance with the right half configuration illustrated in FIG. 31 comprising the microprocessor slices 160–164 and the carry look ahead chips 170 and 171, with the carry inputs to the components 160, 170 and 171 having logical zero applied thereto.

Figure 34:
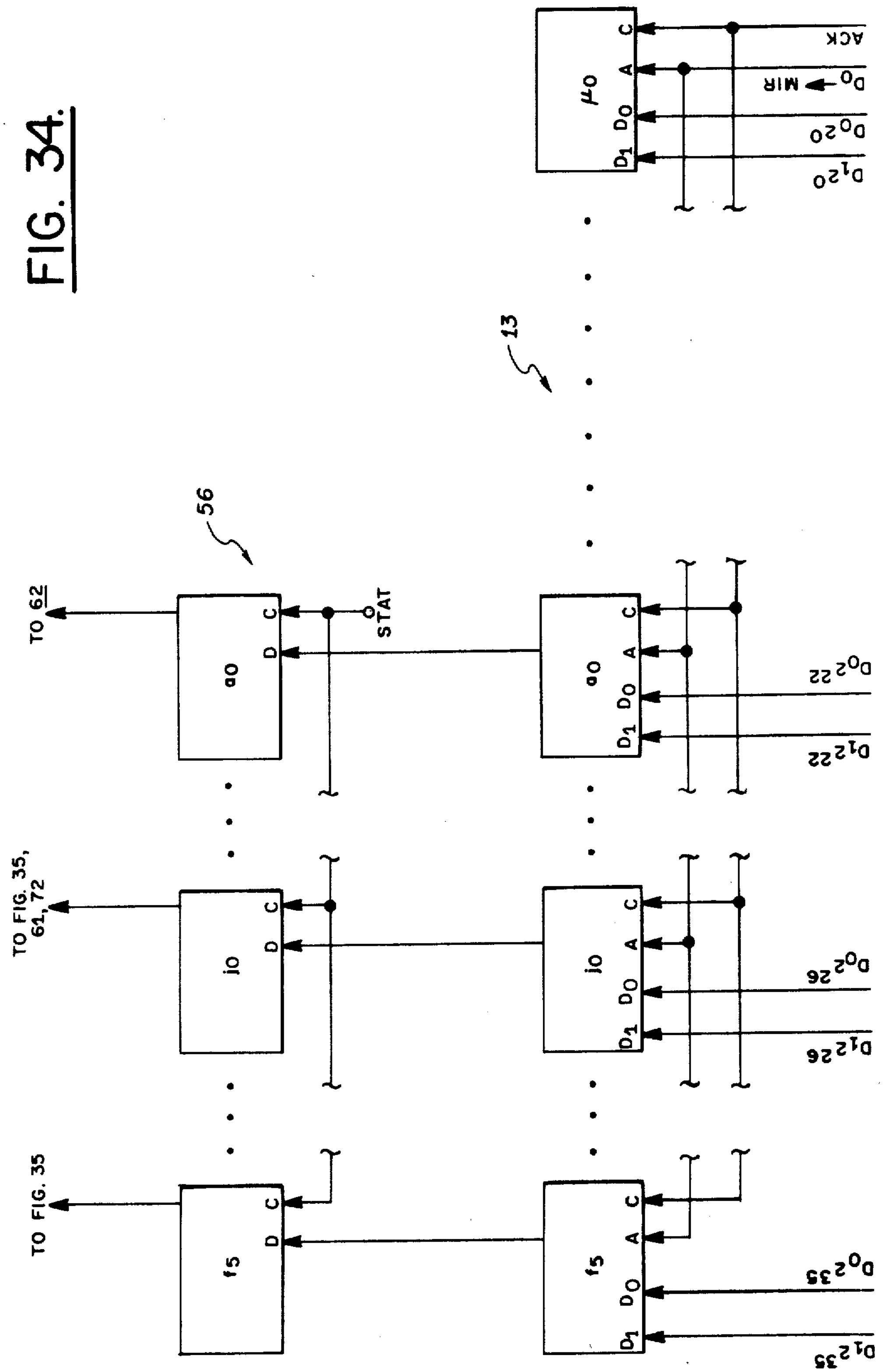
FIG. 34 is a schematic block diagram illustrating details of the macro instruction register and staticizer register of the computer of FIG. 5.

Thus, it is appreciated that each local processor 17, 18 and 19 can be configured to operate as one 36 bit processor or as two independent 20 bit processors, the circuitry of FIG. 34 effecting the isolation between the processor halves when operating in the 2×20 mode.

Since the 1108 data provided to the local processors 17, 18 and 19 are in one's complement format and the ALU slices utilized to implement the local processors are configured for two's complement arithmetic, the end around carry signals described are utilized to provide the proper arithmetic results. For example, as discussed above with respect to FIG. 32, the end around carry signal $G_9P_h+G_hP_hP_9$ provides the required end around carry signal. With respect to FIG. 32, the required end around carry signal for the one's complement arithmetic is provided by the $G_8+P_8(G_c+P_gG_a)$ component of the $C_{in}^*$ signal. The $P_aP_cP_8$ component of $C_{in}^*$ is utilized to suppress the all one's negative zero representation as fully described in U.S. patent application Ser. No. 763,745, filed Jan. 28, 1977 in the names of Barry R. Borgerson and Garold S. Tjaden entitled "A One's Complement Subtractive Arithmetic Unit Utilizing Two's Complement Arithmetic Circuits" issued on July 4, 1978 as U.S. Pat. No. 4,099,248 and assigned to the present assignee.

It will be appreciated with respect to the configuration control and carry propagation arrangements described with respect to FIGS. 31–33 that numerous other designs may be utilized in the local processors of the CPU 10 although the disclosed design is an especially fast one.

Thus, it is appreciated from the foregoing that in the 36 bit mode the local processors 17, 18 and 19 are utilized for full word data computations whereas in the 2×20 mode, 18 bit address computations are efficaciously performed. The 20 bit local processor 27 is also primarily utilized with respect to address computations. The local processor 27 may be utilized for incrementing the macro P register 31, for providing a 100 nanosecond timer for indirect chains and EXECUTE chains and for computing the absolute address of the register of the general register stack 32 pointed at by the a field of the macro instruction as discussed with respect to the instruction status table 38.

DETAILED LOGIC CIRCUITS

Referring to FIG. 34 details of the multiplexer 54, the AND gates 58, the macro instruction register 13 and the staticizer register (FIG. 5*b*) are illustrated. The macro instruction register 13 is comprised of 36 dual input D-type flip flop stages corresponding to the macro instruction fields illustrated in FIG. 1. Each stage of the register 13 receives its corresponding bits from the two memory banks ($D_1$ and $D_0$), the selection therebetween being effected by the $D_0 \rightarrow$MIR signal applied to the A inputs of all of the stages of the register. The appropriately selected data is clocked into the register 13 by means of the ACK signal applied to the clock inputs of the stages. Thus, it is appreciated that the functions of the multiplexer 54 and the AND gates 58 illustrated as discrete components in FIG. 5*b* may be conveniently implemented by the illustrated connections to the integrated circuit components.

The outputs from the a, j and f stages of the macro instruction register 13 are applied to corresponding stages of the staticizer register 56 which is comprised of fourteen single input D-type flip flops. The a, j, and f field information is transferred to the staticizer register 56 by means of the STAT signal applied to the clock inputs of the register stages. The outputs from the f and j stages of the register 56 are applied to logic to be described with respect to FIG. 35 for providing the address into the IST memory 38. The j stages of the register 56 are also connected to the adder 72 (FIG. 5a ) for the reasons discussed above with respect to B-bus input selection. The j and a stages of the register 56 are connected respectively to the multiplexers 61 and 62 (FIG. 5c) to provide data to the B port of the local processor 27.

Figures 35, 35A:
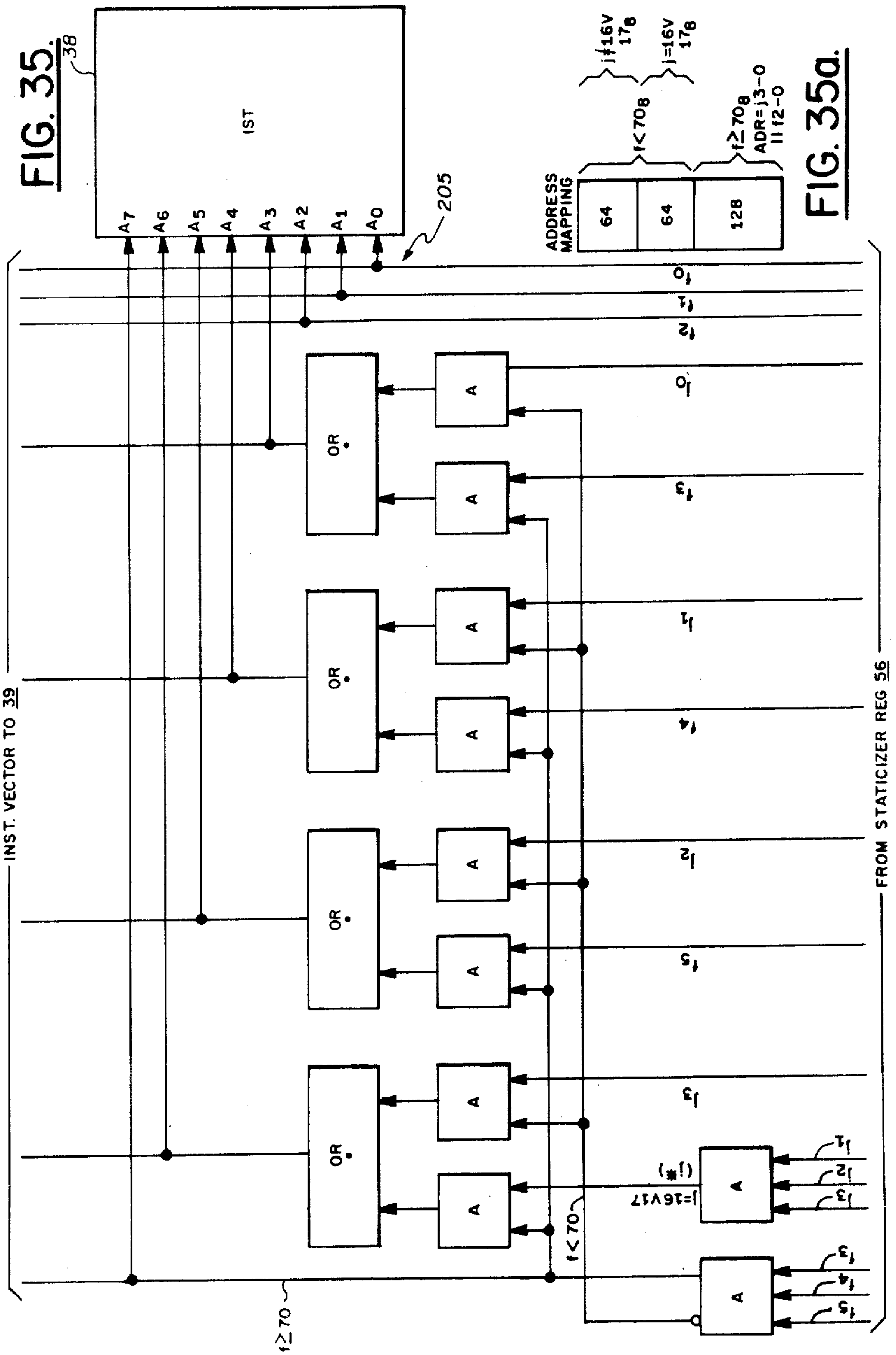
FIG. 35 is a schematic diagram illustrating the logic for addressing the instruction status table of the computer of FIG. 5
FIG. 35a is a memory map of the instruction status table.

Referring to FIG. 35 logic circuitry 205 responsive to the outputs from the staticizer register 56 for providing the address input to the instruction status table 38 as well as for providing the instruction vector to the multiplexer 39 is illustrated. The logic 205 forms the IST address as well as the instruction vector in accordance with the above discussion of FIG. 5 with respect to the IST 38.

As discussed above, the instruction status table 38, which is implemented by a prom, is 256 words along and 10 bits wide providing the above-described fields GB, CB, FOS, SL and MC. The IST 38 decodes the 1108 macro instruction format for the efficacious emulation thereof with the IST address being provided by the f and j fields of the macro instruction being emulated. The memory map of FIG. 35a illustrates the allocation of the memory to the major sub sets of the 1108 macro instructions. The number in each cell represents the number of decimal words reserved for each group of function codes as illustrated by the legends to the right of the map. Macro instructions with an f field of less than 70 octal appear in two locations; one location when an immediate operand is called for and another when an immediate operand is not called for. The IST 38 contains one word for each macro instruction with an f field equal to or greater than 70 octal.

The GB (GRS base address) output field from the IST 38 is utilized in computing the absolute address of the different types of GRS registers indicated by the 1108 a field coding, i.e., X, A, R, and EXEC versus user set (the D6 bit in the processor state word). The absolute address of the register pointed at by the X field is provided by the connection from the X field portion from the macro instruction register 13 to the GRS addressing multiplexers 77 and 78 with the D6 bit concatenated thereto at 95. As previously described, one of the sources for the address to the local memory 28 (FIG. 5c) is the GB field from the IST 38 concatenated with the D6 bit and bit 3 of the LMA field from the micro control store 36. The memory address derived in this manner provides the locations for the base of the desired register set. With LMA bit 3 set to 0 the GB field of the words stored in the IST may be coded to provide the following pattern:

| USE | D6 | GB | LM ADR | CONTEBTS OF LM |
|---|---|---|---|---|
| LA | 0 | 00 | 0000 | $14_8$ |
| LX | 0 | 10 | 0001 | 0 |
| LR | 0 | 10 | 0010 | $100_8$ |
| JGD | 0 | 11 | 0011 | 0 |
| LA | 1 | 00 | 0100 | $154_8$ |
| LX | 1 | 01 | 0101 | $140_8$ |
| LR | 1 | 10 | 0110 | $120_8$ |
| JGD | 1 | 11 | 0111 | 0 |

At the same time that the above address is provided to the local memory 28, the a field from the staticizer register 56 of the macro instruction being emulated is gated to the $B_4$ bus for the local processor 27 (BBS=0). The local processor 27 adds the base provided to its A port from the local memory 28 with the offset (the a field) the result being the absolute address of the desired GRS register. The result is stored in RAR 1 and retained there for the duration of the particular emulation. These operations are performed under the control of the common micro instruction as discussed above with respect to FIG. 15. The local processor 27 then adds the constant 1 to its micro accumulator to permit access to the second A register for double length instructions, this value being stored in RAR 2. These operations are controlled by the first micro instruction of many of the class bases, as for example illustrated in FIG. 16a and discussed above with respect thereto. Alternatively, the constant 1 can be added by utilizing the appropriate bit of LPFF or LPFT from micro control store 36 into the $C_{in}$ input of the local processor 27.

In the emulation of the JUMP GREATER AND DECREMENT macro instruction, the associated word in the IST memory 38 has the GB field set to 11 and with BBS from micro control store 36 equal to 0, the j field concatenated with the A field is gated to the $B_4$ bus 29 (Table 9).

As discussed above with respect to Table 11, the class base field (CB) from the IST memory 38 provides a broad categorization of the types of macro instructions emulated. It will be appreciated that the eight classes shown in Table 11 (the common micro instruction not being a true class) are doubled to 16 classes by the i bit (indirect bit) of the macro instruction. It will be appreciated that the IST 38 (FIG. 35) may be implemented from commercially procurable PROM chips. An instruction not ready signal ($\overline{IRDY}$) may be applied to the chip enable (CE) inputs to the chips so that the CB vector will form a tight loop, i.e., CB will be provided as class base 0. The $\overline{IRDY}$ signal is derived from the IRDY latch to be later discussed with respect to the FETCH NI signal from the DAC latches 250 of FIG. 42.

The fetch on staticize bit (FOS) from the IST 38 if set to 1 begins the fetch of the next macro instruction as soon as possible within an emulation. The bit is set to 0 to avoid fetching the next instruction on a jump instruction where the address of the next instruction has not yet been computed.

For the situations where FOS=1, conventional hardware is included within the control circuits 41 (FIG. 5a) to detect the presence of the 1 utilizing an edge detector driven by the FOS bit in IST memory 38. The edge detector is inhibited during the access time of IST to avoid false detection. When FOS is detected, the hardware transfers P→IARO and fetches the next instruction in accordance with the address in IARO. When FOS is 0, the FETCH NI bit 13 in the DAC table discussed above with respect to FIG. 7 is utilized to request the macro instruction during a particular micro cycle, which level of control is particularly useful in the emulation of jump instructions as well as in the situations discussed above with respect to the FOS bit.

The shift left bit (SL) from the IST memory 38 is set to 1 for the shift left macro instructions and is provided as the high order bit to the shift control register 69 (FIG. 5a) on a D→SCR transfer as indicated at 74.

The mask control field (MC) from the IST memory 38 is utilized to control inversion of the masks contained in the local memories 24, 25 and 26 (FIG. 5) in accordance with table 12 above. For example, let MC=01 and a particular mask be $000777777777_8$, then this mask is provided to the A bus of the associated processor. If, however, MC=10 the complementer interposed between the local memory and the A port of the local processor provides the complement of the mask to the A port of the processor which complemented mask in the example given would be $777000000000_8$. Thus, a single mask may be utilized to mask off (AND) the left most 1 bits ( a right logical shift) or mask off the right most 1 bits (a left logical shift). If MC=11 the mask is selectively complemented in accordance with the sign of the operand to, inter alia, provide sign extension on partial word operands.

Figure 5B:
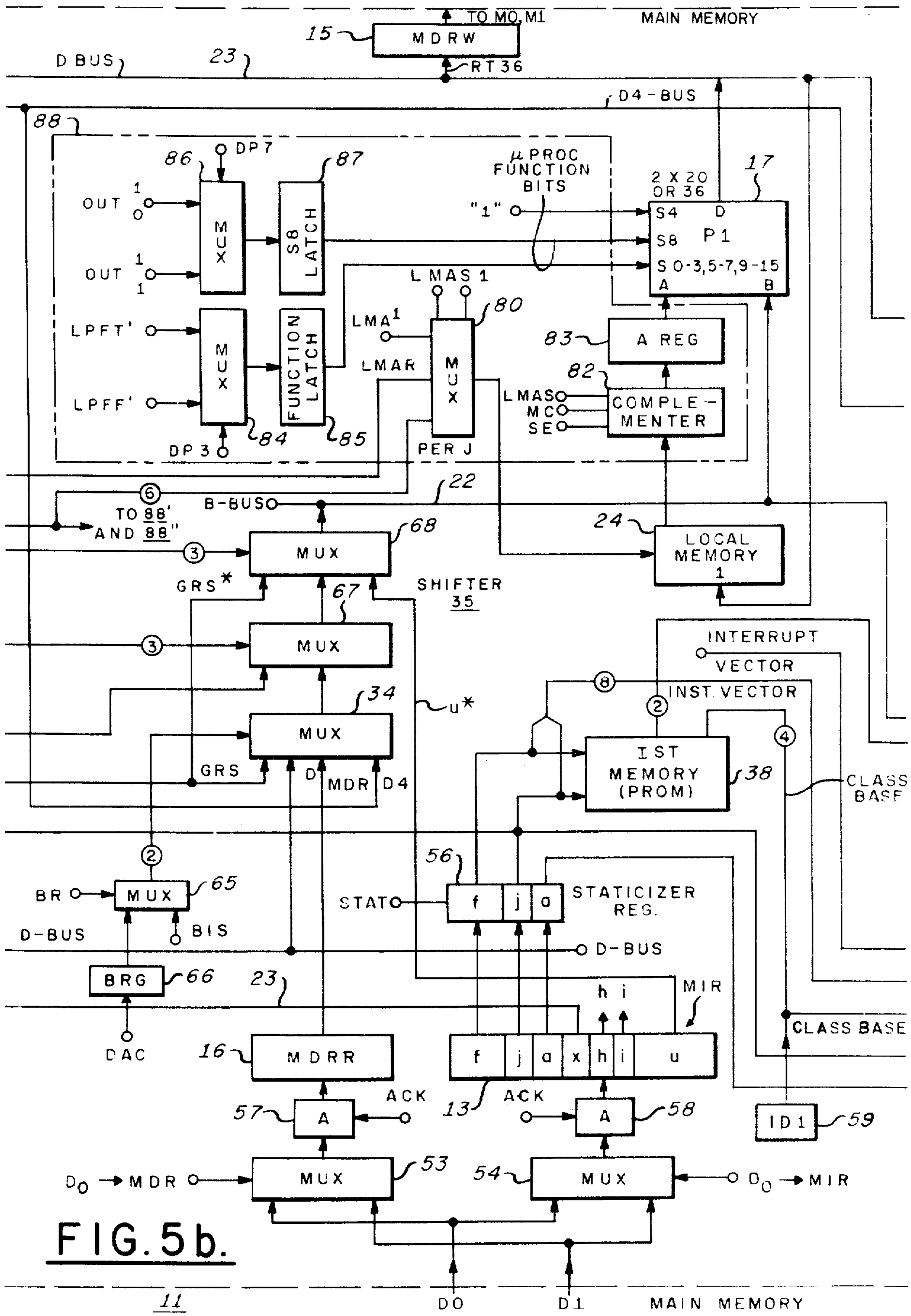
Figure 5C:
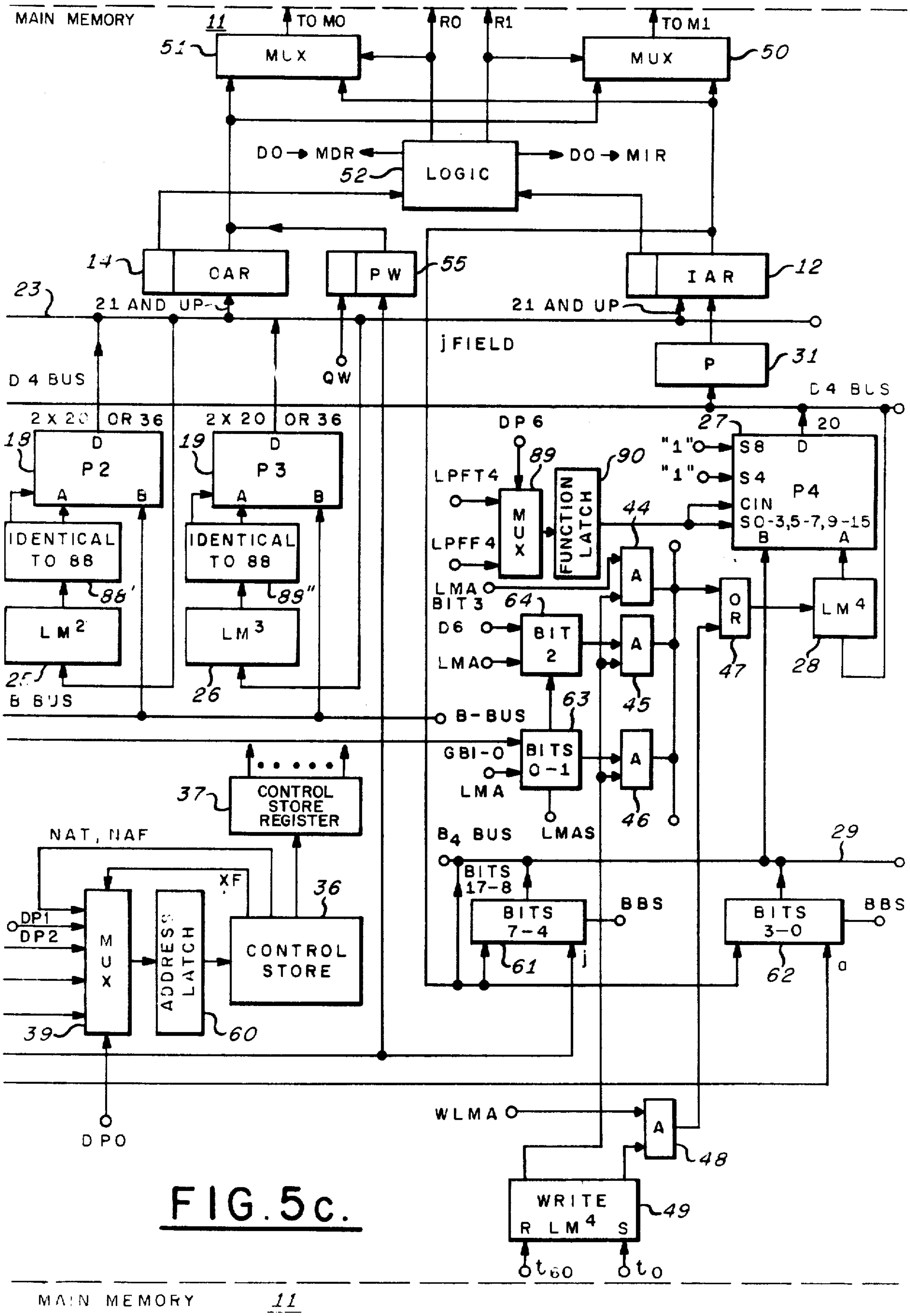
Figures 36, 36A:
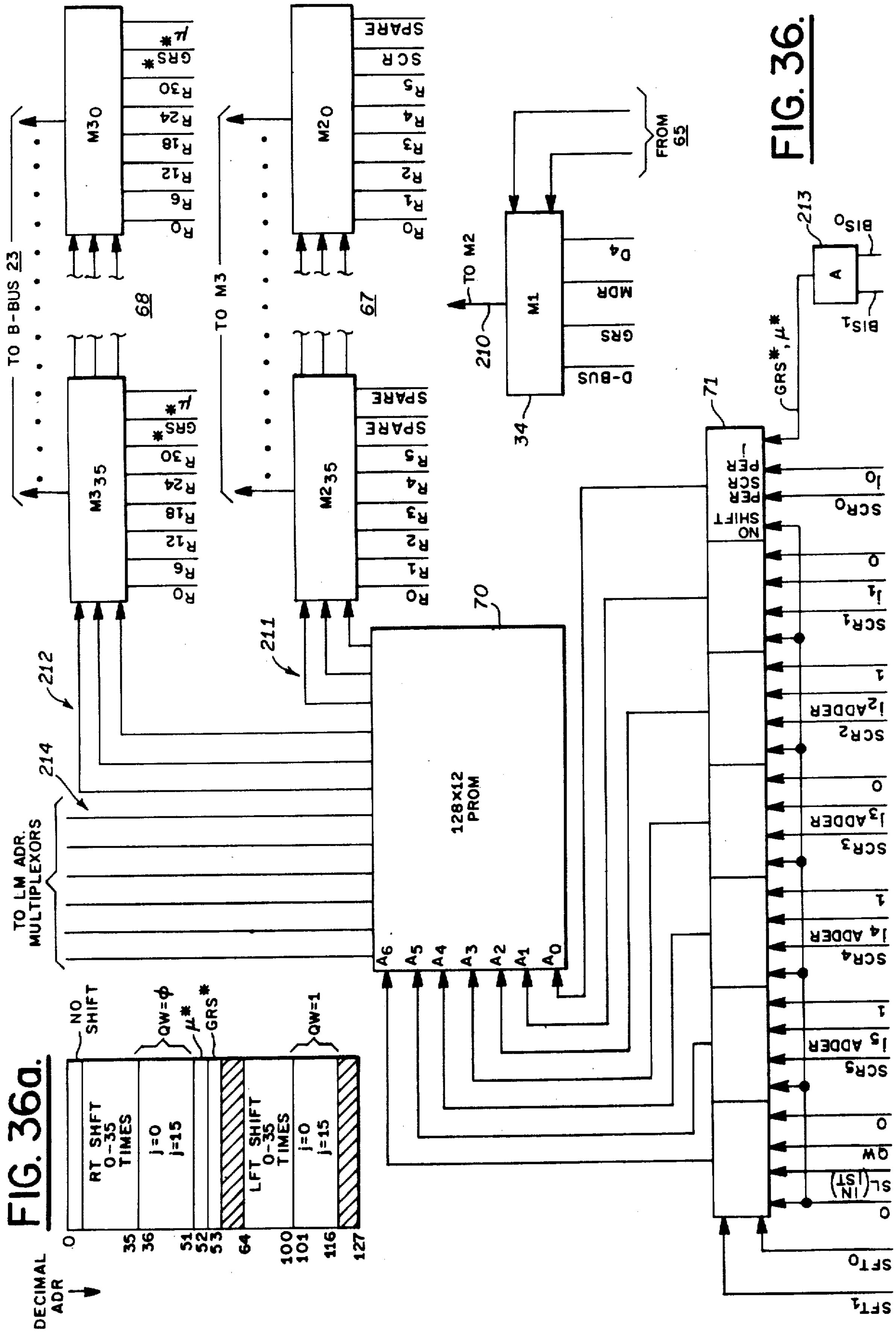
FIG. 36 is a schematic block diagram illustrating details of the B bus input multiplexer, the high speed shifter, the shift/mask address memory and the address multiplexer therefor
FIG. 36a is a memory map for the shift/mask address memory.

Referring to FIG. 36, details of the multiplexer 71, the shift/mask address prom 70, the B bus input multiplexer 34, and the high speed shifter 35 comprised of multiplexers 67 and 68 are illustrated. The multiplexer 34 comprises 36 4-to-1 multiplexers, where the input selection is effected by the two leads from the multiplexer 65 (FIG. 5*b*). The 36 bits of each of the designated inputs vis. B bus, GRS, MDR and D4 are connected to the inputs of the respective 36 multiplexers. The outputs 210 comprise the 36 outputs from the 36 respective multiplexers, comprising the multiplexer 34.

The high speed shifter 35 consists of two levels of multiplexers 67 and 68, each level comprising 36 8-to-1 multiplexer chips as illustrated. The multiplexer 67 comprises chips $M2_0$ through $M2_{35}$ and the multiplexer level 68 comprises chips $M3_0$–$M3_{35}$. The select inputs to the multiplexers 67 are provided by the three output leads 211 from the memory 70 and the input selection for the multiplexers 68 is effected by the leads 212 from the memory 70. The 36 outputs from the multiplexers 34 are connected to the inputs of the multiplexers 67 whereby the 36 input bits are transmitted to the 36 outputs of the multiplexers 67 right shifted by 0, 1, 2, 3, 4 or 5 positions in accordance with the input selection effected by the leads 211. In a similar manner, the 36 outputs from the multiplexers 67 are connected to the inputs of the multiplexers 68 whereby the bits are transmitted in parallel to the 36 outputs of the multiplexers 68 right shifted by 0, 6, 12, 18, 24 or 30 additional positions in accordance with the input selection effected by the leads 212. The connections amongst the multiplexer levels M1, M2 and M3 are such that a right circular shift of the data transmitted therethrough can be controlled from 0–35 positions by means of the multiplexer address inputs 211 and 212. The effect of a left circular shift is accomplished by the complementary right shift.

The interconnections amongst the multiplexers 34, 67 and 68 for effecting the controlled high speed parallel shift are generally well known, a similar arrangement being utilized in the Sperry Univac 1108. Each of the 36 outputs from the multiplexer 34 is connected to six of the multiplexers 67 and each of the 36 outputs from the multiplexers 67 is connected to six of the multiplexers 68, whereby the controlled shifts described above.

As described above, the shifter 35 is controlled by the 128×12 prom 70. The 7 bit address input to the prom 70 is provided by the address multiplexer 71 in the manner described above. Specifically, the multiplexer 71 is comprised of seven 4-to-1 multiplexer segments responsive to the respective bits of the address sources as illustrated. Multiplexer input selection is effected by the two bit SFT field from the micro control store 36. Selection is made between the two non-shifted inputs GRS* and $\mu$* by means of an AND gate 213 responsive to the BIS field from the micro control store 36 in accordance with table 2 as described above. It will be appreciated that the GRS* store and $\mu$* inputs to the multiplexers 68 are arranged, for example, in accordance with the B bus values shown in FIGS. 15 and 16*a* with the indicated zeros and ones applied to the appropriate multiplexer segments of the multiplexer 68. For example, for $\mu$*, zeros are applied to bits $2^{16}$, $2^{17}$, $2^{34}$. and $2^{35}$. Additionally, the seven bits from the SCR register 69 (FIG. 5*a*) are applied to spare inputs of the 7 least significant multiplexer segments 67 for application to the local processors for modification therein. The address mapping for the shift/mask address prom 70 is illustrated in FIG. 36*a*.

The memory 70 also provides 6 outputs 214 to provide addresses to the local memory address multiplexers such as the multiplexer 80 of local memory 24. The address provided by the leads 214 may be utilized to reference masks in the local memories. When shifting it is often required to mask the input operands to the local processors 17, 18 and 19. For example, masking is utilized for j field extraction as well as for the emulation of the logical shift instructions. Accordingly, 36 locations are reserved in each of the local memories 24, 25 and 26 for masks appropriate for 0–35 place shifts. The masks in octal are:

| MASK NUMBER | MASK VALUE |
|---|---|
| 0 | 777777777777 |
| 1 | 377777777777 |
| 2 | 177777777777 |
| 3 | 077777777777 |
| . | . . . |
| . | . . . |
| . | . . . |
| 35 | 000000000000 |

The masks can be in any location and in any sequence in the local memories; however the local memories 24, 25 and 26 must utilize the same address for each corresponding mask. Although 36 masks are stored in memory, 72 are actually required; for example, a right logical shift requires high order zero bits for a subsequent AND instruction in the local processor and a left logical shift requires high order one bits. The complementer 82 (FIG. 5*b*) to be described in greater detail hereinafter effectively doubles the number of masks under control of the micro control store 36. The complementer 82 unconditionally inverts the sense of the bits in the mask or causes inversion thereof to occur in accordance with the sign of the input variable SE (Table 4). This capability may be utilized for sign extension when $j=03_8$, $04_8$, etc.

Figure 37:
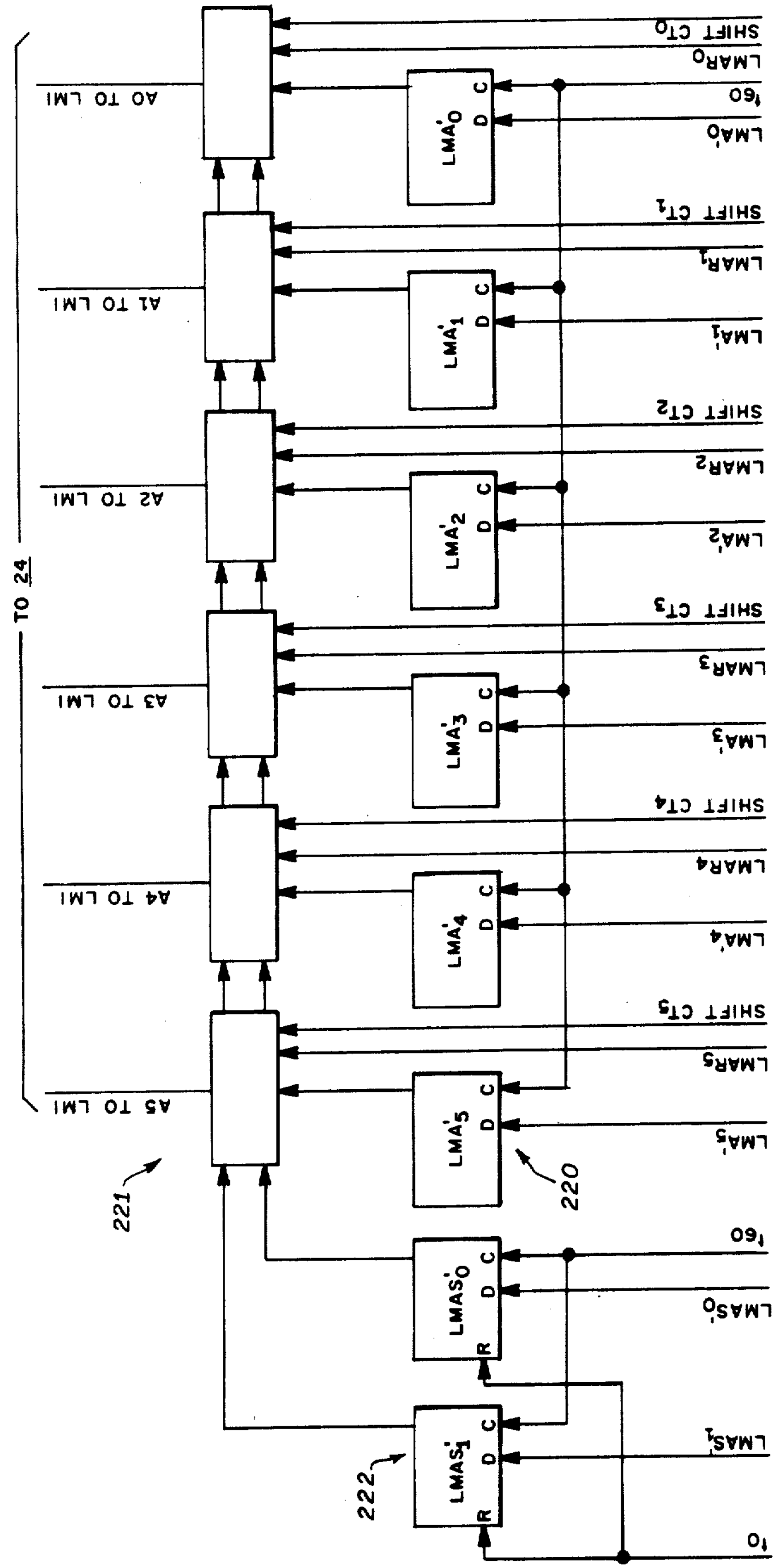
FIG. 37 is a schematic block diagram illustrating details of the local memory address multiplexers of the computer of FIG. 5.

Referring now to FIG. 37, details of the multiplexer 80 (FIG. 5*b*) that provides the addresses to the local memory 24 are illustrated. It will be appreciated that multiplexers identical thereto are utilized to provide the addresses to the local memories 25 and 26. The 6-bit LMA field from micro control store 36 are latched into six D-type flip flops 220 at $t_{60}$. The six latched LMA bits from the flip flops 220, the LMAR address from the register 81 (FIG. 5*a*), as well as the six bits from prom 70 (indicated as SHIFT CT) are applied as inputs to six 3-to-1 multiplexers 221 which provide the six address bits to the local memory 24. Address selection is effected by the two bit LMAS field from the micro control store 36 via latches 222. The latches 222 are clocked at $t_{60}$ and reset at $t_0$.

Figure 38:
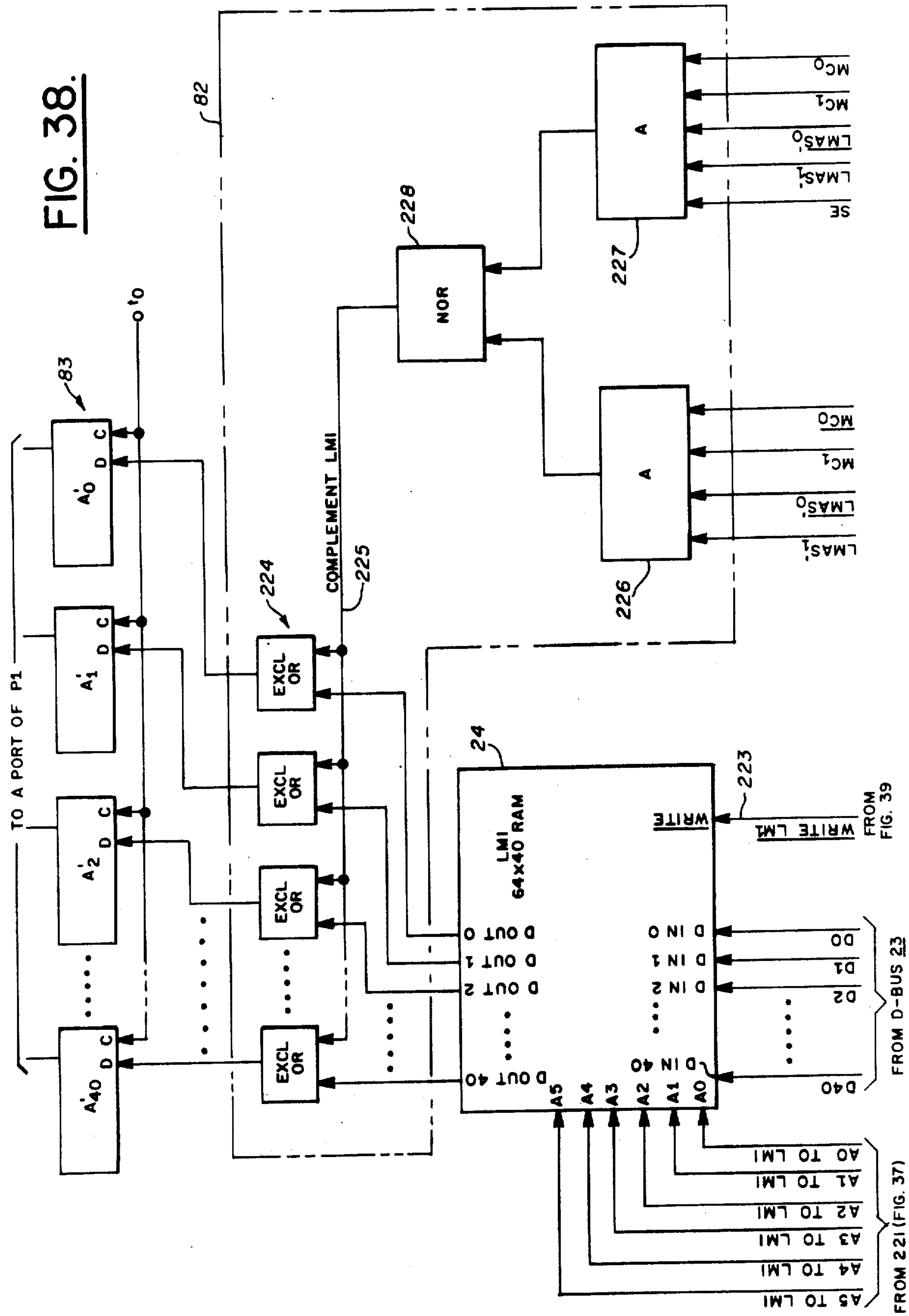
FIG. 38 is a schematic block diagram illustrating details of the local memories, the complementers and the A bus registers of the computer of FIG. 5.

Referring now to FIG. 38, details of the components 24,82 and 83 (FIG. 5*b*) with respect to the local processor $P_1$ are illustrated. It will be appreciated that similar details are replicated with respect to the local processors P-2 and P-3. The local memory 24 comprises a 64 word by 40 bit RAM addressed by the six bits from the multiplexer 221 (FIG. 37) and receives 40 bit words for writing from the D bus 23. Writing is controlled by a $\overline{\text{WRITE LM-1}}$ signal provided on a lead 223 from circuitry to be discussed with respect to FIG. 39. The 40 bit word read from the memory 24 is applied to the complementer 82.

The complementer 82 includes 40 2-input exclusive OR gates 224, one input being driven by the respective data bits from the local memory 24 and the other input being driven by a complement LM1 signal on a lead 225. When the signal on the lead 225 is a logic zero, the word is transmitted uncomplemented, and when the signal is a logical one, the ones complement of the data is transmitted. The signal on the lead 225 is generated by two AND gates 226 and 227 and a NOR gate 228 as follows:

$$[LMAS=10 \wedge MC=10] \vee [LMAS=10 \wedge MC=11 \wedge SE]$$

Thus, it is appreciated from Table 5 above, that data is complemented only when the LMAS micro control field selects the address from prom 70 (FIG. 5*a*) as the address source for the local memory 24. Selective complementation is controlled by the MC bits from the instruction status table 38 (FIG. 5*b*) in accordance with Table 12 and AND gate 227 controls the complementation in accordance with the sign extention (SE) variable with respect to the j field, the QW bit and the appropriate unshifted bit position. This feature is utilized for j field sign extension.

The 40-bit output from the exclusive OR gates 224 of the complementer 82 are applied to the A register 83 (FIG. 5*b*) which is comprised of 40 respective D type latches clocked at $t_0$.

Figure 39:
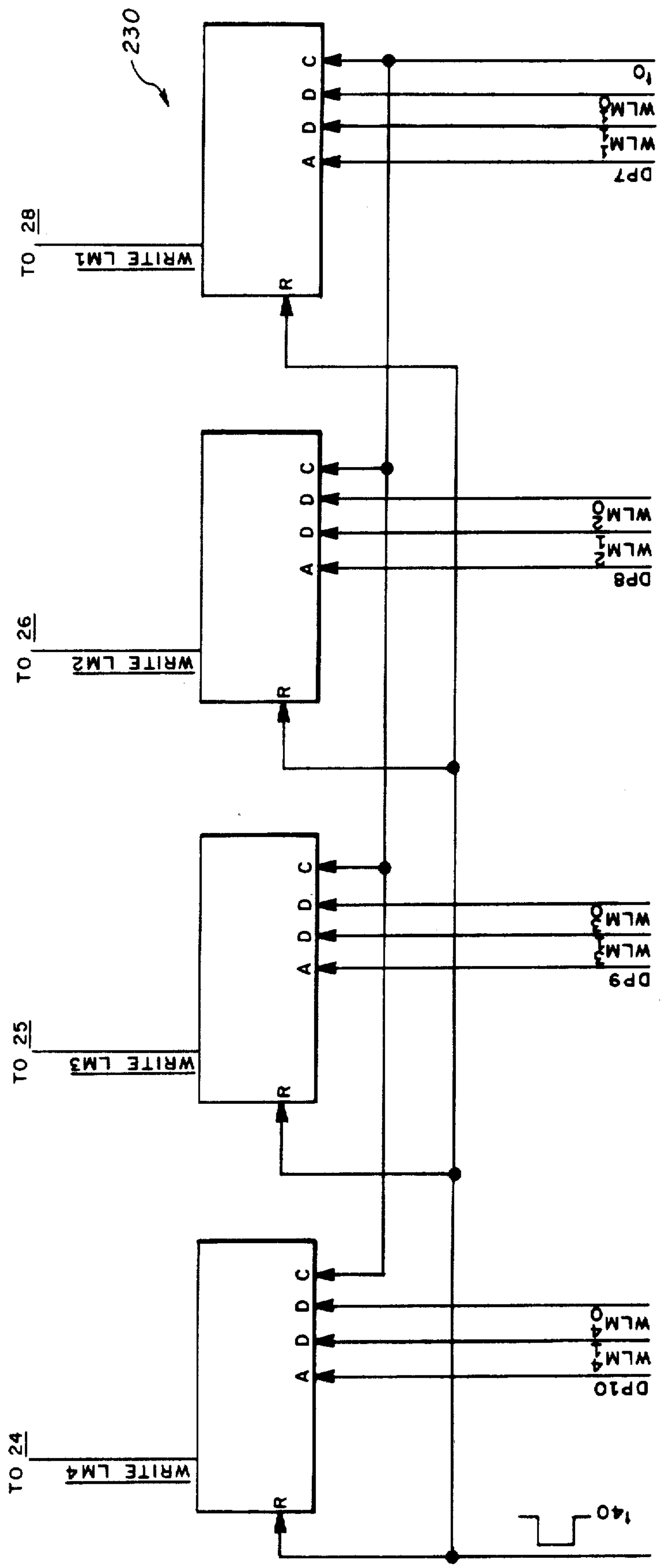
FIG. 39 is a schematic block diagram illustrating details of the write control circuitry utilized with the local memories of the computer of FIG. 5 utilizing DP7–DP10 as computed by the table driven control logic of the present invention.

Referring now to FIG. 39, the circuits for providing the WRITE signal (e.g., lead 223 of FIG. 38) for the local memories 24, 25, 26 and 28 is illustrated. The circuitry is comprised of four dual input D type flip flops 230 which provide the $\overline{\text{WRITE LM}}$ signals for the local memories respectively. The two D inputs to the flip flops 230 are provided by the two bits of the respective WLM fields for the associated processors. The selection between the two D inputs is provided by the associated decision point DP 7-DP 10. The flip flops 230 are clocked at $t_0$ and are reset at $t_{40}$. The respective WLM fields (Table 10) control the write function as follows:

| WLM1 | WLM0 | |
|---|---|---|
| 0 | 0 | NOP (Don't write) |
| 0 | 1 | WRITE IF DP = 1 |
| 1 | 0 | WRITE IF DP = 0 |
| 1 | 1 | WRITE |

Specifically, the $\overline{\text{WRITE}}$ signal is generated as follows:

| DP | WLM1 | WLM0 | $\overline{\text{WRITE}}$ | |
|---|---|---|---|---|
| 0 | 0 | 0 | 1 | NOP |
| 0 | 0 | 1 | 1 | WRITE IF DP = 1 |
| 0 | 1 | 0 | 0 | |
| 0 | 1 | 1 | 0 | WRITE |
| 1 | 0 | 0 | 1 | |
| 1 | 0 | 1 | 0 | |
| 1 | 1 | 0 | 1 | WRITE IF DP = 0 |
| 1 | 1 | 1 | 0 | |

Figure 40:
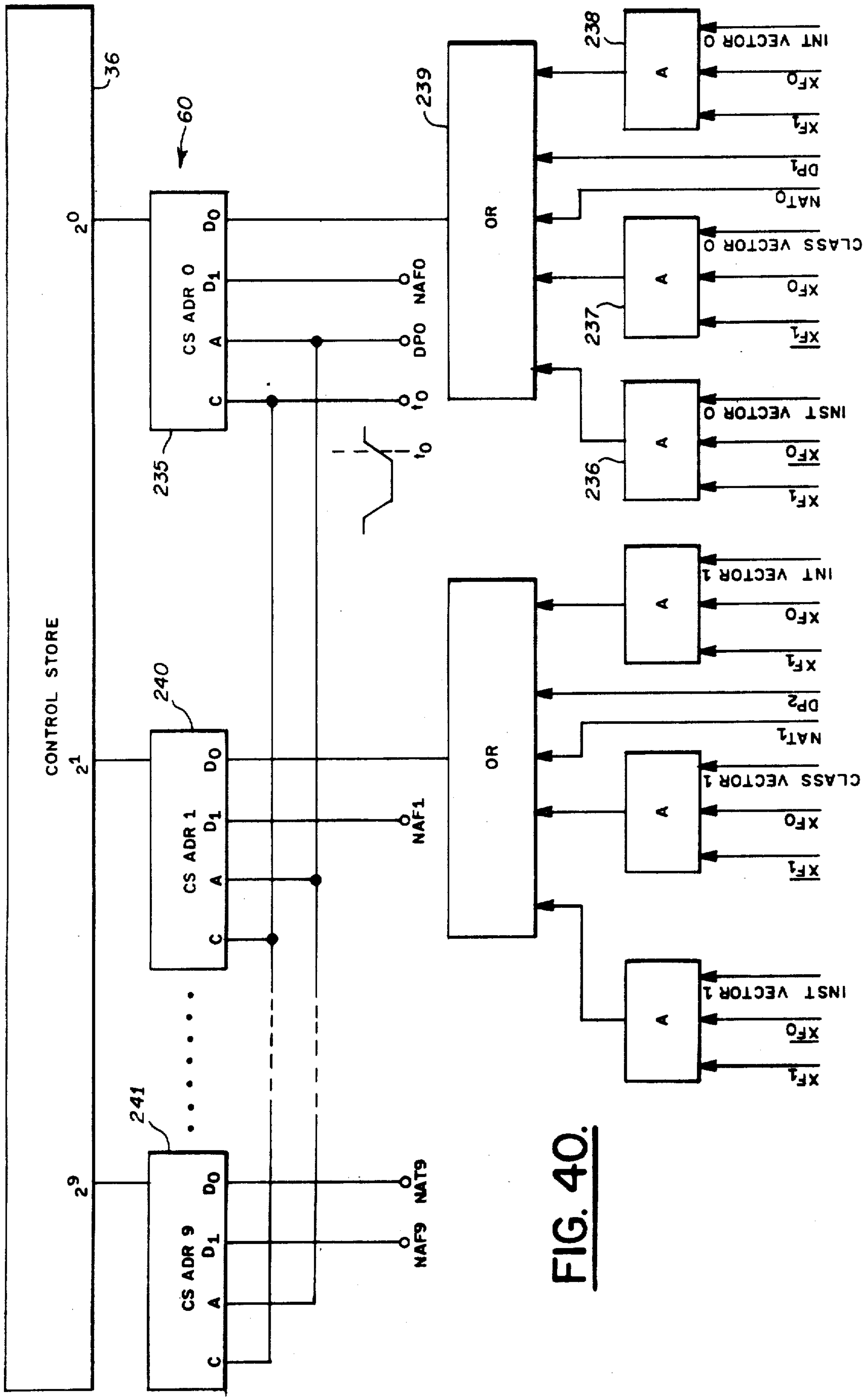
FIG. 40 is a schematic block diagram illustrating details of the addressing multiplexer and latch for the control store of the computer of FIG. 5 utilizing DP0–DP2 as computed by the table driven control logic of the present invention.

Referring now to FIG. 40, details of the multiplexer 39 and the address latch 60 providing the 10 bit address to the control store 36 are illustrated. The address latch 60 is comprised of 10 dual input D type latches for providing the 10 address bits respectively. As discussed above with respect to Table 1, when DP0 is zero, the address NAF is selected as the control store address, and when DP0 is one, NAT is selected as the control store address conditioned by the class base vector, the instruction vector or the interrupt vector in accordance with the XF field. Additionally, DP1 and DP2 are OR'ed respectively with the two least significant bits of the control store address when NAT is selected. The DP0 signal, (FIG. 8*a*) is applied to the A inputs of the latches 60 to effect the address selection. Latch 235 provides the $2^0$ address bit to the control store 36. The least significant bit of NAF is applied to the $D_1$ input of the latch 235 and is selected when DP0 is zero. The least significant bits of the instruction vector, class base vector and interrupt vector are applied through respective AND gates 236, 237 and 238, which are combined in an OR gate 239 to provide the $D_0$ input of the latch 235, which input is selected when DP0 is one. The two bits of the XF field are applied to the AND gates 236, 237 and 238 to effect the selection of the vectors as indicated in Table 1 above. The least significant bit of NAT is applied as an input to the OR gate 239 where it is combined with the outputs of the AND gates 236, 237 and 238 to effect the control functions delineated in Table 1. DP1 is also applied as an input to the OR gate 239 as part of the mechanism for effecting the 4-way vector jump discussed above with respect to the micro control fields VDS0 and VDS1.

Latch 240 provides the $2^1$ control store address bit and receives inputs in a manner similar to that described with respect to the $2^0$ bit except that the 2nd least significant bit of NAF, NAT, instruction vector, class base vector and interrupt vector are applied as illustrated with DP2 providing the 4-way vector jump input under control of VDS1.

The $2^2$ address bit is provided by similar logic except that the third least significant bits from the various inputs are applied in a similar manner to that illustrated. It will be appreciated that the DP1 and DP2 inputs are only utilized with the 2 least significant bits are therefore similar inputs are not included in the higher ordered bits.

The clase base vector, the instruction vector, and the interrupt vector are provided by 4-bit, 8-bit and 5-bit fields respectively. Thus the 4-bits of the class base vector are applied to the control store address bits 3-0; the 8-bits of the instruction vector to the control store address bits 7-0 and the 5 interrupt bits to the control store address bits 4-0 respectively; the XF selection logic being utilized at those orders where required.

The most significant control store address bit $2^9$ is provided by a latch 241 with the $D_1$ and $D_0$ inputs provided by the most significant bit of NAF and NAT, respectively. All of the latches 60 are clocked at $t_0$.

Figure 41:
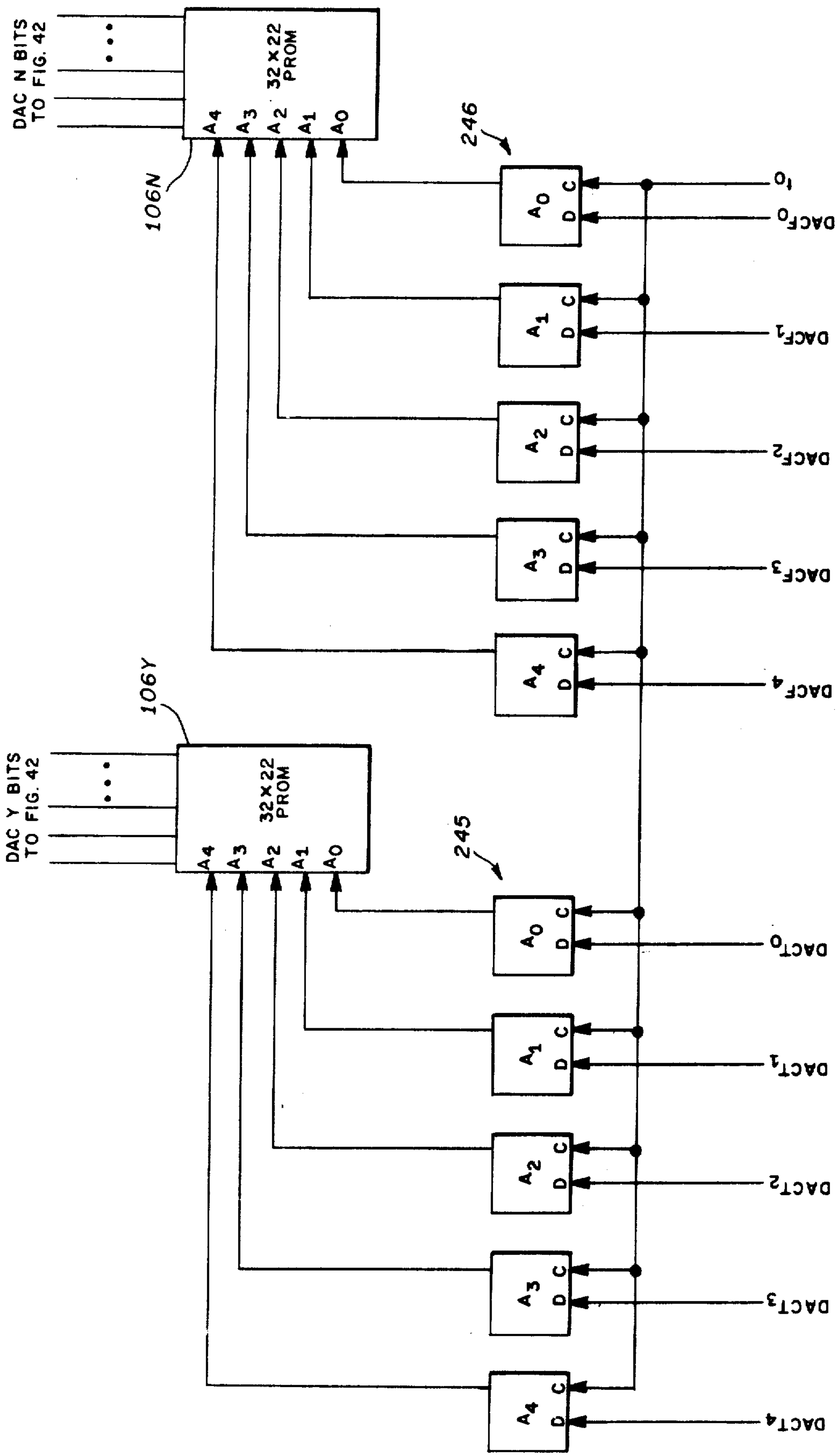
FIG. 41 is a schematic block diagram illustrating details of the addressing latches for the deferred action control memories of the computer of FIG. 5.

Referring now to FIG. 41, details for the addressing of the Deferred Action Control Table (DAC) discussed above with respect to FIG. 7 are illustrated. The 5 bits of the DACT field from the micro control store 36 are applied respectively to the 5 stages of a DACT address register 245 comprised of 5 D type latches. Similarly, the DACF address field from the micro control store 36 is applied to a 5 stage DACF address register 246. The registers 245 and 246 are clocked at $t_0$. The 5 bit DACT address latched into the register 245 is applied to the address inputs of a 32 word by 22 bit prom 106Y and the 5 bit DACF address latched into the register 246 is applied to the address inputs of a 32 word by 22 bit prom 106N. It will be appreciated that the proms 106Y and 106N together comprise the DAC table mapped in and discussed with respect to FIG. 7. Actually only 28 of the 32 words of the proms 106Y and 106M are utilized. The memories 106Y and 106N are duplicates of each other, each storing the 28 words of 22 bits each illustrated in FIG. 7. The 22 bit word addressed by the DACT field is provided at the output of the memory 106Y and is designated as the DACY (yes) bits. Similarly, the memory 106N provides the 22 DACN (no) bits in response to the DACF address. Thus it is appreciated that in response to the DACT and DACF fields in a micro instruction word, two respective words of 22 bits each are provided from the memories 106Y and 106N. Selection between these DACY and DACN bits in accordance with DP11 to provide the deferred action control signals for the CPU 10 will now be described.

Figure 42:
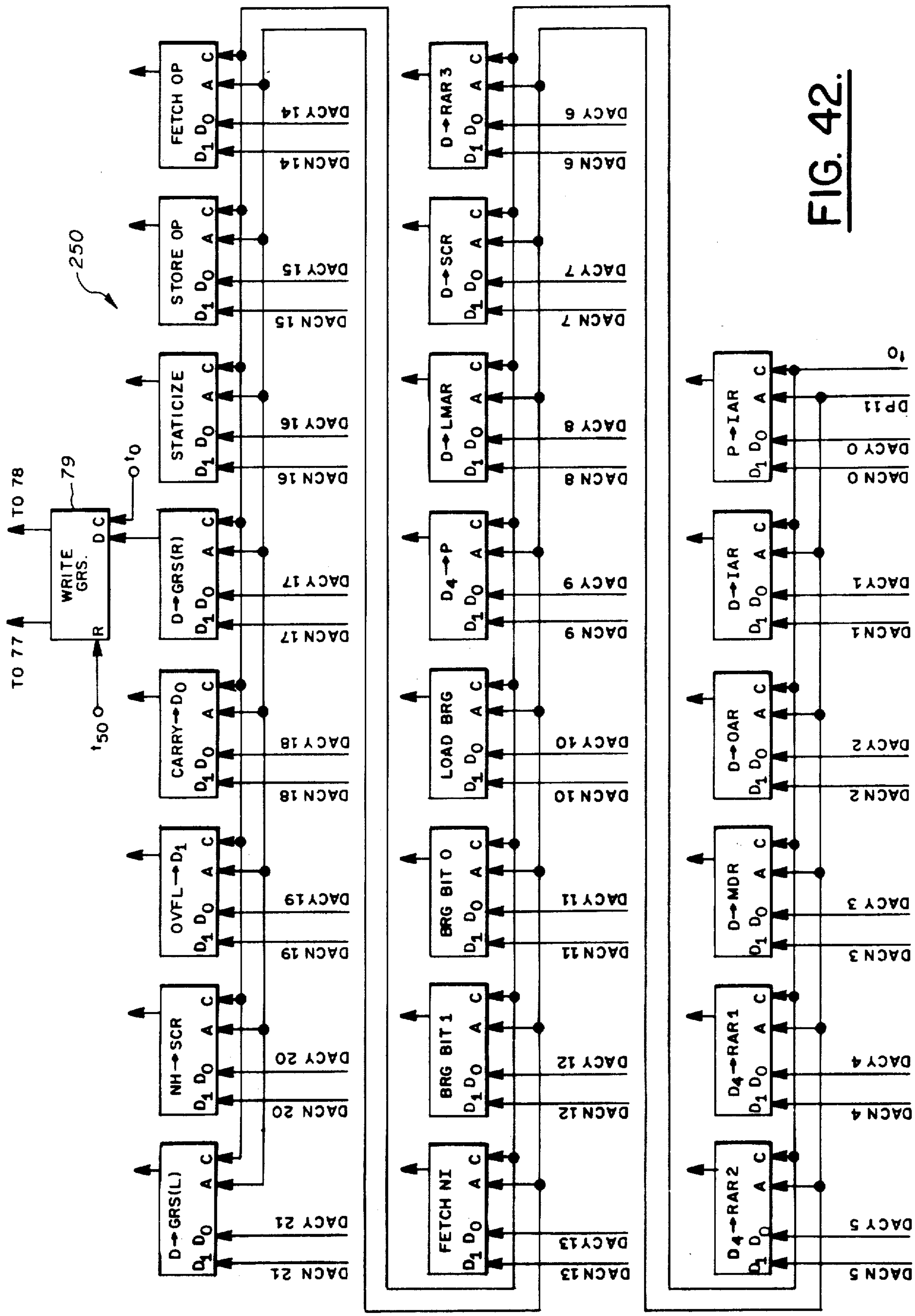
FIG. 42 is a schematic block diagram illustrating the deferred action control latches for the computer of FIG. 5 utlizing DP11 as computed by the table driven control logic of the present invention.

Referring to FIG. 42, deferred action control latches 250 for providing the deferred action control signals to the CPU 10 are illustrated. The DAC latches 250 comprise 22 dual input D type flip flops corresponding to the 22 bits of the deferred action control memory 106 (FIG. 41 and FIG. 7). The $D_1$ and $D_0$ inputs of the latches 250 are connected to receive the corresponding DACN and DACY bits from the memories 106N and 106Y respectively of FIG. 41. The A inputs of all of the latches 250 are connected to receive the DP11 signal (FIG. 8a) and the latches are clocked at $t_0$ to latch DACY or DACN in accordance with DP11. Since the DACN memory 106N (FIG. 41) is addressed by the micro control field DACF and the DACY memory 106Y is addressed by the micro control field DACT, DP11 determines whether the DACT or DACF deferred action will be performed. The outputs from the DAC latches 250 connect to the various points of the CPU-10 to effect the designated actions. The D→GRS(R) flip flop provides the writing control to the write GRS flip flop 79 which was previously described with respect to FIG. 5. The flip flop 79 is set at $t_0$ in accordance with the state of the D→GRS(R) latch and reset at $t_{50}$. Thus it will be appreciated that writing into GRS may be inhibited during the first half of a micro cycle when no write is desired since the WRITE GRS flip flop 79 is not set if D→GRS(R) is zero.

As discussed above, FIG. 7 illustrates the memory map for the DAC 106. The deferred action control prom 106 is essentially a master-bitted list of possible actions to be performed during micro cycle n with the results obtained during micro cycle n-1. If the table indicates the source is the D bus 23, then the OUT fields determine which micro accumulator (P1, P2 or P3) is the source and the DAC table entry determines the destination. Most of the entries of FIG. 7 specify a destination register discussed above with respect to FIGS. 2 and 5 and require no further explanation. However, some of the entries relating to the interface of the main memory 11 will now be explained.

STATICIZE

The latch STAT MEM (not shown) in the control circuits 41 which provides the STAT signal to, for example, the register 56 (FIG. 5b) is set in response to the staticize bit from the DAC (the STATICIZE latch-FIG. 42). The staticize bit from the DAC has a lifetime of only one micro cycle while STAT MEM can remain set for several cycles. When the instruction is staticized, STAT MEM is cleared.

FETCH NI

First, any P→IAR or D→IAR transfer specified in this DAC entry is performed. The next macro instruction is then fetched in accordance with the address in IAR. When the instruction is received from the main memory 11, it is transferred to MIR 13. If STAT MEM is set, the instruction is transferred from the MIR13 to the Staticizer Register 56. If the macro instruction arrives so that it can be decoded by the IST 38 (for the class base vector jump) by $t_0$ of cycle n, a latch (not shown) IRDY (instruction ready) in the control circuits 41 is set by $t_{67}$ of cycle n−1. This is because dynamic variables must be available for propagation in the decision logic 40 by $t_{67}$. At the next occurrence of FETCH NI or FOS (FETCH ON STATICIZE) IRDY is cleared. The marco instruction is not automatically staticized to provide control over indirect addressing chains. The f, j and a fields are retained from the initial macro instruction while x, h, i and u are replaced if i=1 in accordance with the program control flow charts of FIGS. 15-30.

If FETCH NI and FETCH OP are both ONE in the same DAC entry and both addresses are in the same memory module, then the operand fetch is given precedence over the instruction fetch in accordance with procedures utilized in the 1108 computer.

FETCH OP

First, any D→OAR transfer specified in this DAC entry is performed. When this transfer takes place a latch (not shown) in the control circuits 41 designated OARBZY is set and another latch (not shown) designated as ORDY (operand ready) is cleared. Thereafter, a full word operand is fetched in accordance with the address in OAR. The j field manipulations designated in the micro program flow charts of FIGS. 15-30 are performed. If the operand arrives soon enough to propagate to the B-bus 22 by $t_0$ of cycle n, ORDY is set by $t_{67}$ of cycle n−1. As soon as the main memory 11 indicates that it is finished utilizing the address in OAR, OARBZY is cleared.

STORE OP

First, any D→MDRW or D→OAR transfer specified in this DAC entry is performed. If a D→OAR transfer is performed, OARBZY is set. Memory 11 is commanded to write at the word address specified in OAR and the character address specified in PW (partial word). The storage of an operand always takes precendence over an instruction fetch so as to tolerate the sequence, <STORE><EXECUTE> where both instructions pertain to the same address. It is appreciated that STORE OP stores the right half bits $_{17\text{-}00}$ of MDRW on an SLJ instruction even though the SLJ isn't usually considered as a store.

When the main memory is finished utilizing the contents of both OAR and MDRW, the OARBZY latch is cleared. The state of OARBZY is checked before loading OAR or MDRW, whichever occurs first.

The timing for the DAC operations is illustrated in FIG. 14 where the two possible address fields DACT and DACF are read during cycle 1 and latched at the end thereof. During cycle two, both DAC memories 106N and 106Y (FIG. 41) are read. At approximately $t_{95}$ of cycle 2, a decision is made as to whether DACT or DACF was the proper address. The selected bits are latched, where necessary, and the action specified is performed (or initiated) during cycle 3.

Figure 43:
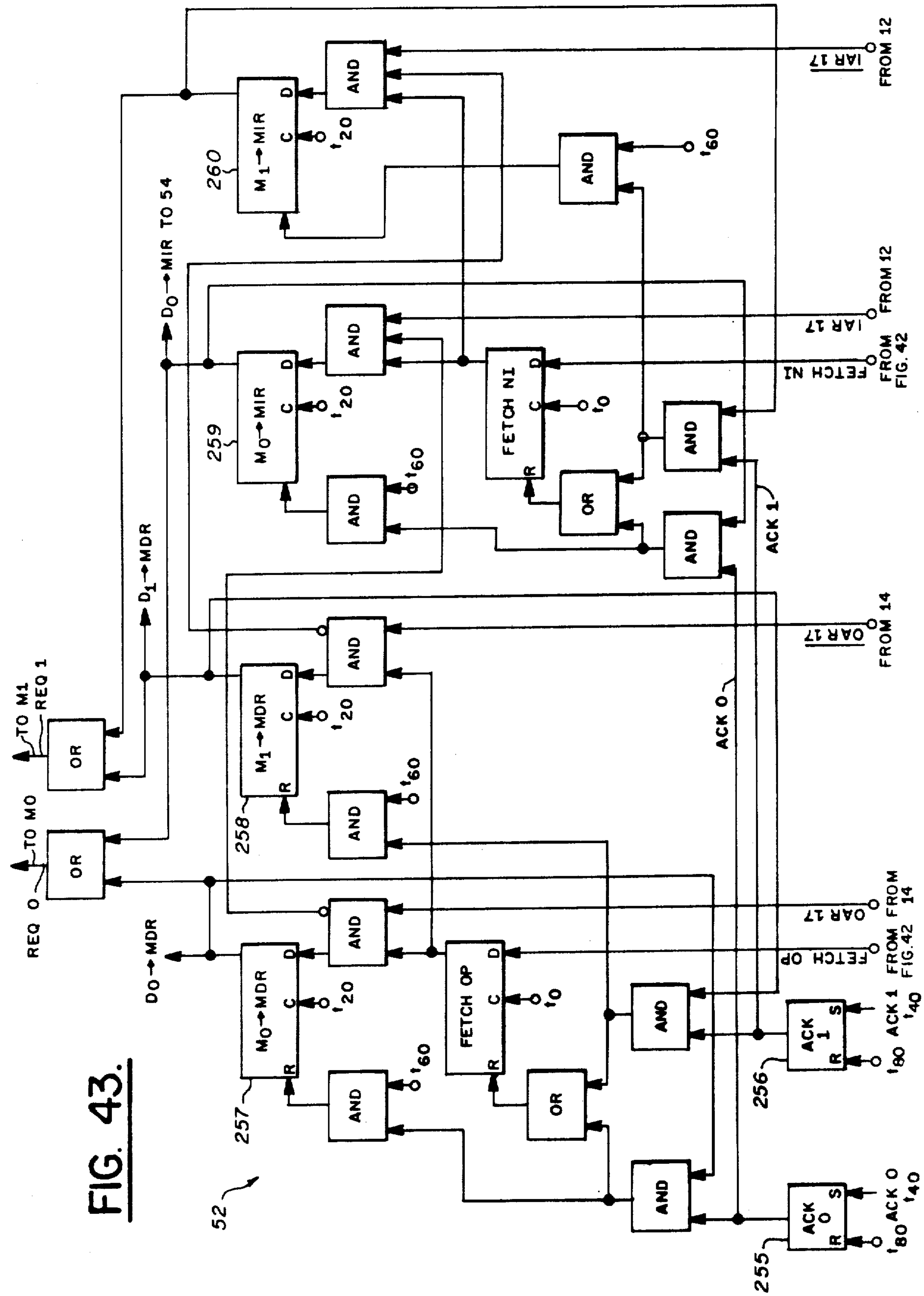
FIG. 43 is a schematic logic diagram illustrating details of the main memory interface control logic for the computer of FIG. 5.

Referring now to FIG. 43, details of the logic 52 (FIG. 5*c*) are illustrated. As discussed above, the logic 52 in response to the respective $IAR_{17}$ and $OAR_{17}$ bits from the instruction address register 12 (IAR) and the operand address register 14 (OAR), provides the request O (RO) and the request 1 (R1) as well as the $D_0 \rightarrow$MDR and the $D_0 \rightarrow$MIR signals as discussed above with respect to FIG. 5. The logic 52 is also responsive to the FETCH OP and FETCH NI signals provided from the appropriate latches of FIG. 42. The logic 52 is additionally responsive to the acknowledge signals ACK0 and ACK1 provided from the electronics associated with the respective data banks of the main memory 11. These signals are provided at $t_{40}$ and are latched into flip flops 255 and 256 respectively.

Figure 44:
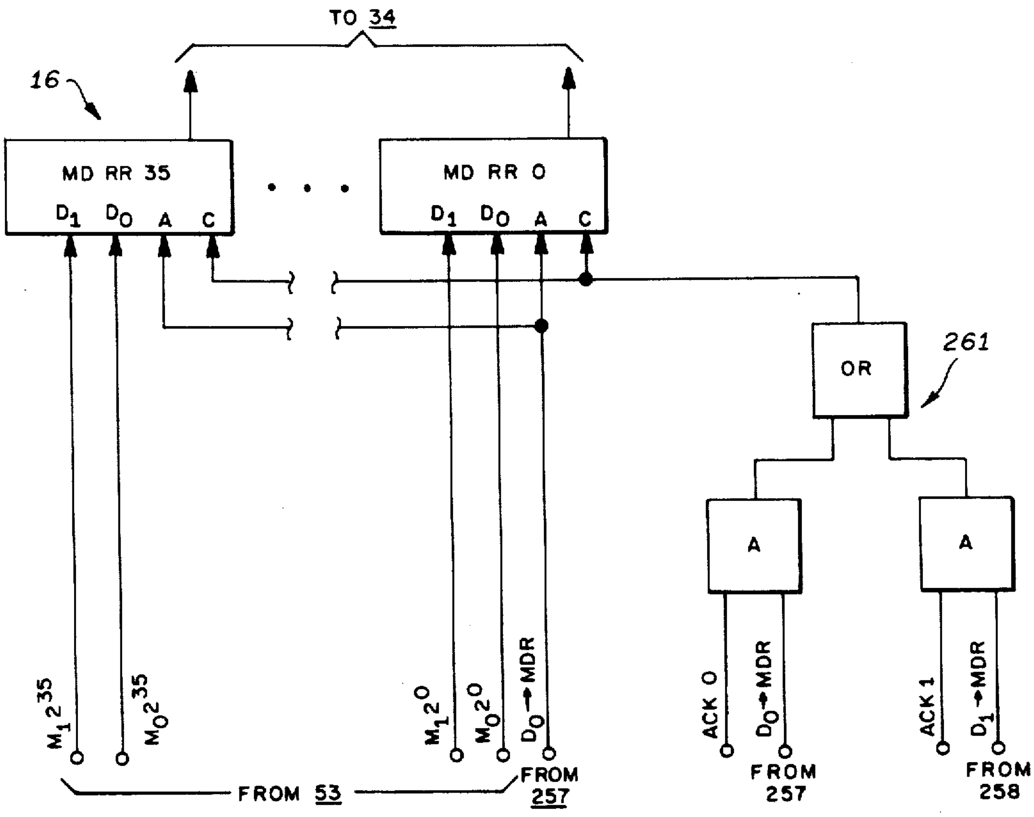
FIG. 44 is a schematic block diagram illustrating the details of the memory data read register of the computer of FIG. 5.

Referring to FIG. 44, details of the memory data register (read) 16 as well as the associated multiplexer 53 and AND gates 57 are illustrated. The register 16 comprises 36 dual input D type latches which accept the respective 36 bits of the 1108 data word read from main memory. The function of the multiplexer 53 (FIG. 5*b*) is performed by the $D_1$ and $D_0$ inputs to each of the latches responsive respectively to the corresponding bits from the two memory modules. Selection between the two modules $M_0$ and $M_1$ is effected by the $D_0 \rightarrow$MDR signal applied to the A inputs of all of the latches of the register 16 which signal is provided from the flip flop 257 of FIG. 43. The MDRR latches are clocked from logic 261 which is responsive to the ACK0, ACK1, D0→MDR and D1→MDR signals discussed above with respect to FIG. 43. The 36 bit output from the register 16 is provided as an input to the multiplexer 34 (FIG. 5*b*).

Figure 45:
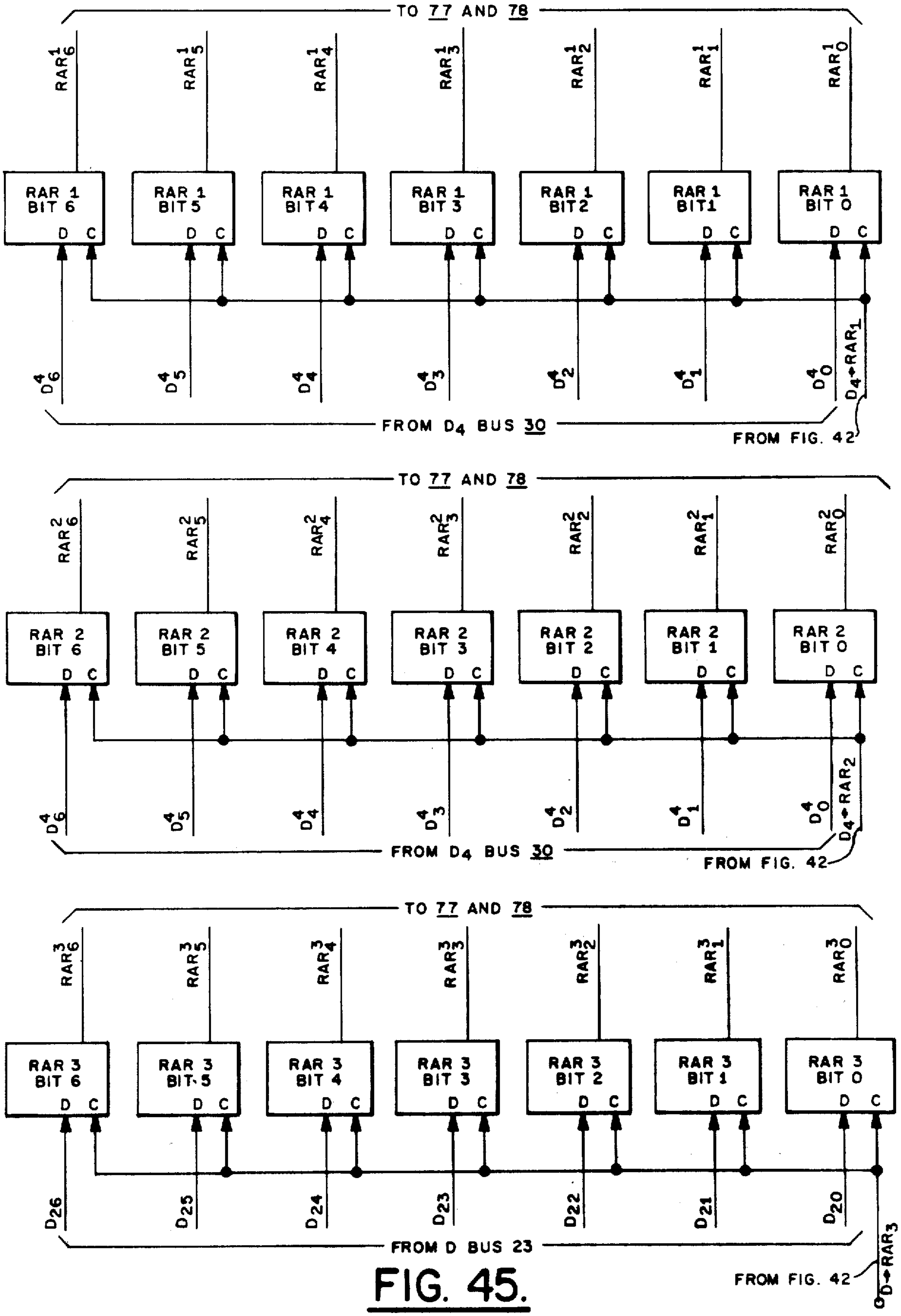
FIG. 45 is a schematic block diagram illustrating details of the register address registers of the computer of FIG. 5.

Referring now to FIG. 45, the GRS addressing registers 33 comprised of registers RAR1, RAR2 and RAR3 (FIG. 5*a*) are illustrated in detail. Each of the registers RAR1, RAR2, and RAR3 provides a 7-bit address to the GRS 32 from 7 D type latches. The register RAR1 is responsive to bits $D_0$-$D_6$ from the D4 bus 30 where the 7 bits are clocked into the register by the $D_4 \rightarrow$RAR1 signal from the deferred action control table latches (FIG. 42). The register RAR2 is also responsive to the bits $D_0$-$D_6$ from the D4 bus 30 which bits are strobed into the register by the $D_4 \rightarrow$RAR2 signal (FIG. 42). The register RAR3 is responsive to the right 7 of the left 20 bits of the D bus 23 ($D_{20}$-$D_{26}$) which bits are clocked into the register by the D→RAR3 signal (FIG. 42). The 7 bit addresses latched into the registers are provided to the multiplexers 77 and 78 as described above.

Figure 46A:
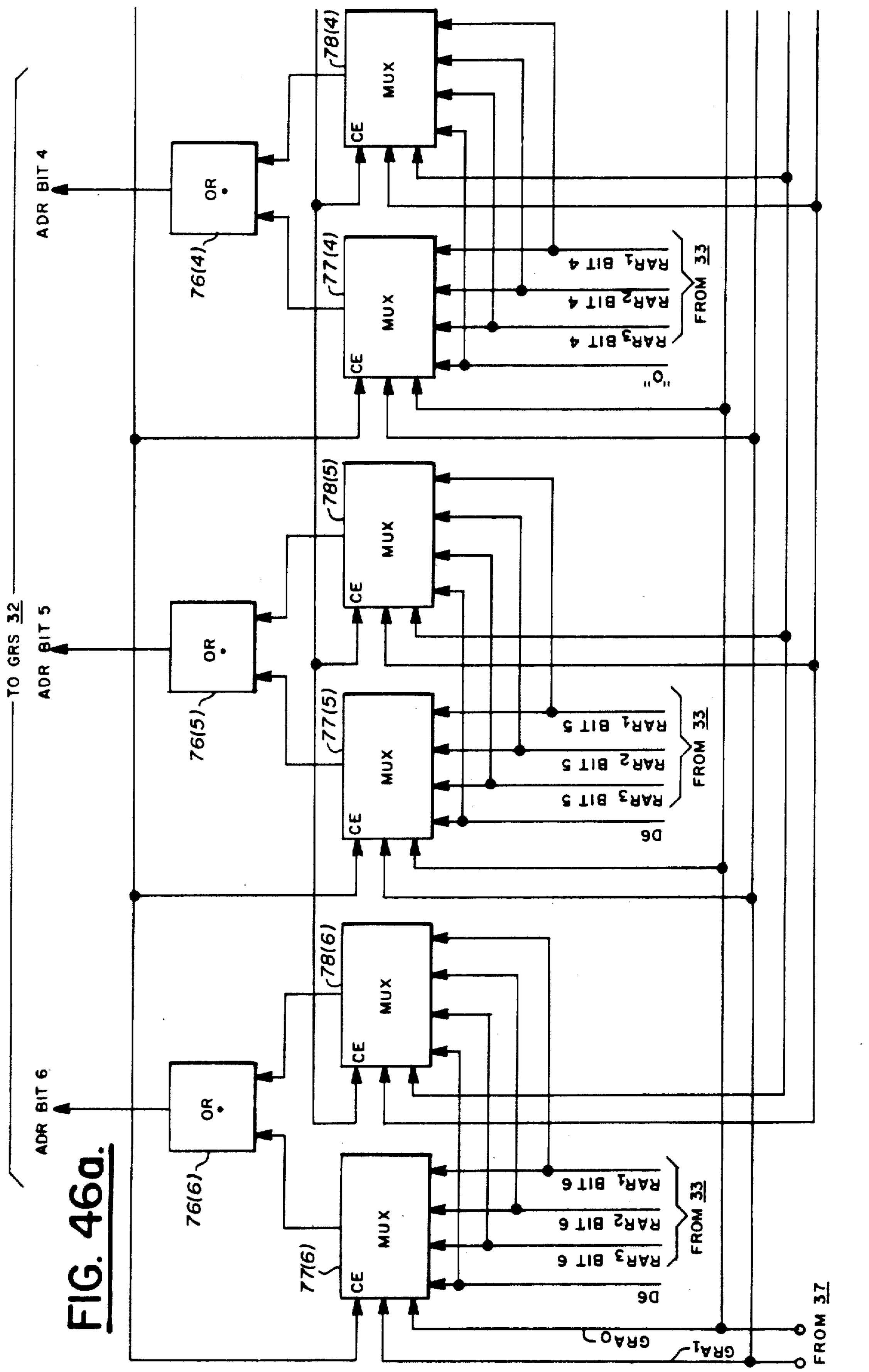
FIGS. 46a and 46b, hereinafter referred to as FIG. 46 in portions of the specification for convenience and brevity, comprise a schematic block diagram illustrating details of the general register stack addressing multiplexers of the computer of FIG. 5

Referring to FIG. 46, comprising FIGS. 46*a* and *b*, details of the GRS addressing multiplexers 77 and 78 as well as the OR gates 76 (FIG. 5*a*) are illustrated. Each of the multiplexers 77 and 78 are comprised of seven 4-to-1 multiplexer segments indicated by the respective reference numerals where the numbers in parenthesis indicate the order of the address bit provided by the multiplexer segment. For example, multiplexer segments 77 (0) and 78 (0) receive as three of its inputs, bit 0 from RAR1, RAR2 and RAR3 respectively, the fourth input being provided by bit 0 of the x-field from the macro instruction register 13. The outputs from the multiplexer segments 77 (0) and 78 (0) are combined in OR gate 76 (0) to provide the address bit 0 to the general register stack 32. In a similar manner, address bits 1–3 are provided by similarly configured multiplexer segments and OR gates; the configuration for address bit 3 being illustrated. The arrangements for address bits 4, 5 and 6 are similar to those for bits 0–3, except that the fourth input to the multiplexer segments for bit 34 is a hard-wired "0" and the fourth input to the multiplexer segments for address bits 5 and 6 are provided by the D6 signal described above. When x-field addressing is selected, the user set of index registers is selected when D6=0 and the executive set of index registers is selected when D6=1. The D6 and "0" inputs to the multiplexer segments for address bits 4–6 effectively adds $\mathbf{140}_8$ to effect this register selection.

Input selection of the multiplexer segments is provided by the GRA and GWA fields from the micro control store 36 as described above with respect to FIG. 5*a* and Table 3. The writing of the GRS 32 is controlled by the flip flop 79 in a manner described with respect to FIGS. 5*a* and 42.

Figures 46B, 46C:
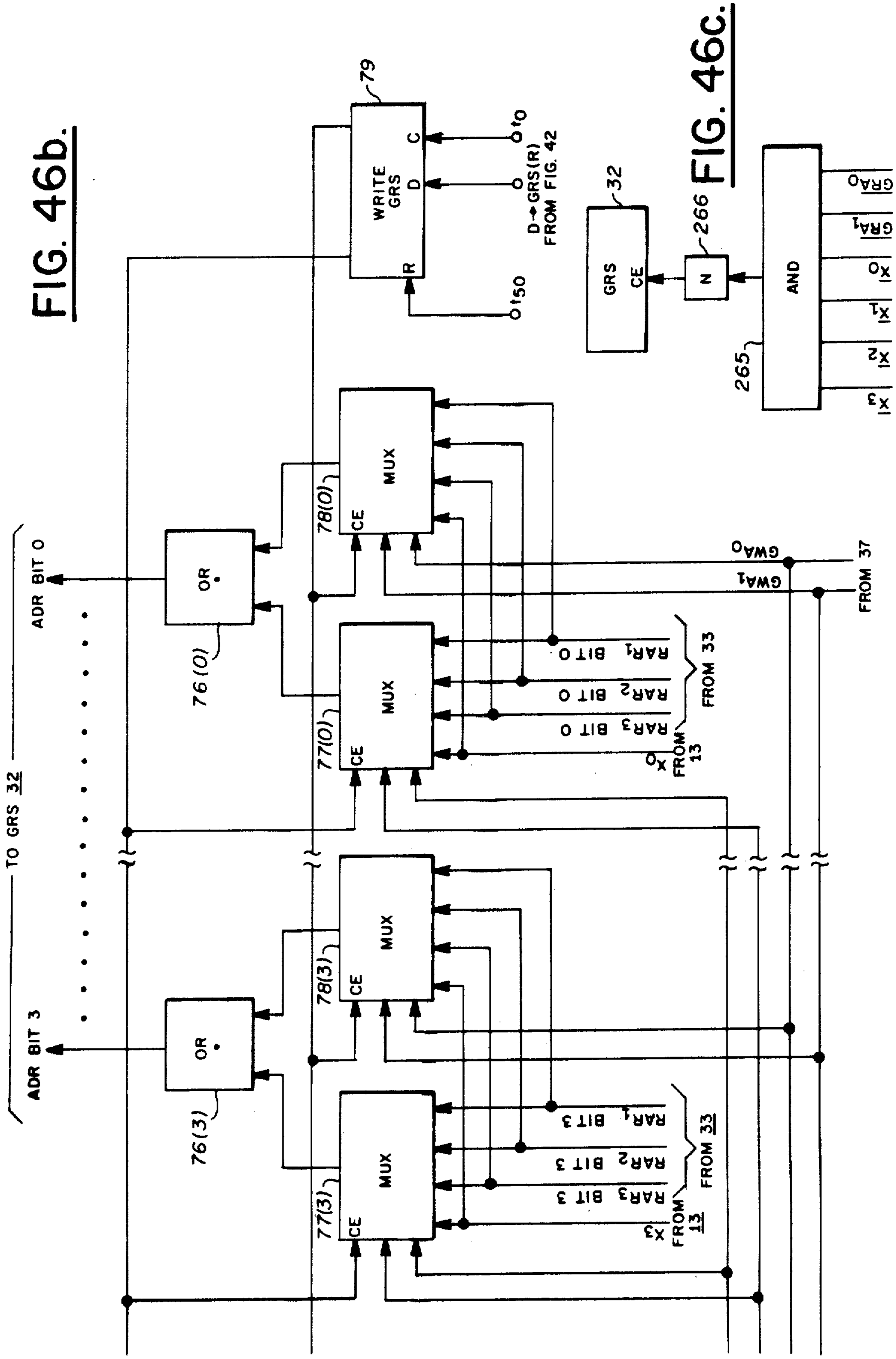
FIG. 46c is a schematic block diagram for forcing a zero output from the general register stack of the computer of FIG. 5 under predetermined circumstances.

When the GRS 32 is addressed for reading by the macro instruction x-field (GRA=00) and the macro instruction x-field is 0, it is desired to provide a zero index value from the GRS 32. FIG. 46*c* illustrates the logic so to do when the conditions specified exist. An AND gate 265 through an inverter 266 applies a signal to the chip enable input of the GRS memory chip, thereby disabling the chip and providing the desired all zeros output.

Figure 47:
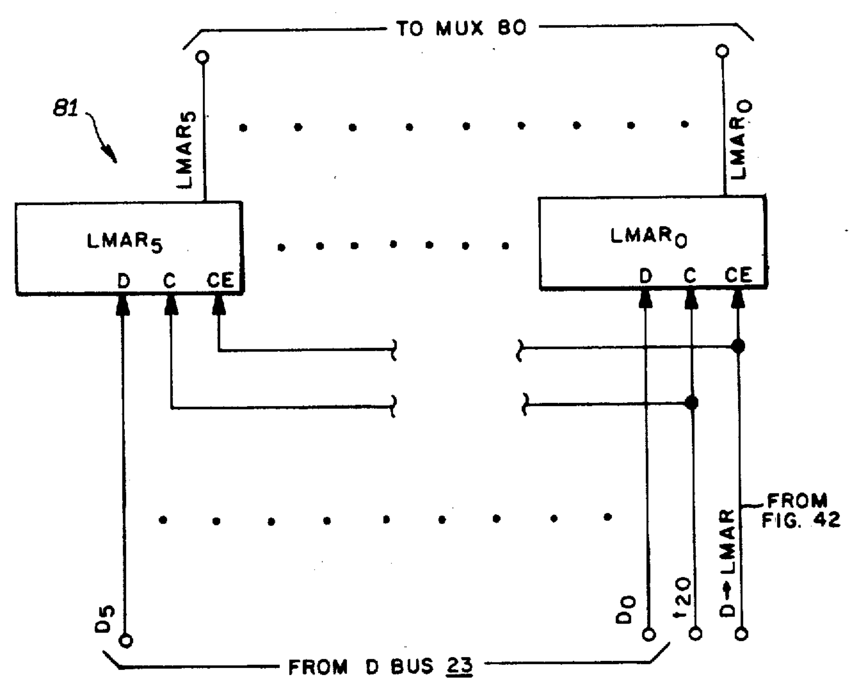
FIG. 47 is a schematic block diagram illustrating details of the local memory addressing register of the computer of FIG. 5.

Referring now to FIG. 47, the details of the local memory address register 81 (FIG. 5*a*) are illustrated. The LMAR 81 is comprised of six D type latches responsive to the six least significant bits respectively from the D bus 23. The latches are enabled via the chip enable inputs thereof in response to the D→LMAR signal discussed above with respect to FIG. 42 and are clocked at $t_{20}$. Thus, when D→LMAR is present, the address bits from the D bus 23 are clocked into the register 81 at $t_{20}$.

Figure 48:
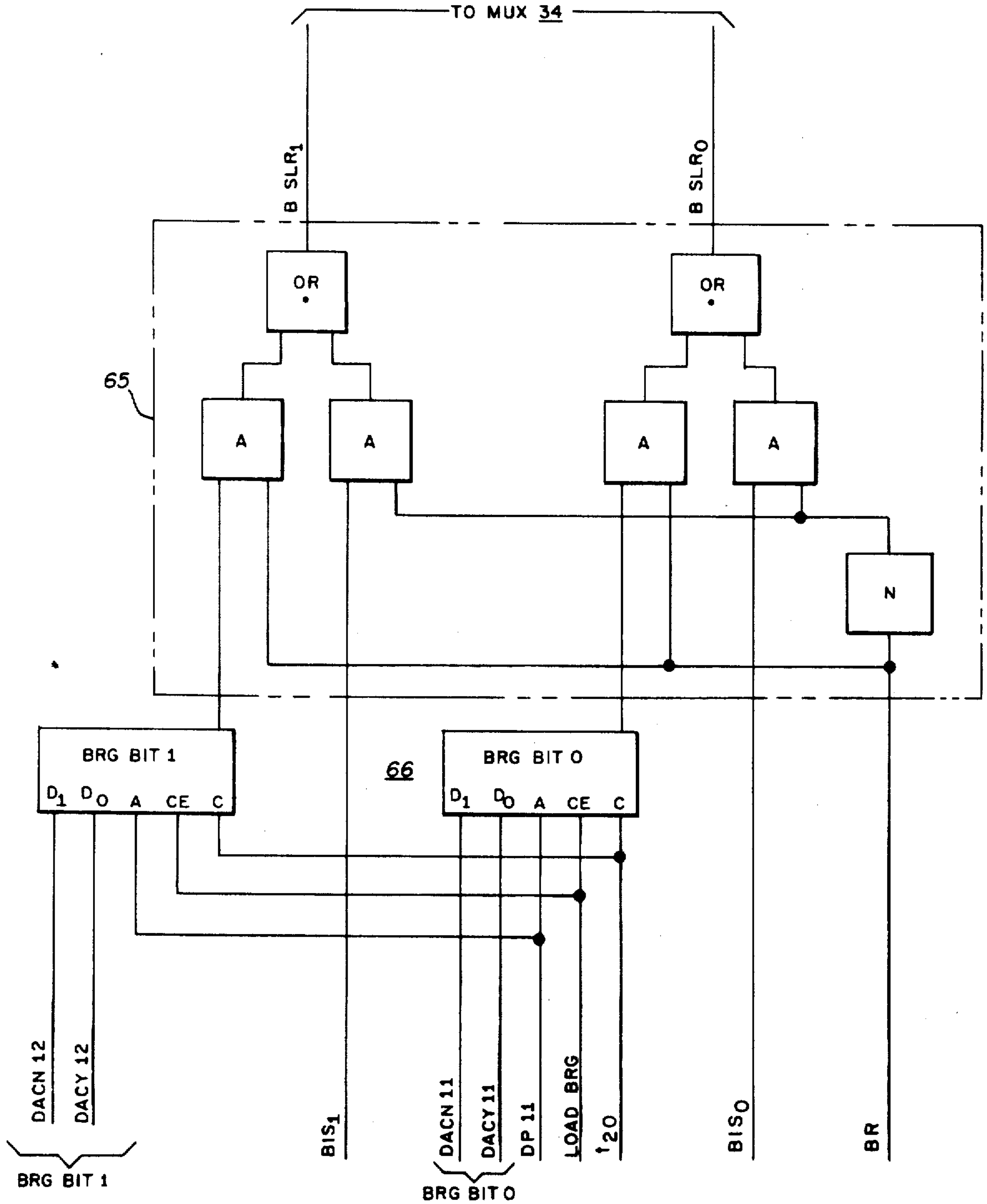
FIG. 48 is a schematic block diagram illustrating details of the B bus selector of the computer of FIG. 5 utilizing DP11 as computed by the table driven control logic of the present invention.

Referring to FIG. 48, the details of the B bus selector components 65 and 66 (FIG. 5*b*) are illustrated. The BRG register 66 comprises two dual input D type latches BRG BIT 1 and BRG BIT 0. The D inputs to the BRG BIT 1 flip flop are provided by the DACN and DACY bit 12 from the deferred action control table discussed above, with respect to FIGS. 7 and 41. The selection between the bits is effected by the DP 11 signal applied to the A inputs of the latches. The latches of the register 66 are enabled as deferred action by the output from the LOAD BRG latch discussed above with respect to FIG. 42, the LOAD BRG signal being applied to the chip enable inputs to the BRG register latches. The BRG BITS ONE and ZERO from the deferred action control table as selected by DP 11 are clocked into the register 66 at $t_{20}$. The two bit output from the BRG register 66 is applied as an input to the multiplexer 65 which selects either the two bits from the BRG register 66 or the two bits from the BIS field from the micro control store 36 in accordance with the BR field from the micro control store. The logic illustrated provides the selected two bits designated as BSLR-0 and BSLR-1 to the select input of the multiplexer 34 so as to effect the B bus input source selection.

Figure 49:
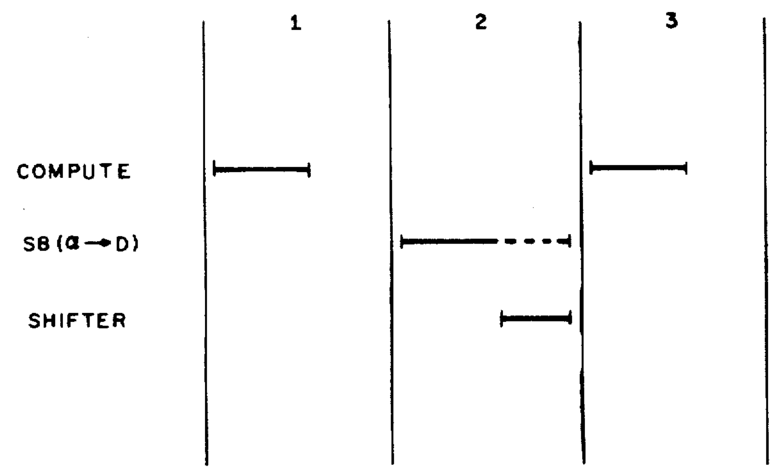
FIG. 49 is a diagram illustrating the timing for a D bus to B bus transfer in the computer of FIG. 5.

When the circuit of FIG. 48 selects the D bus as the source for the B bus input multiplexer 34, a path is established for transferring data from the D bus 23 to the B bus 22, the timing involved being illustrated in FIG. 49. With a data result stored in a micro accumulator during cycle 1, the associated processor gates the data in the accumulator to the D bus 23 during cycle 2 and during the last half of the cycle the information propagates through the shifter 35. The data is therefore available on the B bus 22 for recomputation during cycle 3.

Figure 50:
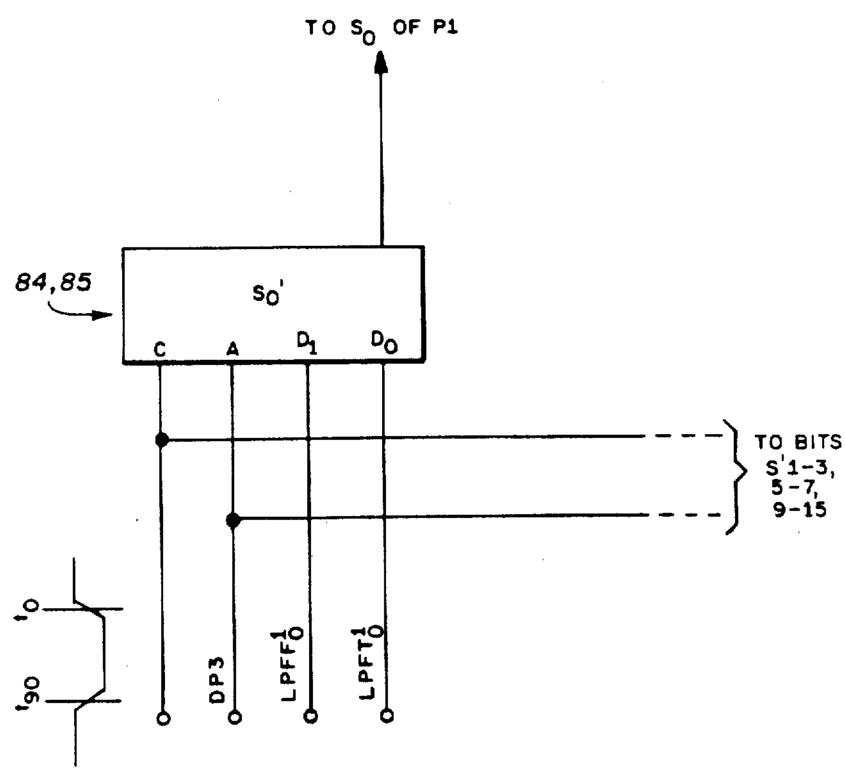
FIG. 50 is a schematic block diagram illustrating the details of the function multiplexers and latches of the local processors of the computer of FIG. 5 utilizing DP3–DP6 as computed by the table driven control logic of the present invention.

As discussed above with respect to FIG. 5, the phantom branch functions for the local processor 17 are implemented by the multiplexer 84 and the function latch 85 that provides the LPFT or LPFF fields to the local processor 17 to control the function thereof in accordance with DP3. When the logic signal DP3 is true the LPFT field in the control store 36 is executed during the next micro cycle; otherwise LPFF is executed. The fields LPFF and LPFT (FIG. 4) each comprises 14 bits for providing the 14 function bits to the processor indicated by the legend as $S_{0\text{-}3,\,5\text{-}7,\,9\text{-}15}$. FIG. 50 illustrates the dual input D type multiplexer/latch utilized to provide the $S_0$ function bit to the local processor 17. The D inputs of the latch are connected to receive the least significant bit from LPFF and LPFT, the selection therebetween being effected by the DP3 signal applied to the A input thereof. The latch is clocked at $t_0$ as illustrated. It will be appreciated that for the local processor 17, thirteen additional such latches are utilized to provide the function bits designated. The 14 latches comprising the multiplexer/latch 84, 85 are connected to the respective bits of the LPFF and LPFT micro control fields for the local processor P1, and DP3 signal being connected to the A inputs of all of the latches and the $t_0$ timing pulse being applied to the clock inputs thereof.

A similar arrangement is utilized to provide the phantom branch capability for the processors 18, 19 and 27, except that the LPFF and LPFT fields utilized are those associated with the respective processors with the signals DP4, DP5 and DP6 respectively being utilized to effect the branch decisions. It will be appreciated, as discussed above, that the $S_4$ function bit input to each of the local processors is wired to a logic 1 since the input is not utilized. The LPFT and LPFF fields (FIG. 4) for the processor P4 have 15 bits, the additional bit being utilized with the $C_{in}$ input to the processor providing the capability of conditionally adding a constant +1 under control of the LPFT and LPFF micro control function fields for the processor.

It will be appreciated that the multiplexer 84 and the function latch 85 of FIG. 5B, as implemented by the dual input D-type flip-flops of FIG. 50, are utilized in providing the three-way overlap operation with respect to overlapping micro-instruction fetch of the next micro-instruction with computing the function selected with respect to the previously fetched micro-instruction. The function latch 85 provides the selected function field of the previously fetched micro instruction to the local processor 17 for execution thereby, while the function fields from the newly fetched micro-instruction are applied from the control register 37 to the multiplexer 84 of FIG. 5. These newly fetched function fields reside at the inputs to the function latches which are storing the function fields from the previous micro-instruction and are strobed into the latches at the beginning of the next micro cycle to control the local processor during that cycle while the next micro instruction is again being fetched.

Figure 51:
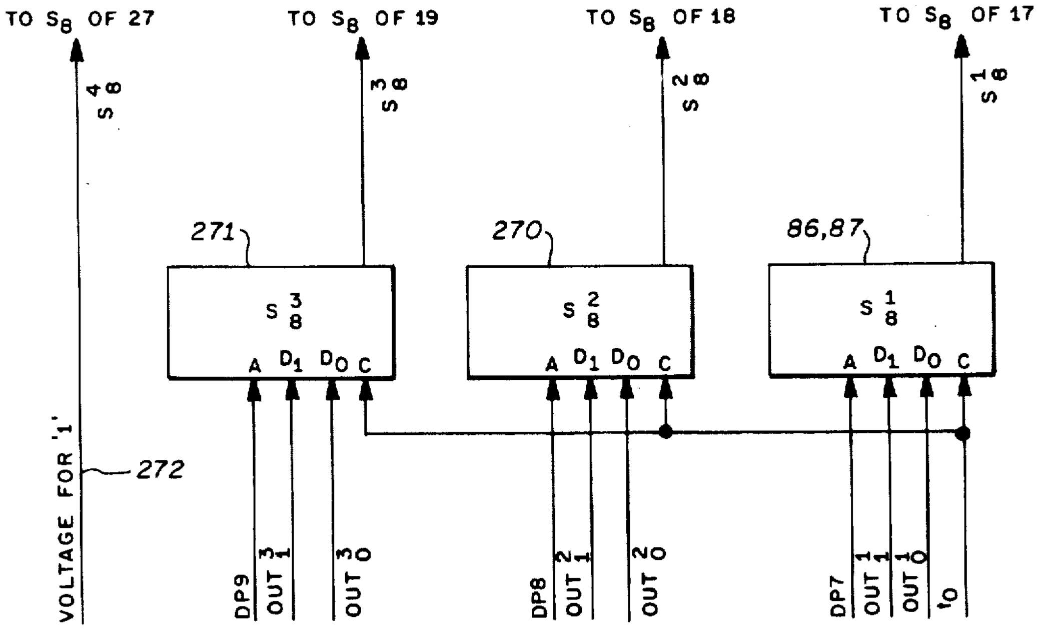
FIG. 51 is a schematic block diagram illustrating details of the output control function multiplexers and latches of the local processors of the computer of FIG. 5 utilizing DP7–DP9 as computed by the table driven control logic of the present invention.

Referring to FIG. 51, the implementation for providing the $S_8$ function bit to each of the local processors, 17, 18, 19 and 27 is illustrated. The multiplexer 86 and latch 87 (FIG. **5*b*) is implemented by a dual input D type multiplexer/latch with the $D_1$ and $D_0$ inputs thereof connected to the two respective bits of the micro control OUT field for the processor P1. The selection between the two latch inputs is effected by the DP7 signal. In a similar manner, latches 270 and 271 are utilized to provide the $S_8$ bit to the processors $P_2$ and $P_3$ under control of the DP8 and DP9 signals respectively. The latches $S_8{}^1$, $S_8{}^2$ and $S_8{}^3$ are clocked at $t_0$. A line 272 provides a logic 1 signal to the $S_8$ input of the processor P4, since this processor does not share an output D bus as do the processors P1, P2 and P3**.

The $S_8$ function bit provides the accumulator output control for the local processors in accordance with Table 8 above. The specific values for $S_8$ in accordance with the OUT field and the associated DP signal are as follows:

| $OUT_1$ | $OUT_0$ | |
|---|---|---|
| 0 | 0 | S8 = 0 |
| 0 | 1 | S8 = f(x) |
| 1 | 0 | S8 = $\overline{f(x)}$ |
| 1 | 1 | S8 = 1 |

| DP | $OUT_1$ | $OUT_2$ | $S_8$ | |
|---|---|---|---|---|
| 0 | 0 | 0 | 0 | S8 = 0 |
| 0 | 0 | 1 | 0 | S8 = f(x) |
| 0 | 1 | 0 | 1 | S8 = $\overline{f(x)}$ |
| 0 | 1 | 1 | 1 | |
| 1 | 0 | 0 | 0 | |
| 1 | 0 | 1 | 1 | |
| 1 | 1 | 0 | 0 | |
| 1 | 1 | 1 | 1 | S8 = 1 |

Figure 52:
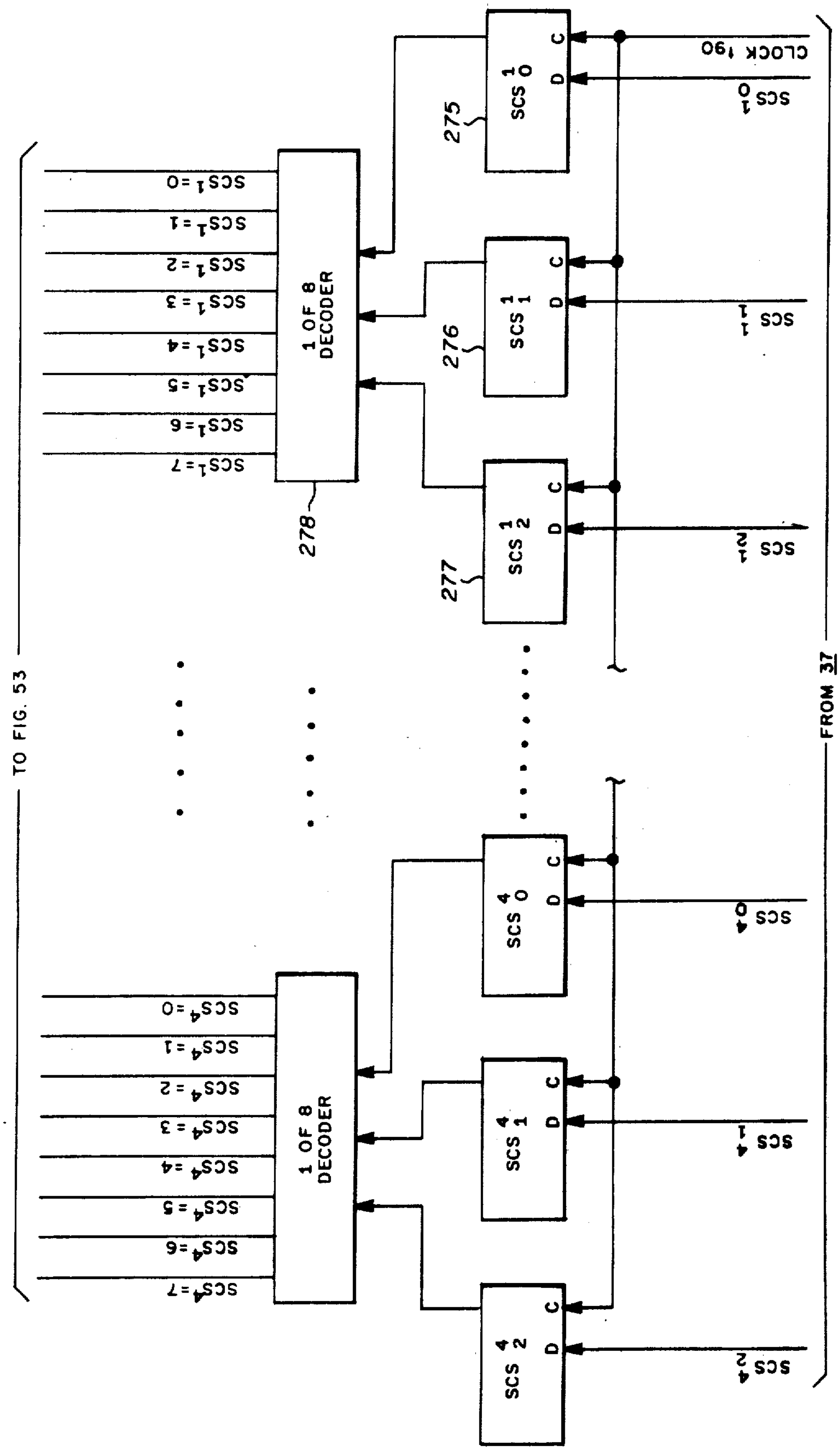
FIG. 52 is a schematic block diagram illustrating details of the SCS latches for the computer of FIG. 5.

As discussed above with respect to FIG. 4 and Table 4, the SCS field associated with each of the local processors selects one of seven settable static control variables (SC1–SC7) to be set in accordance with the value of the decision point (DP7–DP10) associated with the processor. Referring now to FIG. 52, the SCS latches for holding the three bit SCS field associated with each of the local processors are illustrated. For example, the three bits of the SCS field associated with the local processor P1, $SCS_0{}^1$, $SCS_1{}^1$, $SCS_2{}^1$, are applied respectively to the D inputs of D type latches 275, 276 and 277. The three outputs from the latches 275, 276 and 277 are applied to a 1-of-8 decoder 278 which energizes one of the 8 output lines in accordance with the settable static variable selected by the SCS field. For example, if the SCS field selects static variable SC1, the $SCS^1=1$ line is energized. In a similar manner, the SCS fields associated with the local processors P2, P3 and P4 are latched and decoded into 1-of-8 lines. It will be appreciated that the SCS=0 line is not utilized for the setting of a static variable. When the SCS micro control field equal 000 and the SCS=0 line is energized, no static control variable is altered. The SCS fields are clocked into the SCS latches at $t_{90}$.

Figure 53:
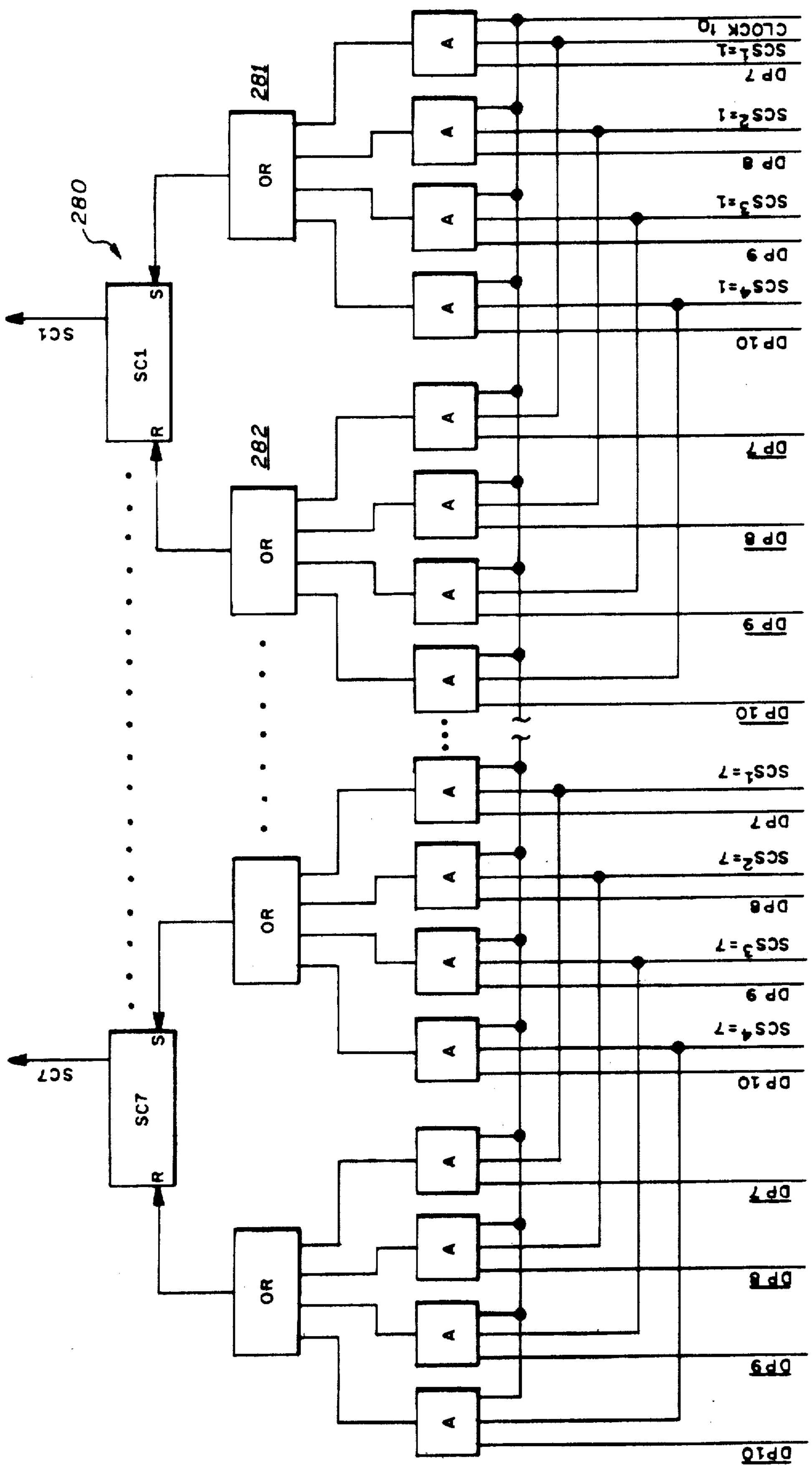
FIG. 53 is a schematic logic diagram illustrating details with respect to the setting of the static control variable latches of the computer of FIG. 5 utilizing DP7–DP10 as computed by the table driven control logic of the present invention.

Referring now to FIG. 53, the logic for setting the selected static control variable (SC1–SC7) for each of the local processors (P1–P4) in accordance with the value of the respective decision point (DP7–DP10) is illustrated. The values of the static control variables, SC1–SC7, are set into respective R-S latches 280. For example, the value of the static control variable SC1 is set into the SC1 latch by latch setting logic 281 and latch resetting logic 282. The latch SC1 can be set with respect to any of the local processors in accordance with the associated DP7–DP10 signal as controlled by the SCS=1 (FIG. 52) signal associated with the particular processor. Similar logic inserts the decision point values into the remaining latches SC2–SC7. The static control variable values are clocked through the logic and into the latches at $t_0$.

It will be appreciated that the seven static control variable latches 280 are shared by the four local processors. The micro code discussed above with respect to FIGS. 15–30 is such that no two local processors will require changing the value of the same static control variable latch at the same time. The components illustrated in FIGS. 52 and 53 are located in the control circuits 41 discussed above with respect to FIGS. 2 and 5.

Figure 54:
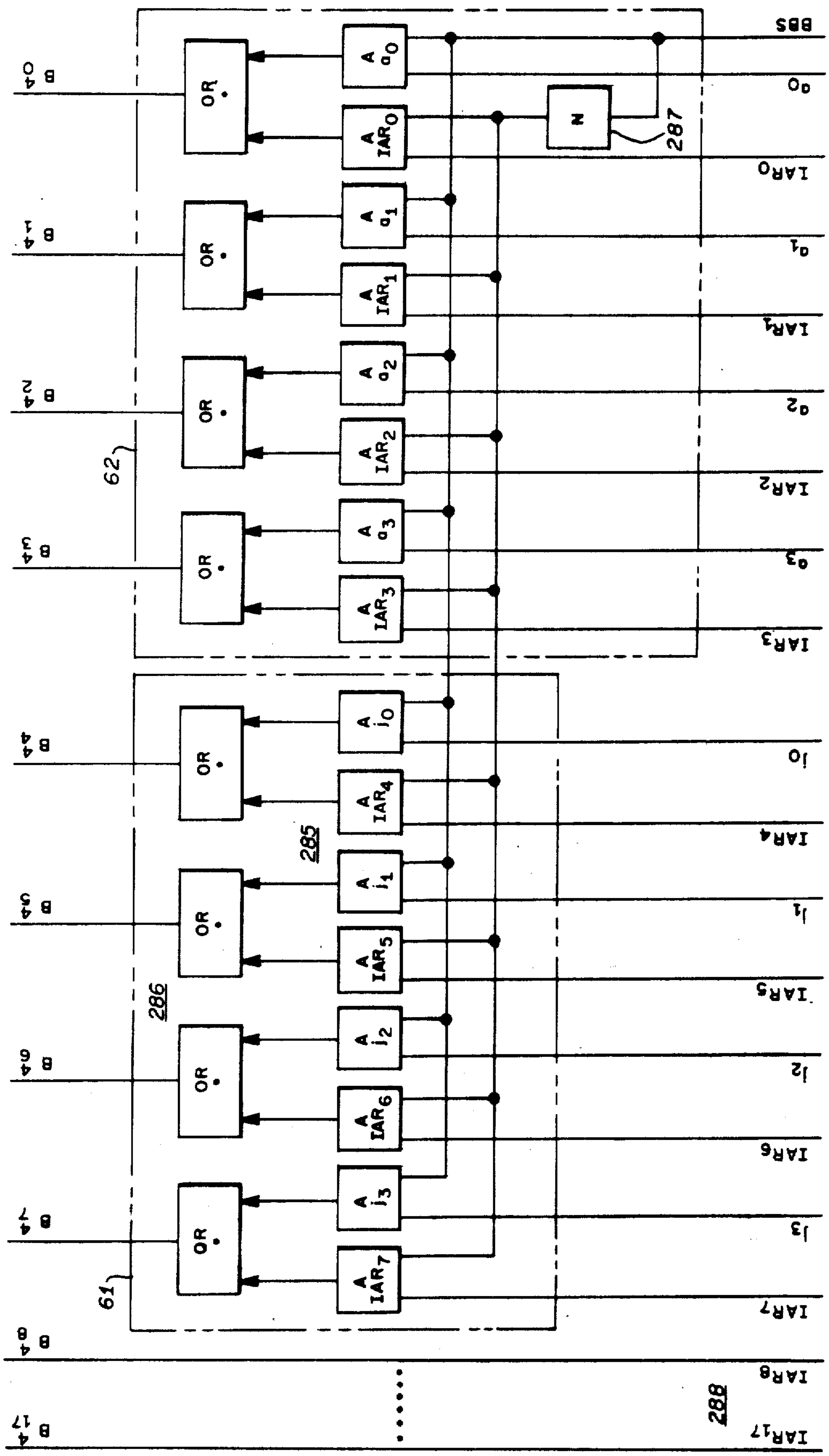
FIG. 54 is a schematic logic diagram illustrating details of the B4 bus multiplexers of the P4 local processor of the computer of FIG. 5.

Referring to FIG. 54, details of the B4 bus 29, as well as the input multiplexers 61 and 62 thereto, (FIG. 5*c*) are illustrated. The multiplexers 61 and 62 are implemented by AND gates 285 and OR gates 286 controlled by the BBS field directly and through an inverter 287 to selectively transmit either the a and j bits or the IAR bits from the instruction address register 12. The logic 285 and 286 provides bits $B_0$–$B_7$ of the B4 bus; bits $B_8$–$B_{17}$ being provided directly from the register 12 via lines 288.

Figure 55:
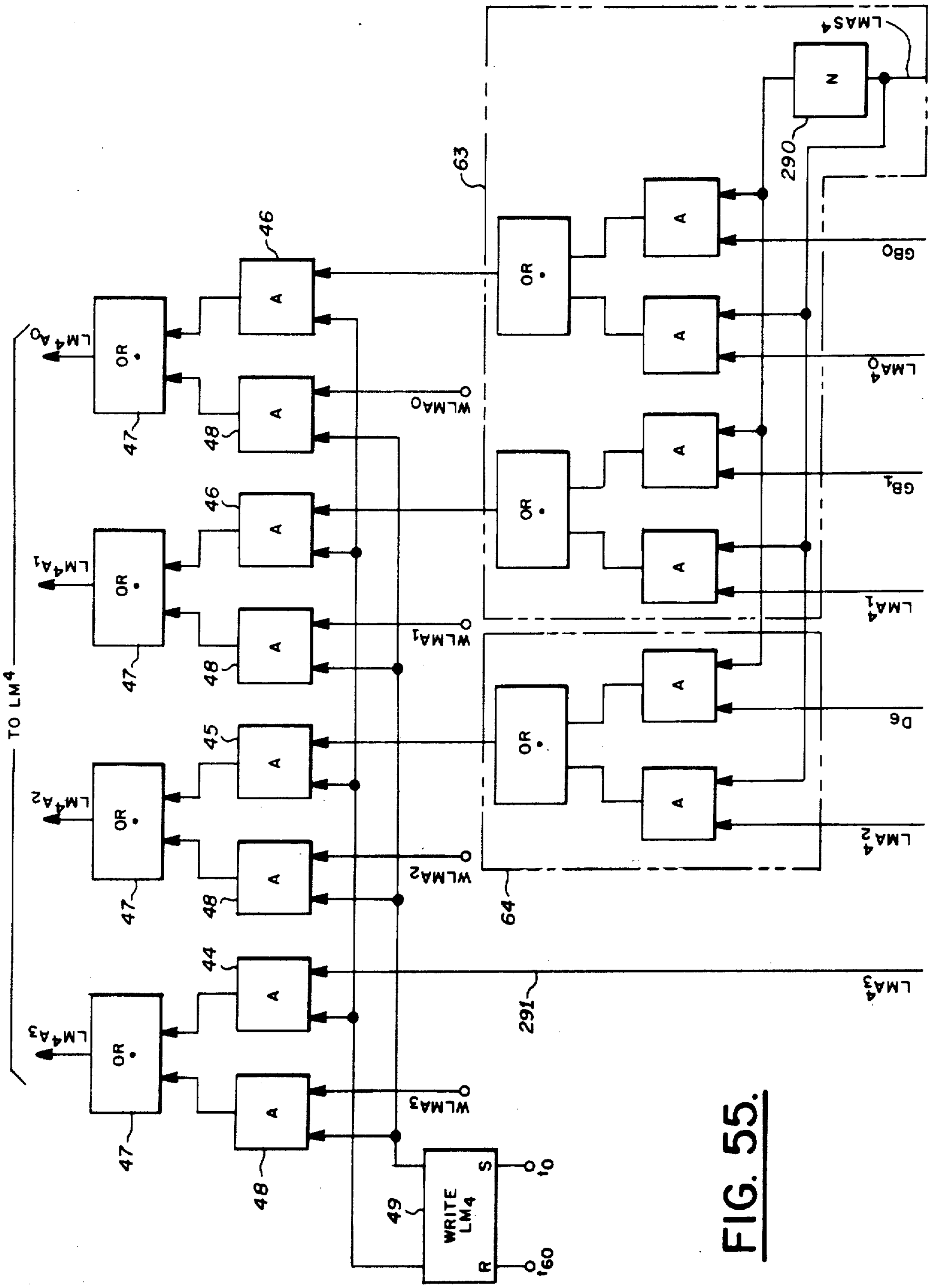
FIG. 55 is a schematic logic diagram illustrating the details of the addressing multiplexer for the local memory (LM4) of the computer of FIG. 5.

Referring to FIG. 55, details of the Logic 44–49 (FIG. 5*c*) and multiplexers 63 and 64 are illustrated. The multiplexers 63 and 64 comprise AND and OR gates responsive to the GB, D6 and LMA fields for selectively providing either the 4 bits of LMA or bit 3 of LMA concatenated with D6 and GB under control of the LMAS field which is applied directly and through an inverter 290 to the AND gates. The 4 bits provided by the multiplexers 63 and 64 and line 291 are multiplexed with the 4 bits of the WLMA field by AND and OR gates 44–48 under control of the WRITE $LM_4$ flip flop 49. The 4 bits from the OR gates 47 are applied to the local memory 28 as the address input thereto.

Figure 56:
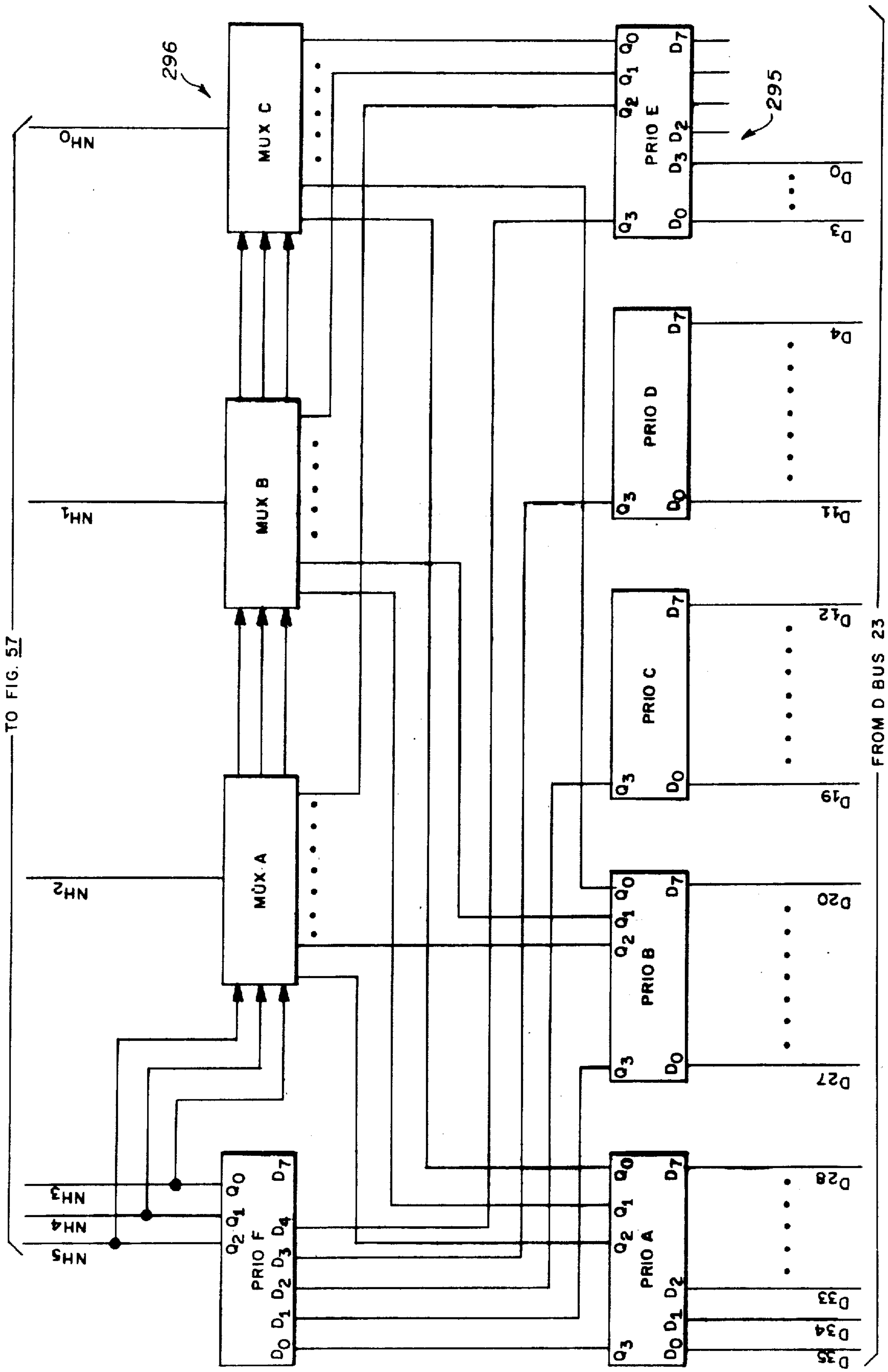
FIG. 56 is a schematic block diagram illustrating details of the normalizer helper of the computer of FIG. 5.

Referring now to FIG. 56, details of the Normalizer Helper 75 are illustrated. The normalizer helper is provided to increase the speed of the normalization process for floating point instructions. The normalizer helper locates the position of the left most one bit in a 36 bit operand from the D bus 23 and converts this location into a count. The count is transferred to the shift control network 69 (FIGS. 5*a* and 57) so that the appropriate shift is provided to move the leftmost one bit into bit position $2^{35}$. The shift count from the shift count register 69 is also applied through the shifter 35, as described above, to the B bus so that the local processors can appropriately adjust the characteristic of the floating point number in accordance with the number of shifts that are required.

The normalizer helper comprises 5 priority chips 295 wherein the outputs $Q_0$, $Q_1$ and $Q_2$ provide a code identifying the position of the leftmost input $D_0$–$D_7$ (with $D_0$ considered as the leftmost input) that has a one bit applied thereto. The $Q_3$ output is indicative of whether any of the inputs $D_0$–$D_7$ have a one bit applied thereto. The D bus bits $D_0$–$D_{35}$ are applied to the respective inputs of the priority chips A–E with the inputs $D_2$–$D_7$ of the priority chip E not being utilized. A priority chip such as that commercially procurable from Motorola Semiconductor Products, as the MC10165 priority encoder as fully described in said above referenced Data Library may be utilized.

The respective $Q_3$ outputs from the priority chips A–E are connected respectively to the $D_0$–$D_4$ inputs of a priority chip F. The resultant outputs $Q_2$–$Q_0$ of the priority chip F are utilized as the select inputs of three 5-to-1 multiplexer chips 296. The $Q_2$ outputs from the five priority chips A–E are connected to the five inputs respectively of the multiplexer A. Similarly, the $Q_1$ outputs from the priority chips A–E are connected to the inputs of multiplexer B with the $Q_0$ outputs of the priority chips connected to the inputs to the multiplexer C. Thus, it is appreciated that in accordance with the output of priority chip F, the multiplexers 296 will provide on their three outputs respectively, the three outputs $Q_2$, $Q_1$ and $Q_0$ of one of the priority chips A–E selected in accordance with the code output from priority chip F.

The $Q_2$, $Q_1$, and $Q_0$ outputs from the priority chip F and the three outputs from the multiplexers A–C, provide the six bit normalizer helper output $NH_5$–$NH_0$ to provide, through the shift control register 69, the address into the shift/mask address prom 70 for controlling the required normalizing data shift.

Figure 57:
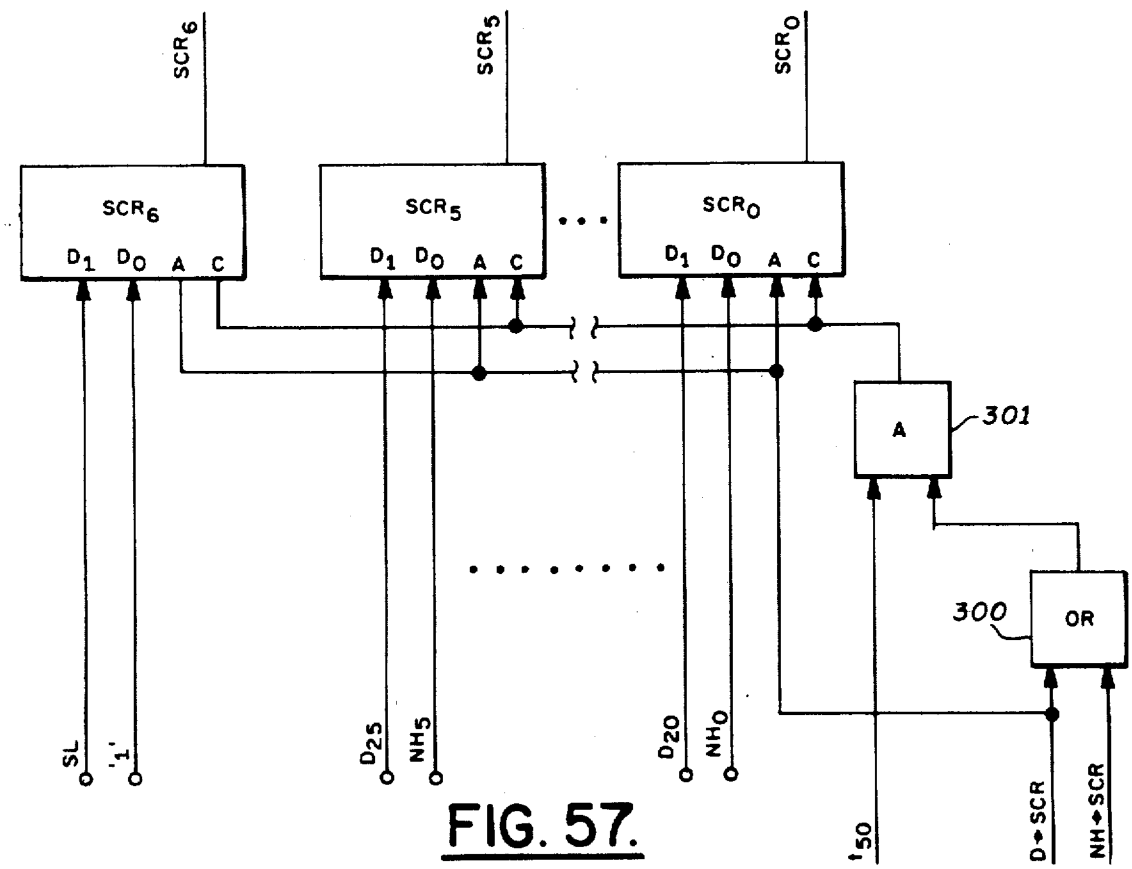
FIG. 57 is a schematic block diagram illustrating details of the shift control register of the computer of FIG. 5.

Referring to FIG. 57, the details of the shift control register 69 (FIG. 5*a*) are illustrated. The register 69 is comprised of seven dual input D type latches with the $D_1$ inputs of the latches SCR 0-SCR 5 being responsive to the D bus bits $D_{20}$–$D_{25}$ respectively. The $D_0$ inputs to the latches $SCR_0$–$SCR_5$ receive the $NH_0$–$NH_5$ outputs respectively from FIG. 56. The most significant stage of the register receives the SL signal and a hard wired "one" at the $D_1$ and $D_0$ inputs thereof respectively. Selection between the D inputs of the register latches is effected by the D→SCR signal from the deferred action control circuitry described above. It is appreciated that when D→SCR is active, the $D_1$ inputs to the latches are selected and when the signal is inactive, at which time the NH→SCR signal may be active, the $D_0$ inputs to the latches are selected. The latches are clocked at $t_{50}$ when either the D→SCR or NH→SCR signals are active as provided through an OR gate 300 and an AND gate 301. The register provides the 7 output bits $SCR_0$ and $SCR_6$ as required for the shifting and normalizing functions.

Figure 58:
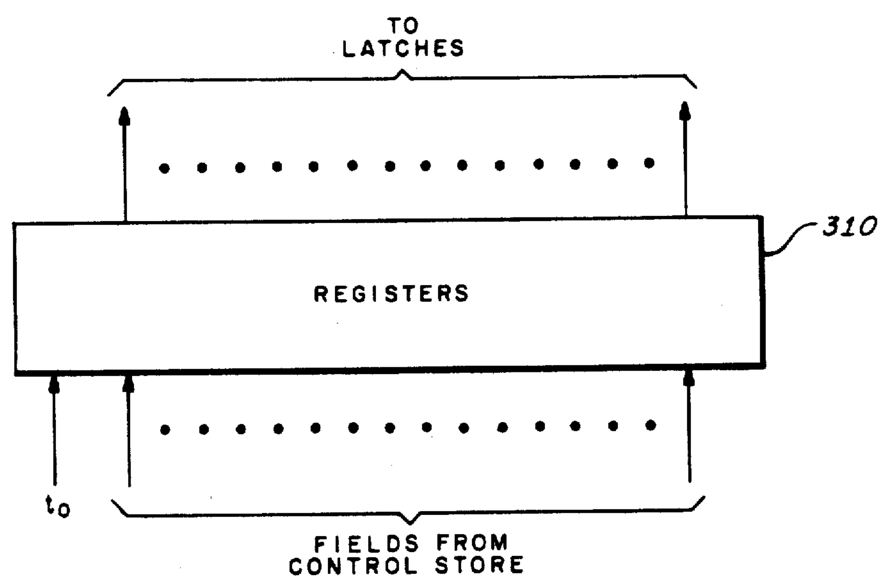
FIG. 58 is a schematic block diagram illustrating the registers utilized in saving control fields over one micro cycle of the computer of FIG. 5 in performing the three-way micro overlapped operation.

Referring to FIG. 58, registers 310 are illustrated which are utilized for saving the DACT, DACF, OUT, WLM and SCS fields for one micro cycle as described above with respect to the three-way micro overlap. The appropriate fields from the control store register 37 (FIG. 5) are strobed into the register 310 at $t_0$ of a particular micro cycle and are thereafter strobed into the appropriate latches at $t_0$ of the next micro cycle. Thus the requisite one micro cycle delay is effected to provide the three-way overlap discussed above.

It will be appreciated from the foregoing descriptions and detailed logic drawings appended hereto, that the circuitry illustrated therein is readily implemented utilizing LSI and MSI commercially procurable components, thereby effecting the significant cost and size advantages discussed above.

It will furthermore be appreciated with respect to the present invention that the logic function computer memories of FIG. 8 are readily implemented utilizing small, fast LSI memory chips. Because of the regular design of the decision and control logic of the present invention as compared with prior random logic designs, LSI storage elements may be utilized to implement the decision making capability of the CPU 10.

It is therefore appreciated from the foregoing with respect to the decision and control logic of the present invention that flexibility is achieved compared to prior art arrangements because the LSI memories utilized may be programmed with the truth tables of arbitrary functions employed in the computer. Hardware economy is effected compared to the prior art random logic designs since it is only necessary to store one truth table for a particular logic function irrespective of the different computer variables that may be applied thereto in computing the values of the decision points.

Although the present invention has been described in terms of use in a micro programmable emulator, it will be appreciated that the decision and control logic concepts described herein may be utilized in implementing the decision and control logic for computers of different designs.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. In a microprogrammable CPU for a computer utilizing a plurality of binary valued control variables and having control storage means for storing a plurality of micro instruction words, each micro instruction word having control variable selection fields and function selection fields, decision control logic apparatus for providing a binary valued decision signal to an appropriate point in said computer for effecting a binary valued control decision within said computer, said binary valued decision signal being provided in accordance with a binary valued control function utilized in said computer for making said binary valued control decision, said control function being a function of binary valued control variables selected from said plurality thereof by said control variable selection fields, said control function selected from a plurality of control functions by said function selection fields, said decision control logic apparatus comprising control variable means for providing a plurality of binary valued control variable signals corresponding to said plurality of binary valued control variables, respectively, control variable selection means coupled to receive said plurality of binary valued control variable signals and said control variable selection fields for selecting control variable signals from said plurality thereof in accordance with said control variable selection fields, and memory means coupled to receive said selected control variable signals and said function selection fields, said memory means storing a plurality of truth tables corresponding to said plurality of control functions respectively, each said truth table comprising binary valued entries, each said entry equal to the binary value of the associated control function for a particular combination of binary values of said selected control variable signals, said memory means being addressed by said selected control variable signals and said function selection fields for providing, in response thereto, the truth table entry corresponding to said selected control variable signals from the truth table selected in accordance with said function selection fields, the addressed truth table entry providing said binary valued decision signal to said appropriate point in said computer for effecting said binary valued control decision within said computer, and in which said computer operates in cycles, said plurality of binary valued control variables comprise a plurality of first binary valued control variables and a plurality of second binary valued control variables, said second binary valued control variables being available in a cycle subsequent to the availability of said first binary valued control variables, said control variable means comprises means for providing a plurality of first binary valued control variable signals and a plurality of second binary valued control variable signals corresponding to said plurality of first binary valued control variables and said plurality of second binary valued control variables respectively, and said control variable selection fields comprise first control variable selection fields and second control variable selection fields, said control variable selection means comprising first control variable selection means responsive to said plurality of first binary valued control variable signals and said first control variable selection fields for selecting first binary valued control variable signals from said plurality thereof in accordance with said first control variable selection fields, and second control variable selection means responsive to said plurality of second binary valued control variable signals and said second control variable selection fields for selecting second binary valued control variable signals from said plurality thereof in accordance with said second control variable selection fields.

2. The apparatus of claim 1 in which said memory means comprises a memory for storing said plurality of truth tables, said memory being responsive to said selected first binary valued control variable signals and to said function selection fields for addressing a plurality of truth table entries in said selected truth table, said entries corresponding to said selected first binary valued control variables, and function value selection means responsive to said addressed truth table entries and to said selected second binary valued control variable signals for selecting one of said addressed truth table entries in accordance with said selected second control variable signals, thereby providing said binary valued decision signal in accordance with said selected function of said selected first and second binary valued control variables.

3. The apparatus of claim 1 in which said function selection fields comprise first function selection fields and a second function selection field, said memory means comprising a plurality of memories responsive to said selected first binary valued control variable signals and to said first function selection fields, each said memory storing a plurality of said truth tables and each said memory being responsive to said selected first binary valued control variable signals and a respective one of said first function selection fields for addressing a plurality of truth table entries in the truth table selected by said one of said first function selection fields, said entries corresponding to said selected first binary valued control variables, memory output selection means responsive to said addressed truth table entries from each of said memories and to said second function selection field for selecting said addressed truth table entries from one of said memories selected in accordance with said second function selection field, and function value selection means responsive to said selected addressed truth table entries and to said selected second binary valued control variable signals for selecting one of said selected addressed truth table entries in accordance with said selected second binary valued control variables, thereby providing said binary valued decision signal in accordance with said selected function of said selected first and second binary valued control variables.

4. In a micro programmable CPU for a computer operating in micro cycles, utilizing a plurality of binary valued static control variables and a plurality of binary valued dynamic control variables, said dynamic control variables being available in a micro cycle subsequent to the availability of said static control variables and having control storage means for storing a plurality of micro instruction words, each micro instruction word having a plurality of static control variable selection fields, a plurality of dynamic control variable selection fields, a plurality of logic function memory selection fields and at least one logic function memory output selection field, decision control logic apparatus for providing a binary valued decision signal to an appropriate point in said computer for effecting a binary valued control decision within said computer in accordance with a selected binary valued control function of selected static and dynamic control variables, said control function selected from a plurality of control functions utilized in said computer, said decision control logic apparatus comprising static control variable means for providing a plurality of binary valued static control variable signals corresponding to said plurality of binary valued static control variables respectively, dynamic control variable means for providing a plurality of binary valued dynamic control variable signals corresponding to said plurality of binary valued dynamic control variables respectively, static control variable selection means coupled to receive said static control variable signals and said static control variable selection fields for selecting static control variable signals from said plurality thereof in accordance with said static control variable selection fields, dynamic control variable selection means coupled to rcceive said dynamic control variable signals and said dynamic control variable selection fields for selecting dynamic control variable signals from said plurality thereof in accordance with said dynamic control variable selection fields, a plurality of logic function memories coupled to receive said logic function selection fields, respectively, and said selected static control variable signals, each said memory storing a plurality of truth tables of a plurality of said control functions, each said truth table comprising binary valued entries, each said entry equal to the binary value of the associated control function for a particular combination of binary values of said selected static and dynamic control variable signals, each said memory being responsive to said respective logic function selection field and to said selected static control variable signals for addressing a plurality of truth table entries in the truth table addressed by said logic function selection field, said entries corresponding to said selected static control variable signals, memory output selection means coupled to receive the respective addressed outputs from said logic function memories and said logic function memory output selection field for selecting the addressed outputs from the logic function memory selected by said logic function memory output selection field, and function value selection means coupled to receive said selected addressed logic function memory outputs and said selected dynamic control variable signals for selecting one of said selected addressed logic function memory outputs in accordance with said dynamic control variable signals, thereby providing said binary valued decision signal in accordance with said selected control function of said selected static and dynamic control variables.

5. The apparatus of claim 4 in which said memory output selection means includes inputs responsive to a constant logic value, said inputs selectable by said logic function memory output selection field for providing said constant logic value as said binary decision signal when said inputs are selected by said logic function memory output selection field.

6. The apparatus of claim 4 in which said memories comprise LSI integrated circuits.

7. Decision control logic apparatus for a digital computer for providing a binary valued decision signal to an appropriate point in said computer for effecting a binary valued control decision within said computer, said binary valued decision signal being provided in accordance with a binary valued control function utilized in said computer for making said binary valued control decision, said control function being a function of binary valued control variables utilized in said computer, said computer operating in cycles and said control function being representable by a truth table thereof, said decision control logic apparatus comprising:

memory means for storing said truth table of said control function, said truth table comprising binary valued entries, each equal to the binary value of said control function for a particular combination of binary values of said binary valued control variables, control variable means for providing binary valued control variable signals corresponding, respectively, to said binary valued control variables, said binary valued control variables comprising first binary valued control variables and second binary valued control variables, said second binary valued control variables being available in a cycle subsequent to the availability of said first binary valued control variables, said binary valued control variable signals comprising first binary valued control variable signals and second binary valued control variable signals corresponding to said first binary valued control variables and said second binary valued control variables, respectively, said memory means being coupled to receive said first binary valued control variable signals for addressing said memory means, said memory means in response thereto providing a plurality of truth table entries in said truth table, said entries corresponding to said first binary valued control variables, said memory means including function value selection means coupled to receive said addressed truth table entries and said second binary valued control variable signals for selecting one of said addressed truth table entries in accordance with said second binary valued control variables, said one selected truth table entry providing said binary valued decision signal to said appropriate point in said computer for effecting said binary valued control decision within said computer.

8. The apparatus of claim 7 in which said binary valued decision signal is provided in accordance with a binary valued control function selected from a plurality of binary valued control functions of said binary valued control variables, said memory means comprises means for storing a plurality of truth tables corresponding to said plurality of binary valued control functions respectively, and said apparatus further includes function selection means for providing a function selection signal for selecting said control function in accordance with conditions within said computer, said memory means being coupled to receive said function selection signal for addressing, in response thereto, the truth table corresponding to said selected function, thereby providing said binary valued decision signal in accordance with said selected function.

9. The apparatus of claim 8 in which said memory means comprises a memory for storing said plurality of truth tables, said memory being coupled to receive said first binary valued control variable signals and said function selection signal for addressing, in response thereto, a plurality of truth table entries in the truth table addressed by said function selection signal, said entries corresponding to said first binary valued control variables, and said function value selection means coupled to receive said addressed truth table entries and said second binary valued control variable signals for selecting one of said addressed truth table entries in accordance with said second binary valued control variables, thereby providing said binary valued decision signal in accordance with said selected function of said first and second binary valued control variables.

10. The apparatus of claim 9 in which said computer utilizes a plurality of said first binary valued control variables and a plurality of said second binary valued control variables, said control variable means providing first and second pluralities of binary valued control variable signals corresponding, respectively, thereto, said control variable means comprising first control variable selection means responsive to said first plurality of binary valued control variable signals for selecting first binary valued control variable signals therefrom for application to said memory to provide said addressed truth table entries, and second control variable selection means responsive to said second plurality of binary valued control variable signals for selecting second binary valued control variable signals therefrom for application to said function value selection means to provide said binary decision signal.

* * * * *